Aug. 7, 1945.    G. DEAKIN    2,380,950
TELECOMMUNICATION SYSTEM
Filed April 23, 1943    36 Sheets-Sheet 1
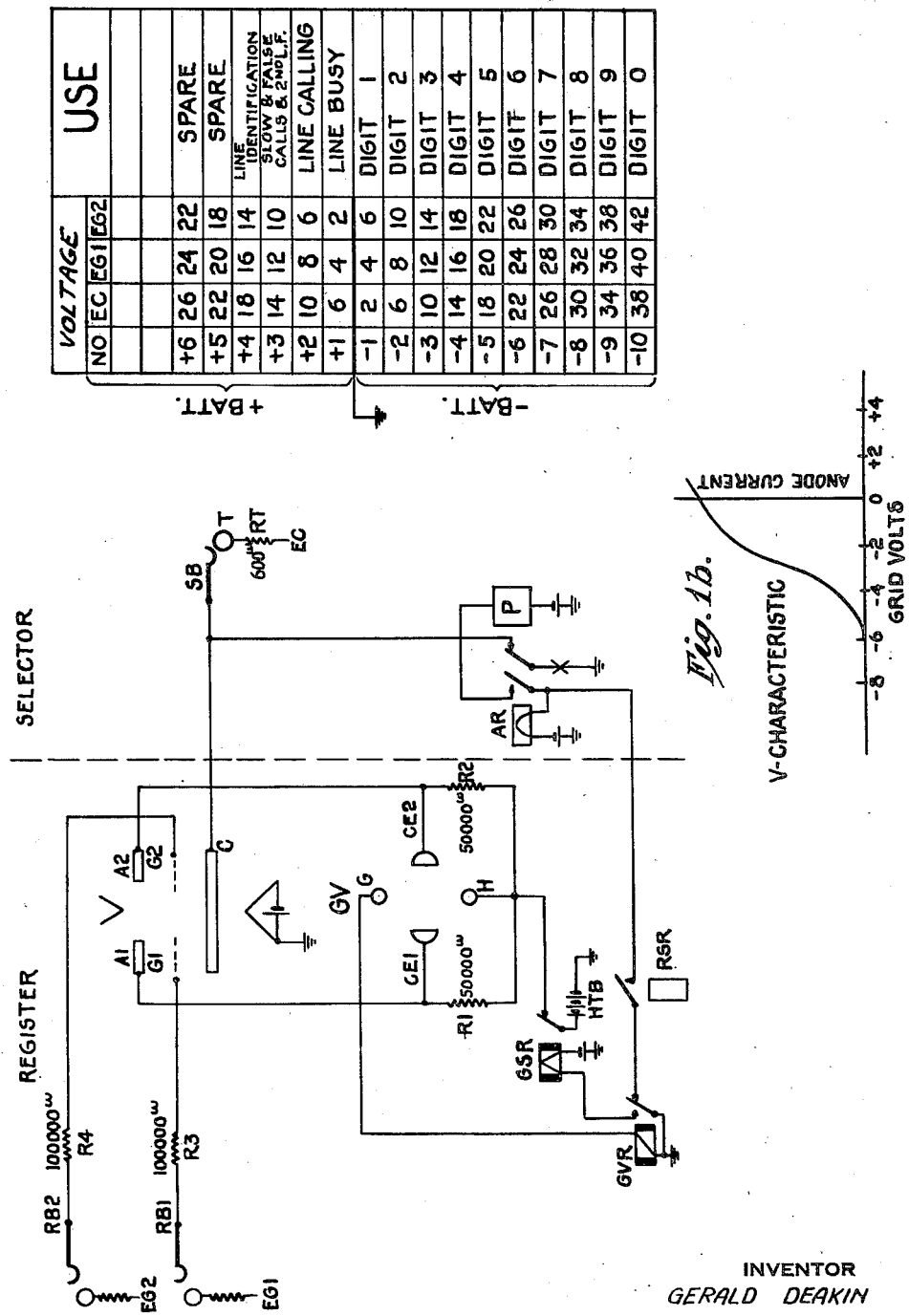
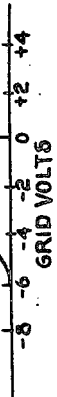
INVENTOR
GERALD DEAKIN
BY
*Edward D. ......*
ATTORNEY

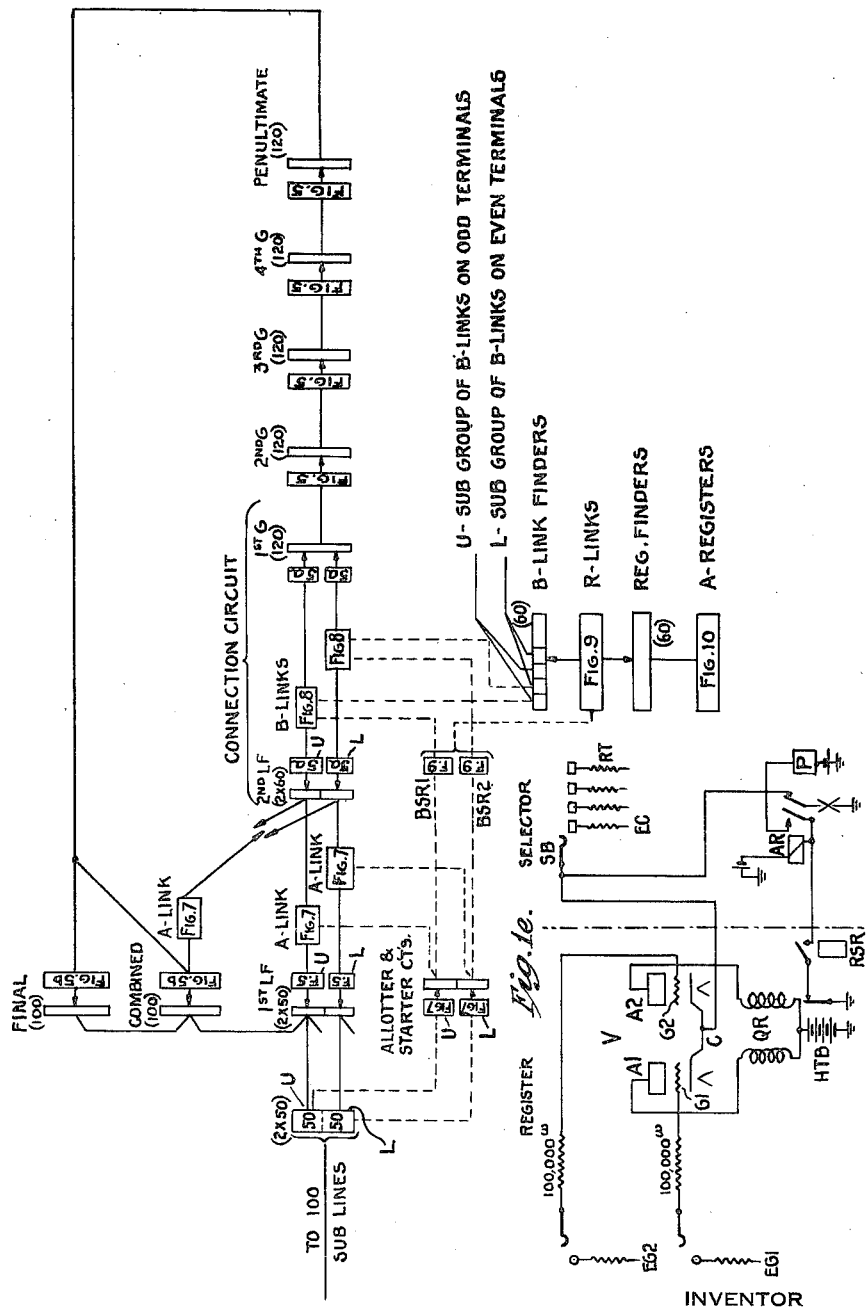

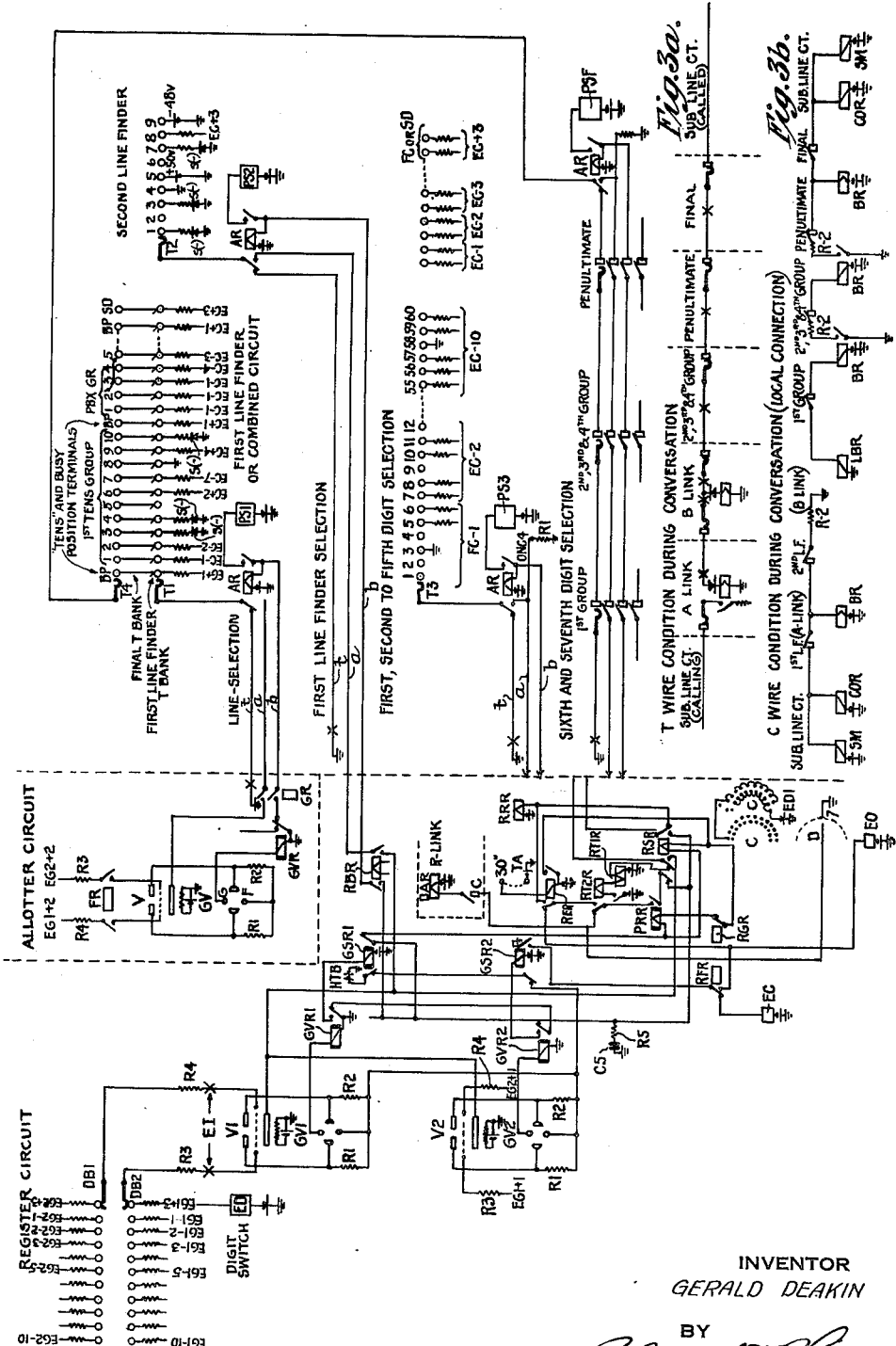

Aug. 7, 1945.                G. DEAKIN                2,380,950
                       TELECOMMUNICATION SYSTEM
                         Filed April 23, 1943          36 Sheets-Sheet 5

Fig. 4.

HOME POSITION                DIRECTION OF MOVEMENT
                                    ——————▶
TEST POSITION              BRUSHES ON ODD ROWS
                         10 GROUPS OF 6 TRUNKS EACH

| | GR 1 | GR 2 | 3 | 4 | 5 | 6 | 7 | 8 | 9 | GR 10 | |
|---|---|---|---|---|---|---|---|---|---|---|---|
| A | o o | o o | o o | o o | o o | o o | o o | o o | o o | o o | o A |
| A | o o | | | | | | | | | o | o A |
| B | o o | | | | | | | | | | o B |
| B | o o | | | | | | | | | | o B |
| C | o o | | | | | | | | | | o C |
| C | o o | | | | | | | | | | o C |
| T | o o | | | | | | | | | | o T |
| T | o o o | o | o | o | oo | | | oo | oo | | oo T |

10 EXTRA TRUNKS   10 GROUPS OF 1    10 GROUPS OF 2 EACH    10 GROUPS OF 2 EACH
   FOR SPECIAL      3ʳᴰ GRADING         2ᴺᴰ GRADING            1ˢᵀ GRADING
   ASSIGNMENT

◀——————
                       BRUSHES ON EVEN ROWS

Fig. 4a.

HOME POSITION
                            DIRECTION OF MOVEMENT
                                    ——————▶
                          BRUSHES ON ODD ROWS
  BP#1   1ˢᵀ-10  BP#2  2ᴺᴰ-10  BP#3  3ᴿᴰ-10  BP#4  4ᵀᴴ-10  BP#5  5ᵀᴴ-10  BP#6  1ˢᵀ EXTRA-4  R.T. POS.

| | | | | | | | |
|---|---|---|---|---|---|---|---|
| A o o | o o o | o o o | o o o | o o o | o o o | o o A |
| A o o | o o o | o o o | o | o | o | o A |
| B o o | o o o | o o o | o | o | o | o B |
| B o o | o o o | o o o | o | o | o | o B |
| C o o | o o o | o o o | o | o | o | o C |
| C o o | o o o | o o o | o | o | o | o C |
| T o o | o o o | o o o | o | o | o | o T |
| T o o | o o o | o o o | o o o | o o o | o o o | o o T |

BP#12  10ᵀᴴ-10  BP#11  9ᵀᴴ-10  BP#10  8ᵀᴴ-10  BP#9  7ᵀᴴ-10  BP#8  6ᵀᴴ-10  BP#7  2ᴺᴰ EXTRA-4
                                                                           AND SPECIAL
                                                                           ASSIGNMENT
                          ◀——————
                       BRUSHES ON EVEN ROWS

INVENTOR.
                                          GERALD DEAKIN
                                       BY
                                          Edward D. Kinney
                                                       ATTORNEY Aug. 7, 1945.   G. DEAKIN   2,380,950
TELECOMMUNICATION SYSTEM
Filed April 23, 1943   36 Sheets-Sheet 6
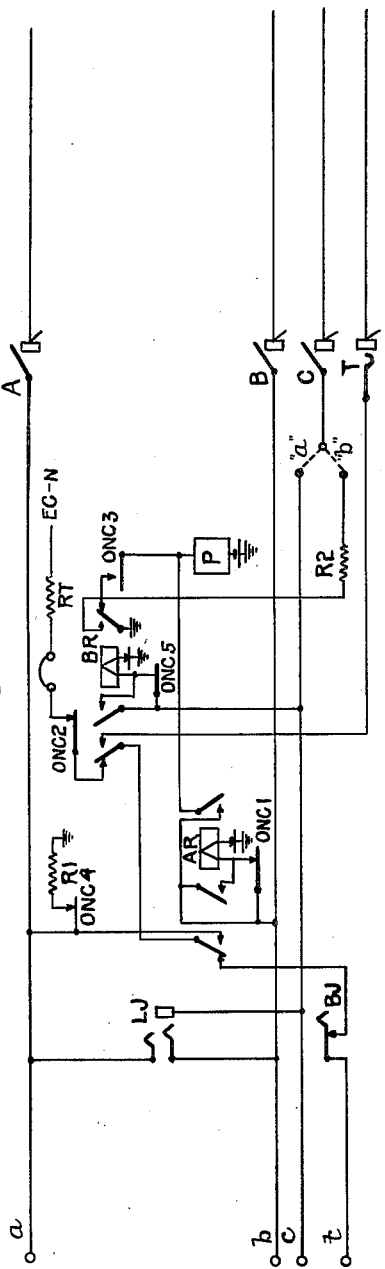
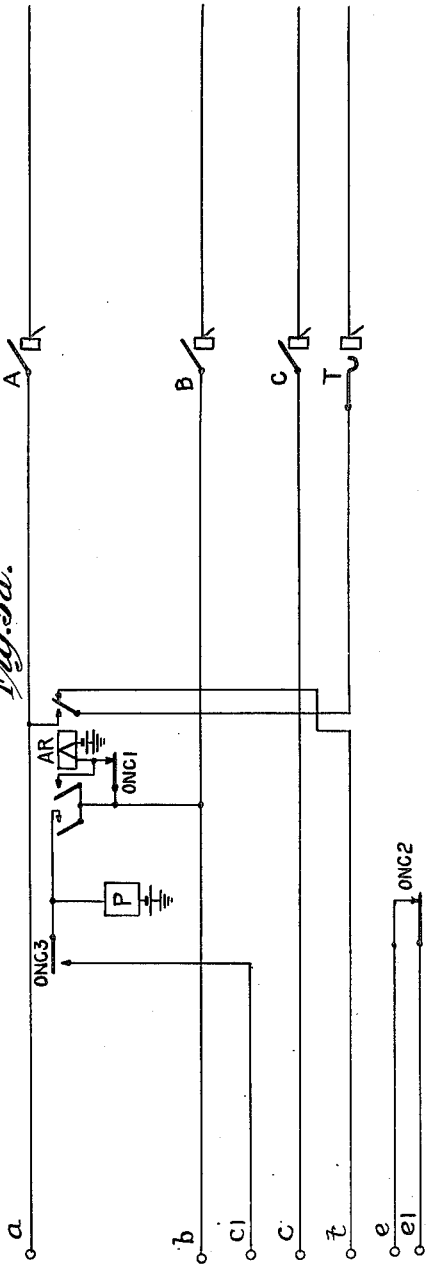
INVENTOR.
GERALD DEAKIN
BY
*Edward D. Thuney*
ATTORNEY

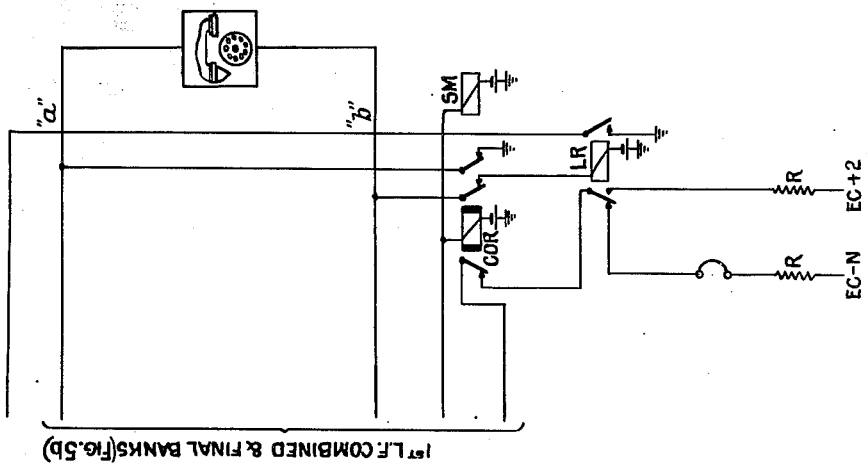
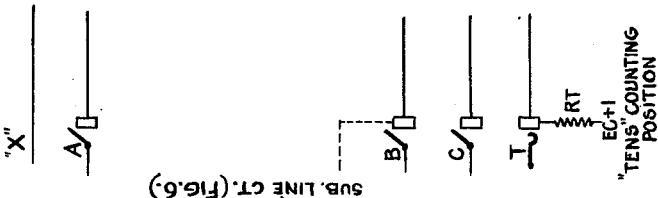
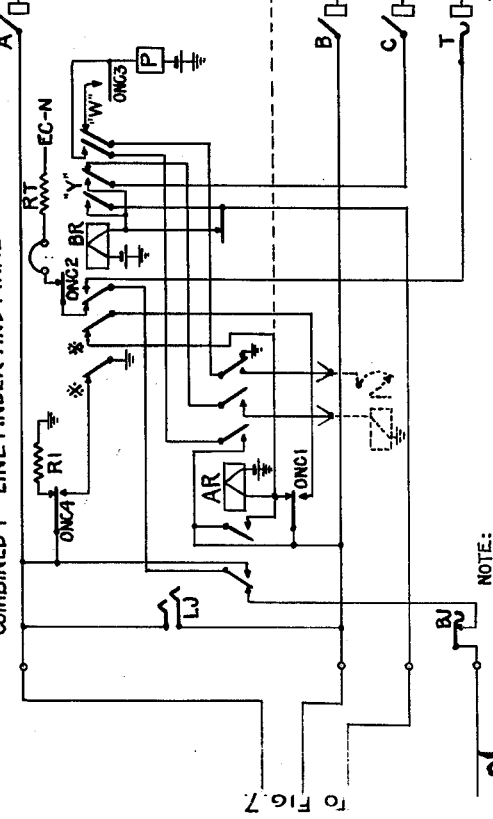

Aug. 7, 1945. G. DEAKIN 2,380,950
TELECOMMUNICATION SYSTEM
Filed April 23, 1943 36 Sheets-Sheet 8

INVENTOR.
GERALD DEAKIN

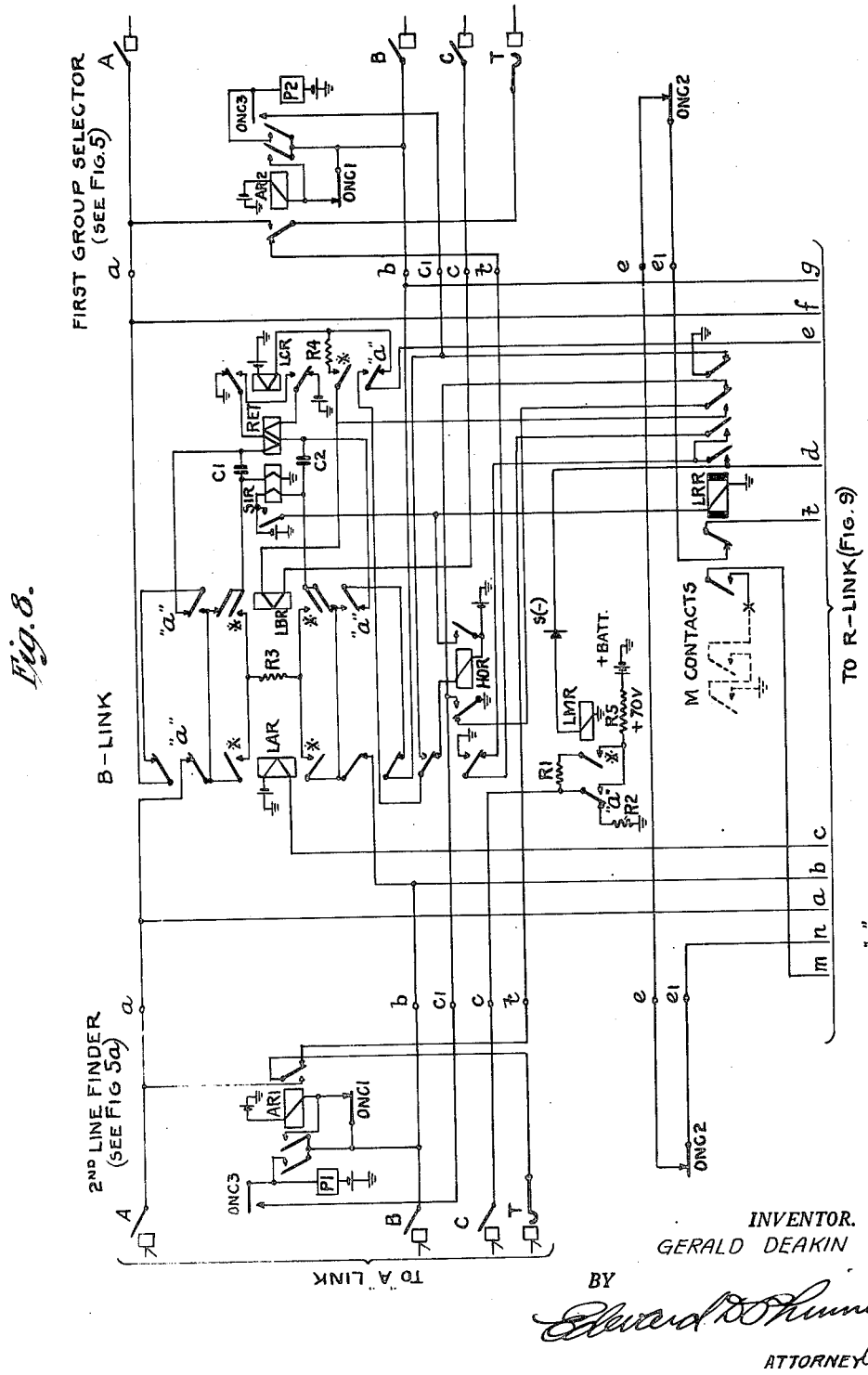

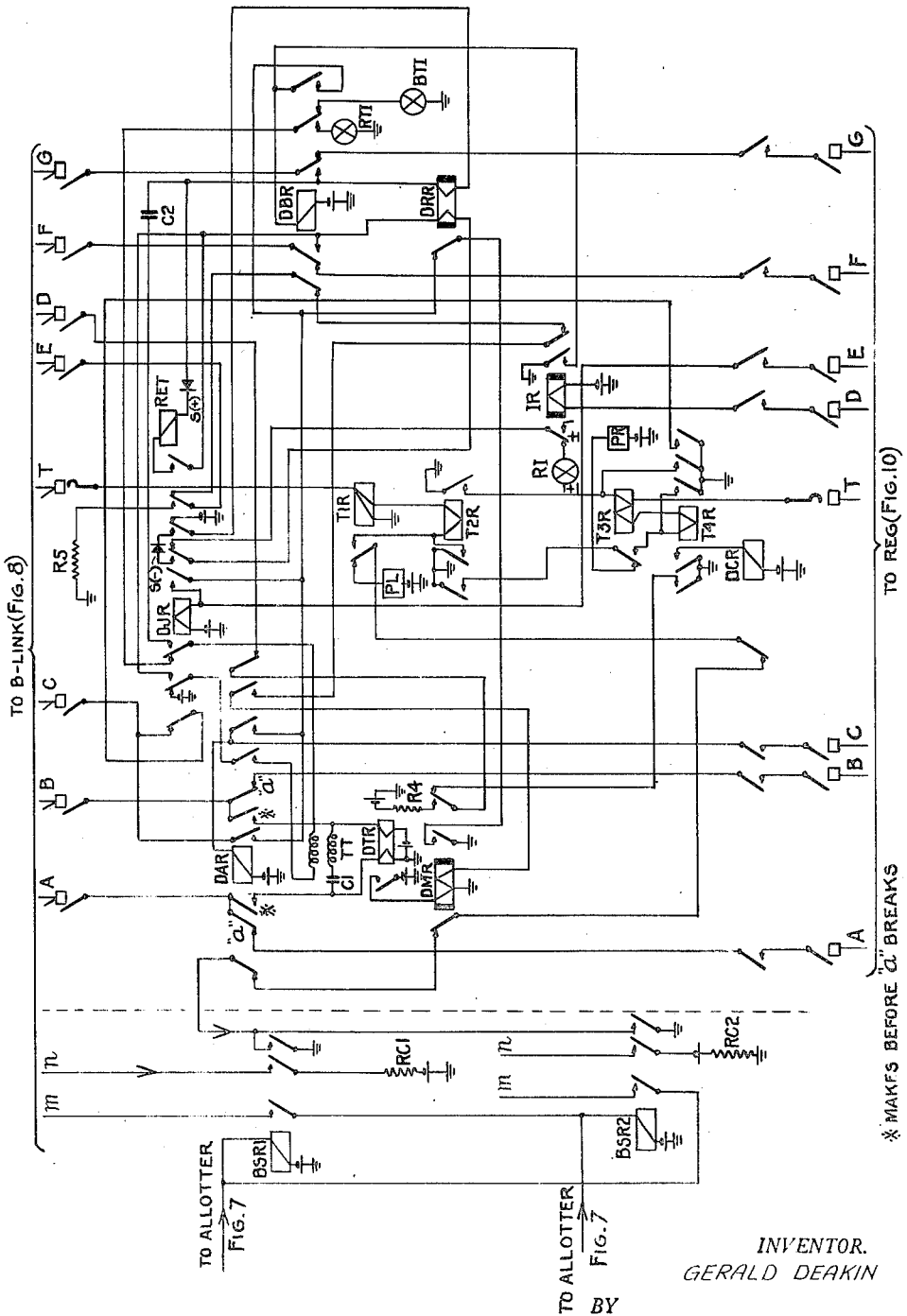

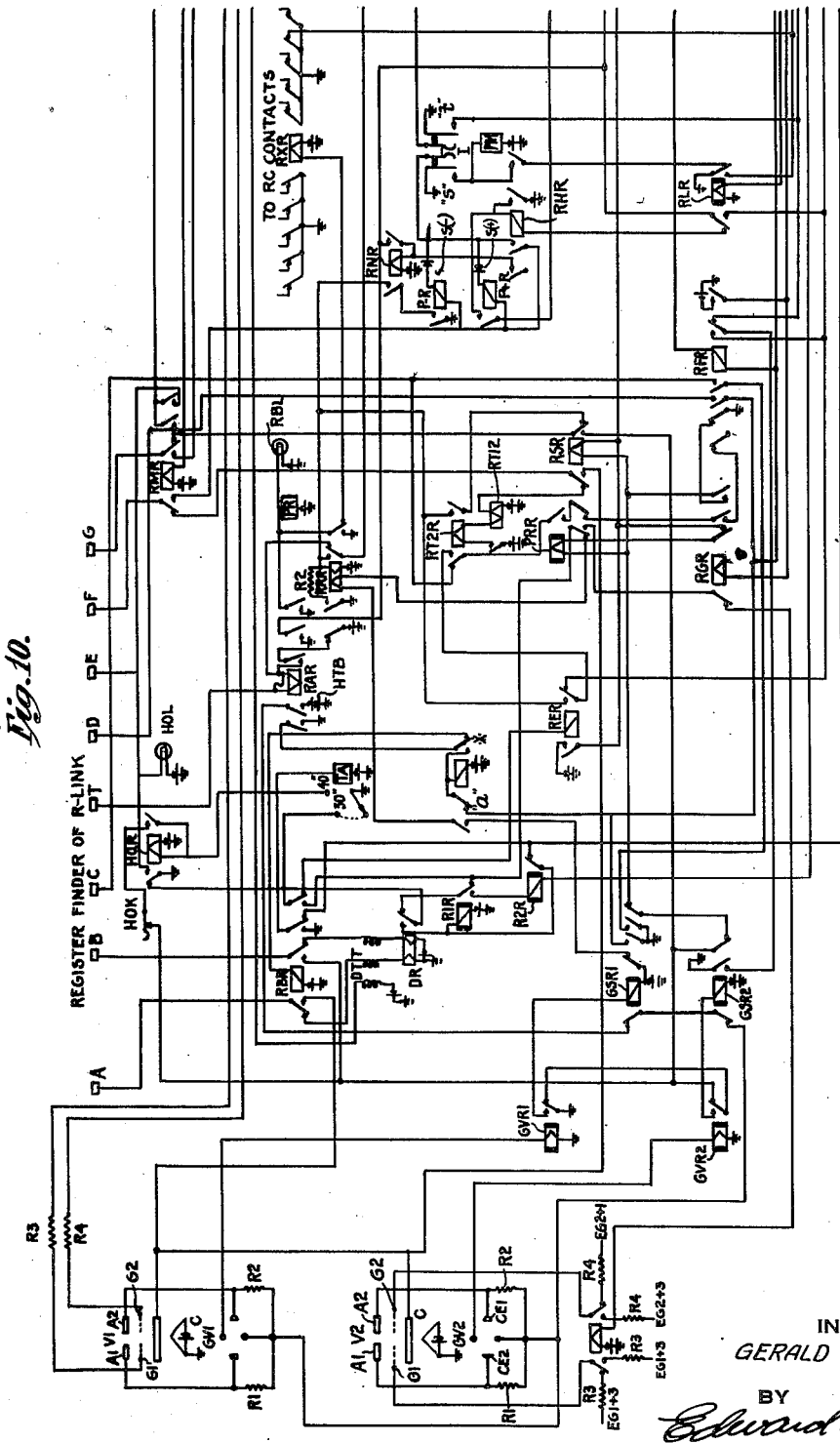

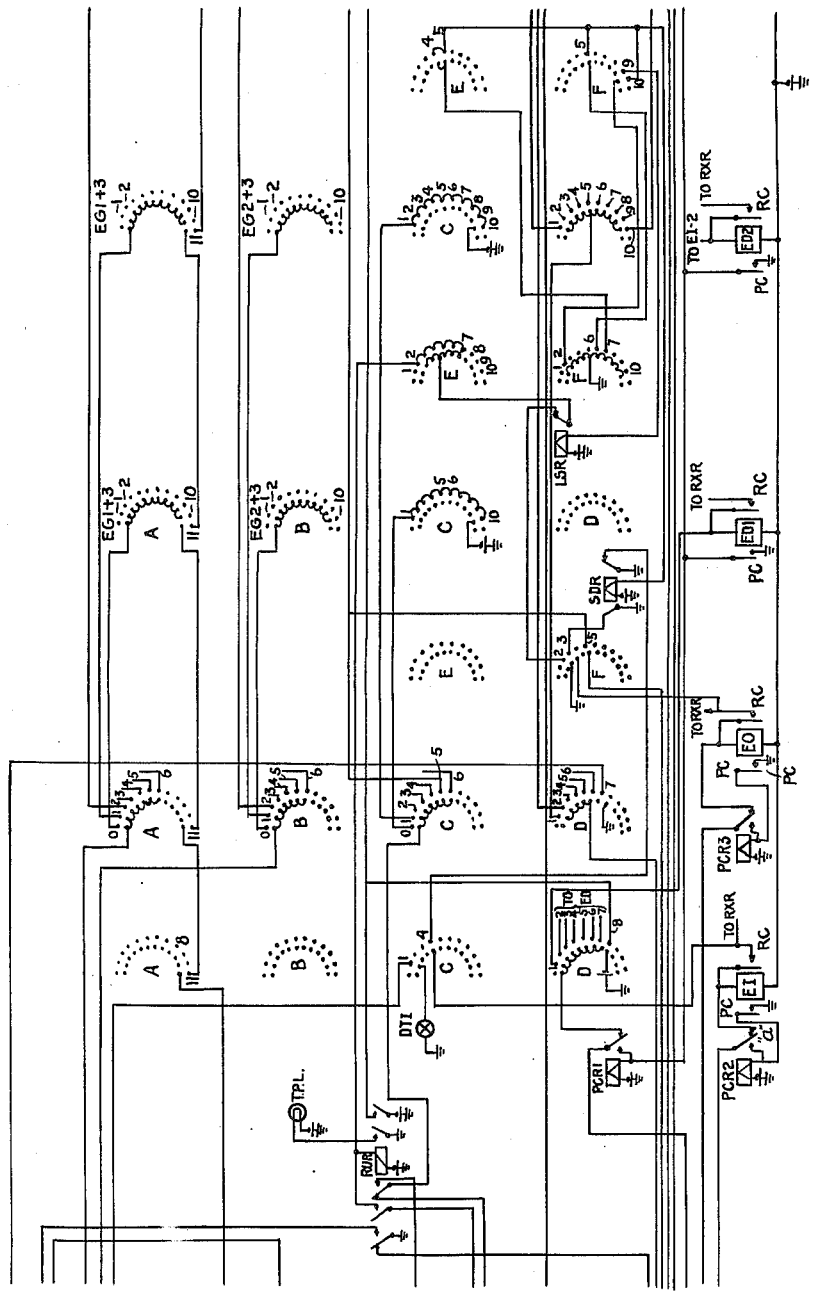

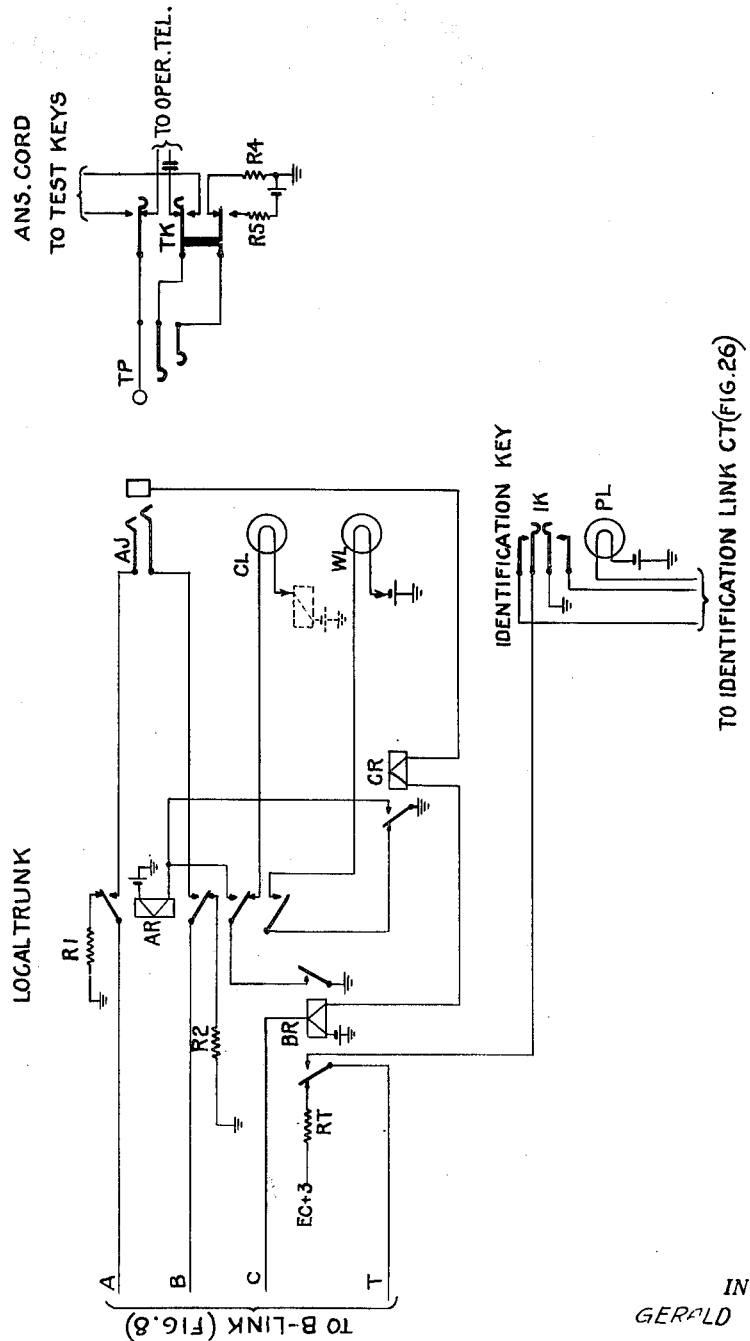

Aug. 7, 1945.   G. DEAKIN   2,380,950
TELECOMMUNICATION SYSTEM
Filed April 23, 1943   36 Sheets-Sheet 15

INVENTOR.
GERALD DEAKIN
BY
ATTORNEY

Aug. 7, 1945.   G. DEAKIN   2,380,950
TELECOMMUNICATION SYSTEM
Filed April 23, 1943   36 Sheets—Sheet 16
*Fig. 14.*
OUT-UNIVERSAL   IN-UNIVERSAL
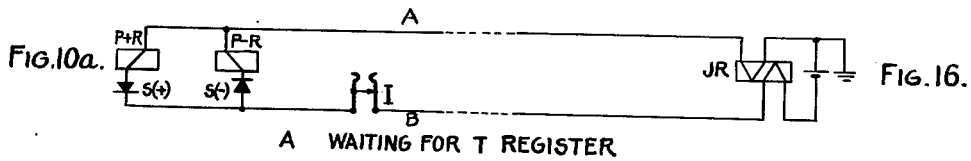
A   WAITING FOR T REGISTER
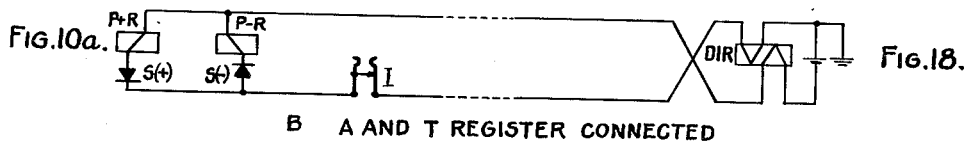
B   A AND T REGISTER CONNECTED
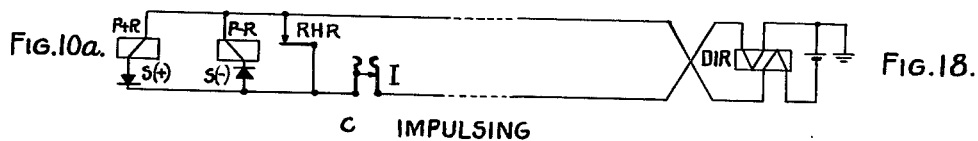
C   IMPULSING
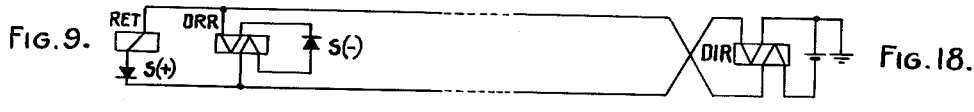
D   A REGISTER RELEASED
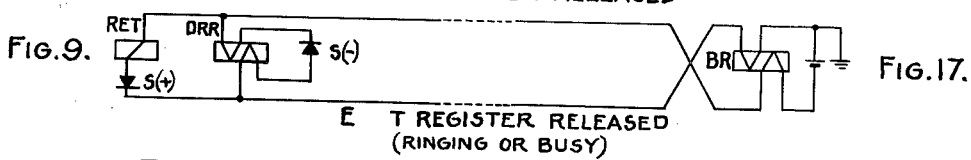
E   T REGISTER RELEASED
(RINGING OR BUSY)
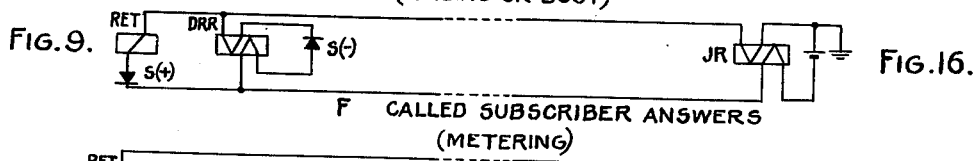
F   CALLED SUBSCRIBER ANSWERS
(METERING)
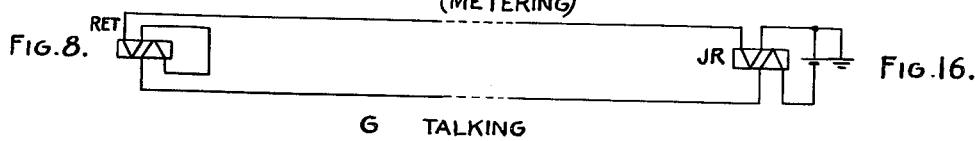
G   TALKING
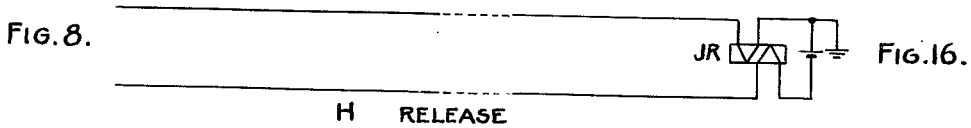
H   RELEASE
INVENTOR.
GERALD DEAKIN
BY
Edward D. Kinney
ATTORNEY Aug. 7, 1945.                G. DEAKIN                2,380,950
                      TELECOMMUNICATION SYSTEM
                   Filed April 23, 1943      36 Sheets-Sheet 17
OUT-UNIVERSAL          *Fig. 15.*          IN-STROGER
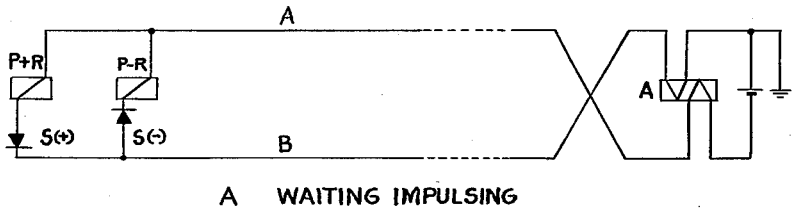
A   WAITING IMPULSING
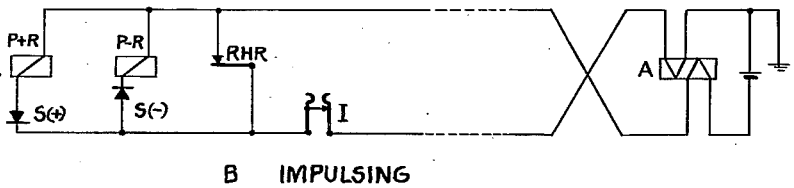
B   IMPULSING
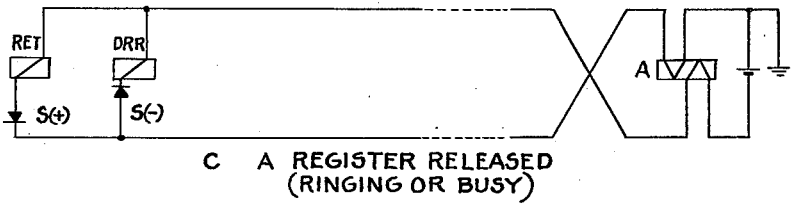
C   A REGISTER RELEASED
      (RINGING OR BUSY)
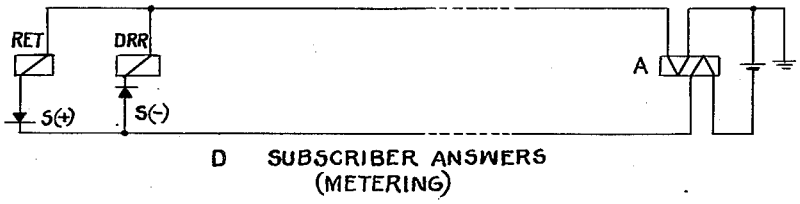
D   SUBSCRIBER ANSWERS
         (METERING)
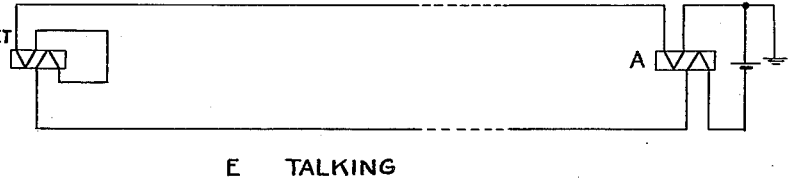
E   TALKING
F   RELEASE
INVENTOR.
GERALD DEAKIN
BY
*Edward D. Kinney*
ATTORNEY

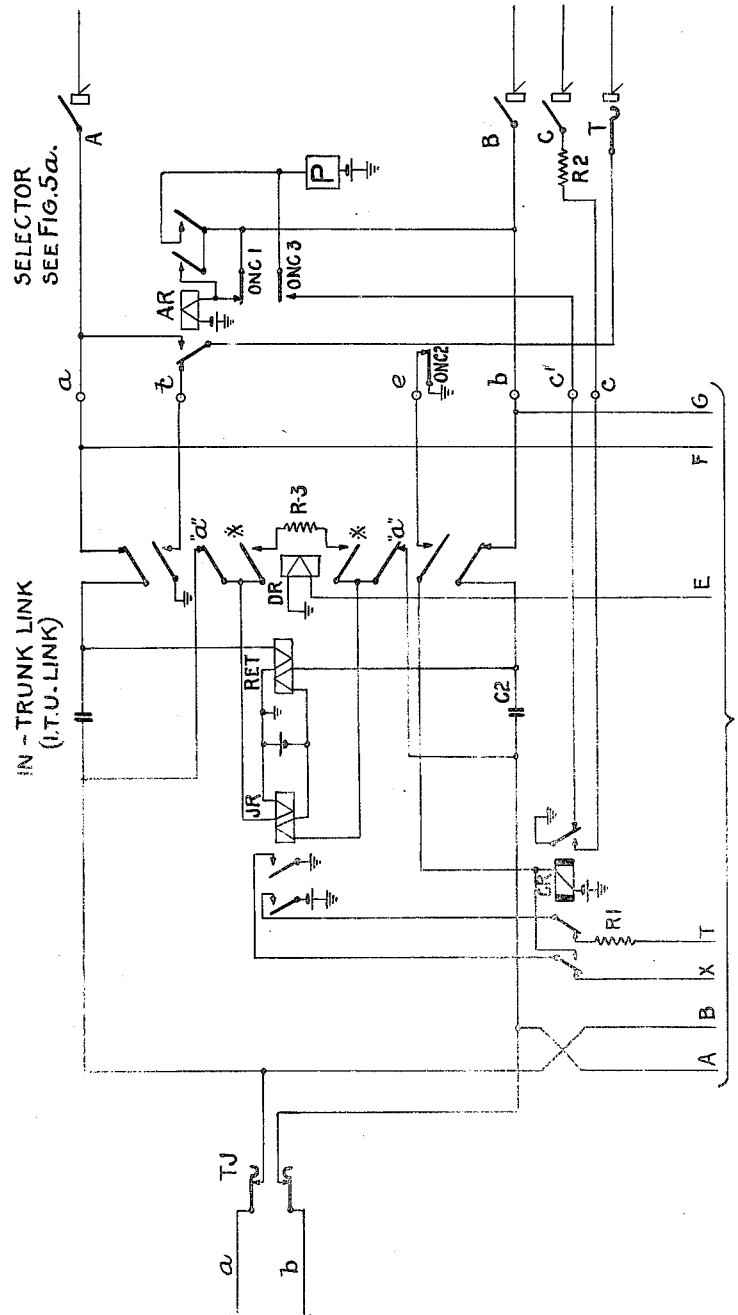

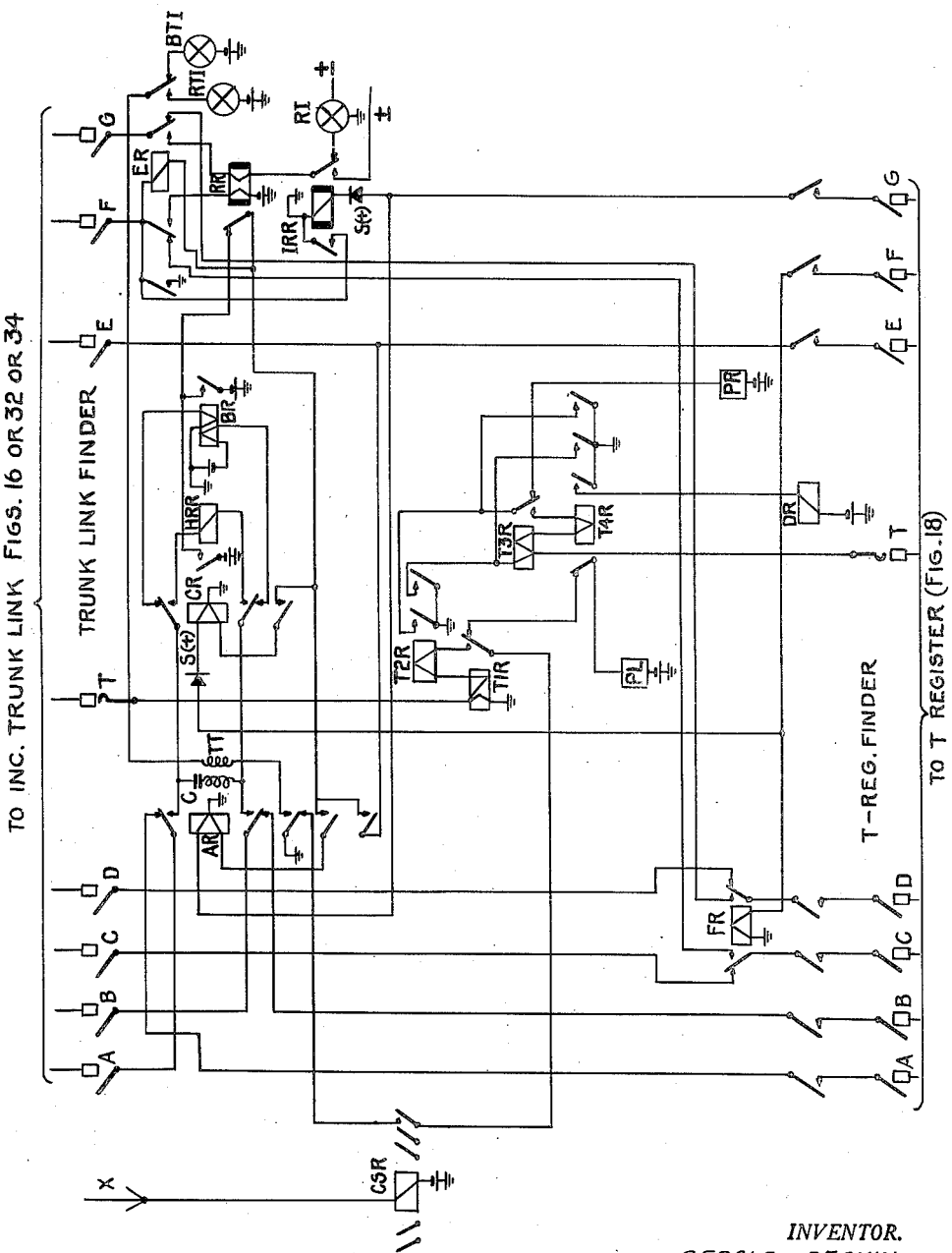

Aug. 7, 1945.  G. DEAKIN  2,380,950
TELECOMMUNICATION SYSTEM
Filed April 23, 1943   36 Sheets-Sheet 29

INVENTOR
GERALD DEAKIN
BY
ATTORNEY

Aug. 7, 1945.  G. DEAKIN  2,380,950
TELECOMMUNICATION SYSTEM
Filed April 23, 1943   36 Sheets-Sheet 32
Fig. 30.
OUT-STROWGER                IN-UNIVERSAL
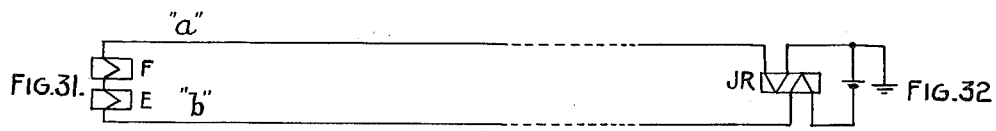
A  TRUNK CONNECTED
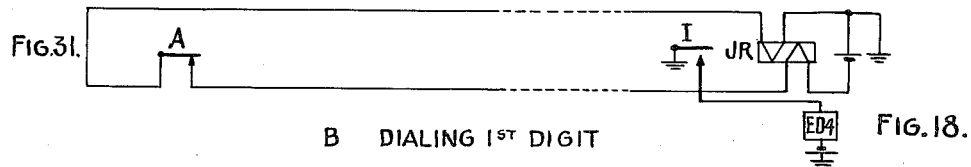
B  DIALING 1ST DIGIT
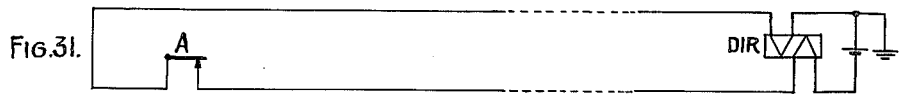
C  DIALING REMAINING DIGITS
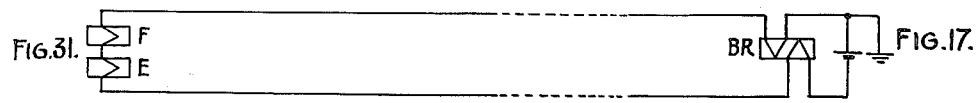
D  T REGISTER RELEASED
(RINGING OR BUSY)
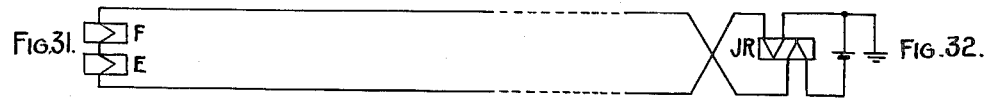
E  CALLED SUBSCRIBER ANSWERS
(METERING AND TALKING)
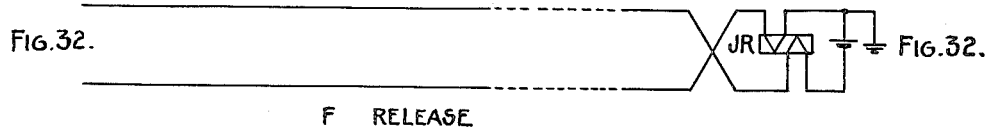
F  RELEASE
INVENTOR.
GERALD DEAKIN
BY
Edward D. Kinney
ATTORNEY

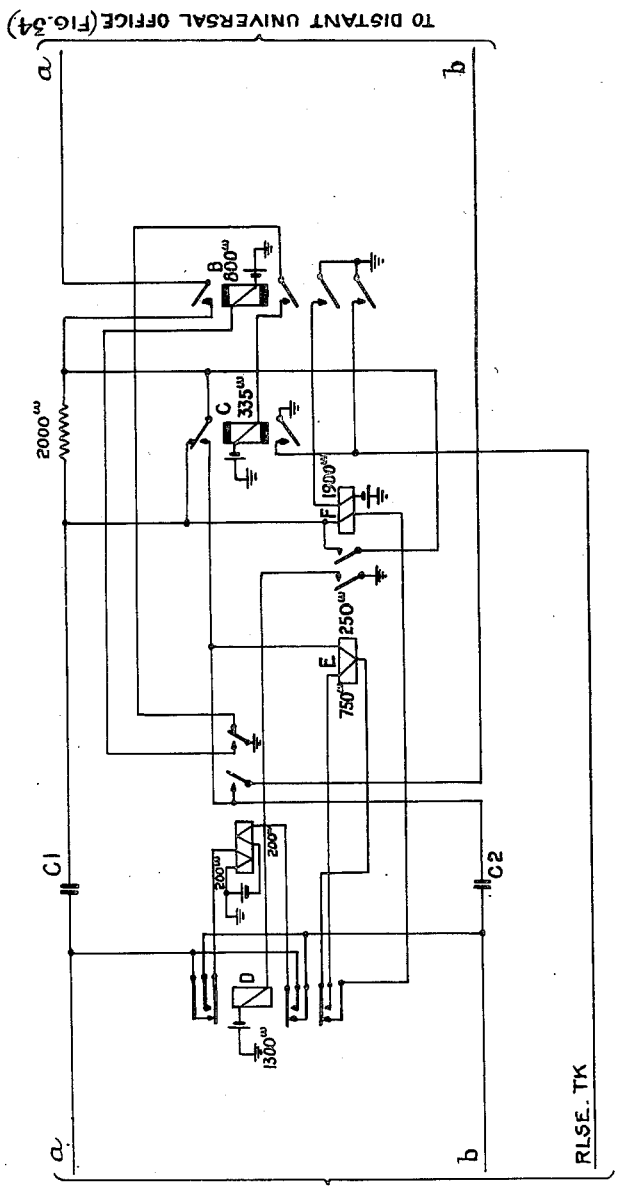

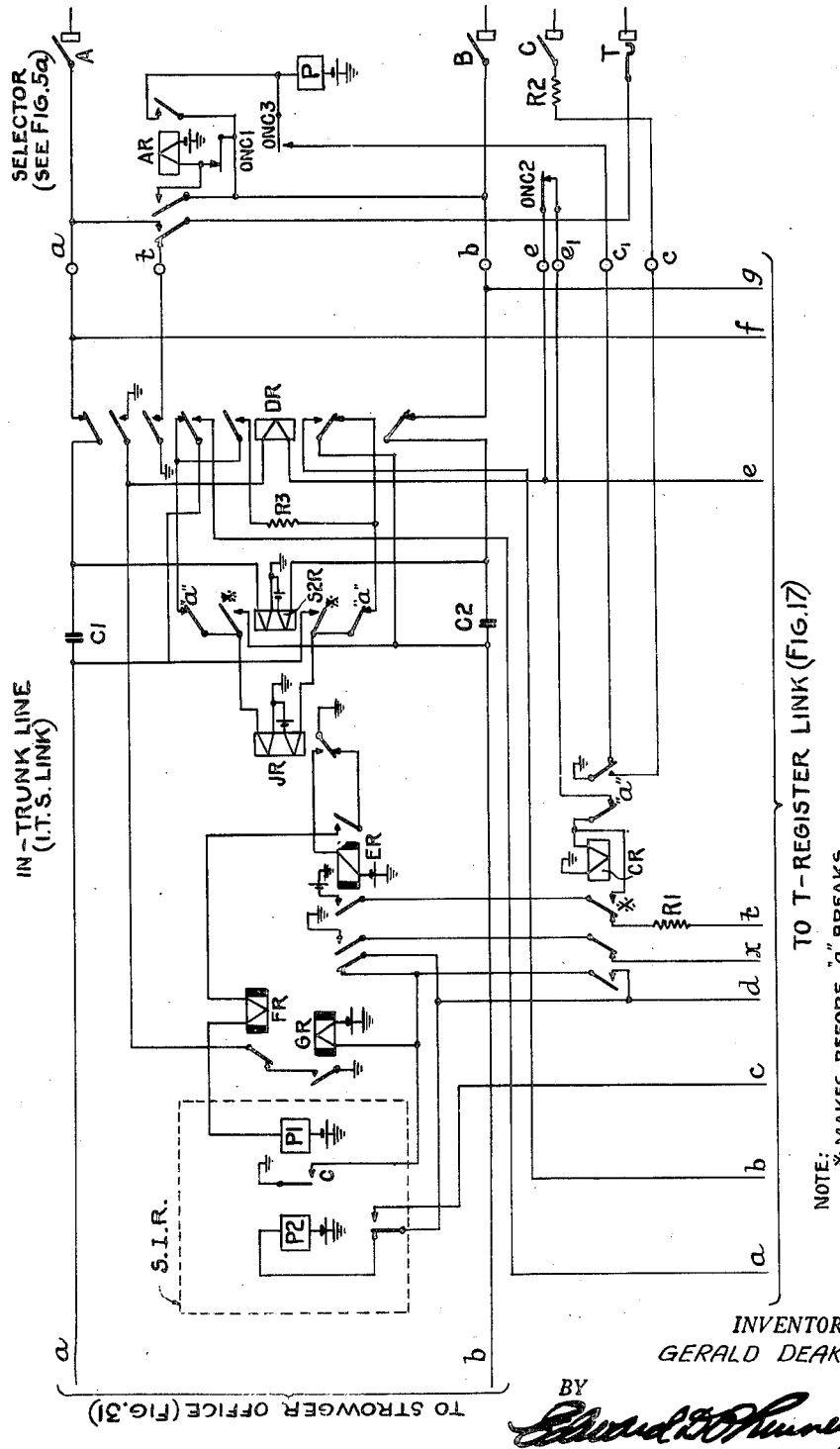

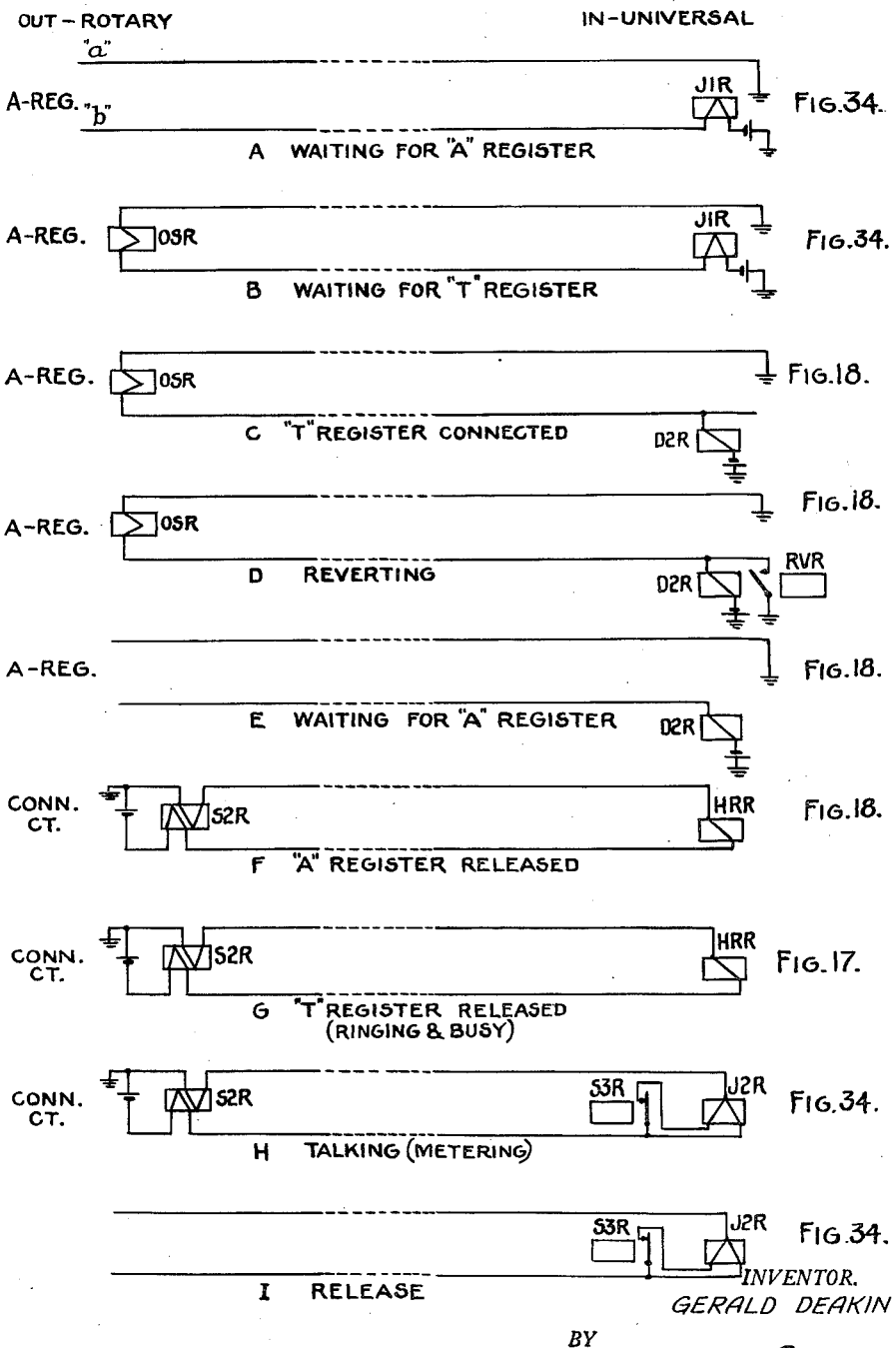

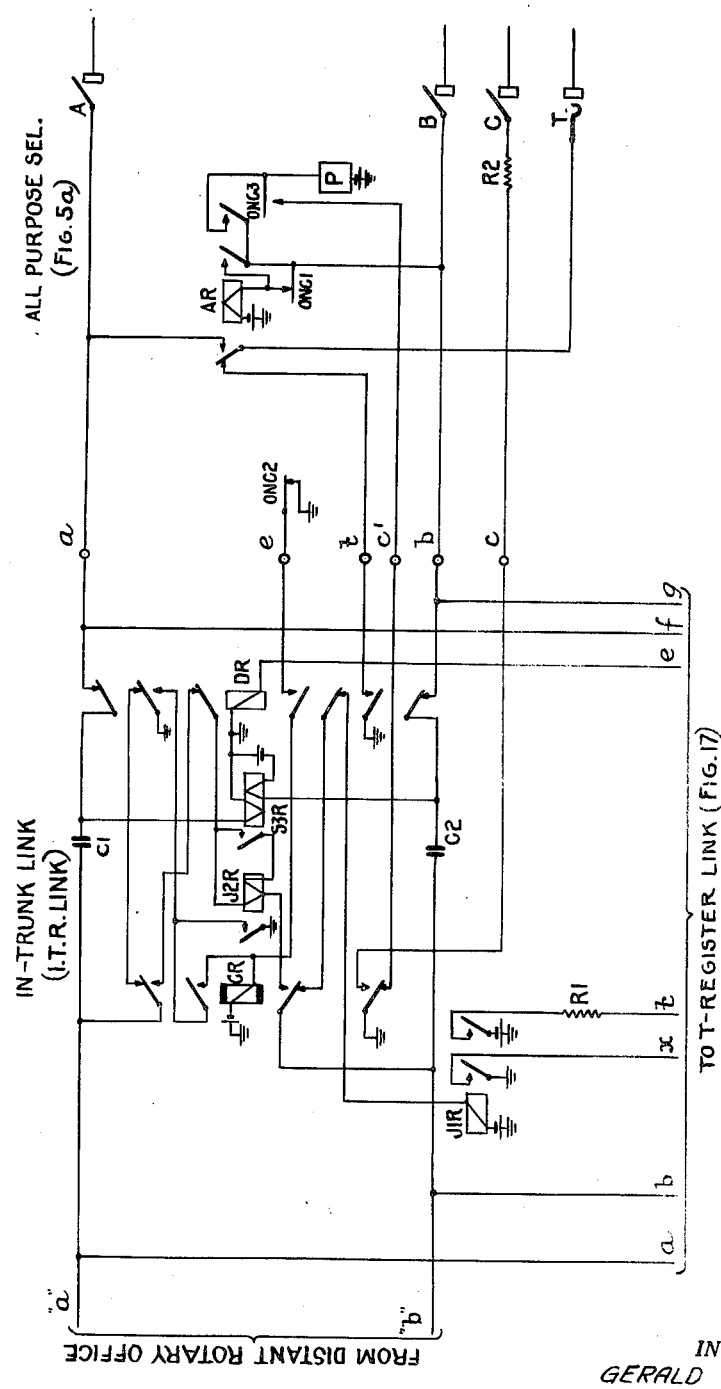

Patented Aug. 7, 1945

2,380,950

UNITED STATES PATENT OFFICE 2,380,950

TELECOMMUNICATION SYSTEM

Gerald Deakin, New York, N. Y., assignor to International Standard Electric Corporation, New York, N. Y., a corporation of Delaware Application April 23, 1943, Serial No. 484,184

167 Claims. (Cl. 179—18)

This invention relates to new and useful improvements in automatic switching systems adapted for use in telephone exchanges and the like.

The objects of the invention are to insure the rapid performance of switching operations, and to use the fewest possible different types of switching devices in the system, thus minimizing the costs of installation and operation.

With these objects in view, an arrangement is provided which, if applied to telephony, makes possible the use of a single type of switch for the establishment of intra-office and inter-office connections with various types of switching systems. The switch has two variants, one employing a single and a second two relays for controlling its circuits. Under the control of a register, these switches are operated to perform all the required non-numerical and numerical operations.

The automatic telephone exchange system embodying the various features of the invention employs the principles of multi-potential selection disclosed in my application Serial No. 458,297, filed Sept. 14, 1942, (Case 127). A single type of simple selector is used for all major switching purposes. This simple selector switch may be used with slight modifications as a first line finder, final selector, combined first line finder and final selector, second line finder; first, second, third, etc., group selector, final selector, special service selector, identification line finder and W. C. test final.

I shall refer to the system as the "Universal" system to distinguish from other automatic telephone systems in which step-by-step or power driven switches are used and which will be referred to as "Strowger" and "Rotary" systems. The operating mechanism and contact arrangement of the switches used in the Universal system may be of any suitable kind. However, I prefer to employ selector switches of the type disclosed in my co-pending applications, Serial No. 429,272, filed February 2, 1942 (Case 126) and Serial No. 433,315, filed March 4, 1942 (Case 129). It will be obvious to those skilled in the art that the various features of the present invention may be embodied in any other type of switching system or arrangement. This will be clear from the claims and the detailed description of certain preferred embodiments.

Figure 1C:
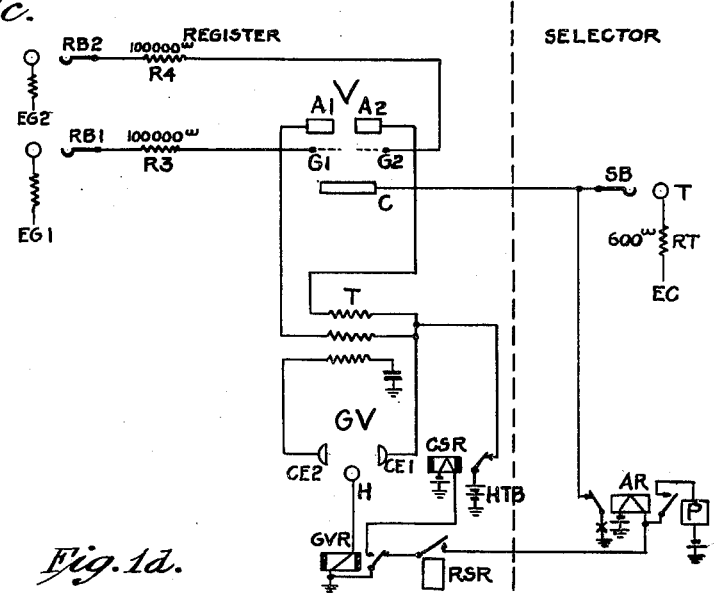
Fig. 1 is the fundamental circuit diagram for explaining the general principles of multi-potential selection.
Fig. 1(a) is a table showing the voltages applied to the multi-electrode electric discharge tube to control the selection of various digits and perform all other necessary selecting functions.
Fig. 1(b) is the characteristic curve of said tube.
Figure 1D:
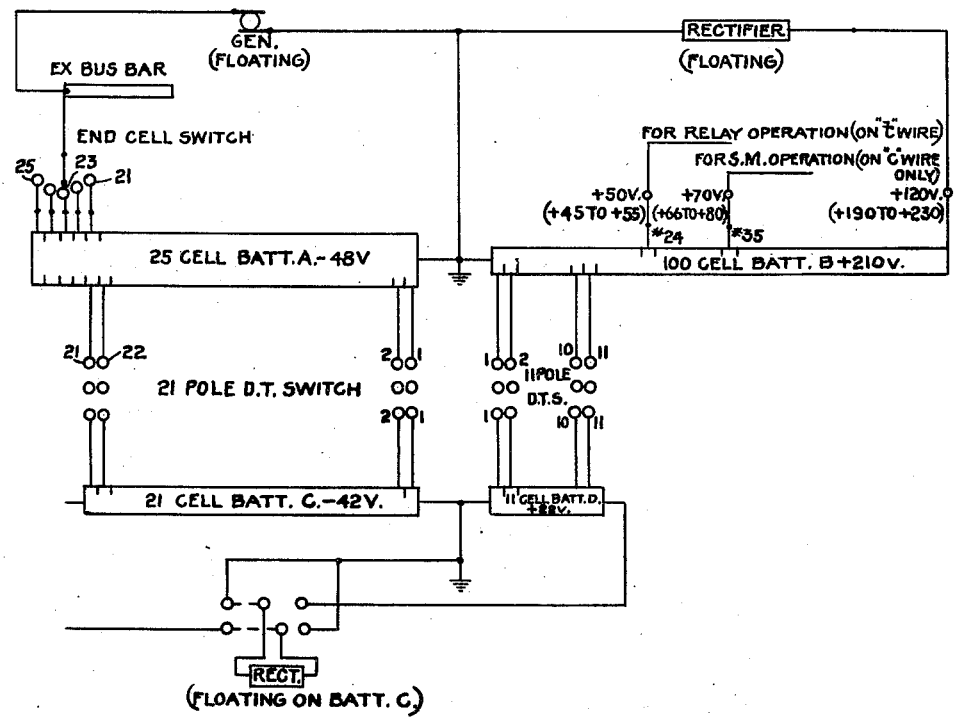
Figure 10B:
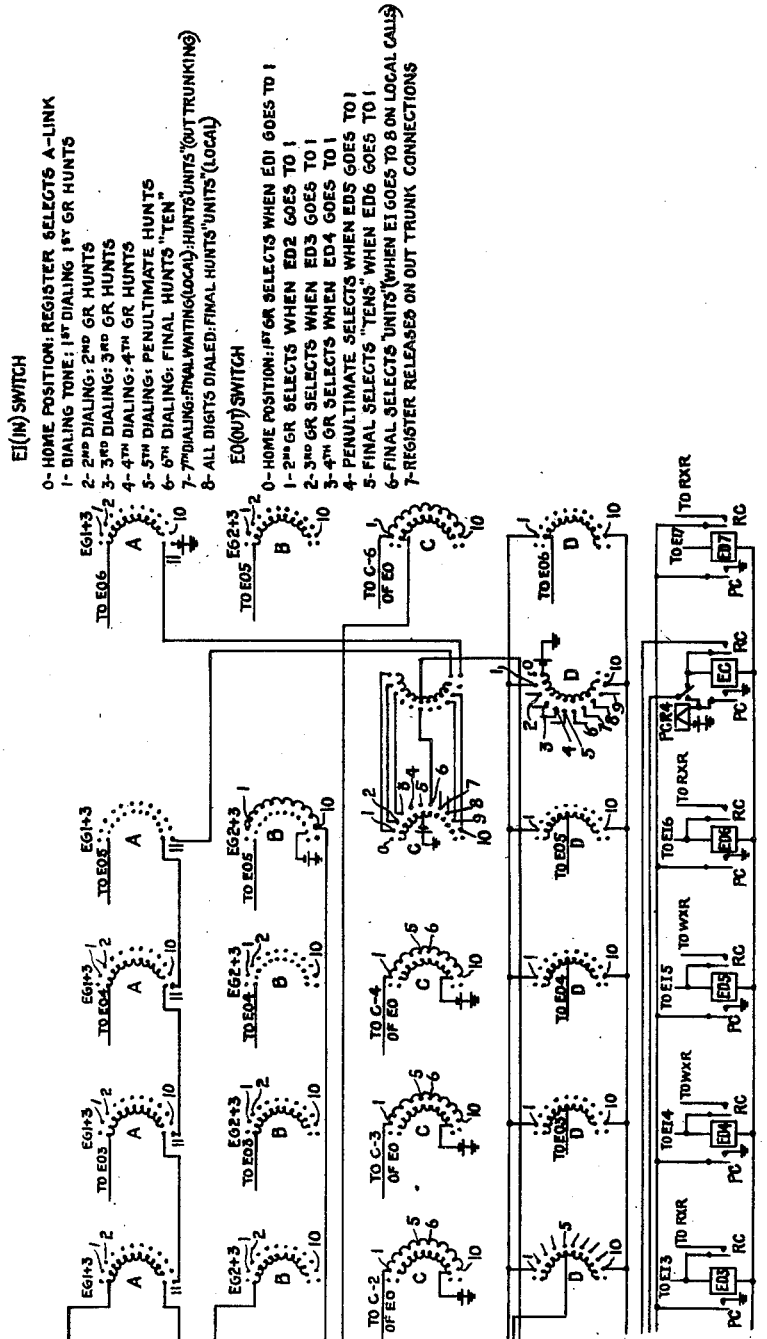
Figure 12:
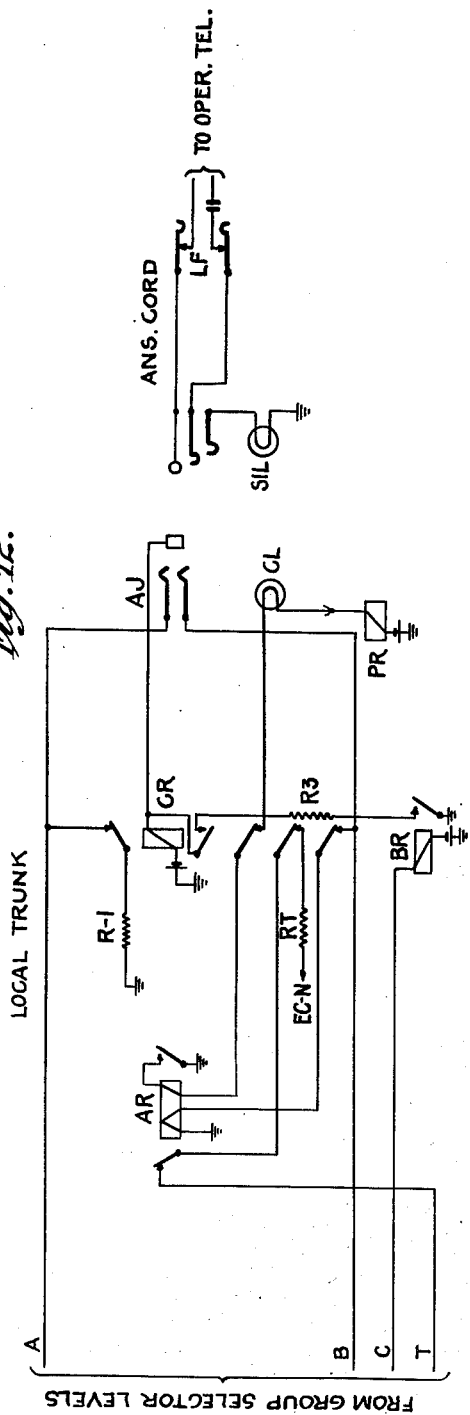
Figure 13:
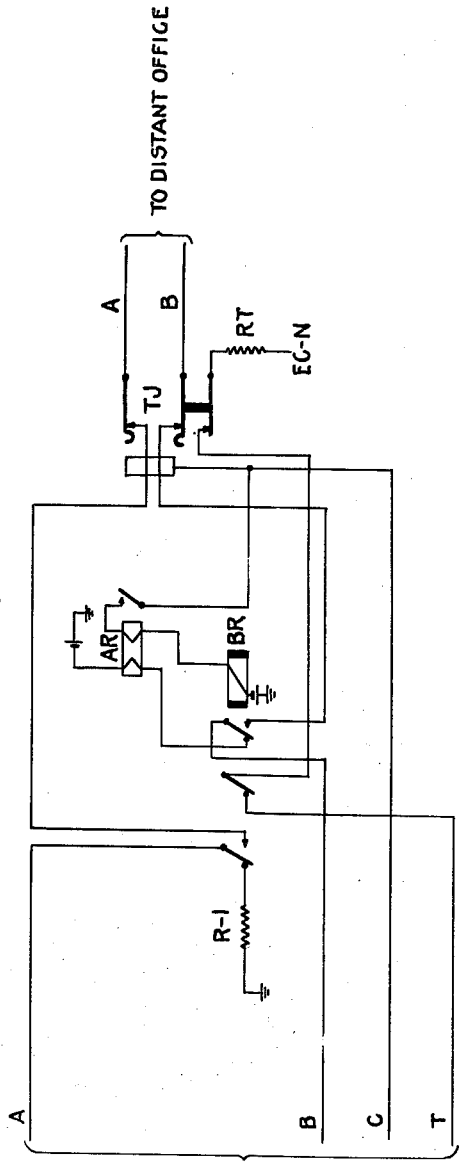
Figure 18:
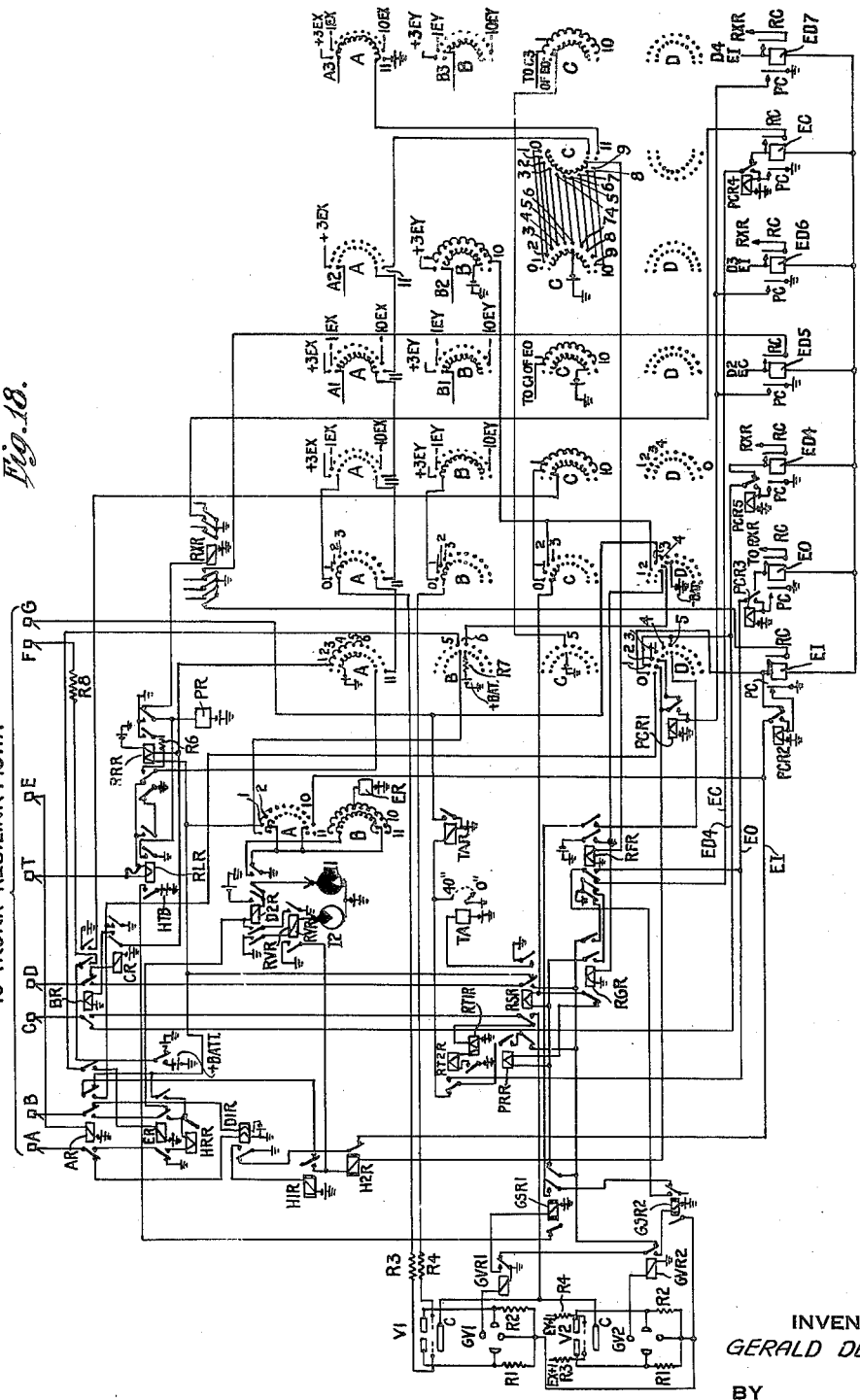
Figure 19:
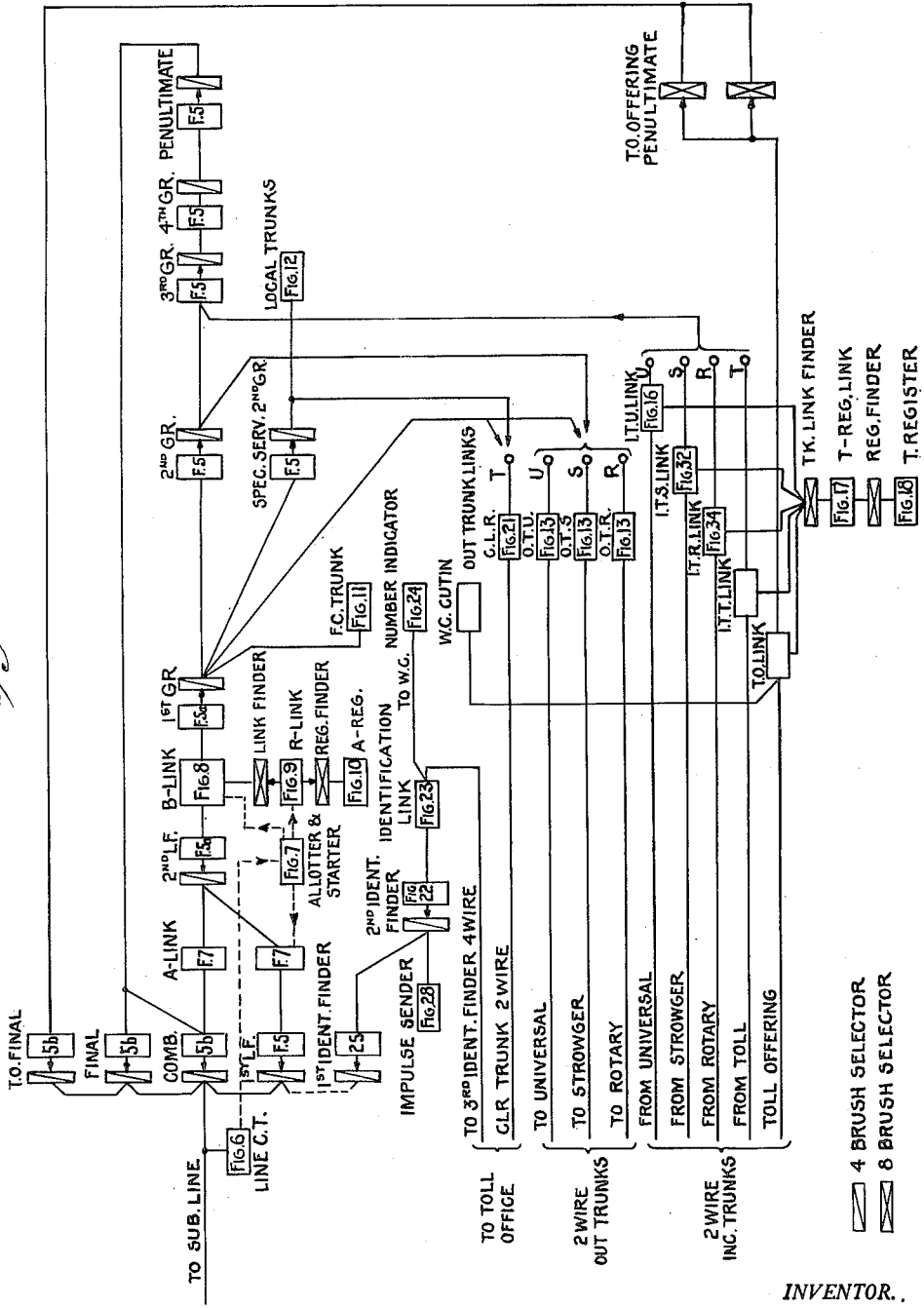
Figure 20:
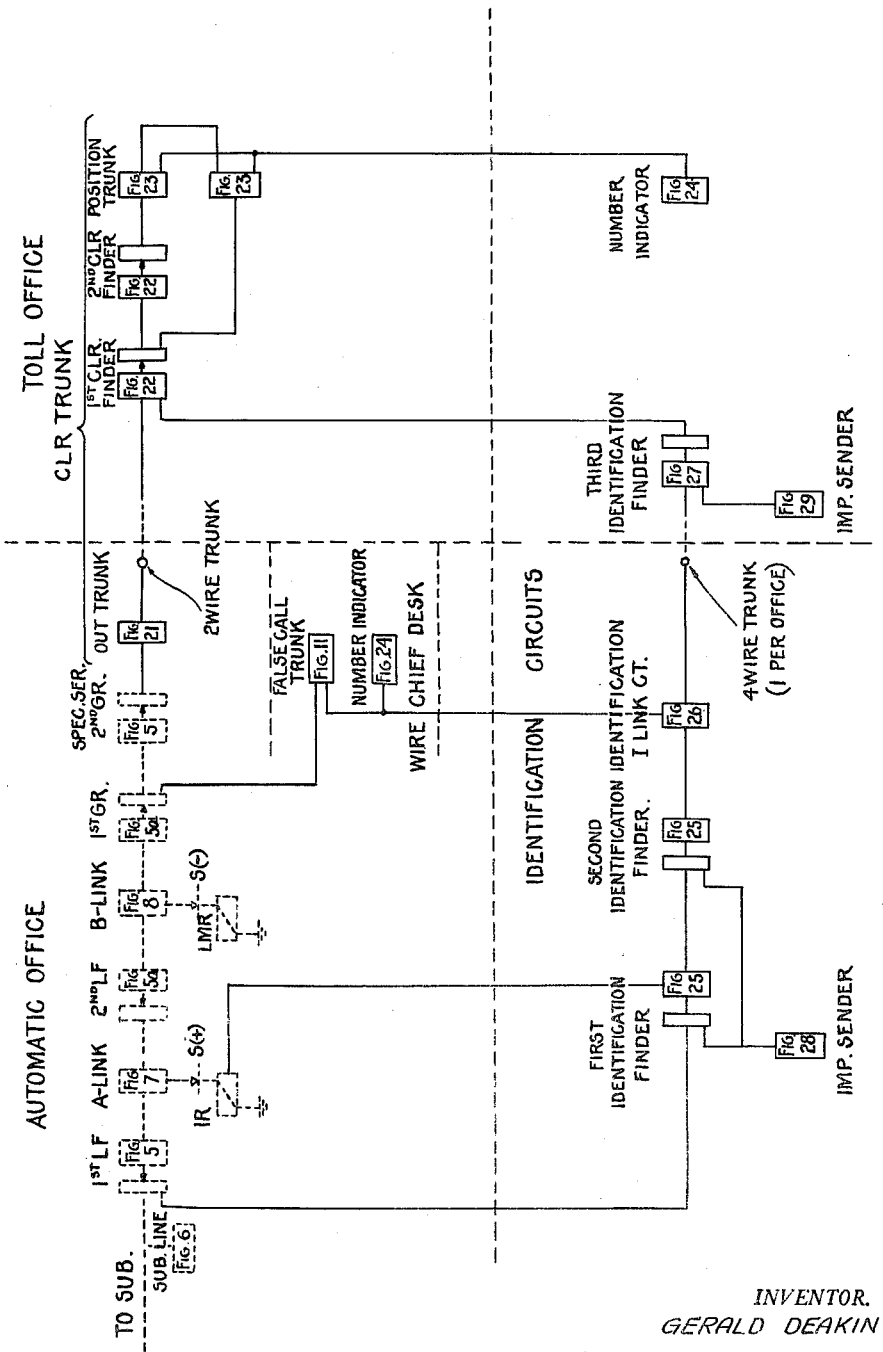
Figure 21:
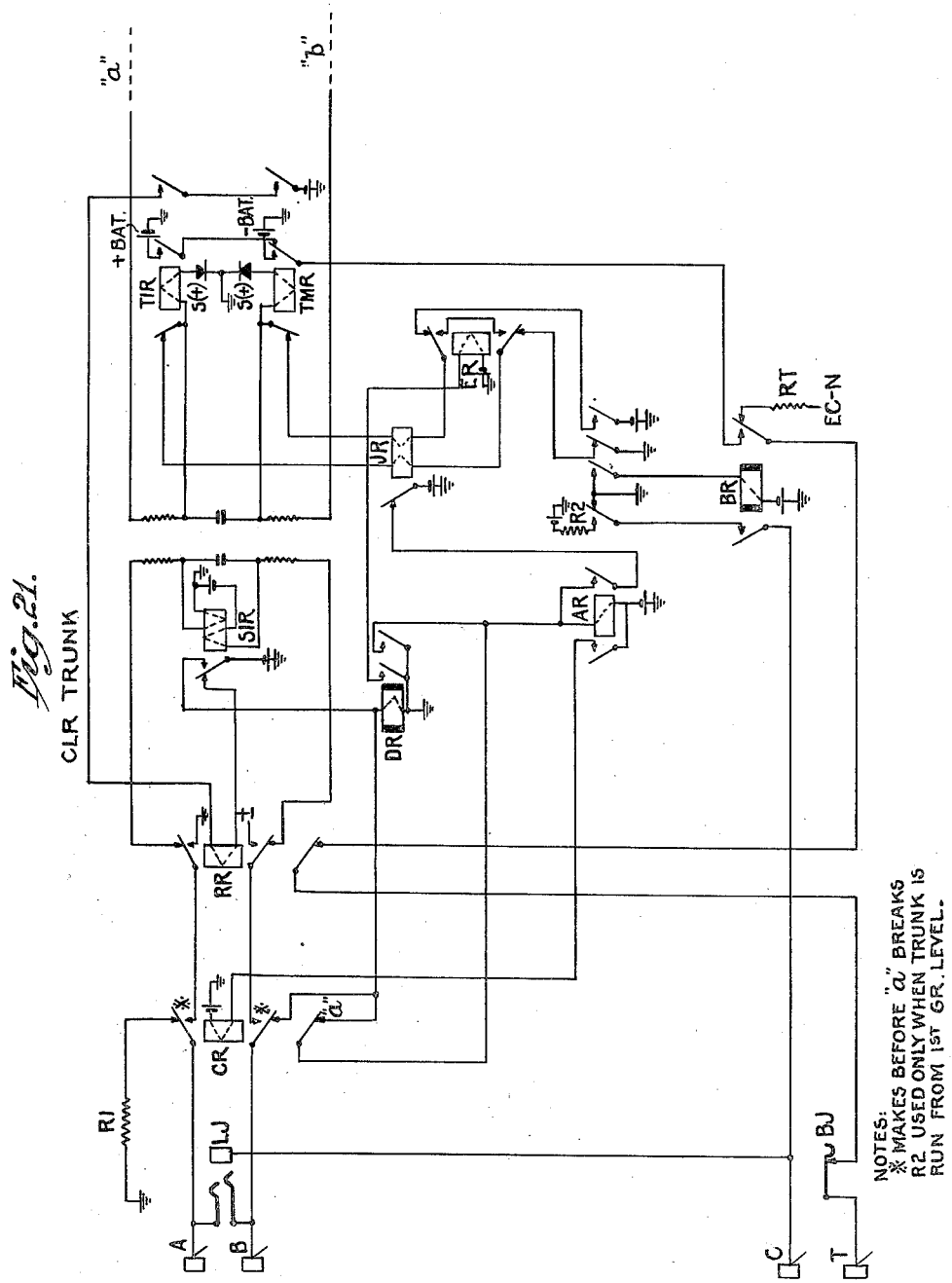
Figure 22:
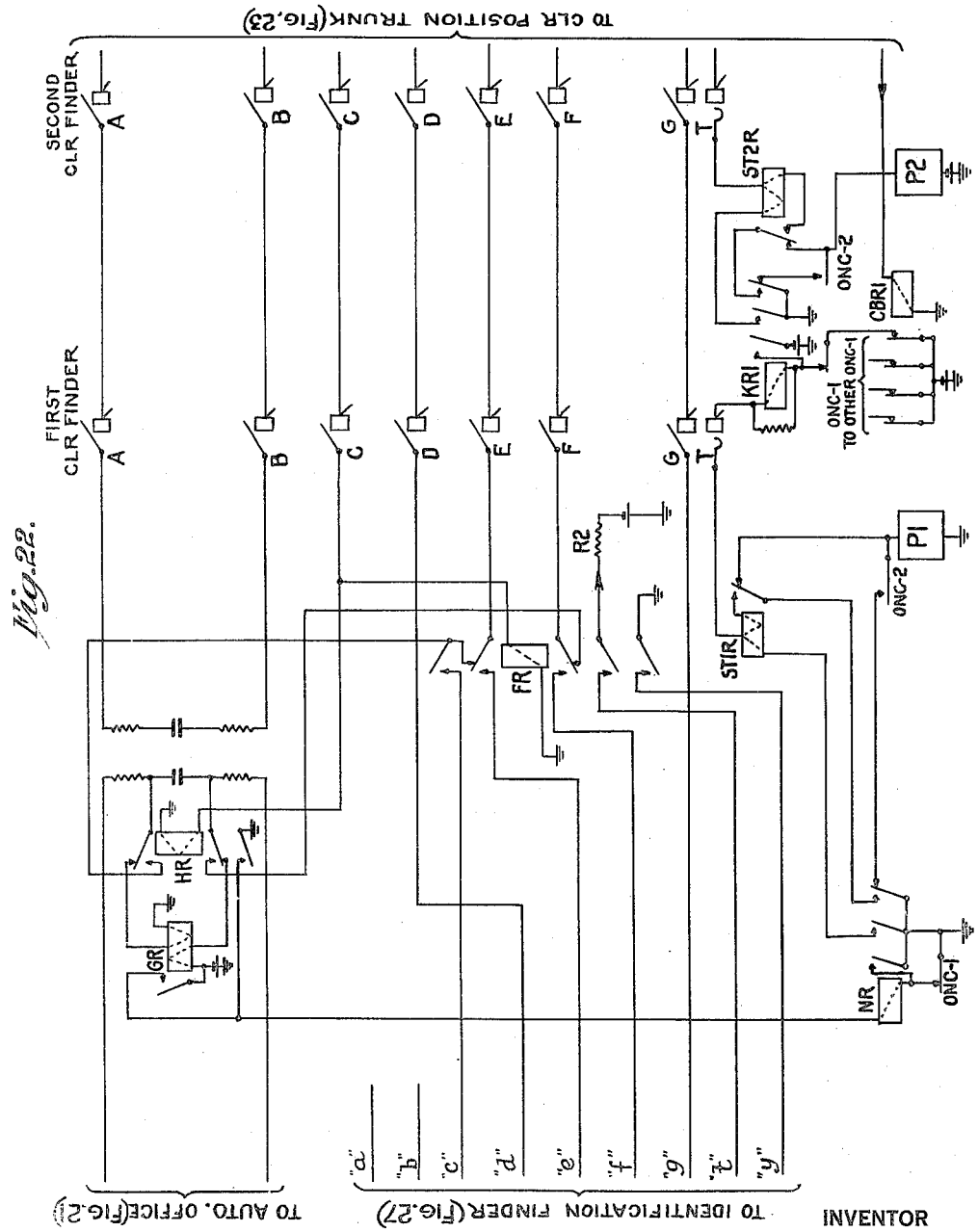
Figure 23:
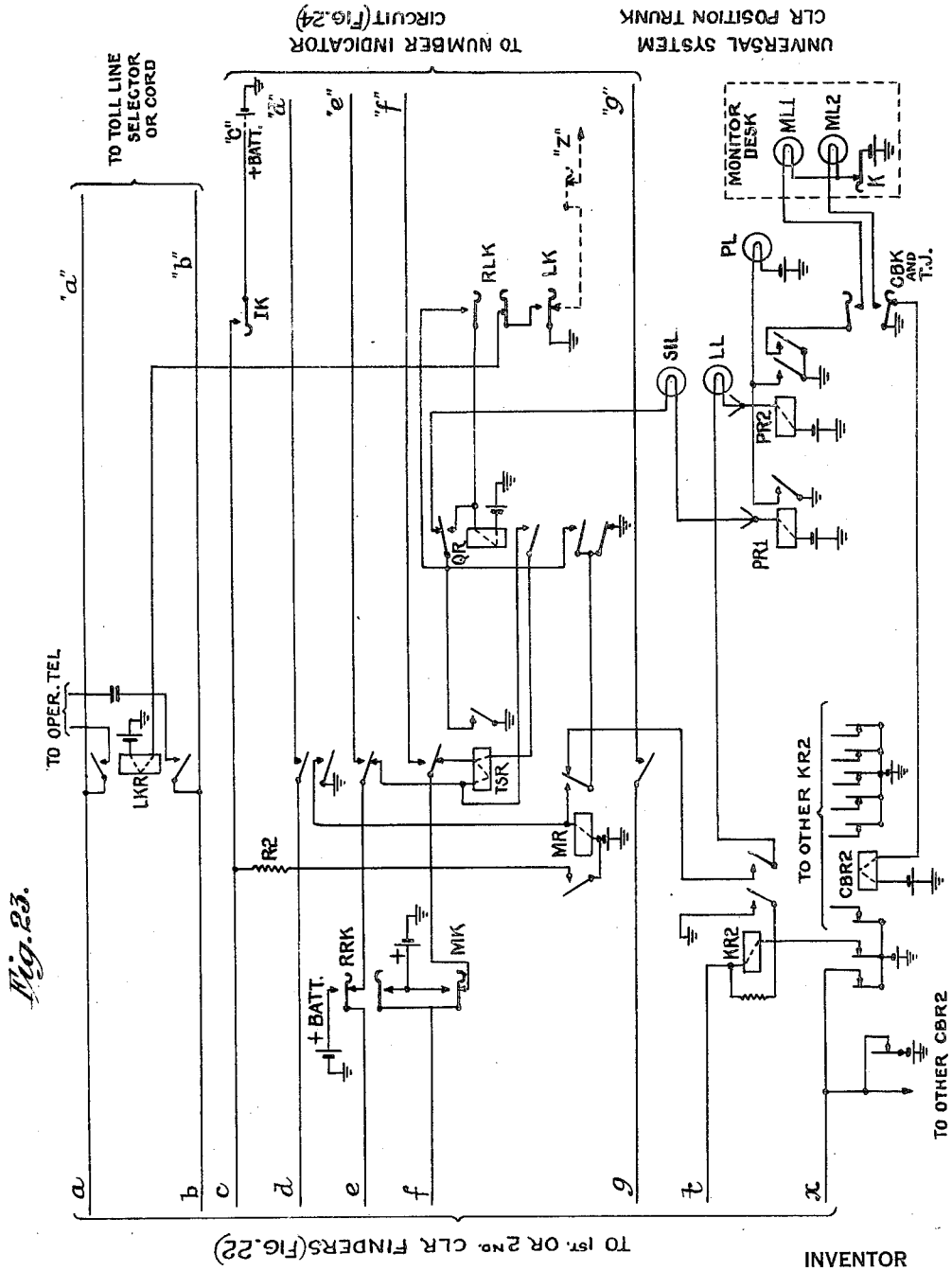
Figure 24:
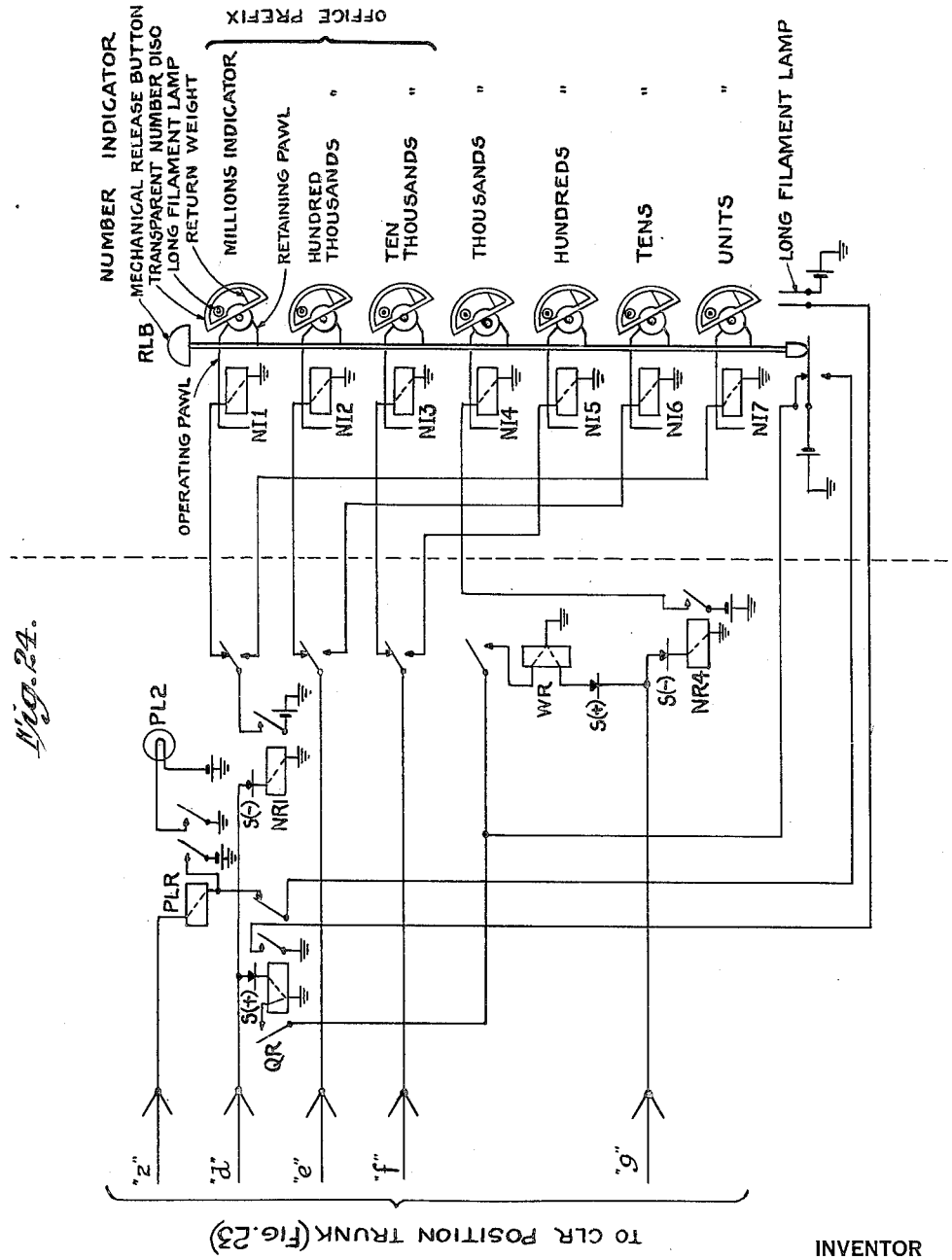
Figure 25:
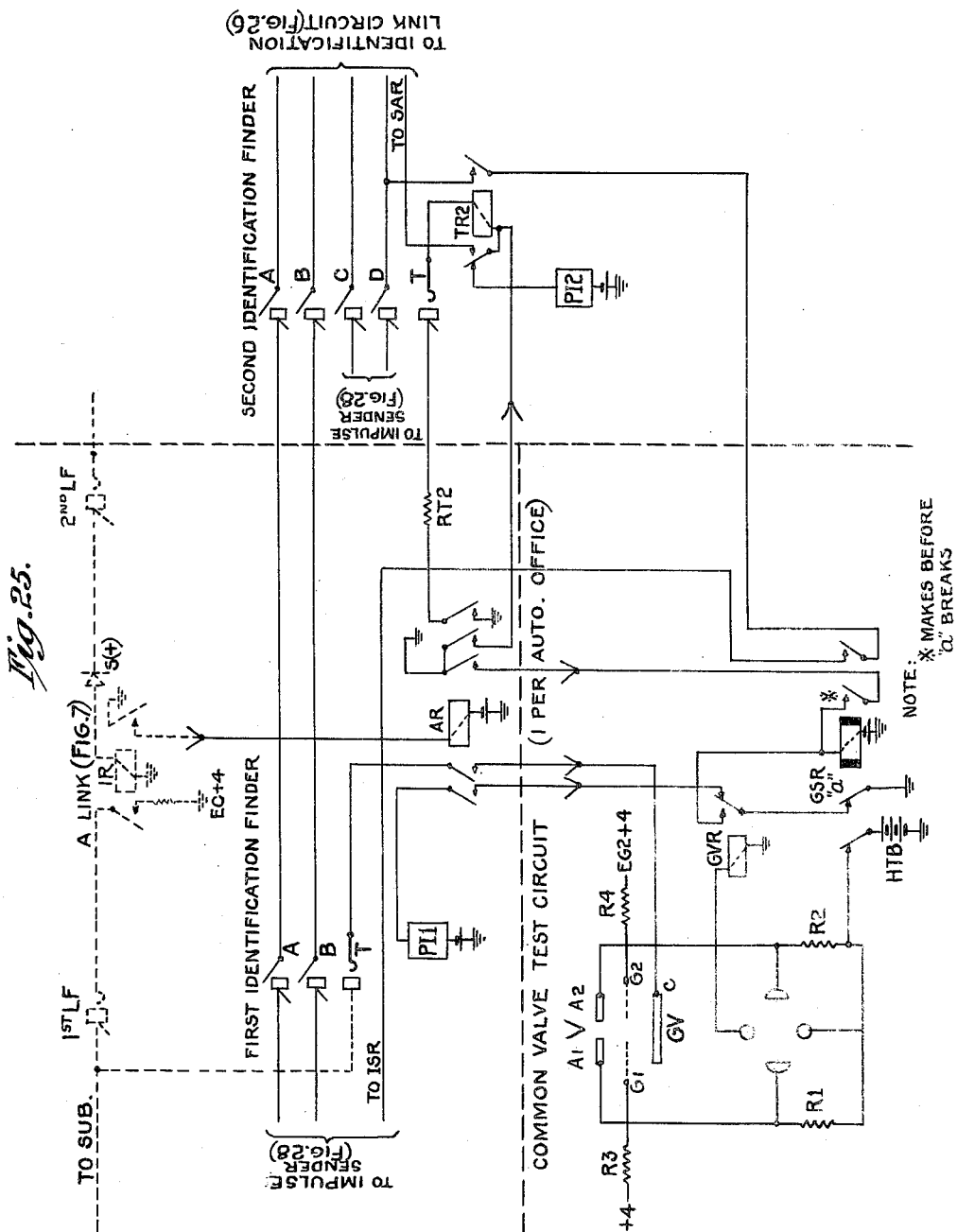
Figure 26:
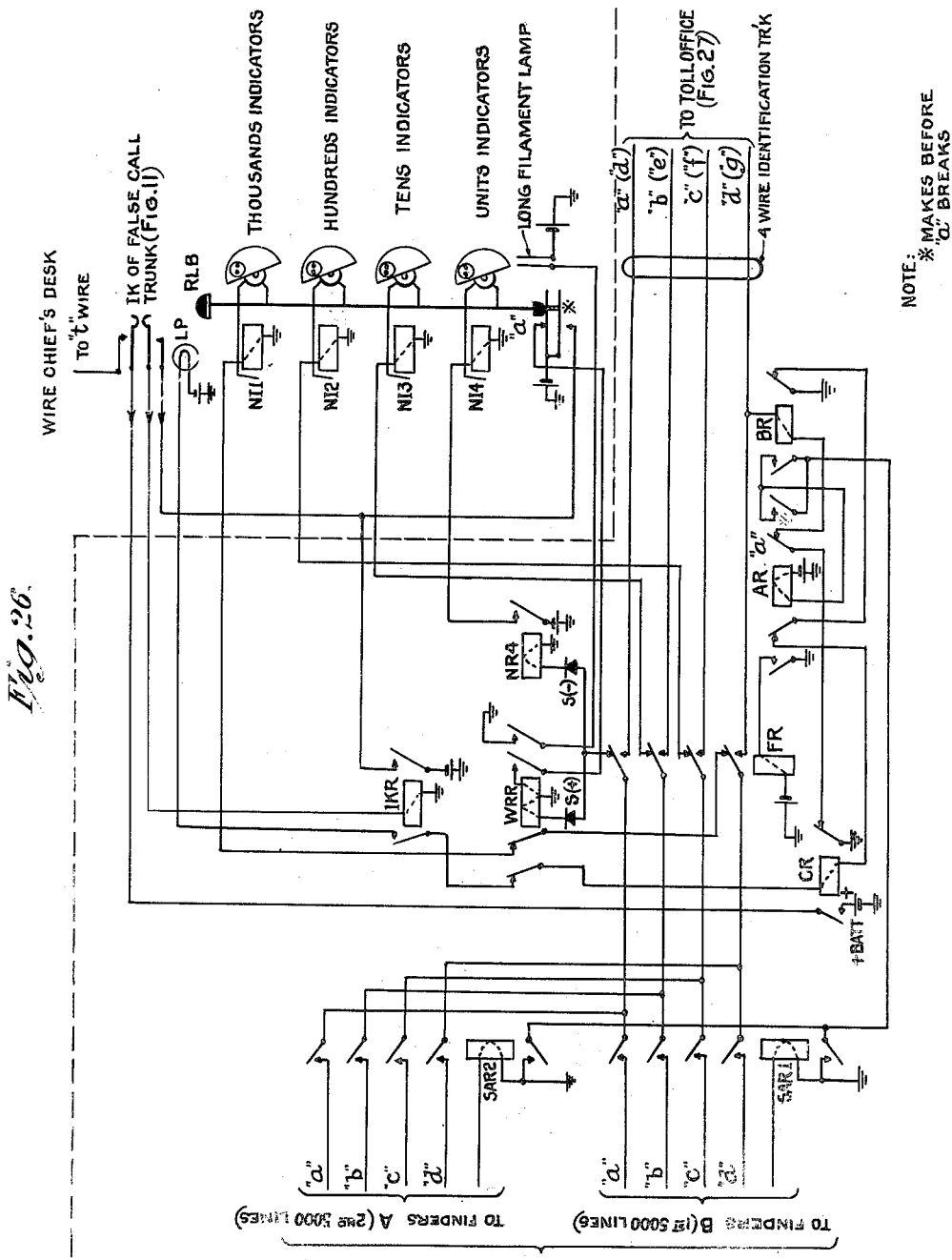
Figure 27:
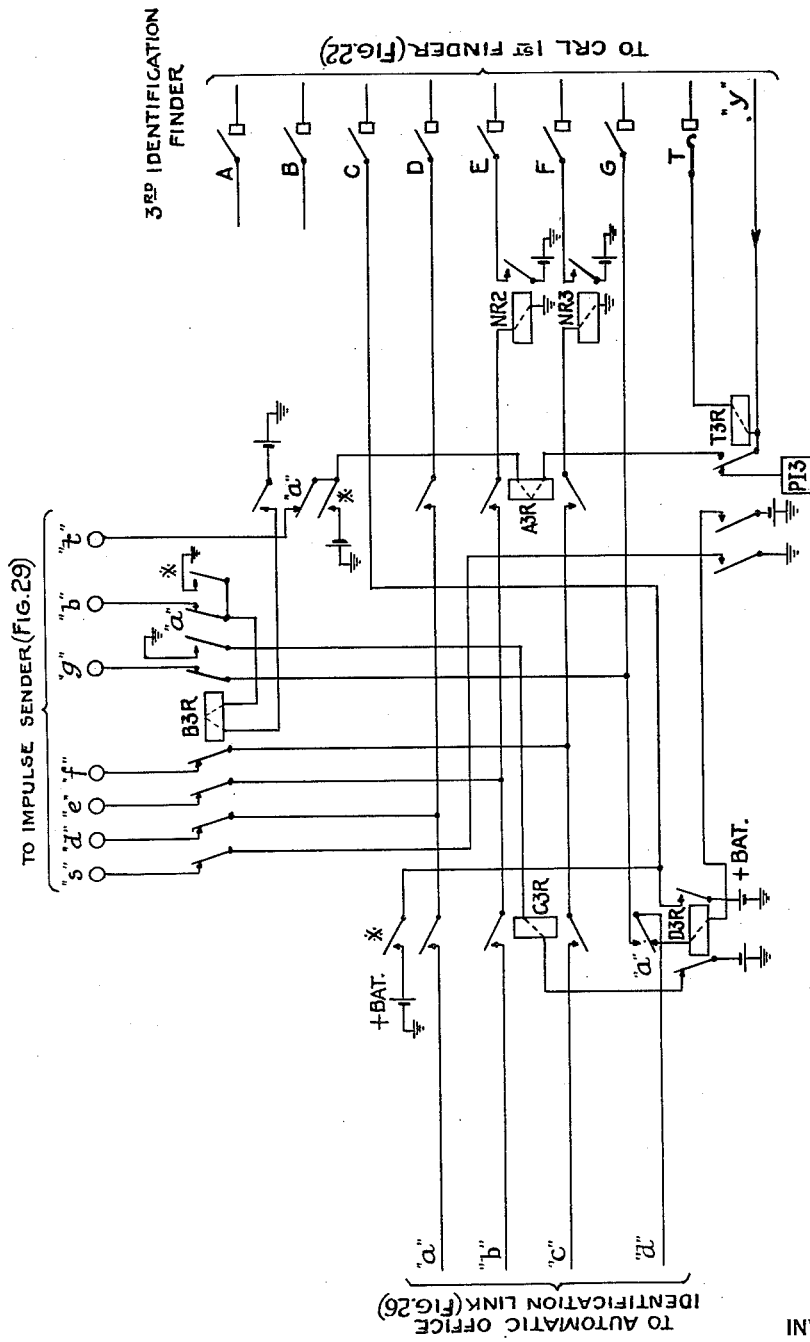
Figure 28:
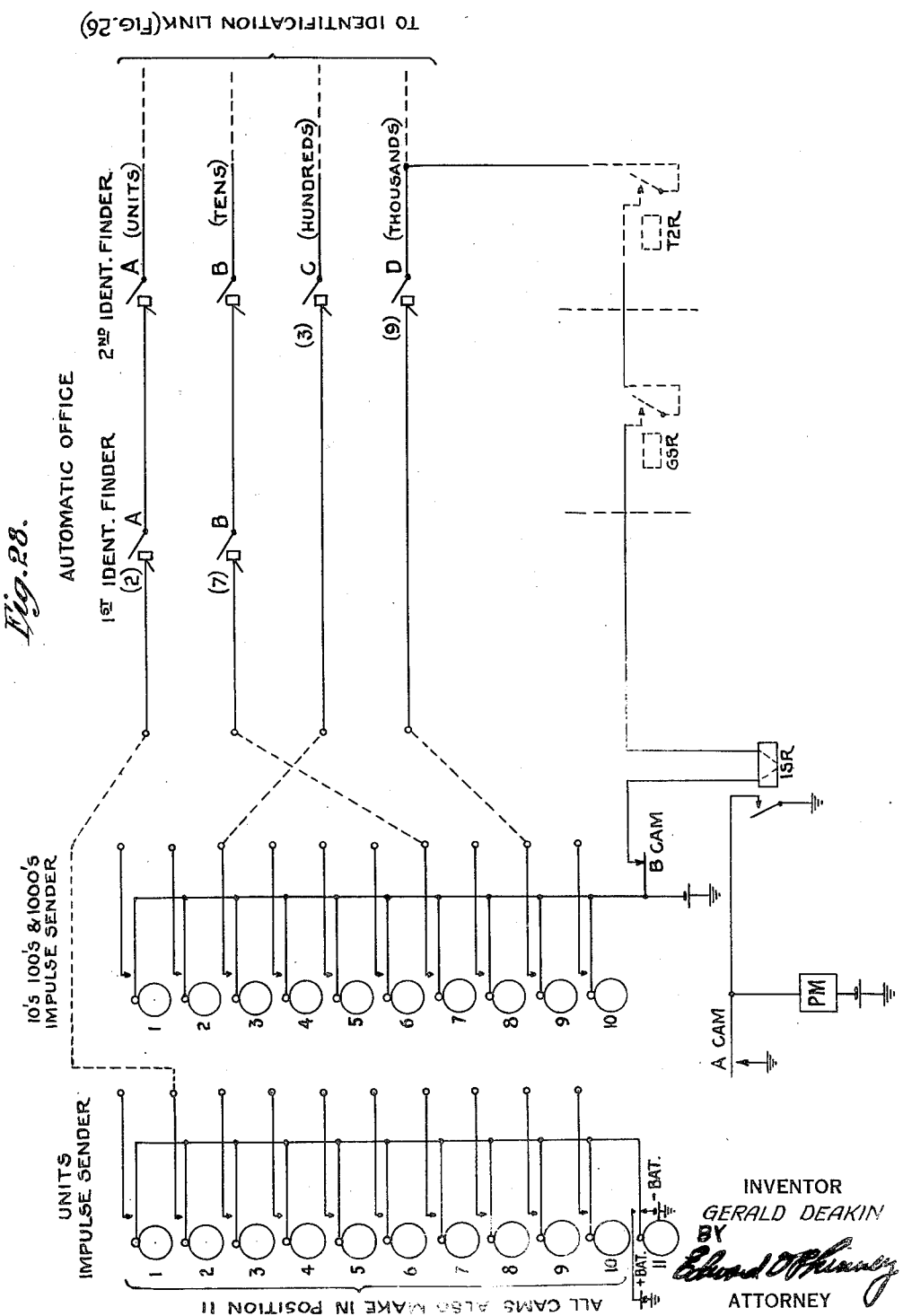
Figure 29:
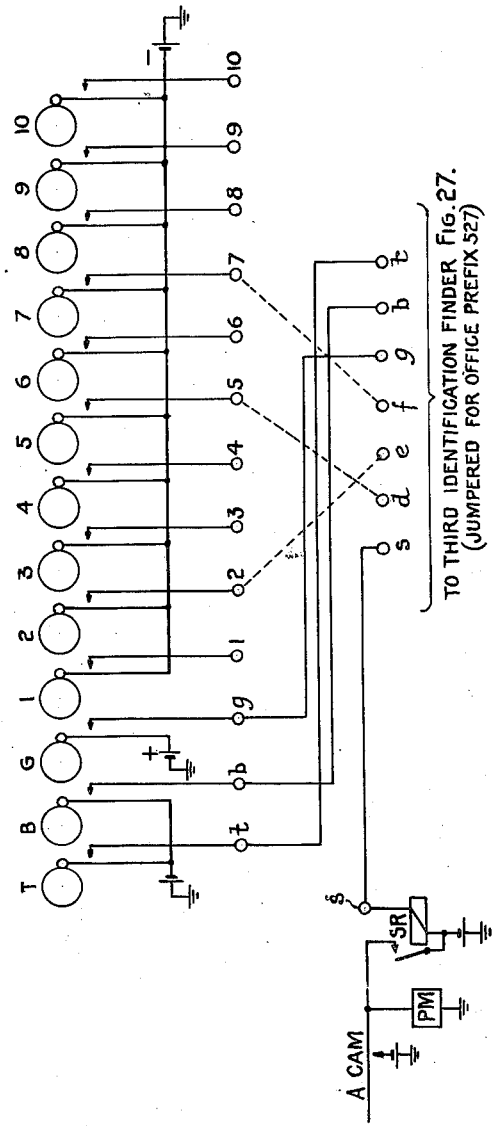

Figs. 1(c) and 1(e) are modifications of the arrangement shown in Fig. 1;

Fig. 1(d) shows the D. C. power supply arrangement;

Fig. 2 is a key sheet of the figures used in establishing a call within a Universal office;

Fig. 3 shows the fundamental circuit arrangement of a Universal exchange system;

Fig. 3(a) shows the condition of the $t$ wire during conversation;

Fig. 3(b) shows the condition of the $c$ wire during conversation;

Fig. 4 is a typical selector bank arrangement;

Fig. 4(a) shows the arrangement of a final selector bank;

Fig. 5 is the circuit diagram of a switch that can be used as a first line finder and a special service second group selector and, with a slight modification, as a local second, third and penultimate group selector;

Fig. 5(a) is the circuit of a switch that can be used as a second line finder or first group selector and, with a slight modification, as an incoming group selector;

Fig. 5(b) is the circuit of a switch which can be used as a final selector or as a combination first line finder and final selector;

Fig. 5(c) shows part of the terminal bank of a final selector;

Fig. 6 is a subscriber's line circuit;

Fig. 7 shows an allotter and an A-link circuit;

Fig. 8 shows a B-link with a second line finder and first group selector associated therewith;

Fig. 9 shows an R-link and the B-link finder and register finder associated therewith;

Figs. 10, 10(a) and 10(b) illustrate an A-register circuit at a Universal exchange;

Fig. 11 is a circuit diagram of a local trunk for routing a false call from a B-link to an operator's position;

Fig. 12 shows a local trunk for routing a call from a group selector to an operator's position;

Fig. 13 is an out-trunk leading from a Universal office to another Universal office or to a Strowger office or to a Rotary office;

Fig. 14 illustrates the trunk fundamental circuit in various stages of switching from one Universal exchange to another;

Fig. 15 is a trunk fundamental circuit illustrating the various stages of switching from a Universal to a Strowger exchange;

Fig. 16 is an in-trunk link used in switching from one Universal exchange to another;

Fig. 17 shows the T-register link at a Universal exchange;

Fig. 18 is the T-register circuit at the Universal exchange;

Fig. 19 is a key sheet showing the arrangement of the various figures in switching within a Universal office, identifying the number of the calling party and in switching between a Universal office and other Universal offices, or toll offices, or offices equipped with Strowger or Rotary switches;

Fig. 20 is a key sheet showing the arrangement of the drawings in switching from a Universal office to a CLR toll office and for identifying the calling subscriber's number;

Fig. 21 shows the outgoing end of a CLR trunk;

Fig. 22 shows the first and second CLR finders in a toll office;

Fig. 23 is a CLR position trunk;

Fig. 24 is the number indicator circuit in a CLR office;

Fig. 25 shows the first and second identification finders;

Fig. 26 shows an identification link circuit and part of a wire chief's desk;

Fig. 27 shows the third identification finder of a CLR office;

Fig. 28 shows an impulse sender in its relation with the identification finders of a Universal office;

Fig. 29 shows an impulse sender connected with the third identification finder;

Fig. 30 is a trunk fundamental circuit showing the various stages of switching from a Strowger office to a Universal office;

Fig. 31 shows the out-trunk repeater of a Strowger office;

Fig. 32 shows an in-trunk from a Strowger office and terminating in a Universal office;

Fig. 33 is a trunk fundamental circuit showing the various stages of switching from a Rotary to a Universal office;

Fig. 34 shows the in-trunk from a Rotary office and terminating in a Universal office.

The notations on most figures and the key sheets show how the drawings must be assembled for tracing the establishment of various classes of connections.

MULTI-POTENTIAL SELECTION (FIG. 1)

DESCRIPTION OF CIRCUIT

The type of multi-potential selection circuit which is used in the switching circuits hereinafter described, is shown in Fig. 1. It consists of a high vacuum twin triode or pentode V or their equivalent in separate tubes and a cold cathode gas valve GV having two control electrodes $CE_1$ and $CE_2$ and two main gap electrodes G and H. A high tension battery of an average potential of 210 volts is connected through resistances $R_1$ and $R_2$, respectively, on the one side to control electrode $CE_1$ and anode $A_1$, and on the other side to control electrode $CE_2$ and anode $A_2$.

In the table Fig. 1a will be found a number of sequences of three potentials each, 10 negative and 6 positive. The potentials under column EC are applied to the cathode C of V, those under column $EG_1$ to grid $G_1$ of V, and those under column $EG_2$ to grid $G_2$ of V. As explained later, it is only when EC, $EG_1$ and $EG_2$ form a predetermined sequence that the circuit operates.

The potentials may be placed on the grids by a relay, by a digit switch controlled by the subscriber's dial, or they may be permanently connected to them. The cathode is, in all cases, connected to the hunting brush SB which searches for the EC potential to complete a sequence set by the pre-selected pair of grid potentials.

The tubes V and GV are in the register circuits (Fig. 10) and in the originating allotter circuit (Fig. 7). The digit switches are also in the register circuit and the only connection the tube circuit has with the switching circuits is the cathode connection to the hunting brush SB. In the register circuit, because of the short connections, there should be no trouble in maintaining the high insulation resistance which is necessary if the potentials due to the relatively high resistance resistors ($R_1$ to $R_4$) are not to be noticeably affected. The test reistance RT (through which the cathode potential is applied to the T terminal, is 600 ohms, thus the normal insulation resistance of a good telephone cable should not cause an appreciable drop of the actual EC voltage as it appears on the cathode C. It is important to note that the highest test potential placed on telephone cabling is —42 volts and +26 volts. The high tension battery, average potential 210 volts, is restricted to local wiring within the register or allotter circuit.

One main gap electrode H of gas valve GV is connected to the high tension battery (210 volts) and the other, G to ground through relay GVR. This relay is designed to operate and open its back contact with the maximum speed upon the ionization of GV. RSR represents the starting relay in the register or allotter circuit which, when operated, closes the circuit of AR and P, the former the selector starting relay and the latter the selector clutch magnet of the all purpose selector circuit Fig. 5.

ASSIGNMENT OF TEST POTENTIAL SEQUENCES

The various test potential sequences may be assigned in any convenient manner. The particular assignment adopted for the circuits which follow is given in the table of Fig. 1a. It will be noted that the 10 negative sequences have been assigned in order to the ten digits 1 to 0. Four of the six available positive sequences have been assigned to special services as indicated in the column under "Use." Two positive sequences remain spare and may be used for other special purposes as occasion may require. If necessary, the number of positive test sequences could be increased to 10.

The potential of the cathode with respect to the filament must not exceed the safe commercial limit set for the tube used which is generally in the neighborhood of 50 or 60 volts. The filament is heated from the —48 volt battery A.

OPERATION OF THE FUNDAMENTAL SELECTION CIRCUIT

It is well known that in certain pentodes and triodes the anode-current rises rapidly when a decreasing negative grid-potential passes a certain point. A typical grid-volts anode-current characteristic curve of a tube suitable for use in the circuit is shown in Fig. 1b. With the cathode at 0 volts, grid $G_1$ at —2 volts, and grid $G_2$ at —4 volts, considerably more current will flow over anode $A_1$ than over anode $A_2$. This large difference in current through resistances $R_1$ and $R_2$ develops a breakdown potential across the control gap of the gas filled tube GV which fires and energizes GVR which, in turn, de-energizes AR and P.

It will be seen that all of the sequences listed in Fig. 1a meet the above requirement, that is, grid G1 is always −2 volts and grid G2 −4 volts with respect to the cathode. Assume now that the register is set for the negative sequence −2 with grid G1 at −8 volts and grid G2 at −10 volts. When RSR closes the circuit of AR and P, P advances the hunting brush SB which in a normal group selector makes contact first with the trunks of −1 sequence, −2 volts being applied to the cathode. Since the register applied −8 and −10 volts to the grids, grid G1 will now be −6 volts and grid G2 −8 volts with respect to the cathode. Little or no current will, therefore, flow through R1 and R2 and in any case, the difference in current strength will not be sufficient to develop a breakdown voltage.

Assuming that there are no free −2 sequence trunks, the hunting brush SB continues on and tests the next group of trunks, −3, making grid G1 +2 and grid G2 0 volts with respect to the cathode. Under this condition, current flows through R1 and R2 but the difference in their strength is insufficient to develop a breakdown potential. Thus it is only when the hunting brush tests a trunk of −2 sequence that grid G1 becomes −2 volts and grid G2 −4 volts with respect to the cathode and it is only when this predetermined relationship exists between the potentials applied to the electrodes that the circuit operates.

In practice the hunting brush SB when searching for the maximum positive sequence +4 may pass over terminals connected to the maximum negative sequence −10, in which case grid G1 becomes +54 volts and grid G2 +52 volts with respect to the cathode. As before stated, more or less equal currents will flow over both R1 and R2 so that a breakdown potential is not developed.

MAKING SELECTED TRUNK OR LINE BUSY

The selected trunk or line is made busy ultimately by removing the EC potential from the T terminal, but before this can be done, the T terminal is grounded over the back contact of AR as shown in Fig. 1. At the moment of test, AR is, of course, energized and thus the ground is removed. The gas valve GV fires 50 to 100 micro-seconds after the hunting brush makes contact with the proper T terminal. This action is practically instantaneous compared with the speed with which mechanical relays and clutches can be made to function. Relay GVR will break its back contact in 1 to 1.5 milli-seconds and AR will make its back contact in 1.5 to 2 milli-seconds, after which the T terminal is made busy. The T terminal thus remains unguarded for an interval of about 3 milli-seconds, during which time the gas valve of another circuit or circuits may test and fire. It is not expected that such a double test will occur frequently but when it does occur, a double connection will result unless provision is made for the subsequent double test on the a wire after the selector has stopped. This double test will be later described when the circuits are considered in greater detail.

CONTINUOUS HUNTING

Continuous hunting is automatically provided for since a selector will cease hunting only when it tests a free trunk or line which completes the sequence started by the register or allotter. A selector will hunt continuously over a group of trunks until one of the proper EC potential becomes free or until the calling subscriber hangs up.

MULTIPLE TESTING

Two or more cathodes of different circuits may be connected in multiple to the same test brush. One set of tubes may be set, for example, for sequence +1 and another for sequence −3. Whichever sequence is completed first fires the corresponding gas valve, but not the other. Multiple testing is used in the final selector and will be described in tracing a call through the system.

Multiple testing may also be used for rapid keying. An operator may, for example, have 10 digit keys connected to potentials −1 EC to −10 EC. The momentary depression of any key will fire instantly the corresponding valve circuit. Multiple testing may be used in many other ways.

ULTIMATE CIRCUITS

Fig. 1 is intended to show only as much as is necessary to explain the fundamental principle of operation. The ultimate circuits may take quite different form and may employ different and even additional valves. While relay GVR is shown connected directly to one main gap electrode of GV on one side and to ground on the other side, it may be found necessary to use an external condenser and resistance to insure the effective operation of GVR upon the ionization of GV. The requirements are that GVR have a substantial back contact pressure of not less than 30 grams, and that it break this back contact in a minimum of time and immediately thereafter close a front contact for a sufficient length of time to energize a slow releasing relay GSR which de-ionizes the gas valve GV, whereupon GVR releases.

Numerous other circuits making use of the grid-volts anode-current characteristic may be devised, for example, a circuit similar to Fig. 1 but using a transformer T instead of resistances is shown in Fig. 1c. In all other respects, Figs. 1 and 1c are alike.

It may be seen from examination of Fig. 1b, that the same results may be obtained by using a single grid brush connected to the grids of two single triodes or pentodes having different characteristics or by connecting one of the grids of the two similar tubes to the single grid brush through an individual biasing battery or its equivalent.

In the modification shown in Fig. 1(e) the gas valve GV of Figs. 1 and 1(c) is replaced by a differential relay QR. As long as the current in the two plate circuits of tube V are approximately the same, the relay QR will not operate. However, when a proper sequence of potentials is met, then the current through one winding becomes much greater than through the other winding and the relay QR operates and performs the same function as relay GVR in Figs. 1 and 1(c). Otherwise the operation of the system is the same as in the previous case.

FUNDAMENTAL SELECTION AND SWITCHING CIRCUITS

D. C. POWER SUPPLY (FIG. 1d)

The successful operation of multi-potential selection requires a reliable source of D. C. potentials and a reasonable degree of voltage stability. The following batteries are required: Battery A −48 volts consisting of 25 cells which is the main source of power; battery B +210 volts consisting of 100 cells which serves as the auxiliary battery and is used to supply a small amount of current at +50 volts for the momentary operation of relays in series with positively polarized reactifiers; a small amount of current at +70 volts for the momentary booster operation of the service meter; a small amount of current at +210 volts for the momentary operation of the gas valves. Battery C —42 volts consisting of 21 cells, and which is the small negative test battery for multi-potential selection; battery D +22 volts consisting of 11 cells which is the small positive test battery for multi-potential selection.

Battery A is the only battery of appreciable size. Batteries C and D may be of the smallest commercial types available, while battery B need not be much, if any larger.

Batteries A, B and C are normally floated, the first off a charging generator, if the current drain is heavy, and the latter two off rectifiers. During hours of slack load and possibly at other times batteries B and C may be disconnected from the charging means. At these times battery D may be charged from the rectifier normally floating battery C.

The potential of the main exchange bus-bars is maintained between the limits of —48 volts and —51 volts by means of an end cell switch. It is not thought necessary to provide end cell switches elsewhere since the small current drain permits the voltage at these other points to remain more or less constant.

All batteries and their connections are planned for a freshening charge voltage of 2.3 volts.

It is assumed that the potential of the cells in battery A will never fall below 1.8 volts and rarely below 2 volts. It is assumed that the cell potential of battery B will never fall below 1.9 volts at any time. It is also assumed that the cell potential of batteries C and D will be maintained between the limits of 1.9 volts and 2.1 volts, but these limits may be considerably exceeded without disturbing the operation.

The individual cell potential of batteries C and D must be maintained between the limits of 1.7 volts and 2.5 volts, although tests indicate that the upper limit may be raised without rendering selection unreliable. The lower limit of 1.7 volts is the lowest voltage any storage cell should be allowed to attain at any time. The system is designed for an average potential of 2 or 2.1 volts per cell which latter is the usual potential obtained when a battery is floated as is done in the case of battery C.

The cells of batteries A and B are used as a reserve for those of batteries C and D, respectively. The change-over is accomplished by multi-pole double throw switches. It is not necessary that each battery have the same average cell potential when a switch is thrown. Battery C, for example, may be at the lower limit of 1.6 volts per cell while battery A is at the upper limit of 2.3 volts per cell, or vice versa. The important requirement is that all cells in any one battery shall have as nearly the same potential as possible and be within the afore-mentioned limits and it is not essential that the potential of the cells of battery C be the same as those of battery D.

As the EC potentials (Fig. 1a) are applied to the $t$ wire, it is essential that other potentials applied to this wire for other than test purposes shall not come within the range of the test voltages as given in the table. The $t$ wire may have applied to it for these other purposes a ground, —48 volts within the extreme limits of —46 to —55, although these extreme limits are not met with in normal operation, and +50 volts within the extreme limits of +45 and +55. The important potentials are the lowest negative potential of 46 volts and the lowest positive potential of 45 volts.

Referring again to the table in Fig. 1a, the voltages given in column EC are those which are used on the T terminals for test purposes. The highest negative EC potential, number —10, comes from the 19th cell of battery C which may obtain a maximum potential of nearly 44 volts (normal 40 volts) with the average cell potential 2.3 volts. As the minimum potential of battery A is —46 volts, a minimum difference of 2 volts will exist between the maximum EC test potential and the minimum operating T potential (a combination never met in normal operation). This difference is, however, sufficient to prevent false operation. Should the EC potential —10 be allowed to equal the potential of battery A, false selection might occur during moments of multiple metering when, and only when, the minimum —46 volts of battery A is placed on the $t$ wire momentarily to operate the multiple metering relay LMR. The maximum positive EC potential, number +6, is +25 volts which is well below the minimum potential of +45 volts of battery B.

From the foregoing, it will be seen that the supply of test and other potentials for multi-potential selection is not difficult or costly and with reasonable attention given to wiring and fusing, reliable multi-potential selection will be insured as far as the D. C. power supply is concerned.

MULTI-POTENTIAL SWITCHING (FIGS. 2 AND 3)

Switching Plan (Fig. 2)

General

In the foregoing, multi-potential selection was described as applied to intra-office switching systems. For inter-office trunking between A and T registers, direct D. C. impulsing is used. Better to understand the switching circuits, one should have a clear picture of the switching plan, that is, how the various circuits are inter-connected and the order in which they operate. A typical switching plan for an area with a switching capacity of 10,000,000 lines is diagrammatically shown in Fig. 2. This plan follows the conventional lines of the well-known rotary power-driven system. The subscribers' lines terminate in the banks of first line finders, finals, and combined finals and first line finders, called for short "combined circuits." The first line finders and combined circuits are connected by A-links to the banks of second line finders which, together with first group selectors and B-links, form the well-known connection circuits. The banks of the first group selectors are connected to second group selectors, and so on to the finals and combined circuits. In switching systems of smaller capacity, the unnecessary group selectors are deleted.

The auxiliary circuits are the allotter and starter, the R-link and the A-register circuits. Out-trunking may be done from the first, second, third or fourth group selector banks, as the case may require, and the incoming trunks may terminate on second, third, or fourth group selectors, also as the case may require.

An important equipment feature of the Universal system is that all four-brush selector and finder circuits found in the conversation train are made up of one of the three forms of an all purpose selector circuit (Fig. 5). An A-link (Fig. 7) consisting of two relays is used to connect a combined circuit or a first line finder to the second line finder banks and a B-link (Fig. 8) consisting of F relays is used to connect the second line finder to the first group selector to form the connection circuit. The same all purpose selector circuit is also used for incoming trunks in connection with T-links which consist of groups of relays which vary in number and arrangement according to the nature of the distant office (see Junction Key Sheet Fig. 19).

Distribution of subscribers' lines

As the Universal system is a decimal system, the subscriber lines are divided into blocks or groups of 100. These lines, as just stated, terminate in the banks of first line finders, final selectors and combined circuits. The subscriber lines are arranged in numerical order in the banks of the finals and combined circuits, and these switches start hunting at line No. 1. This arrangement is not satisfactory for the first line finders since subscriber No. 100 would always have a comparatively long wait for the dialing tone. To reduce this time, each block of 100 subcriber lines is divided into two sub-groups of 50 each, known as the upper (U) and lower (L) sub-groups. These two sub-groups are connected, respectively, to the upper and lower halves of the first line finder banks. The first line finders are correspondingly divided into two sub-groups, one sub-group (U) having its home position at the left and serving the upper group of 50 lines as first choice, and the other (L) having its home position at the right and serving the lower group of 50 lines as first choice. As the combined circuits must always have their home position at the left, the subscribers in the lower half of the bank will always have to wait a little longer for the dialing tone during moments of peak traffic when combined circuits must be used, and all subscribers will have a somewhat longer wait when all their respective first choice finders are engaged and second choice finders are used. The sequence of selection is such that a subscriber is always picked up by a first choice finder if one is free; if none is free, then by a second choice finder, if one is free; and finally by a combined circuit when no line finder is free.

Allotter circuits (Fig. 7)

Each sub-group of subscriber lines (U) and (L) has its own starter and allotter circuit. When a subscriber calls, the associated allotter circuit allots a first choice A-link, if one is free, if not, a second choice A-link, and if none of these is free then an A-link connected to a combined circuit. In no case is more than one A-link selected for the same call. If two calls arrive in the same group of 50 at the same time, one must wait until the first one reached by the A-link is connected through to the register. Under normal traffic conditions, this takes about one second.

Distribution of first line finders and combined circuits

The two sub-groups of first line finders (U) and (L) and the combined circuits are connected to the banks of the second line finders through A-links. It is customary to split these sub-groups and run them to two or three groups of connection circuits so as better to distribute the originating traffic. To reduce hunting time, the second line finders which form part of the connection circuits are also divided into two sub-groups, an upper (U) and a lower (L) with left and right home positions respectively. The capacity of the banks of the second line finders is 120. Thus 60 A-links are connected to the (U) sub-group and 60 to the (L) sub-group. When a subscriber originates a call and the associated allotter circuit allots an A-link, it also marks the proper group of B-links as first choice for the R-links, all of which are started simultaneously to hunt by the allotter circuit. If the A-link is connected to the upper half of the second line finder bank, it will be picked up by a (U) group or first choice second line finder, if one is free.

Selection of calling line

After the allotter circuit has chosen a free A-link, it directs the associated first line finder or combined circuit, as the case may be, to the calling line.

Disposition of B-links, R-links and A-registers

The (U) and (L) groups of B-links are connected to odd and even terminals, respectively, in the B-link finder banks of the R-links. The R-link finders have eight brushes and their banks have capacity for 60 circuits which number is more or less in agreement with the number of connecting circuits required to serve a full bank of 120 A-links. Because of this coincidence, one group of R-links is provided for each group of B-links or connection circuits. The R-links are controlled by two starting relays $BSR_1$ and $BSR_2$. When $BSR_1$ is energized, it starts all idle R-links hunting and makes available as first choice all idle (U) group B-links. When $BSR_2$ is energized, it also causes all idle R-links to hunt but makes available to the R-links as first choice the (L) group of B-links. When all first choice B-links are busy, the other group is automatically made available as second choice.

Each vertical row of terminals in the bank of the allotter switch connected to an A-link is also connected to the proper BSR relay. Since the A-links are spread over two or three groups of connection circuits, two or three $BSR_1$ and $BSR_2$ relays will be correspondingly multipled in the bank of the allotter switch.

The register finders of the R-links are also eight-brush, 60-point hunting switches. Their banks are connected to the A-registers. When the number of registers is less than 60, certain registers are multipled twice, possibly three times, so as to eliminate hunting delays because of idle terminals.

Selection of A-link

The allotter circuit energizes the proper BSR relay immediately after seizing the A-link. The BSR relay energizes all idle B-link finders in the group and a B-link of the first choice sub-group is connected to an R-link if a B-link in this sub-group is free; if not, a B-link in the other sub-group or second choice is chosen. The R-link, immediately after seizing a free B-link, causes the register finders to hunt for and select an idle A-register. The time of hunt for the B-link and the subsequent hunt for the A-register, under normal traffic, is very short.

Immediately after the A-register is connected, it directs the second line finder to the calling A-link.

If the subscriber's line is favorably placed in the first line finder bank, it will be picked up first by the first line finder. However, if the A-link is relatively more favorably placed in the bank of the second line finder, it may be picked up first by the second line finder. When both selections are complete, the subscriber is connected through to the register and hears the dialing tone.

Finder and selector speeds

The four-brush first and second line finders hunt at a speed of 100 terminals per second. The bank has 122 terminals and the change-over travel space at each end of the bank is equivalent to approximately five terminals so that the total hunting distance in terminals for one complete cycle is 132. In other words, the selector makes the cycle in 1.32 seconds.

The eight-brush auxiliary finders hunt at 60 terminals per second. The capacity of the bank of an eight-brush finder is 61, thus the total travel in terminals, allowing for the change-over at each end, is 71. In other words, an eight-brush selector hunts over an entire arc in 1.2 seconds.

Hunting by the group and penultimate selectors may be withheld until after the digit has been dialed or hunting may commence immediately following the commencement of dialing. In the first case, high speed hunting would be necessary to avoid delays in cases where the trunk to be selected is at the far end of the bank. In the second case, lower speed may be used, such that the switch follows a short distance behind the dial. This is the plan adopted for the Universal system and the speed selected is 60 terminals per second with the 10 groups of trunks spread out over the first or upper half of the bank as shown in Fig. 4. In an arrangement such as shown in Fig. 4, when, for example, the digit 0 is dialed, the switch will reach position 8 or 9 by the time dialing ceases, and the subsequent hunt would be very short in case one or more of the individual trunks are free, but somewhat longer in case a graded trunk in the lower half must be selected.

Since the "tens" positions in the finals are ten terminals apart, the final may hunt at the same speed as the finders, namely, 100 terminals per second. To prevent an overrun in selecting the units, their selection is withheld until after the units digit has been dialed. The following hunt at 100 steps per second is, of course, very short.

Elapsed time to dialing tone

The moment a first line finder starts to hunt, an R-link picks up a B-link and then an A-register, after which the register causes the second line finder to pick up the first line finder. The subscriber receives the dialing tone from the register when both first and second finders have completed their selection. The hunting time of the first line finder under various conditions is shown in Table I and of the second line finder in Table II. As the two hunts are coincident, that which takes longest determines the time of dialing tone to the subscriber. It will be seen that in the bulk of cases the second line finder will be the last to complete the connection. The average time to the dialing tone is calculated to be 1.15 seconds with a minimum of .8 seconds and a maximum of 2.4 seconds. However, this maximum will be reached only once in about every 100 calls.

The hunting speeds previously mentioned and upon which Tables I and II are based are safe speeds and which have already been considerably increased.

TABLE I

Dialing tone delay in seconds due to first line finder

|  | A-links | | | | | | | | |
|---|---|---|---|---|---|---|---|---|---|
|  | First choice (80%) | | | Second choice (20%) | | | Average | | |
|  | a. | b. | c. | a. | b. | c. | a. | b. | c. |
| 1. Allotter switch operates | 0.15 | 0.15 | 0.15 | .20 | .20 | .20 | .16 | .16 | .16 |
| 2. Line finder operates | .20 | .45 | .70 | .95 | 1.20 | 1.45 | .35 | .60 | .84 |
| Total | .35 | .60 | .85 | 1.15 | 1.40 | 1.65 | .51 | .76 | 1.00 | a.—Line No. 1.
b.—Line No. 50.
c.—Line No. 100.
Average for all lines under all conditions .73 second.
Data E. B. H. C.—1.5.
H. T.—2 minutes.
P.—.001.
5.—First choice ⎱
5.—Second choice ⎰ 14 circuits per 100 lines.
4.—Combined ⎰

TABLE II

Dialing tone delay in seconds due to second line finder

|  | B-links | | | | | | | | |
|---|---|---|---|---|---|---|---|---|---|
|  | First choice (90%) | | | Second choice (10%) | | | Average | | |
|  | a. | b. | c. | a. | b. | c. | a. | b. | c. |
| Allotter starts R-links | .15 | .15 | .15 | .20 | .20 | .20 | .15 | .15 | .15 |
| R-link selects B-link | .25 | .25 | .25 | .25 | .25 | .25 | .25 | .25 | .25 |
| R-link selects register | .20 | .20 | .20 | .35 | .35 | .35 | .22 | .22 | .22 |
| 2nd line finder selects A-link | .20 | .50 | .80 | 1.00 | 1.30 | 1.60 | .28 | .58 | .72 |
| Total | .80 | 1.10 | 1.40 | 1.80 | 2.10 | 2.40 | .90 | 1.20 | 1.34 | a.—Zero hunt by second line finder.
b.—Aver. hunt by second line finder.
c.—Max. hunt by second line finder.
Average for all conditions 1.15 seconds.

Elapsed time to ringing or busy tone

Except at peak moments when all trunks are busy and continuous hunting is brought into play, selection follows closely the motion of the dial except that, as previously stated, the units selection is withheld until after the units digit has been dialed in. As the final or combined selector hunt at the speed of 100 terminals per second, the called line is picked up .2 to .3 second after the dial has come to rest. The busy tone or ringing tone, as the case may be, follows immediately.

It should be pointed out that where a delay in the Universal System is due to continuous hunting, in all other systems except the Rotary the call would be lost since there is no means of storing a call during peak moments when all trunks are busy.

OPERATION OF SWITCHING SYSTEM (FIG. 3)

Selection of calling line by first line finder

In Fig. 3 only a few essential parts of the circuits are shown. Further details and full circuit descriptions will follow. Power magnet PS1 of the first line finder or combined circuit (Fig. 7) and relay AR are energized over the back contact of GVR of the allotter circuit (Fig. 7) when relay GR operates. AR disconnects the brush T1 from the busy ground on the t wire and in place thereof connects it to cathode c of valve V over the a wire. The calling EC potential (see Fig. 1a) is +2 and is applied to terminal 6 of the first finder, final and combined banks (Fig. 3a) over the front contact of the line relay (Fig. 6).

It is assumed in Fig. 3 that the final and first line finder bank terminals are in one unbroken multiple, thus the first T terminal tested is the first "tens" or busy terminal BP, to which is connected EC potential +1 (Fig. 1a). Terminals 1 and 2 are shown free and connected to their respective negative EC potentials —1 and —2. Terminals 3, 4 and 10 are indicated as belonging to called subscribers on local connections and, therefore, grounded through multiple metering relay LMR in series with rectifier (S—) (see Fig. 3a). Terminal 5 belongs to a calling subscribed and is open (see also Fig. 3). Terminal 6, as previously stated, is connected to the positive calling EC potential +2. Terminal 7 is free and is connected to its normal EC potential —7. Terminal 8 is dead grounded, a momentary condition met with during selection. Terminal 9 is connected to EC +4, the line identification potential which is placed on the t wire of the calling line when the identification relay IR is operated (see Fig. 3a). Terminal 11 is the second "tens" or busy terminal BP and is connected to EC +1. One of these BP terminals appears before and after each group of ten lines in the final banks and also in the first line finder banks in case the multiple is common. The following terminals 1, 2, 3 and 5 are shown free and form one P. B. X group. Terminal 4 is a free main line. Note that the P. B. X terminals need not be consecutive but all terminals must be between the same pair of BP terminals.

Relay FR of the allotter circuit (Fig. 3) connects EG1 +2 and EG2 +2 to grids G1 and G2 respectively of tube V, thus when brush T1 reaches the sixth terminal on which EC +2 is placed, and only that terminal, the necessary sequence is completed, V fires GV, and GV operates GVR, thus opening the circuit of PS1 and AR. The release of PS1 stops the first line finder on the terminals of the calling line and AR makes the T terminal quickly busy to ground over its back contact. A little later, the cut-off relay COR is energized and the EC potential is disconnected. The condition of the t wire becomes as shown in Fig. 3a.

*Selection of first line finder by second line finder*

When a free R-link, B-link and register have been selected, RBR of the register circuit (Fig. 3) operates and a ground on the b wire over the back contacts of GVR1 and GVR2 operates AR and then PS2 of the second line finder. AR disconnects brush T2 from the busying ground and in place thereof connects it to the a wire and cathodes of valves V1 and V2. EG1 +3 and EG2 +3 are normally on grids G1 and G2 respectively, of V1, and EG1 +1 and EG2 +1 on the grids of V2. The latter is not involved at this stage since there is no EC +1 potential on any second line finder T terminal.

As test brush T2 hunts, it may test six possible conditions: (1) Terminals 1, 3 and 7, t wire grounded through multiple metering relay LMR and rectifier S(—), (see Fig. 3a). This means that the first line finders are busy on originating connections. (2) Terminal 4, t wire with a dead ground indicating that a calling line is being selected. (3) Terminal 5, t wire with positive 50 volt battery indicating that the identification relay IR is being operated. (4) Terminal 8, t wire with 48 volt negative battery indicating that multiple metering is in process. (5) Terminal 2, t wire open indicating a second choice B-link unallotted. (6) Terminal 9, t wire with EC potential +3. This is the potential which identifies the calling A-link, and when it is tested, V1 fires GV1.

The maximum number of A-links connected to the same full second line finder bank on which EC +3 may appear simultaneously is equal to the number of operated allotter circuits having access to the corresponding group of B-links.

*Selection by group selectors (Fig. 3)*

When the subscriber dials, digit switch ED in the register advances brushes DB1 and DB2 to the terminals corresponding to the digit dialed and the corresponding EG1 and EG2 potentials are placed on grids G1 and G2 of valve V1. When a group digit switch ED advances from position 0 to position 1, it closes the fundamental circuit by operating relay RSR, and incidentally slow release relay PRR. RSR disconnects the register release relay RRR from the b wire and the two double test relays RT1R and RT2R from the a wire and in place thereof places a ground on the b wire over the back contacts of GVR1 and GVR2 and connects the a wire to the cathodes C1 and C2 of GV1 and GV2. Relay AR and clutch PS3 of the group selector operate and the selector searches for a free trunk having that EC potential which will complete the sequence set by the digit switch ED. When the sequence is complete, V1 fires GV1 whereupon GVR1 operates and removes ground from the b wire. Relays RSR, AR and magnet PS3 quickly release and the selector comes to rest on the terminals of the trunk leading to the chosen second selector GVR1 operates GSR1. GSR1 de-ionizes gas valve GV1, whereupon GVR1 falls away and, in turn, releases GSR1. GSR1 is slow releasing and allows time for the de-ionization of GV1 and to prevent a too early re-energization of RSR which would otherwise occur since one side of the circuit of RSR will be found closed to battery at the next digit switch ED should the subscriber dial more rapidly than the selector chooses, as is often the case. When AR releases, it makes the selected trunk momentarily busy over a back contact to ground.

When PS3 is de-energized, the selector brushes A, B and C make contact with the terminals of the trunk to the selector beyond and a circuit is established from ground, resistance R1, off normal contact ONC4 of the chosen selector. wire a, back contact of RSR, high resistance winding of test relay RT1R to battery. RT1R operates and shunts its high resistance winding by its low resistance winding in series with the low resistance test relay RT2R and makes the trunk busy for the purpose to be presently explained. RT2R operates and when GVR1 makes its back contact, a circuit is established from ground, back GVR1, back GVR2, back RSR, front PRR, front RT2R, back RER, winding of "out control" switch EO to battery. EO operates and advances one step, thereby arranging the register for the control of the next selector by the next digit. PRR whose circuit was opened at the same time as that of RSR being slow releasing holds it front contact closed after GVR1 again makes its back contact for a sufficiently long time to operate the quick acting escapement switch EO over the circuit just described.

The off-normal contact ONC4 opens when the selector leaves its home position, but before this takes place, the cathodes of valves V1 and V2 are connected to the *a* wire by RSR, since ground completes no sequence, the valves do not operate. All group selectors operate in exactly the same manner.

Double test

Two or more selectors may test the same trunk in the same time interval of 3 milli-seconds. When this happens, brushes A of the two or more selectors will be connected in multiple to the same test resistance R1. All test relays RT1R operate, but should two or more make their front contact at the same instant, all will release because RT1R is adjusted to release when the current through its low resistance winding is thus reduced. In practice, the relays RT1R may buzz for an instant but sooner or later one relay makes its front contact first and effectively shunts out the others. The registers which come out second best on a double test close a circuit over the back contact of RT2R instead of over the front contact as previously explained, and in so doing operate the busy relay DAR of the R-link over brush C of the register finder. DAR releases the partially completed connection up to and including the first group selector and applies the busy tone to the calling line which the calling subscriber hears when he places the receiver to his ear after completing dialing.

Selection by final selector

The final selector makes two selections instead of one as the group selector does. It first selects the particular group of ten lines corresponding to the "tens" digit, after which it selects the wanted line in the selected group of ten. As double testing is not required after the final has been picked up, relay RGR is operated when EO reaches the "tens" selecting position. Thus, when the "tens" digit switch ED goes to position 1, relay RSR is operated but not PRR. The digit switch brushes DB1 and DB2 of the "tens" digit switch are disconnected by means not shown, and valve V1 may not function. Ahead of each group of ten lines, as previously stated, is a "tens" or busy position terminal connected to EC +1, whereby whenever the final selector brush T4 tests a "tens" position terminal, V2 fires GV2 and in turn GVR2 operates GSR2. Each time GSR2 operates, it advances a counting switch EC one step over the back contact of RFR. By means not shown, RFR operates after the next to the last impulse of the dialed digit has been sent in. For example, if the digit 6 is dialed, RFR operates after the fifth impulse has been received, and when GSR2 operates on the sixth impulse, EO operates instead of EC. EO arranges the register for the following "units" selection.

The "units" digit switch is connected and the "units" are selected in the same way. When the EC potential required to complete the sequence is reached, V1 fires GV1. RSR is operated and the final comes to rest on the chosen line. When GSR1 operates on this last selection, it causes the R-link to apply ringing current to the called line.

P. B. X groups in final bank

As shown in Fig. 3, a P. B. X group is formed by connecting the required number of individual line terminals to the same EC potential. The group must be between the same pair of busy position terminals. The final selector functions in the same manner whether it is selecting a main line or a P. B. X line.

Called line busy

A line is made busy by removing the EC potential from the T terminal or by placing a dead ground upon the T terminal. In either case the final selector is unable to complete the sequence and will therefore pass on to the next "tens" terminal which is connected to potential EC +1. The register circuit is so arranged that when the final selector tests such "tens" terminal, V2 fires GV2. GV2 operates GVR2 which, in turn, operats GSR2. RFR is energized and GSR2 advances EO one additional step, in this case to position 7, thereby grounding the C brush of the R-link. Busy relay DAR operates, releases the connection to and including the first group selector and applies busy tone to the calling line.

Short number call

Ordinarily the register is released only when the full number of digits has been dialed. However, there will be many calls in which only 1, 2 and 3 digits are dialed. To release the register on such calls, the selected local trunk places a momentary ground on the *b* wire instead of the usual battery through an AR relay. When RSR releases and closes its back contact, the relay RRR which is connected to battery operates and releases the register. The register may be released at any stage by grounding the *b* wire.

False call

Should a line become grounded or should the subscriber fail to dial within 30 seconds after removing the handset, the time alarm TA of the register will operate relay RER. Relay RER energizes RSR and the first group selector hunts in the usual way. Since the digit switch has not been moved out of its home position, the grids of valve V1 are connected to potentials EG1 +3 and EG2 +3. Connected to the banks of the first group selectors are a few false call trunks to the wire chief. Their T terminals are connected to potential EC +3. When, therefore, the selector reaches one of these trunks, V1 fires and the selector comes to rest in the usual way. Since RER is energized, the register release relay RRR is operated over the front contact of RER instead of EO which, as previously stated, is normally operated over the back contact of RER.

Slow or incomplete dialing

Should the subscriber fail to complete the dialing of a subscriber's number or take more than 30 seconds between the dialing of digits, the time alarm will again operate RER as on a false call. The home positions of all digit switches, normally place potentials EG1 +3 and EG2 +3 on the grids of V1. In the banks of all selectors, except the first, are a few local trunks with the corresponding potential EC +3, whereby a slow or incomplete call, like a false call, is automatically removed from the register and directed to a suitable local trunk.

Group selector hunting starts with dialing

To avoid unnecessary delay in selection, group selectors and the finals on the "tens" selection start hunting immediately after the first dial impulse is received.

The selection of the units, because of the close proximity of the terminals does not start until the dialing of units digit is complete.

OPERATION OF ALL PURPOSE SELECTOR CIRCUITS (FIGS. 5–5C)

GENERAL

The all purpose selector circuits (Fig. 5) have a starting relay AR and, except when associated with a B-link (Fig. 8) or a trunk link (Figs. 16, 32, or 34), a holding and release relay BR. When associated with such link circuits, a BR relay becomes unnecessary since its function may be performed by any relay in the link circuit which releases at the end of a connection. The starting relay AR has an added function in the final selector or combined circuit (Fig. 5b) where it is used to hold the called line busy after the preceding penultimate selector has released until the called subscriber hangs up. The wiring shown in Fig. 5 is for first line finder and local second, third, fourth and penultimate group selectors, that in Fig. 5b for final selector and combined circuits, and in Fig. 5a for second line finders, first group and incoming trunk selectors.

In Fig. 5 relays AR and BR have three armature springs. In Fig. 5a relay AR also has three springs but there is no BR relay. In Fig. 5b the number of armature springs on relay AR is increased from three to five and on BR from two to seven. The respective windings of the two relays are the same for all figures.

The bays on which the four brush finders or selectors are mounted are identical and include provision for mounting of the relay unit (1 or 2 relays) and, when required, the associated fuse, the listening or test jack LJ and busy jack BJ. The relay unit has attached to it the wiring for the particular figure to which it belongs. The home contacts which vary in number, character and location (right or left) are molded units and are plugged into holes molded in the selector bank, thus any combination of home contacts may be easily met without disturbing the internal mechanism of the selector.

The selector has four brushes, A, B, C and T. The test brush T is a rubbing brush. The other three do not make contact while the selector is in motion but all make contact with their respective terminals when the selector is at rest, except in the home position where there are no terminals.

The all purpose selector circuits are used in all regular switching circuits, as distinguished from auxiliary circuits, with or without association with other equipment call links.

The circuit of Fig. 5 may be used without additional equipment as a local or special service second group selector, local third or fourth group selector, or a penultimate selector circuit.

The circuit of Fig. 5b may be used without other equipment as a final selector circuit.

The circuit of Fig. 5 may be used for a first line finder in association with an A-link (Fig. 7).

The circuit of Fig. 5b may be used as a combined circuit by connecting it in multiple to an A-link (Fig. 7) and to the banks of the penultimate selectors.

The circuit of Fig. 5a may be used as the second line finder and as the first group selector circuit in association with a B-link (Fig. 8) to form the well-known connection circuit.

The circuit of Fig. 5a may be used as an incoming second, third or fourth group selector circuit from any distant office when connected to the appropriate incoming trunk link, some of which are listed below:

From Universal Fig. 16
From Strowger Fig. 32
From Rotary Fig. 34

The arrangement and connection of the all purpose selector circuits in a large central office are shown diagrammatically on Junction Key Sheet JK-10.

OPERATION OF ALL PURPOSE SELECTOR CIRCUIT (FIG. 5)

After an all purpose selector circuit has been picked up, ground is placed on the c wire directly or indirectly. This operates relay BR over off-normal contact ONC5. Relay BR locks up to the c wire over one front contact and removes the EC potential from the t wire, thereby removing a temporary current drain on the test battery which would otherwise occur since the t wire is grounded between selections. BR also removes ground from off-normal contact ONC3.

The circuit remains in this condition until selection is initiated by the grounding of the b wire by the register. Relay AR operates over off-normal contact ONC1 and locks up to the b wire over one front contact, and over another front contact connects clutch magnet P to the grounded b wire. The energization of the magnet P elevates brushes A, B and C and causes the selector to operate. As the selector moves out of its normal or home position, off-normal contacts ONC1, ONC2, ONC4 and ONC5 open and ONC3 closes. All this takes place before the T brush reaches the first bank terminal. During selection relays AR and BR are energized and the T brush is connected to the a wire over front contacts of BR and AR. The t wire remains open at the selector end and grounded at the other end.

When a free trunk or line is found, the register removes ground from the b wire which releases AR and clutch magnet P simultaneously. AR is quick-releasing so that the ground on the t wire makes the selected trunk or line busy a few milliseconds after testing. The de-energization of P causes brushes A, B and C to make contact with their respective terminals, after which the register checks for a possible double connection over the a wire to ground through resistance R1 of the chosen selector. As contacts ONC1, ONC2 and ONC5 are open in any off-normal position, the selector in case of momentary release may not be again picked up or AR or BR again energized until the selector has returned to its home position.

During conversation the BR relays remain energized. These relays have high resistance windings to reduce current consumption. They need not be quick-operating or releasing. One purpose of resistance R2 is further to reduce current consumption.

At the end of a connection, ground is removed from the c wire and BR releases. Over one back contact and off-normal contact ONC3, the clutch magnet P is energized. Brushes A, B and C are lifted and should the BR relay in the following selector be energized by a direct ground (connection b, Fig. 5), it is released when brush C opens its circuit. With relay BR released, the circuit of the test brush T remains open during the homing operation. When the selector reaches its home position, contact ONC3 opens and the selector comes to rest. Contacts ONC1, ONC2 and ONC5 close and the selector is now ready for the next call.

OPERATION OF FINAL OR COMBINED CIRCUIT
(FIG. 5B)

The operation of relays AR and BR in establishing a connection is identical to their operation in Fig. 5. The added complication of Fig. 5b is due to the provision made to hold the final switch, and only the final switch, until the called subscriber hangs up. If this were not done, the called subscriber would initiate an unnecessary false call whenever the calling subscriber hung up first as is generally the case.

When the penultimate selector removes ground from the c wire, it opens the holding circuit of BR and also COR of the called subscriber's line circuit (Fig. 6 and Fig. 3b). COR is made somewhat slow-releasing so that it does not again place a test potential on the t wire of the subscriber's line before its holding circuit is again established as hereinafter described. The springs on BR are so adjusted that the following circuit is closed first; ground, back BR, lower contact of ONC4, which is closed when the switch is off-normal, brush A, a wire, subscriber's set, if called subscriber has not hung up, back over the b wire of subscriber's line to brush B, lower contact of ONC1, which is also closed when the final switch is off-normal, a second back contact of BR, winding AR to battery. AR is a quick-operating as well as a quick-releasing relay. Over a back contact AR removes ground from the restoring contact ONC3. This ground is removed before or at the instant contact w of BR makes and as relay AR is much quicker than clutch magnet P, the brushes are not raised or their circuits opened. Over a front contact AR closes a circuit from ground, winding common low resistance timed alarm TA, front AR, back of BR, brush C, COR and SM (Fig. 6) in multiple to battery. The cut-off relay COR is thus retained energized and the subscriber's line continues busy. It will be seen that COR must be made just sufficiently slow-releasing so that it does not make its back contact before AR makes its front contact.

When the called subscriber hangs up, the circuit of AR is opened. AR falls away and over its back contact, a back contact of BR and ONC3, energizes P which elevates brushes A, B and C and returns the final selector to its home position, in which position ONC3 opens, ONC2 and ONC5 close, and ONC1 and ONC4 open their lower contacts and close their upper contacts.

Should the called subscriber fail to hang up within a predetermined time, say 30 seconds, the timed alarm TA momentarily closes a contact which places ground on a front contact of all energized AR relays. This ground releases all selectors in which AR is energized and BR de-energized, circuit from ground, 30 second contact of TA, front AR, back BR, ONC3, P to battery. The called lines, which up to this time have been held, are released when brushes A, B and C are raised and each originates a false call if the associated called subscriber does not hang up within a further period of 30 seconds. Slow-releasing called subscribers are thus automatically transferred to the wire chief's desk. As soon as brushes A and B are elevated, relays AR release, after which TA restores its contact to its normal position. Since TA is common to a large group of finals, it will be seen that some slow-releasing called lines may be released in less than 30 seconds, and sufficient timed alarms should be provided so that the average release does not become too short.

After the final selector has completed the "tens" selection, it stops on a busy position terminal (Fig. 5c). As the upper contact of ONC1 is now open, AR cannot be energized for the succeeding "units" selection in the ordinary way. To permit this second operation of AR, the B terminals in all busy positions in the bank of each individual final selector are strapped together and wired to relay AR as shown in dotted lines in Figs. 5b and c. Likewise, the T terminals of each individual final selector bank are connected through a resistance RT to the busy potential EC +1. The busy position BP terminals in the banks of the various final selectors are not connected together by ribbon cable.

The final or first line finder holding a subscriber's line may be released by placing a momentary direct battery on the c wire. This short-circuits and thus releases BR.

OPERATION WITH LINK CIRCUITS (FIG. 5a)

When the all purpose selector circuit is attached to a link circuit, a separate BR relay becomes unnecessary, but the AR relay and its method of operation remain as above described.

When attached to a B-link (Fig. 8), the BR relays are replaced by the B-link relay LRR. When this relay is released at the end of or during a connection, it drives the second line finder and first group selector home over their respective ONC3 contacts. The ONC2 contacts hold the test circuit open until both switches return to normal, thus the link may not be picked up in an off-normal position for a new call.

When attached to a trunk link (Figs. 16, 32 or 34) the BR relay is replaced by the CR relay of the trunk link. This relay falls away when the connection is released and drives the selector home over its back contact and off-normal contact ONC3. While the trunk may be picked up at the outgoing end immediately after release, relay CR cannot be re-energized until the selector reaches its home position and closes ONC2. The register may receive impulses immediately it is connected regardless as to whether the selector is in its home position or moving to its home position.

ARRANGEMENT OF SWITCH BANKS (FIGS. 4 AND 4a)

The capacity of a group selector bank is 122, 120, for trunks, 2 for routine testing. The trunks may be connected to a group selector bank in that manner which is most desirable and efficient from a traffic point of view. A typical arrangement for substantially uniform traffic is shown in Fig. 4. In this case there are ten groups of six individual trunks each. These are hunted over first. On the return journey, the brush carriage searches over the first grading, then over the second grading, and finally over the third grading, in each of which gradings trunks of the ten groups appear. By grading is means trunks which appear in two or more multiple splits. The last ten terminals on the return journey are marked for special assignment. A few of them may be assigned to false call or slow dialing trunks and the remainder to give greater facilities to one or more of the regular trunk groups.

The arrangement of the final bank (Fig. 4a) differs considerably from that of a group selector bank, primarily because the 100 subscriber lines must be arranged in numerical order and because 100 is the numerical switching capacity of the final. The remaining 22 lines may be used for other purposes, for example, as follows:

Seven vertical rows, or 14 lines are required for the 12 busy positions BP1 to BP12 and the 2 routine test positions. Five groups of 10 lines each are passed over on the outward movement and five groups on the inward movement. Busy position 6 is normally suppressed so as not to count the "tens" twice when completing the outward movement and commencing the inward movement. The remaining four rows or 8 lines, may be used as non-numerical P. B. X lines. Ordinarily these 8 lines are not cabled to the main distributing frame. However, they may be and when so cabled, the capacity of the fifth group of 10 lines may be increased to 18, thereby providing a larger group of P. B. X lines, 8, however, without their own directory number. By suppressing certain busy positions or establishing new ones, almost any reasonable arrangement of the final bank becomes possible, for example, all the busy positions on the return journey could be suppressed providing no "tens" digit above five is assigned to that particular final. An important point to remember is that there must always be enough busy positions, at least ten terminals apart, to count the highest "tens" digit.

SELECTION OF CALLING SUBSCRIBER'S LINE

Line Circuit (Fig. 6) Operates

The subscriber closes the line circuit and operates LR. LR operates over wire $x$, back contact of ACR and JR, starting relay ASR of the allotter circuit (Fig. 7). It also transfers the $t$ wire from its normal EC potential $-n$ to the calling EC potential $+2$.

Allotter Circuit Selects Idle A-Link Circuit (Fig. 7)

ASR places potentials EG1 $-n$ and EG2 $-n$ on grids G1 and G2, respectively, of the twin triode V via back contacts of PR. These $-n$ potentials are the predetermined potentials which match the particular normal EC potential of the $t$ wire of the combined circuits as determined by their position in the penultimate banks. Hereinafter, combined circuits are included when first line finders are mentioned, unless specifically excluded.

ASR does a number of other things as follows:

It places high tension battery on GV via the back contact of GSR. It closes the circuit for time alarm TA and energizes the allotter circuit clutch magnet PA and relay QBR, circuit from ground, back GVR, front ASR, back FR, winding QBR, PA to battery. Should the finder brushes be resting on an idle A-link of the first choice, that link is seized, otherwise the allotter switch hunts for an idle circuit.

When an idle A-link is found, the EC potential on the $t$ wire matches the pre-selected potentials of the grids. The circuit of the cathode may be traced from $c$ of V, front ASR, back GR, brush T of the allotter switch, $t$ wire, and then in the first line finder: busy jack BJ, back AR, back BR, off-normal contact ONC2, resistance RT to potential EC $-n$. V fires GV and GV operates relay GVR. When GVR opens its back contact, it de-energizes QBR and PA, causing the allotter switch to come to rest on the terminals of the selected A-link. When QBR makes its back contact, brush T is grounded over a front contact of ASR and the A-link is thus made quickly busy to the other allotter circuit and to the penultimate selectors in case the selected A-link is connected to a combined circuit.

Allotter Circuit Selects Calling Line

GVR operates GSR. GSR de-ionizes GV and over a front contact and a back contact of GR energizes FR, which locks up over a front contact of ASR and a back contact of JR. GSR is made slow-releasing to allow sufficient time for GV to de-ionize. GVR releases, then GSR. When GSR releases, it energizes GR over its back contact and a front contact of FR. GR locks up over a front contact of FR. FR opens the circuit of QBR and PA so that the allotter switch magnet and QBR are not again energized when GVR makes its back contact.

FR transfers the grid potentials from $-n$ to $+2$ required to match the calling line potential EC $+2$. Over two front contacts to ground, FR energizes relay XR of the A-link and the starting relay $BSR_1$ of the R-links (Fig. 9). XR disconnects the A-link from the $a$ and $b$ wires of the second line finder and the identification relay IR from the $t$ wire of the second line finder. It also disconnects the $c$ wire of the second line finder from the $c$ wire of the first line finder. Finally, XR grounds the $c$ wire of the first line finder.

GR places ground on the $b$ wire of the first line finder and connects the cathode $c$ of V to the $a$ wire. The ground on the $b$ wire may be traced from back GVR, front GR, back ER to brush B. The cathode connection may be traced from the cathode, front ASR, front GR, back ER to brush A. The grounding of the $c$ and $b$ wires operates relays AR and BR of the first line finder, after which the first line finder hunts for the calling line as above described. When the calling line is found, the sequence of potentials is completed and V fires GV. GV operates GVR which, in turn, removes ground from the $b$ wire, thereby de-energizing AR and P of the first line finder and causing it to come to rest on the terminals of the wanted line. When AR releases, the $t$ wire is quickly grounded over the T brush of the allotter switch, thereby making the calling line busy during the interval pending the operation of the cut-off relay COR. When first line finder brushes A, B and C make contact with their respective terminals, the circuit of the $c$ wire is closed from ground, front XR, front BR, another front BR, brush C, winding of COR and SM to battery. The cut-off relay operates and disconnects the line relay LR and at the same time opens the $t$ wire, thereby removing the test potential from it and making the further grounding of the $t$ wire unnecessary.

GVR operates GSR for the second time. GSR de-energizes GV, also for the second time, and over a front contact of GR energizes ER which locks up over a front contact of GR. ER disconnects the $a$ and $b$ wires from the selecting circuit and in place thereof connects them to battery and ground through retardation coil RET. This retardation coil is connected to the line before or at the instant the line relay is disconnected and in this way the calling line circuit is not opened and the subscriber is not given an objectionable click should he have the receiver at his ear at the moment the change-over takes place.

R-Link (Fig. 9) Chooses B-Link (Fig. 8)

FR (Fig. 7), as previously stated, closes a circuit from ground, front FR, brush E of allotter switch, winding $BSR_1$, common starting relay for the R-links (Fig. 9), to battery. $BSR_1$ places a common test potential through resistance RC1 on all first choice free B-links (Fig. 8). The circuit may be traced from battery, resistance RC1, front BSR1, common wire $n$ to all idle B-links of the first choice, off-normal contact ONC2 of the second line finder, off-normal contact ONC2 of the first group selector, back LRR to the T terminal in the banks of the B-link finders of the R-link circuits. It will be seen that a B-link may not be picked up unless both the second line finder and first group selector are in their proper home positions. BSR1 starts all idle R-link circuits, closing a circuit from ground, front BSR1, common lead to back DAR, back DMR, back DCR, back T1R, PL to battery. All idle R-links are thus caused to search for an idle B-link of the first choice, all of which, as previously stated, are made available, and the B-link which is nearest to a hunting R-link will be picked up.

The first R-link to reach a T terminal of an idle B-link closes the aforementioned common test circuit from RC1 to terminal T through the high resistance winding of T1R (Fig. 9) to ground. T1R operates and de-energizes the clutch magnet PL of the B-link finder causing that finder to come to rest, and over its front contact shunts its high resistance winding by its low resistance winding in series with low resistance test relay T2R, thus making the selected B-link busy to all other hunting R-links. Should two R-links test at the same instant, their associated T1R relays will operate and possibly buzz for an instant until one effectively shunts out the other.

R-LINK (FIG. 9) CHOOSES REGISTER (FIG. 10)

When T2R (Fig. 9) operates, it energizes the register finder power magnet PR over the back contact of T3R. When a free register is found, T3R operates in a circuit from ground, front T2R, high resistance winding of T3R, brush T, winding RAR (Fig. 10), back RRR, terminal 11, brush A of E1 in series through terminals 11 of all escapement switches to battery at bank A of ED1. This series circuit is arranged to prevent a register from being picked up when any of the escapement switches are off-normal. T3R de-energizes PR and shunts its high resistance winding by its low resistance winding in series with low resistance relay T4R, thereby making the register busy to all other R-links. RAR locks up over a back contact of RRR.

T4R operates DCR and over two front contacts to ground locks up the test circuit. DCR closes the leads to the register finder brushes A to G and over a back contact opens the starting lead. T4R grounds brush C of the B-link finder via back DJR which operates LAR of the B-link (Fig. 8). LAR disconnects the transmission bridge from the $a$ and $b$ wires of the second line finder and energizes SIR over resistance R3. The $a$ and $b$ wires are connected over the two pairs of brushes A and B of the B-link and register finders (Fig. 9) and back contacts of DAR to the dialing relay DR of the register (Fig. 10). SIR energizes B-link release relay LRR. LRR grounds the $t$ wire of the second line finder, circuit from ground, front T4R (Fig. 9), back DMR, back DAR, brush D of B-link finder, front LRR (Fig. 8), another front LRR, back AR1 to the T brush of the second line finder. Finally, LRR opens the circuit of the T brush of the B-link finder and T1R and T2R (Fig. 9) release.

SECOND LINE FINDER (FIG. 8) SELECTS A-LINK (FIG. 7) UNDER CONTROL OF REGISTER (FIG. 10)

RAR (Fig. 10) places high tension battery HTB on GV1 and GV2 over back contacts of GSR1 and GSR2 and operates RBR over a back contact of RCR. RBR connects the A brush, i. e. the $a$ wire, to the cathode C of valves V1 and V2. Over another front contact RBR connects the B brush, i. e. the $b$ wire, to ground over the back contacts of GVR1 and GVR2. The grounding of the $b$ wire operates AR1 (Fig. 8) which causes the second line finder to hunt for the calling A-link. When the calling A-link is found, potential EC +3 is placed on the cathode of V1 and V2, circuit from EC +3 (Fig. 7), RT, front GR, brush D of the allotter switch, T brush of second line finder (Fig. 8), front AR1, $a$ wire to the cathodes. Since the two grids of V1 are normally connected to the corresponding +3 potentials over terminals of banks A and B of ED1 (Fig. 10), the sequence is completed and V1 fires GV1. V2 remains inactive as its grids are connected to +1. The second line finder comes to rest on the terminals of the wanted A-link and GV1 operates GVR1 which, in turn, operates GSR1, the latter de-ionizing GV1 and energizing RCR which locks up over a front contact of RAR and releases RBR, thereby connecting the $a$ and $b$ wires through from the A-link to the dialing relay DR in series with two windings of the dialing tone transformer DTT. As the circuit of the $a$ and $b$ wires is closed at the A-link through resistance R1 by relay XR (Fig. 7), DR operates.

ALLOTTER CIRCUIT RELEASES

When magnet P1 (Fig. 8) is de-energized, brushes A, B and C of the second line finder make contact with their respective terminals. The C brush closes a circuit from ground, R2, back LMR, brush C, brush G of allotter switch, winding JR, front GR to battery.

With both JR and ER energized, battery is disconnected from ASR. ASR releases. With JR energized and ASR de-energized, the holding ground is removed from FR and GR. GR removes ground from ER. These three relays release. FR de-energizes XR. XR falls away and connects the $a$ and $b$ wires from the calling subscriber's station to the $a$ and $b$ wires leading to the register. Shunt R1 at relay XR is removed after this connection is made so that the dialing relay DR does not fall away during the transfer. ER is released after FR releases GR and XR so that the retardation coil RET. bridge is not removed from the $a$ and $b$ wires before the dialing relay DR of the register is connected, thus the subscriber's line circuit is not opened. The release of XR connects the $c$ wire from the first line finder through to the second line finder before ground is removed. BR of the first line finder and COR of the line circuit are now energized over the $c$ wire of the second line finder, back contact of LMR (Fig. 8), resistance R2 to ground. Finally, the identification relay IR (Fig. 7) is again connected to the $t$ wire of the B-link through rectifier S(+). JR releases when GR breaks its front contact.

The allotter switch has no home position so that the release of the allotter circuit merely means the restoration of all relays to normal and this is practically instantaneous. The allotter switch power magnet may not be again energized until ER, the last relay to release, makes its back contact, thus the circuit may not be again used until all relays have returned to their normal position. The timed alarm TA is restored to normal when FR releases. All brushes remain in contact with the terminals of the last A-link allotted, but the brush circuits are opened at relay contacts.

In the foregoing descriptions it was assumed that the first line finder picked up the subscriber's line before the A-link was connected to a register. However, the reverse will often take place and the B-link will pick up the A-link while the first line finder is still hunting for the subscriber's line. In this event, JR will operate as previously described and Rl at XR (Fig. 7) will hold DR (Fig. 10), but as ER will not have been operated, the circuit of ASR remains closed over a back contact of ER. When the first line finder picks up the subscriber's line, ER operates as previously described, after which the allotter circuit releases, followed by XR.

PREMATURE RELEASES

A premature opening of the line loop may occur at any time before the calling line is seized by a register. Such premature openings of the line loop result in premature releases Should the line loop be opened after LR (Fig. 6) and ASR (Fig 7) have operated, but before FR and GR have operated, LR and ASR merely release and the line and allotter circuits are restored to normal. It should be noted that FR may not be operated without GR for the reason that FR operates on the front contact of GSR and GR on the back contact and GSR always releases shortly after it makes its front contact.

Should the line loop be opened after LR, ASR, FR, GR and XR have operated, LR and ASR release FR and GR remain locked up over the back contact of JR, and FR holds XR energized The first line finder hunts for the calling line in the usual way when ground is applied to the $b$ wire. When LR releases, the calling line potential EC2 is removed, and the finder would hunt continuously until another call is originated unless some special means were provided to stop hunting. It is not permissible to de-energize a finder regardless of its position over the bank and thus allow the brushes to come in possible contact with a live connection To provide a proper means for release, advantage is taken of the busy terminal potential EC $+1$. When ASR falls away PR is energized, circuit from ground, front GR back ASR, winding PR to battery. PR transfers the grids of V to potentials $+1$, and when the finder reaches the first busy position, V fires GV and the first line finder comes to rest on the busy position terminals. Brushes A, B and C make contact, but as the A and B terminals are not connected, a loop is not applied to the $a$ and $b$ wires. An R-link seizes a B-link and then an A-register, all as previously described, after which the register causes the second line finder of the B-link to seize the A-link which is possible since potential EC $+3$ is applied to the $t$ wire of the second line finder by GR. When the A-link is seized, JR operates and FR, GR and ER release and the allotter circuit restores to normal. The register circuit is released when XR removes shunt Rl from the $a$ and $b$ wires, the line circuit being open. The release of the R-link and the B-link follows the release of the register. The combined circuit, if one happens to be attached to the A-link, is held busy against penultimate selectors by a ground on the $t$ wire, circuit from ground, front PR, back QBR, brush T of the allotter switch to the $t$ wire.

As long as there remains one available register, one available R-link, one available B-link, and one available A-link, the allotter circuit will release within a maximum of four seconds. Should there be none of one of the above identified circuits free, or should there be a fault, timed alarm TA, which commences to operate when ASR and FR are energized, will energize relay ACR over its five second contact. ACR locks up over its front contact in series with a front contact of LR. In this way the call is transferred to the second allotter circuit.

Should the first allotter circuit fail to release within 30 seconds, TA lights guard lamp GL and calls attention to a fault or abnormal traffic condition.

CUTTING IN OF SECOND CHOICE A-LINKS AND COMBINED CIRCUITS

When all A-links of the first choice first line finders are busy, the $m$ contact of the XR relays of that choice are closed in series to ground and operate ABFR. When ABFR operates, it connects the $t$ wire of the second choice A-links to spare T terminals in the first allotter switch bank, thus giving the first allotter circuit access to all A-links connected to first line finders. Similarly, when all first choice A-links of the second group of subscribers' lines are busy, ABFR of the second allotter circuit operates and makes its second choice A-links available.

When all A-links connected to all first line finders are busy, the $n$ contacts of XR close in series and operate ABCR, thereby making the combined circuits available.

SELECTION OF CALLED SUBSCRIBER

SWITCHING CAPACITY AND NUMBERING

The switching capacity of a Universal office is determined, as is the switching capacity of a Rotary office, by the switching capacity of the local or A-register. In the Universal system the switching capacity of the register is determined by the number of digit switches (ED), there being one digit switch for each digit in the number, thus a 7 digit register with a maximum switching capacity of 10 000,000 lines would have 7 digit switches. A Universal register arranged for 7 digits may also handle a call with fewer digits, for example, a single digit call to toll, a 2 digit call to special services or a 6 digit call to a subscriber's number. A mixed numbering scheme of this nature is now in use and to illustrate the inter-working possibilities of the Universal system, the A-register circuit is arranged to work into such network without requiring any change in the numbering or equipment of existing Strowger offices.

INTRA-OFFICE SWITCHING

Switching within a Universal office is always on a multipotential basis.

INTER-OFFICE SWITCHING

Out-trunking to another Universal office or to a Strowger office is with direct impulsing at the average speed of ten impulses per second, which is the average speed of dialing or impulsing in the Strowger system. Trunking to a Universal office could be done at a much higher speed if the speed were not limited by the Strowger offices in the same network. Out-trunking to a Rotary system is done on a reverting basis which requires that provision be made for reverting in the A-register. The register (Figs. 10, 10a, 10b) is not arranged for revertive trunking, but the modification required is not extensive. All trunks are two-wire full metallic. Earth currents are not used.

DIAL SPEEDS

The Universal register may be used with normal speed dials or with high speed dials operating 20 or more steps a second. These high speed dials are required by P. B. X. and other operators. Dial speeds in the Strowger system, as previously indicated, must be kept as close to ten as possible. Dial speeds in a Rotary exchange average 11 to 12 steps per second, although higher speeds can be accommodated by the Rotary register.

INTRODUCING UNIVERSAL INTO EXISTING NETWORKS

A Universal office may be introduced into an existing Strowger network without any change in the existing Strowger offices as regards both in-trunking and out-trunking. The Universal system may be introduced into a Rotary network without change in the Rotary offices so far as trunking from the Universal to Rotary is concerned. When trunking in the reverse direction, revertive impulses from the Rotary register must be unpaired since the Universal system operates on a decimal basis while the Rotary system operates on the basis of multiples of 200.

ESCAPEMENT SWITCHES

The digit and control switches in the register have a slipping friction drive and operate by escapement. A short impulse releases the escapement but the moment the tooth passes the holding edge of the pawl, the switch magnet is disconnected by a quick acting relay PCR operated by a passing contact PC, thus releasing the pawl in time to catch the next tooth. Escapement switches may consist of 1, 2, or 3 pairs of arcs or banks of 12 pairs of terminals each, terminals 8 and 11 being 180° apart, with each of these end pairs normally short-circuited by a split brush. When the escapement switch is in operation, the brush on terminal 11 moves into the open while the other brush continues to make contact between pairs in positions 1 to 10 as the switch advances. The escapement switch may have bridging brushes or non-bridging brushes, the difference being that a bridging brush makes contact with the preceding pair of terminals before breaking contact with the first pair while the other brush does not. Bridging brushes are marked by small squares on the drawings. Each escapement switch has a restoring contact RC which is normally open with the split brushes in positions 0 and 11, but closed when the switch is at rest in any other position. The normal operating speed of the escapement switch is 30 per second. All switches of the same register are mounted on a common shaft which is caused to rotate when the register is picked up, thus the friction drives slip only when the register is in use.

OPERATION OF A-REGISTER ON LOCAL CALLS

WAITING FOR SUBSCRIBER TO DIAL FIRST DIGIT

After the B-link has selected an A-link under the control of the register, the following relays or trains of relays are energized:

Cut-off relay COR (Fig. 6), relay BR first line finder (Fig. 5b), circuit from ground (Fig. 8), R2, back LMR, brush C of second line finder, back XR (Fig. 7), conductor c, winding of BR (Fig. 5) of first line finder to battery, and in multiple via front Br (Fig. 5b) on combined circuits only, brush C of first line finder, COR and SM to battery. The service meter SM does not operate.

Relay LAR, supervisory relay SIR and slow release relay LRR of the B-link (Fig. 8). SIR is energized over resistance R3, front contacts of LAR and back contacts of LBR. Relay LRR is energized over the front contact of SIR. LAR is energized over a circuit from ground, front T4R of the R-link (Fig. 9), brush C of the B-link finder, LAR to battery.

Dialing relay DR (Fig. 10) is energized in series with the calling subscriber's line and the two windings of the dialing tone transformer DTT.

Relays RAR and RCR of the register (Fig. 10). Relay RAR is operated over a circuit from ground at the R-link (Fig. 9), front T4R, windings of T4R and T3R, brush T of the register finder, winding relay RAR, back of register release relay RRR to battery. RCR is locked up over its front contact in series with a front contact of RAR to ground. RAR closes the circuit of the common shaft power drive clutch magnet PR and relay RXR (Fig. 10a) which removes ground from the restoring contact RC of the escapement switch.

Slow release relay RIR of the register (Fig. 10) is energized over the back contact of HOR and front contact of DR. Timed alarm TA is also operated over the same circuit via the back contacts of R2R and RBR.

"In-control" escapement switch EI (Fig. 10a) was sent from position 0 to position 1, circuit from ground, back HOR, front DR, back R2R, back PCR₂, winding EI to battery. As EI passes from position 0 to 1, contact PC closes momentarily and energizes PCR₂ which locks up over the front contact of DR and disconnects the winding of EI. With EI in position 1, a circuit is closed from ground, dialing tone interrupter DTI (Fig. 10a), position 1, bank C of EI, one winding of dialing tone transformer DTT to battery. The subscriber hears the dialing tone and the circuit remains in this condition until the subscriber dials.

SUBSCRIBER DIALS FIRST DIGIT

The subscriber dials the first digit of the wanted number which in this case is assumed to be local office number 290066. When the digit 2 is dialed, the line circuit is opened for two short intervals of time. Each time the line circuit is opened, DR falls away and over its back contact closes a circuit from ground, back HOR, back DR, front RIR, winding of low resistance relay R2R, back PCR₁, brush D, position 1, bank D of EI, winding of first digit switch EDI to battery. As EDI advances, passing contact PC closes and operates quick acting PCR₁ which locks up and de-energizes pawl magnet EDI before the latter reaches the next position, and the escapement clutch holds EDI in position 1. When DR leaves its back contact, which it does when the line circuit is closed between dial impulses, PCR₁ is released so that the next time DR makes its back contact, EDI is advanced from position 1 to position 2. R2R is slow releasing and does not again make its back contact until after the series of dial impulses have been sent in (when the line circuit remains closed for a longer period) until the dialing of the next digit. This inter-digital time is long enough to allow R2R to release. RIR is slow releasing and does not fall away during dialing.

When R2R releases, a circuit is established from ground, back HOR, front DR, back R2R in multiple through timed alarm TA and back PCR₃, EI to ground. The time alarm brush again starts toward its 30 second contact and EI moves from position 1 to position 2. The dialing tone interrupter DTI is disconnected and the register is now in a position to receive the dialing of the second digit. It might be remarked here that the speed of in-dialing has nothing to do with the speed of subsequent switch selection or outtrunk impulsing. The subscriber may dial as rapidly as he can. The speed of local switch selection depends upon the length of the hunt and whether or not continuous hunting is involved on the particular call. Under normal traffic conditions, the switch selection follows very closely upon dialing and the bell of the called local subscriber should ring within a fraction of a second after completion of dialing.

FIRST GROUP SELECTOR OPERATES

EO is in position 0. With EDI in position 2, potentials −2 are placed on grids G1 and G2 of valve V1, circuits from terminals 2, banks A and B of EDI, terminals 0, banks A and B of out-control switch EO, resistances R3 and R4 to grids G1 and G2 of V1.

When EDI is stepped from position 0 to position 1 on its way to position 2, a circuit is established from battery, terminals 1 and 2 bank C of EDI, terminal 0 bank C of EO, back RUR, winding RSR and PRR in multiple 3, back RGR, back GSR, back GSR₂, back GVR₂, back GVR₁ to ground. PRR and RSR operate and the latter energizes relay AR₂ of the first group selector (Fig. 8), circuit from ground, back GVR₁, back GVR₂, front RSR, back RMR, brush G of register finder, front DCR (Fig. 9), back DBR, brush G of B-link finder, off-normal contact ONCI of first group selector, winding AR2 to battery.

RSR also connects the cathodes of V1 and V2 to the a wire, circuit from cathodes C, front RSR, back RMR, brush F of register finder, front DCR, back DBR, brush F of B-link finder, the a wire, front AR2 to brush T of the first group selector.

With AR2 operated, the winding of the first group selector power magnet P2 is closed in multiple with the relay to ground over the back of GVR₂ and GVR₁ independently of contact ONCI. P2 operates and the selector advances, at the same time raising brushes A, B and C so that they do not make contact with the terminals while the switch is in motion. Test brush T, however, makes contact with all terminals it passes over and when a free trunk with the proper EC potential, in this case EC −2, is found, V1 fires GV1 and GV1 operates GVR₁.

GVR₁ opens the circuit of relays RSR and AR2 and the power magnet P2, the first group selector comes to rest upon the terminals of the selected trunk and brushes A, B and C make contact with their corresponding terminals. The busying ground is quickly applied to the T terminal over a back contact of quick releasing relay AR2 and front LAR.

When brush C of the first group selector makes contact, a circuit is established from ground, front LRR, winding LBR, brush C, contact ONC5, winding BR of second group selector (Fig. 5) to battery. The resistance of BR of the local second group is such that LBR does not operate and the transmission bridge is not removed from the B-link. BR operates and disconnects the E potential from the t wire.

When brush A of the first group selector makes contact, a circuit is established from battery, high resistance winding of RT1R (Fig. 10), back RSR, back RMR, brush F, front DCR, back DBR, brush F of B-link finder, brush A of first group selector, wire a of second group selector, ONC4, resistance R1 to ground. RT1R operates and shunts its high resistance winding by its low resistance winding in series with low resistance RT2R, thereby checking for a double connection.

GVR₁ operates GSR₁. GSR₁ de-ionizes GV1 whereupon GVR₁ releases and closes a circuit from ground, back GVR₁, back GVR₂, back RSR, front slow releasing relay PRR, front RT2R, back RER, back PCR₃, winding of "out-control" switch EO to battery. When PRR falls off EO advances from position 0 to position 1 and PCR₃ operates, locks up and disconnects EO.

SUBSCRIBER DIALS SECOND DIGIT

With EI in position 2, DR advances ED2 to a position corresponding to the digit dialed, in this case 9. R2R releases TA and PCR₂. When dialing ceases, R2R is again de-energized and TA and EI are again energized. EI advances from position 2 to position 3 and PCR₂ operates and de-energizes EI.

SECOND GROUP SELECTOR OPERATES

EO is in position 1. As soon as ED2 advances to position 1, the circuit of RSR is again closed, this time over bank C of ED2, and terminal 1 bank C of EO. Relay AR and then the power magnet P of the second group selector (Fig. 5) are energized and the second group selector selects a free third selector in the desired group in the same manner as the first group selector selected the second group selector. When a free third selector is found, V1 fires GV1. GV1 operates GVR₁, RSR, AR and P release and the second selector comes to rest. RT1R checks for a double connection and if successful, EO goes to position 2.

SUBSCRIBER DIALS THIRD DIGIT

EI is in position 3. The third series of the dial impulses advances digit switch ED3 to the position corresponding to the digit dialed, after which EI goes from position 3 to position 4, and is then driven on to position 5, circuit from ground, back SDR (Fig. 10–b), terminal 4, bank C of EI, restoring contact RC, which is closed when EI is off-normal, winding EI to battery. When EI leaves position 4, this second circuit opens and EI comes to rest in position 5. The object of advancing EI in this case is to suppress a selection since the local numbers have but six digits instead of seven digits, the capacity of the register. The strapping of banks F of EDI and ED2 is individual to each six digit Universal office.

THIRD GROUP SELECTOR OPERATES

EO is in position 2. When the dialing of the third digit commences, RSR is operated for the third time and the third selector (Fig. 5) advances and selects a free penultimate selector in the same manner as it itself was selected by the second group selector. V1 fires GV1 for the third time. RT1R checks for a double connection and EO goes from position 2 to position 3, from which position it is driven to position 4, its circuit being closed in position 3 over another back SDR to ground. The "out-control" switch EO is therefore driven past the normal fourth selection position as was the "in-control" switch EI.

Subscriber Dials Fourth Digit

EI is in position 5 and the fourth series of dialed impulses advances digit switch ED5 to the corresponding position, after which EI goes from position 5 to position 6.

Penultimate Selector Operates

EO is in position 4. When the dialing of the fourth digit commences, RSR is operated for the fourth time and the penultimate selector (Fig. 5) advances and selects a free final in the same manner as it itself was selected by the third group selector. VI fires GVI for the fourth time. RTIR checks for a double connection and EO goes from position 4 to position 5.

Subscriber Dials Fifth Digit

EI is in position 6 so that the fifth series of dial impulses advances digit switch ED6 to the corresponding position. For the purpose of explanation, assume the digit 6 is dialed. At the end of dialing, EI goes from position 6 to position 7.

"Tens" Selected by Final Selector and Counted by Register

EO is in position 5. When ED6 advances from position 0 to position 1, a circuit is established from battery, terminal 0, bank B of terminal 6, ED6, terminal 5 bank C of EO, back RUR, winding RSR, back GSR1, back GVR1, back GVR2 to ground. A second circuit is established in multiple with RSR from bank B of ED6, terminal 5 bank F or EO, winding RGR, back RUR (Fig. 10a) to ground. RGR opens the circuit of PRR. The usual grid potentials −1 to −10 for VI are missing from banks A and B of ED6.

The final selector (Fig. 5b), which selects the same way as the preceding group selectors, advances when RSR is energized and each time a "tens" terminal is tested, V2 fires GV2. GV2 operates GVR2, but this does not release the final selector of RSR since the circuits of these are now closed to ground over two front contacts of RGR and two back contacts of RFR. GVR2 energizes GSR2 which de-ionizes GV2 and advances the "tens" counting switch EG (Fig. 10-b) one step, circuit from ground, front GSR2, front RGR, back RFR, back PCR4, winding EC to battery. The final continues without stop between the "tens" terminals. When one less count than the "tens" digit dialed has been made, for example, five counts for the digit 6, a circuit is established from battery, bank C terminal 6 of ED6, terminal 5 of bank C of EC, winding RFR, back RUR to ground. RFR operates and removes the ground from the back contact of GVR2. Over a front contact RFR places battery on RGR so as to prevent it from releasing when EO goes from position 5 to position 6. Over another front contact RFR transfers the circuit through the front of GSR2 from EC to EO, and when the sixth "tens" is counted, V2 fires GV2 and GV2 operates GVR2 which opens the holding circuit of RSR of the register and of AR and P of the final. The final comes to rest on the selected "tens" terminal. GVR2 operates GSR2 which de-ionizes GV2 for the sixth time and sends EO from position 5 to position 6, circuit from ground, front GSR2, front RFR, back PCR3, winding EO to battery. RFR remains energized and retains RGR as previously stated.

Subscriber Dials Sixth Digit

The subscriber dials the sixth or "units" digit and ED7 advances accordingly. When dialing is complete, EI goes from position 7 to position 8, in which position it rests until the register is released.

"Units" Selected by Final Selector

With EI in position 8 and EO in position 6, a circuit is established from ground, back GVR1, back GVR2, back GSR1, winding RSR, back RUR, terminal 6 bank C of EO, bank C of ED7, terminal 8 bank D of EI to battery. RSR operates and connects the cathodes of VI and V2 to the *a* wire and places ground on the *b* wire in the usual way. Since off-normal contact ONC1 of the final is open, the circuit of AR is now closed over the B brush [the B terminals of the "tens" positions (Fig. 5c) are wired to their associated AR relay], winding of AR to battery. AR again locks up the *b* wire and P is re-energized. The final now searches for the EC potential corresponding to the number dialed. If, for example, the units digit 6 had been dialed, VI fires GVI when potential EC −6 is tested. GVI operates GVR1 which releases RSR of the register and AR and P of the final. The final selector comes to rest upon the wanted line. When the C brush of the final again makes contact with the C terminal, a circuit is closed from ground at the penultimate (Fig. 5), resistance R2, connection *b*, brush C of the penultimate, front and winding of BR of the final to battery, and in multiple over front BR, brush C of the final, cut-off relay CO and service meter SM to battery. BR of the final and COR are energized in multiple in series with R2, in the B-link (Fig. 8). The service meter SM does not operate under this condition.

Line Free, Register Releases After Causing R-Link to Ring Wanted Subscriber. R-Link Meters Successful Call When GSR1 operates, two circuits are closed from ground, front GSR1, front RFR to terminals C and D, thereby operating relays DAR and IR of the R-link (Fig. 9).

DAR opens the line circuit (*a* and *b* wires) to the dialing relay DR (Fig. 10) of the register which releases (see below) but not before the bridging relay DTR (Fig. 9) is connected by DAR. DTR is operated in parallel with DR and operates slow-releasing relay DMR. DMR and DAR place ground on the C brush of the B-link finder, circuit from ground, front DMR, back DRR, front DAR, brush C. LAR (Fig. 8) is thus retained when T4R releases as explained later. Over the same front contact, DMR provides a locking circuit for the relays DAR and DBR.

When IR is energized, ringing current is applied immediately to the called line, circuit from 48 volt battery, back DJR, one winding of DRR, front DBR, brush G of B-link finder, *b* wire to subscriber, returning over *a* wire to brush F of the B-link finder, front DBR, other winding of DRR, back DJR, front IR to AC ringing generator. When the D brush circuit of the register finder opens a little later, the slow-releasing IR falls away and connects DRR to the ringing interrupter RI. Relay DRR is a marginal relay and does not operate in series with the substation ringer and condenser.

The calling subscriber hears the ringing tone through transformer TT and condenser CI. The primary winding of this transformer is closed from ringing tone interrupter RTI, front DBR, back DJR, primary winding TT, front DAR, back DJR to battery.

When the called subscriber answers, the shunting of the ringer and condenser by the transmitter and induction coil operates DRR. DRR opens the holding circuit of relays DAR and DBR of the R-link and LAR of the B-link. When relay DBR releases, it disconnects DRR and ringing current from the called line.

DAR disconnects DTR from the a and b wires and DTR falls away and opens the circuit of slow-releasing relay DMR, but before DMR breaks its front contacts a circuit is established from battery, resistance R4, front DMR, back DAR, brush D, rectifier S(—), LMR to ground. LMR makes its contact x before a breaks and connects the positive 70 volt metering battery to the c wire which is normally connected to ground through R2. After contact a breaks, a circuit is closed from the 70 volt positive metering battery through low resistance R5, brush C of second line finder, back XR, c wire, front and winding BR of first line finder (Fig. 5b) to negative battery and in multiple over brush C of first line finder, windings of COR and SM to negative battery. The combined potentials of nearly 120 volts operates SM. When DMR opens its front contact, LMR releases and the c wire is again restored to normal. The service meter releases.

LAR (Fig. 8) is a quick-releasing relay and makes its back contact before or at the same time DAR breaks its front contacts. In this way the line circuit is not noticeably opened when DTR is disconnected from the a and b wires. When LAR makes its back contacts, a speech transmission circuit is established between the calling and called subscribers. Supervisory relay SIR supplies current to the calling subscriber's line and maintains energized slow release relay LRR. Current for the called subscriber is supplied over retardation coil RET. Although the subscribers are placed in immediate telephonic communication when DRR operates, the metering of the call is not disturbed since the R-link may not again be picked up for a second call until DMR releases and closes the starting circuit.

The R-links have no home position so that at the end of a connection the brushes of the B-link finders and register finders remain in contact with their respective terminals. All brush circuits, except that of the T brush, however, are opened at relay contacts so that the idle R-links do not disturb the B-links or registers whether or not the latter are free or engaged.

Should the calling subscriber hang up before the called subscriber answers, DTR falls away and releases DMR. When DMR opens its front contacts, relays DBR and DAR and LAR of the B-link (Fig. 8) are released but as DMR opens the battery circuit of brush D at the same time, the metering of the connection does not take place.

LINE BUSY, R-LINK APPLIES BUSY TONE AND RELEASES SELECTOR TRAIN

In case the wanted line is busy, the final passes on to the next "tens" position, whereupon V2 fires GV2 and GV2 operates GVR2 which causes the final to stop. GVR2 operates GSR2 which deionizes GV2 and sends EO from position 6 to position 7 over a front contact of RFR. In position 7 EO places a ground on terminal C which operates DAR of the R-link (Fig. 9). As DBR is not operated, the circuit of busy tone interrupter BTI is closed through the primary of the transformer TT and is heard by the calling subscriber. The register releases as described below.

When DAR operates with DBR de-energized, a circuit is established from ground, very low resistance winding of DMR which relay has already been operated by DTR, front DAR, back IR, back DBR, back DJR, brush E of B-link finder, back LCR of B-link (Fig. 8), winding LCR to battery. LCR operates and locks up over a circuit from ground, front LRR, front LCR, resistance R4, LCR to battery. After the locking circuit is closed, LCR transfers the E terminal from connection with its winding to connection with a front contact of LAR, off-normal contact ONC3 of the first group selector, winding of power magnet P2 to battery. P2 operates in series with the low resistance winding of DMR and the selector returns to its home position when ONC3 opens and the selector comes to rest. When the C brush is raised, the succeeding train of selectors is released so that on a busy connection only the A-link, B-link, and R-link are held. The purpose of the low resistance winding on DMR is to hold this relay energized and the R-link circuit busy should the subscriber hang up and release DTR (Fig. 9) before the switch reaches its home position.

The calling subscriber hearing the busy tone hangs up and the R-link releases. The call is not metered.

LAR (Fig. 8) releases when DMR breaks its front contact. LAR releases SIR and SIR releases LRR. LRR drives the second line finder PI to its home position over off-normal contact ONC3. When brush C of the second line finder is raised, the first line finder and COR release.

REGISTER RELEASES

When DAR (Fig. 9) operates, it opens the circuit of the dialing relay DR (Fig. 10) which falls away and de-energizes slow release relay RIR. When RIR makes its back contact, the register release relay RRR is energized, circuit from battery, back GSR1, front RCR, one winding of RRR, back RIR, back DR, back HOR to ground.

RRR operates and locks up to ground over its second winding and resistance R2. RRR opens the holding circuit of RAR and RXR, and T3R and T4R of the R-link. T4R falls away and releases DCR (Fig. 9) which opens the circuits of the register finder brushes A, B, C, D, E, F and G. RAR releases RCR.

RRR maintains energized the shaft clutch magnet PR. When RXR releases, it closes the homing circuit of all escapement switches. All switches return to their home position whereupon their respective restoring contacts RC open. When all home positions have been reached, the 11th terminal series circuit is closed to battery over the A banks of the register switches, and RRR is short-circuited and releases. Relays RFR and RGR release on or before EC passes position 9. The register is now in condition to receive another call.

P. B. X OPERATION

P. B. X groups are formed by connecting a number of lines between a pair of "tens" terminals to the same EC potential. The final selector operates exactly as though it were seeking a main line and if all lines in the P. B. X group are busy, it passes on to the next "tens" position, after which the subscriber receives the busy tone in the usual way.

FALSE CALL OPERATION

Should a subscriber's line become grounded or faulty, causing the line relay to operate, or should the subscriber fail to dial within 30 seconds after removing his receiver from the switchhook, timed alarm TA (Fig. 10) closes its 30 second or other predetermined timed contact and energizes RER.

RER energizes RSR and PRR which causes the first selector to operate in the usual way. Since the digit switch ED1 is in its 0 position, potentials EG1 +3 and EG2 +3 remain on the grids G1 and G2 respectively of V1. The selector hunts for a trunk having potential EC +2 a few of which appear in the banks of the first group selectors. These trunks terminate on the wire chief's desk. When a free trunk with potential EC +3 is found, V1 fires GV1 and the selector comes to rest in the usual way on the selected local trunk and after the usual check for a double connection a circuit is established from ground, back GVR2, back RSR, front PRR, front RT2R, front RER, winding RRR to battery.

The energization of RRR releases the register and the opening of the $t$ wire releases T4R of the R-link whereupon DCR releases. (Fig. 9), DCR releases LAR of the B-link (Fig. 8). The line is now connected through to the wire chief's trunk. As explained below, the wire chief may test and identify the faulty line from his desk.

SLOW OR INCOMPLETE DIALING

Should a subscriber take more than 30 seconds between digits during dialing or fail to dial the full number, timed alarm TA closes its 30 second contact as on a false call and energizes RER. ED1 has been operated, otherwise the call would appear as a false call, and one or more of the five remaining digit switches ED2, ED3, ED5, ED6 or ED7 are in their home positions, in which potentials EG1 +3 and EG2 +3 are placed on the grids G1 and G2 respectively of V1. RER operates RSR as on a false call and the second, third, fourth, penultimate or final selector hunts for a local trunk having the potential EC +3. A few of these trunks appear in the arcs of the second, third, penultimate and final selectors. They may terminate in a phonograph record which automatically notifies the subscriber of his faulty operation or they may terminate on a special operator's position.

When a free trunk with potential EC +3 is found, V1 fires GV1 and the register is released as on a false call and the B-link is connected through to the phonograph record or special operator.

DEAD LEVEL

A dead level in a flat continuous bank means an unassigned trunk group number. Normally, there are 10 groups in each bank with potentials EC −1 to EC −10. When any of these groups is not required, one terminal is set aside for each of the unused groups which are assigned their group potential. When a subscriber dials a wrong level number he will be connected to one of these trunks which terminates before an operator or on a phonograph record.

HOLD-OVER AND CONTINUOUS HUNTING

Under normal conditions RSR can remain energized for not more than about two seconds, and its energization for a longer time is an indication of (1) continuous hunting, i. e. all trunks busy, or (2) a fault. In order to trap these abnormal traffic or faulty conditions, the "hold-over" feature of the Rotary system is retained. The waiting condition is allowed to exist for 40 seconds after the last digit of the called number has been dialed. If the subscriber does not hang up before the expiration of this period, the "hold-over" feature operates releasing the calling line but not the B-link, the R-link, the A-register and the train of selectors. These are held in substantially the condition they happen to be in at the moment of hold-over. The alarm lamp HOL (Fig. 10) is lighted so that immediate attention may be given to the call. A key HOK is provided for each register and when thrown, disables the hold-over feature when it is desired not to use it or to follow up calls promptly. When this key is thrown, the whole connection releases when the calling subscriber hangs up. Should a call become free in case of legitimate continuous hunting after the hold-over has operated, the connection is released when the free trunk is picked up. This is done so as not to tie up trunks unnecessarily during busy moments.

After the last digit has been dialed, TA advances. When it passes the 30 second contact, nothing happens since RSR is already operated. When it reaches its 40 second contact, relay HOR is operated. This relay locks up over a front contact, hold-over key HOK, back GVR2, back GVR1 to ground. HOR lights lamp HOL and grounds the E terminal which operates relay DJR of the R-link (Fig. 9). HOR removes ground from the armature of DR, and the register release relay RRR is not energized when DR falls away.

DJR (Fig. 9) opens the circuit of brush C and releases LAR (Fig. 8). Over a front contact DJR operates LCR, circuit from ground, resistance R5, front DJR, brush E, back LCR, winding LCR to battery. LCR operates and locks up over a front contact of LRR to ground and over a transfer contact disconnects the E brush from its winding and connects it to a back contact of LAR, now de-energized, winding HOR (Fig. 8) to battery. HOR maintains LRR energized over one contact and over another front contact and off-normal contact ONC3 energizes P1 and returns the second line finder to its home position. When brush C is raised, the A-link and the calling subscriber's line are released. When LAR is released, it removes the shunt R3 from S1R which releases. Relay LRR, being slow-releasing, does not break its front contact before its circuit is again closed by HOR.

The train of group selectors, the register, the R-link and the B-link remain in this condition until (1) the hold-over key HOK (Fig. 10) is thrown, thereby releasing HOR (Fig. 10), or (2) the hunting switch, in case this is the cause of the hold-over, finds a free trunk and operates GVR1 or GVR2, as the case may be. When either of these relays operates, ground is removed from HOK and HOR releases exactly as though HOK had been thrown. DR is on its back contact, having released when the brushes of the second line finder were raised. RSR is also on its back contact because GVR1 or GVR2 is operated. When, therefore, HOR makes its back contact, a circuit is established from ground, back HOR, back DR, back R1R, back RSR, winding RRR, front RCR, back GSR1 to battery. RRR operates and releases the register. The R-link releases when the circuit of RAR and the T brush is opened, thereby causing relays T3R, T4R and, in turn, DCR to fall off. DJR is released when the hold-over relay HOR (Fig. 10) breaks its front contact and removes ground from brush E of the register finder. DJR removes ground from brush E of the B-link finder and releases HOR of the B-link (Fig. 8), whereupon LRR and then LCR release. Over a circuit from ground, back contact LRR, off-normal contact ONC3, P2 to battery, the first group selector returns to normal. When brush C of the first group selector is raised, the succeeding train of selectors is released.

PREMATURE AND OTHER RELEASES BY REGISTER

The following table showing the treatment of the R-link register and B-link finder brushes (Fig. 9) will be of assistance in following the various releases encountered in the operation of the A-register circuit (Figs. 10–10b).

| | Finder brushes of R-link | | | | | |
|---|---|---|---|---|---|---|
| | Register finder brushes | | | | B-link finder brushes | |
| | C | D | E | T | C | E |
| 1. Ringing (local call) | G | G | | | G | |
| 2. Busy (local call) | G | | | | G | G |
| 3. R and B (trunk call) | G | G | G | | G | GR |
| 4. Release on double test (short call) | G | | | | G | G |
| 5. Release on (false call) (slow call) | | | | Open | | |
| 6. Release during hunting | | | | do | | |
| 7. Hold-over | | | G | | | GR |

G means ground, direct.
GR means ground, through resistance.

On a successful call the register grounds the C and D brushes of the register finder and the R-link grounds the C brush of the B-link finder. This is the ringing position. On a busy call the register grounds only the C brush of the register finder and the R-link grounds the C and E brushes of the B-link finder. This is the busy position. On the completion of impulsing to a trunk register, the A-register grounds the C, D and E brushes of the register finder and the R-link grounds the C brush of the B-link finder and connects the E brush to ground through a resistance. This is the busy or ringing position on a trunk call.

Since it is desired to give the calling subscriber a busy signal after an unsuccessful double test, the C brush of the register finder and the C and E brushes of the B-link finder are grounded as on a busy call. When the register releases on a short, false or slow call, it opens the T brush circuit of the register finder, thereby releasing the R-link and returning the call to the B-link. Should the calling subscriber hang up before dialing a digit or after dialing part of the number while the selector is at rest, the connection is released when RRR is energized over the back contact of DR, circuit from ground, back HOR, back DR, back RIR, back RSR, winding RRR, front RCR, back GSR₁ to battery, thus opening the t wire. However, should the calling subscriber hang up while the selector is hunting and thus with the brushes open over possible live terminals, the register is not released until a free trunk is found, the releasing back contact circuit of DR being open at RSR. This is done so that the brushes of a hunting selector may not be dropped on a busy connection.

In all of the above cases the register releases. In the hold-over, as previously explained, the register does not release. The register grounds brush E of the register finder to establish a hold-over, after which the R-link grounds the E brush of the B-link finder through a resistance.

SHORT NUMBER CALLS

When it is desired to release the register after having dialed less than the full number of digits, say 2 digits, as on a local call to a special operator, the register is released by placing a momentary ground on the b wire, thus operating RRR over the back contact of RSR.

FALSE CALL TRUNK (FIG. 11)

A false call is a call which remains without dialing for 30 seconds. Such calls are directed automatically to a local trunk (Fig. 11) which runs from the first selector group banks to the wire chief's desk. Each bay of first group selectors is provided with three or four of these trunks. The wire chief may identify the number of the line creating the false call.

HANDLING OF A FALSE CALL

When the first group selector (Fig. 8) seizes a false call trunk, ground through resistances R1 and R2 (Fig. 11) is placed on the a and b wires through to the register. The ground on the a wire permits the register to make the usual double test. After a successful check for a double connection, the ground on the a wire operates release relay RRR of the register, whereupon the register and R-link release.

The closure of the c wire from ground (Fig. 8), front LRR, winding LBR, brush C, high resistance winding of BR of the false call trunk (Fig. 11) to battery operates BR but not LBR. The closed calling line circuit energizes SIR (Fig. 8) which holds the false connection. BR (Fig. 11) over one front contact, lights the calling lamp CL and over a change-over contact disconnects the calling potential EC +3 from the t wire and in place thereof connects the t wire to a spring on the identification key IK, one of which keys is associated with each false call trunk.

The wire chief answers the call by plugging in a cord, leaving the test key TK in its normal position, thus closing a circuit from battery, high resistance winding of BR, low resistance winding of BR, low resistance winding CR, sleeve of cord R4 to ground. CR operates in parallel with the winding of LBR of the B-link and energizes AR which locks up over its front contact and a front contact of BR. AR extinguishes the calling lamp CL and extends the calling line through to the test cord.

The wire chief may speak on the calling line and if no answer is received, he may throw the test key TK, thereby placing battery instead of ground on the sleeve of the plug. This battery, through the low resistance windings of CR and BR, shunts the high resistance winding to BR and causes LBR of the B-link to operate. The faulty line is now connected through to the wire chief's test cord. The wire chief may apply a howler and make such other tests as he may deem necessary to ascertain the cause or nature of the false call. After he has done this, the wire chief may withdraw the test plug from the jack and allow the call to remain on the trunk for a predetermined five or ten minutes to make sure that it will not clear itself. When the wire chief removes the plug, CR releases. AR and BR remain energized and a circuit is established over a back contact of CR and a front contact of AR which lights the waiting lamp WL. The removal of the shunt from the high resistance winding of BR causes LBR to release, thus restoring the B-link transmission bridge to the line. SIR retains LRR. After WL has burned a sufficient length of time, the wire chief may depress the identification key IK and ascertain the number of the faulty line as described below. The wire chief may then order the faulty line plugged out or up at the main distributing frame.

Local Trunks to Desks and Special Positions

Local trunks to information positions, complaint positions, order number positions, coin collector positions, small CLR toll positions will vary with the requirements, but fundamentally each will follow along the lines of Fig. 11 and Fig. 12.

A local trunk (Fig. 12) is intended for information or other similar purposes where the release of the connection remains under the control of the calling subscriber. After the group selector has seized a trunk, the register tests for a double connection over the *a* wire in the usual way, after which relay AR operates in series with the premature release relay RRR (Fig. 10) in the register circuit which is connected to the *b* wire. AR locks up and lights the calling lamp CL and disconnects the test potential from the *t* wire. BR operates when the C brush makes contact with the terminal. The operator answers with an answering cord. CR operates in series with the supervisory lamp SIL and disconnects RI and AR from the *a* and *b* wires. AR releases and CL is extinguished when the holding circuit is opened. CR maintains open the *t* wire circuit. The supervisory lamp SIL is shunted out by a parallel circuit to ground from front CR, R3, front BR to ground. Should the calling subscriber hang up first, BR releases and removes shunt from the supervisory lamp which now burns. Should the operator remove plug from jack first, CR remains energized until the calling subscriber hangs up and releases BR.

Should it be desirable to remove the B-link transmission bridge, for example, at coin collector positions or small CLR toll positions, the local trunk should be of the false call trunk type shown in Fig. 11. The waiting lamp WL and the identification key IK may be omitted when not wanted.

Position Indicators and Pilot Lamps

All escapement switches are equipped with indicators so that the switchman may follow the progress or non-progress of a call with ease. Each register is equipped with a busy lamp RBL which burns when the register is engaged. A pilot lamp TPL is provided for each register and burns when the register is arranged for inter-office trunking. A hold-over lamp HOL is provided for each register and burns when the register is in the hold-over position.

OPERATION OF A-REGISTER ON OUT-TRUNK CALLS TO ANOTHER UNIVERSAL OFFICE OR TO A STROWGER OFFICE

General

The first group selector levels for which the register is strapped are assigned as follows:

Level 0: Direct trunks to toll
Level 9: Connected to special service second group selectors
Levels 1 and 8: Spare
Levels 2 to 7: Connected to local second group selectors from which all out trunks radiate, although if desirable and by suitable re-strapping of the register, trunks to other automatic offices may be run from first or third group levels.

In the present embodiment all subscribers' numbers consist of six digits, except those beginning with the following first two digits: 20, 24, 65, 74 and 75. These have seven digits. The office prefix of the local Universal office for which the register is strapped begins with the digits 29. Inter-office trunking is with direct impulses, the equivalent of a standard dial. Trunking to a Universal office or to a Strowger office is done in substantially the same manner.

The out-trunk circuit (Fig. 13) is used at the outgoing end of trunks to another Universal office, to a Strowger office, or to a Rotary office, thus one out-trunk circuit suffices for all purposes. However, BR is made slow-releasing on trunks to a Strowger office.

The various conditions of the trunk fundamental circuit during the establishment of a connection are shown on the following diagrams: Fig. 14, Universal to Universal and Fig. 15, Universal to Strowger.

Subscriber Dials First Two Digits (Office Prefix)

We will assume the number called has six digits. The subscriber dials the first two digits and a first group selector selects a second group selector and the second group selector selects an idle out-trunk (Fig. 13) in the manner previously described.

Out-Trunk Picked Up and Conversion of Register to Out-Trunking

After the out-trunk has been picked up by a second group selector and brushes A, B and C have made contact with their respective terminals, the A-register makes the usual double test and if successful, EO is driven from position 1 to position 2. When EO goes to position 2, RUR (Fig. 10a) operates, circuit from ground, terminal 2 bank F of EO, back LSR, terminals 2 to 7 bank E of EDI, (the first digit being 2–7) winding RUR to battery. RUR locks up over a front contact of RAR. RUR operates RMR which transfers the F and G brushes of the register finder from connection with RSR for multi-potential selection to the out-trunk bridge for inter-office selection. This bridge may be traced from brush F, front RMR in multiple through relays (Fig. 10a) P+R and P−R and rectifiers S(+) and S(−), contact of interrupter I, front RMR to brush G. RUR transfers the selection starting lead which runs from bank C of EO, from connection with the winding of RSR to the armature of P+R. Finally, RUR connects battery to bank C of ED7, thereby permitting the repeating of the unit impulses as soon as the dialing of the unit impulses commences.

It will be remembered that the units selection within the office on a multi-potential basis is withheld until the dialing of the units is complete. This is to prevent the final switch, operating at 60 to 80 steps a second, from overrunning the dial operating at 10 steps a second. During local selection, battery is not placed on bank C of ED7 until EI brush D goes to position 8 which it does after the completion of dialing.

Only when a local office prefix ending in 9, in this case 29, is dialed, LSR operates, circuit from ground, bank F terminal 2 of EDI, bank F terminal 9 of ED2, winding LSR to battery. LSR opens the operating circuit of RUR so that the register remains in condition for intra-office selection. RUR is not operated when the first digit dialed is 0, 9, 1 or 8, although by continuing the strapping of bank E of EDI, the spare levels 1 and 8 may be arranged for out-trunking.

With the register thus converted to inter-office trunking, a circuit is established from ground (Fig. 13), RI, back BR, wire *a*, the selectors, B-link, R-link, brush F of register finder, front RMR, winding P−R, rectifier S(−1), interrupter I, front RMR, brush G, *b* wire to out-trunk circuit, back BR, winding AR to battery. AR operates and closes a circuit from ground, resistance R2 (Fig. 5) of the second group selector, brush C, front AR, second winding AR, winding BR to battery. AR and BR operate and lock up over a front contact of AR. BR disconnects the EC potential from the t wire, R1 from the a wire and AR from the b wire. BR then connects the a and b wires through to the inter-office trunk. Rectifier S(—) passes current when negative battery is connected to the b wire while S(+) passes current when negative battery is connected to the a wire. P—R operates, but as its front contact is open at RNR, a premature release does not take place.

IN-TRUNK LINK, T-LINK, AND T-REGISTER IN UNIVERSAL OFFICE CONNECTION

The in-trunk circuit at the distant Universal office is shown in Fig. 16. When the trunk pair is closed at the out-going end, the fundamental circuit becomes as shown in A of Fig. 14. JR (Fig. 16) operates and picks up a T-register link (Fig. 17), which in turn causes a T-register (Fig. 18) to pick up the T-link. All this will be described in detail below. It will suffice to say here that the trunk fundamental circuit remains as shown in A of Fig. 14 until the trunk register is connected, at which time the connections to the a and b wires are reversed as shown in B of Fig. 14. The dialing relay DIR of the trunk register (Fig. 18) operates in series with relay P+R in the A-register (Fig. 10a). Under normal conditions all this takes place in less than a second.

INCOMING TRUNK SELECTOR IN STROWGER OFFICE CONNECTED

When the trunk pair is closed at the out-going end, the dialing or A relay in the in-coming trunk which is connected directly to the trunk line operates in series with P+R and the trunk fundamental circuit becomes as shown at A in Fig. 15, the relay A of which forms part of a standard Strowger in-coming selector not further illustrated herein.

SUBSCRIBER DIALS THIRD DIGIT

EI is in position 3. EO is in position 2. The dial impulses advance ED3 to a position corresponding with the number dialed, after which EI goes to position 4, then on to position 5. ED4 is by-passed since a six and not a seven digit number is dialed.

THIRD DIGIT TRUNKED

When ED3 reaches position 1, a circuit is established from battery, bank C of ED3, terminal 2 bank C of EO, front RUR, front P+R, winding RHR, back RLR, front RAR to ground. RHR locks up. RHR operates RNR which locks up over a front contact of RAR. RHR short-circuits relays P—R, P+R and the two rectifiers. Over another front contact, RHR closes the circuit of the impulse interrupter magnet PM from ground, back RLR, front RHR, PM to battery. As PM advances, it sends out from I a series of impulses, approximately ten per second, consisting of short openings of the trunk loop. At the beginning of each opening, a momentary circuit is established from ground, contact t of interrupter I, back PCR4, EC to battery. PCR4 operates and locks up, and de-energizes EC, which advances one step for each impulse sent out over the trunk. Assuming that the digit 5 has been dialed, when the trunk circuit is opened for the fifth time, EC goes to position 5 and a circuit is established from battery, terminal 5 bank D of EC, terminal 5 bank D of ED3, terminal 2 bank D of EO, winding RLR to ground. RLR operates, releases RHR and the interrupter power magnet PM comes to rest as soon as its centering contact s opens. Over one front contact, RLR restores EC to its home position over the latter's restoring contact RC which opens when the switch reaches its home position. Over another front contact RLR sends EO from position 2 to position 3, circuit from ground, front RAR, front RLR, back PCR3, EO to battery. RLR is sufficiently slow-releasing to allow ample time for EC to return home and for the operation of EO. EO is driven from position 3 to position 4 as previously described. RHR may not be again energized for the succeeding series of impulses until RLR makes its back contact. It begins to release when EC leaves position 5. The comparatively long closure of the trunk loop causes the inter-digital change-over to take place in the trunk register (Fig. 18).

The condition of the trunk fundamental circuit during impulsing to a Universal office is shown at C in Fig. 14 and to a Strowger office at B in Fig. 15.

REMAINDER OF DIGITS DIALED AND TRUNKED

As the number dialed has six digits, the three additional digit switches ED5, ED6 and ED7 operate in the usual way and each series of digits is repeated to the trunk immediately after dialing commences, thus there is no delay in repetition. When the last digit has been sent in, EI goes to position 8 and EO to position 7.

A-REGISTER RELEASES

When EO goes to position 7, a circuit is established from ground, terminal 7 bank D of EO, to the terminals C, D and E of the register finder. These grounds operate relays DAR, DJR and IR of the R-link (Fig. 9). IR operates DBR. DAR opens the circuit of the dialing relay DR (Fig. 10) and the register releases.

R-LINK OPERATES

DJR closes a circuit from ground, R5 front DJR, brush E of B-link finder, back LCR, winding LCR to battery. LCR operates and locks up over a front contact of LRR and transfers the connection to the E brush from its winding to a front contact of LAR which continues the circuit through ONC3, P2 to battery of the first group selector. Because of the presence of resistance R5 in this circuit, P2 does not operate. LCR disconnects battery and ground from the retardation coil RET and bridges the latter across the a and b wires, thus preparing the holding bridge for the trunk connection.

DJR (Fig. 9) disconnects the two windings of DRR from the ringing circuit and connects them together through rectifier S(—). DJR also bridges retardation coil RET in series with rectifier S(+) across the trunk circuit over brushes F and G via front contacts of DBR. As the direction of current flow in the trunk pair is not changed, relay DIR of the Universal T-register (see D, Fig. 14) or relay A of the Strowger selector (see C, Fig. 15) remains energized in series with RET and the rectifier S(+). No current passes through windings of relay DRR and rectifier S(—).

When selection is complete at the in-coming end, the calling subscriber hears the ringing or busy tone, as the case may be, from the distant office through transformer TT (Fig. 9), the primary circuit of which is closed from brush F, front DBR, front DJR, front DAR, one winding of TT, front DJR, condenser C2, front DBR to brush G. The trunk fundamental circuit during ringing or busy is shown at E in Fig. 14 for a Universal office and at C in Fig. 15 for a Strowger office. It will be noticed that in the Universal office the T-register (Fig. 18) has been released and replaced by a relay BR in the T-register link (Fig. 17). A detailed description of this will be given later.

Should the calling subscriber hear the busy tone, he hangs up and releases the connection in the originating office whereupon the trunk is released as described below.

METERING

When the called subscriber answers, the direction of current flow in the trunk line reverses and the trunk fundamental circuit to a Universal office becomes as shown at F in Fig. 14 and to a Strowger office as shown at D in Fig. 15. DRR (Fig. 9) operates in series with S(—) and releases the R-link and LAR of the B-link. The calling subscriber's meter operates as previously described.

In a Strowger office, the reversal takes place in the final selector in the well-known manner. In a Universal office the reversal takes place when the call is transferred from the T-link, E in Fig. 14, back to the trunk link relay JR, F in Fig. 14. Relay A in the Strowger final selector and relay JR in the Universal trunk link are held by retardation coil RET in the B-link (see G in Fig. 14, and E in Fig. 15).

RELEASE

At the end of conversation, the connection is released when the calling subscriber hangs up. On a call to another Universal office, the release at the distant Universal office takes place promptly upon the opening of the trunk loop caused by the raising of the A and B brushes of the first group selector. On a call out-going to a Strowger office, the release also takes place when the trunk loop is opened, but as the A-relay releases slow-releasing relay B, the Strowger connector (final) does not fully release until relay B falls away. To prevent the out-going trunk from being picked up too quickly, relay BR (Fig. 13) on out-trunks to Strowger exchanges is made quite slow-releasing so as to keep the t wire open a sufficient length of time to make sure of a positive release in the distant Strowger office.

SHORT NUMBER CALLS

Should the subscriber dial a two digit special service number in a distant office, the A-register will obviously not release in the usual way since normal release requires the dialing of the full number of digits for which the register is arranged. To release such short number calls, the local trunk in the Strowger exchange reverses current in the trunk line and operates relay P—R in the register circuit. This relay energizes the register release relay RRR and the connection is returned to the B-link. Such calls are not metered.

MAKING OUT-TRUNK BUSY FOR TEST

The out-trunk may be made busy at the outgoing end by plugging into test jack TJ (Fig. 13) which removes the test potential from the t wire. By means of a suitable test plug circuit, the sleeve circuit of the jack may be used to test the trunk before occupancy so that a busy circuit need not be plugged into.

The out-trunk circuit may also be made busy from the in-coming end by plugging into test jack TJ (Fig. 16).

OPERATION OF 2-WIRE CLR TOLL TRUNK
(FIGS. 21–23 AND JUNCTION KEY SHEET FIG. 20)

GENERAL

Toll operation may be broadly classified as follows:

(a) Manual operation with handwritten tickets.

(b) Automatic operation with automatic ticketing.

(c) Automatic operation with automatic multiple metering.

During the transition period, combinations of the above may be desirable, for example, manual operation with manual multiple metering.

In recent years improved and increased toll line facilities have made it possible to handle the bulk of toll calls on a "No-Delay" basis and where manual operation has been retained, it is now generally on a CLR basis, i. e. the line and recording positions are combined into one where the call is recorded or ticketed and then completed while the subscriber remains at the telephone. The CLR trunks (Figs. 21, 22) are 2-wire trunks which may be run from first or second group levels to the central toll board. It gives the toll operator full supervision of the calling subscriber and places the release of the connection after she has answered under her control. In combination with other circuits, it enables the operator to identify the number of the calling line. It also enables her to operate the meter of the calling subscriber as many times as desired and to re-ring the subscriber after he has hung up. The same trunk may thus be used to handle CLR business on a manual ticketing or on a manual multiple metering basis or on a mixture of both, according to what is preferred. Supervision and control over the 2-wire CLR trunk between the automatic office and the toll office is obtained in the following manner:

Closure of the CLR trunk metallic loop through a double wound relay at the automatic office operates a double wound calling line relay to ground and battery at the toll office. The calling subscriber may release the connection only before the CLR operator answers, and before she disconnects the calling line relay and in place thereof bridges the high resistance winding of a CLR supervisory relay across the trunk. The bridged relay at the automatic office falls away. No current flows over the CLR trunk wires. The subscriber may signal the toll operator by opening his line circuit in the usual way, whereupon the two windings of the relay at the outgoing end are connected, respectively, to ground and battery. This relay does not operate, but the high resistance CLR supervisory relay at the toll board does operate and lights the supervisory lamp.

To release a connection, the calling subscriber hangs up and the toll operator connects the low resistance winding of the CLR supervisory relay across the CLR trunk, thus also operating the double wound relay at the automatic end.

To operate the calling subscriber's meter, the CLR operator places positive battery on the b wire of the CLR trunk. Each time battery is connected, the meter operates once. To identify the calling subscriber, the CLR operator places positive battery in the *a* wire of the trunk. The subscriber cannot release during these operations. To re-ring the subscriber after he has hung up, and only after he has hung up, the CLR operator places positive battery on both *a* and *b* wires simultaneously.

Positive battery is placed on the inner terminals of the repeating coil at the toll office and, if necessary, in graded steps so as to avoid undesirable clicks in the receiver of the calling or called subscriber. During conversation, the CLR trunk between the repeating coil at the automatic office and the repeating coil at the toll board are free of all earth and battery connections, except the single earth at toll office end, which earth is placed between the two relays connected one each to the two inside terminals of the repeating coil through two rectifiers.

The CLR trunk may terminate at the toll or CLR office in a variety of ways, depending upon the size and nature of the office. In smaller areas the trunks may terminate in a cord or in a pair of multiple jacks, one pair for the usual talking and sleeve connections and the other pair for control purposes. The second jack would be plugged into only when metering, identification, or re-ring is required. One plug with three keys could be used or three plugs, each set for its particular purpose.

In larger areas where a large number of CLR operators are required to handle the traffic, it is advisable to provide automatic distribution to the operators. Traffic may then be more easily and effectively directed to fewer positions as it decreases. The position trunk may terminate in a toll line cord or, better yet, in an automatic toll line switch, thus reducing the manual switchboard position to a sloping top cabinet equipped only with keys, lamps and identification number indicator. We shall describe CLR trunks having first or first and second distribution finders without regard to the manner in which the subsequent toll connection is completed by the CLR operator. The description will be restricted to the operation of the trunk between the automatic office and the CLR position.

OPERATION

*Connection of CLR trunks in automatic office*

The CLR trunk (Fig. 21) may be run from a first group level or B-link (Fig. 8) or, as is generally the case, from a special service second group level (see *a* in Fig. 5). In the following description it is assumed that the trunk is run from a special service second group selector level.

*B-link selects special service second group*

The B-link seizes a free special service second group selector in the same manner as it seizes a local second group selector. LBR of the B-link (Fig. 8) does not operate in series with the high resistance winding of BR of the special service second group (Fig. 5). BR operates and holds the special service second group busy.

*Special service second group selects CLR trunk*

The special service second group selector selects a free CLR junction in the usual way and the selected CLR junction (Fig. 21) is made temporarily busy by grounding the *t* wire. When the A, B and C brushes make contact with the trunk terminals, the register (Fig. 10) tests, first for a double connection over the *a* wire and then, if successful, closes the circuit of the *b* wire which operates the register release relay RRR (Fig. 10) and DR of the trunk (Fig. 21). DR and RRR operate in series with each other. RRR releases the register and the R-link. LAR of the B-link (Fig. 8) releases promptly and connects the B-link transmission circuit to the subscriber's line and to the CLR trunk.

DR (Fig. 21) locks up temporarily over a front contact and a back contact of CR. This is done to make sure that DR is made slow-releasing. DR operates AR. AR operates CR. CR disconnects the winding of DR from the *b* wire and resistance R1 from the *a* wire, and connects the *a* and *b* wires to the CLR transmission circuit. Over a back contact, CR opens the locking circuit of DR but before DR has had time to release, S1R operates in series with the calling line and maintains DR over its first or operating winding.

AR operates slow-releasing relay BR. BR disconnects the *t* wire from the EC potential and in place thereof connects it to the multiple metering and identification relays TMR and TIR. Over a front contact of AR and a front contact of BR, the circuit of the *c* wire is connected to battery through resistance R2, thereby operating LBR of the B-link (Fig. 8). R2 is not low enough to shunt out BR of the special service second group (Fig. 5). LBR connects the CLR transmission circuit to the *a* and *b* wires before it disconnects the B-link transmission circuit. In this way the circuit of the calling subscriber's line is not open during the transfer.

*First CLR finder operates*

DR (Fig. 21) operates ER and connects the two windings of relay JR in series across the out trunk circuit, thereby operating JR and GR (Fig 22) in the toll office. GR operates NR. NR places ground on the high resistance winding of test relay ST1R and power magnet P1 of the first CLR finder. The finder searches for a free second CLR finder and when one is found, a circuit is established from battery, front common busy relay CBR1, ONC-1 of the second finder, winding KR1, brush T, winding ST1R, front NR to ground. ST1R operates in series with KR1. P1 is de-energized and the first CLR finder comes to rest on the terminals of the second CLR finder. ST1R shunts its high resistance winding by its low resistance winding and makes the second line finder busy.

*Second CLR finder operates*

KR1 prepares the test circuit of ST2R and energizes P2. The second finder hunts for a free local trunk to an operator's position. When one is found, a circuit is completed from battery, front CBR2, winding KR2 (Fig. 23), for ST2R which operates and the second CLR finder comes to rest on the selected local trunk. KR2 lights line lamp LL over one front contact and a back contact of QR and MR.

*Premature release by calling subscriber*

If the calling subscriber hangs up before the CLR operator answers, S1R (Fig. 21) falls away and releases DR. DR releases AR since the locking circuit of AR is opened at the back contact of JR, which is energized in series with GR (Fig 22) at the moment DR opens its front contacts. DR releases ER but, as just mentioned, AR releases before JR makes its back contact which it does when ER opens its front contacts, thus opening the circuit of JR and GR.

At the toll office GR falls away and releases

NR. NR unlocks and releases ST1R and KR1. KR1 unlocks and releases ST2R and KR2 (Fig. 23). KR2 unlocks and extinguishes the line lamp LL. The release of NR and KR1 restores the first and second finders to their home positions over off-normal contacts ONC2. When the finders reach their home positions, ONC2 opens and ONC1 closes, thus preparing the finders for another call.

In the automatic office, AR (Fig. 21) opens the circuit of slow-releasing relay BR and a momentary circuit is established from ground, back AR, front BR, brush C of the special service second selector through to the C brush of the B-link. This ground short-circuits LBR (Fig. 8) which releases and restores the B-link transmission circuit. When the subscriber has hung up the B-link releases in the normal way, after which the special service second group selector is released and it, in turn, releases the CLR trunk.

CLR operator answers

The CLR operator answers by throwing listening key LK (Fig. 23) which operates listening key relay LKR over a series contact on the release key RLK. LKR operates MR which locks up over a front contact and a back contact of QR. MR opens the circuit of the line lamp LL which goes out. A circuit is established from battery, front MR, resistance R2, brush C of second CLR finder, brush C of first CLR finder, windings HR and FR in multiple to ground. HR operates and disconnects GR but retains NR over a front contact. FR is of high resistance and does not operate in this circuit.

The toll operator is now in communication with the calling subscriber over the contacts of LKR and the release of the connection is under her control. The subscriber may signal the toll operator by opening and closing the line circuit in the usual way, whereupon SIR falls away and releases DR (Fig. 21). DR, in turn, releases ER, whereupon ground and battery are connected to the a and b wires, respectively, over front contacts of AR. AR remains locked up over a front contact and a back contact of JR. JR does not operate because of the high resistance of the operating winding of TSR (Fig. 23) which is now bridged across the trunk line at the toll office over back contacts of LKR (Fig. 23) and FR (Fig. 22) and front contacts of HR. TSR operates and lights the supervisory lamp SIL over its front contact and a back contact of QR. Should the operator be listening in on the toll trunk at the moment the subscriber hangs up, TSR will be disconnected but JR (Fig. 21) will remain unoperated and the connection at the automatic office will not be broken.

Multiple metering

The operator may operate the calling subscriber's meter at any time by throwing the metering key MK, one of which is provided for each position trunk (Fig. 23). Each time MK is depressed, it applies positive battery to the b wire of the CLR trunk and operates relay TMR (Fig. 21) through rectifier S(+) to ground. TMR applies negative battery to the t wire over a front contact of BRR and a back contact of RR. The metering relay LMR (Fig. 8) of the B-link operates and applies the metering current to the c wire as on a successful local call.

Re-ring

The subscriber, after hanging up, is re-rung by the operator when she throws key RRK (Fig. 23). This key applies positive battery to both sides of the CLR trunk, thereby operating TMR and TIR (Fig. 21) simultaneously. This simultaneous operation closes the circuit of RR, which opens the t wire and prevents the operation of the B-link multiple metering relay and applies ringing current to the a and b wires of the calling line after opening the transmission circuit.

Calling line identification

Calling line identification will be presently described in detail. Let it suffice to say here that the CLR operator depresses line identification key IK (Fig. 23). IK short-circuits R2 and operates FR (Fig. 22). FR causes the third identification finder to pick up the trunk and apply positive battery to the a wire and operate TIR (Fig. 21) which, in turn, applies positive battery to the t wire of the calling line and operates IR of the A-link (Fig. 7).

Release

At the end of a connection, the calling subscriber hangs up and lights SIL (Fig. 23). The operator depresses release key RLK which operates QR. QR closes the low resistance winding of TSR, thus operating JR (Fig. 21). The connection is now released as on a premature release.

OPERATION OF IDENTIFICATION CIRCUITS (FIGS. 21–29, FIG. 13 JUNCTION KEY SHEET FIG. 20)

GENERAL

Means are provided for each automatic office to enable the wire chief or other local operator, toll operator, to identify the number of a calling line. The wire chief needs this means to ascertain the number of a faulty line creating a false call. It is not necessary to trace back these calls switch by switch with or without the aid of tones. The CLR toll operator need not ask the calling subscriber for his number which she can obtain automatically with a minimum of effort and without reducing her speed in extending the call. Automatic ticketing could not be practiced without such number identifying means.

The number identification by the wire chief and CLR toll operator in a large area will be described. However, an automatic office equipped, as shown on Key Sheet Fig. 20 may without change be equipped for automatic ticketing provided the automatic ticketing equipment is adapted to receive the number impulses in about the same way as they are received by the number indicator (Fig. 24).

A feature of the identification system herein described is that neither the wire chief in the automatic office nor an operator in the toll office may hold the identification circuit busy beyond the time it takes the circuit to identify the calling line. The maximum time required for the first identification finder to pick up the calling line is 2 seconds, average 1 second. The maximum time required for the second identification finder to pick up the first finder is 1 second. Since these two finders hunt simultaneously, the maximum time to the identification link is 2 seconds, average 1 second. After the identification link is picked up, it takes 1 second to set the wire chief's number indicator, after which the identification circuit is automatically freed. The elapsed time between the depression of the identification key on the wire chief's desk to the appearance of the number on the indicator is thus in the neighborhood of 3 seconds.

In cases where the identification call originates at the toll office, time must be allowed for the third identification finder to pick up the CLR trunk and for sending in the office prefix to the number indicator. This takes a maximum of 2 seconds, average 1½ seconds. These times added to the first and second finder times of 1 and 2 seconds, previous mentioned, makes the elapsed time between the depression of the identification key by a toll operator and the appearance of the full subscriber's number with office prefix a maximum (identification circuit free when identification key is depressed) of 4 seconds, average of 3 to 3½ seconds.

IDENTIFICATION EQUIPMENT

*In automatic offices*

Each A-link (Fig. 7) includes an identification relay IR. This relay is connected to the *t* wire through a small rectifier S(+) and operates when a positive potential of normal value is applied to the *t* wire.

One standard 4-brush "first identification finder" (Fig. 25) is provided for each group of first line finders (Figs. 7 and 5b), making 100 first indentification finders in a 10,000 line office. The *t* wires of these finders are connected to the corresponding *t* wires of the first line finders. Separate wire chief false call finders are not necessary.

Two "second identification finders" (Figs. 25 and 26) are provided for each 10,000 line office. Each is a standard 50-point, 8-brush finder, of which 5 brushes are used. One of these finders serves the first 5,000 lines or first 50 first identification finders and the other the second 5,000 lines or second 50 first identification finders.

Should satellites or branch offices be associated with the automatic office, first identification finders would be located in the satellite or branch offices. Should the number of lines exceed 200, second identification finders would also be installed in the satellites or branch offices and connected to a second identification finder in the main office.

One multi-potential test circuit (Fig. 25) common to all 100 first identification finders is provided.

One common impulse sender IS (Fig. 28) with 11 cams, 10 of which are arranged to send 1 to 10 negative battery impulses respectively and one a positive battery impulse, is provided for each automatic office or satellite. This sender is normally at rest and when energized makes one revolution and during this time sends out impulses from all cams simultaneously except the 11th cam which cam sends out its positive impulse after the 10th negative battery impulse. The time required to send all impulses is about 1 second.

The two second identification finders in each 10,000 line automatic office are connected to a four-wire identification link (Fig. 26), the function of which is to make the identification system busy to the toll office when used by the wire chief and busy to the wire chief when in use by a toll operator. The link is connected to the third identification finder (Fig. 27) in the toll office by a four-wire trunk.

For each wire chief's desk there is provided one 4-digit number indicator as shown in Fig. 26.

*Equipment in toll office*

At a toll office arranged for manual CLR service there is provided:

One third identification finder circuit (Fig. 27) for each connected 10,000 line automatic office. It is connected by a four-wire trunk to the identification link (Fig. 26) in the automatic office. The third identification finder is a standard 8-brush finder with bank capacity of 60 CLR circuits. The CLR junctions (Fig. 22) from the associated automatic office are connected to the bank terminals of the third identification finder. Should there be more than 60 trunks from the same automatic office, one or more additional identification finders may be connected in multiple to the third identification finder circuit.

The common identification equipment of each CLR toll or other toll office position is shown in Fig. 24 and consists of four relays and one 4 to 7 digit number indicator, depending upon the switching capacity of the area. A 7-digit indicator will take care of an area of 10,000,000 lines, a 6-digit indicator will take care of an area of 1,000,000 lines, and so on. The number indicator consists of as many digit units as the switching capacity requires. Each digit unit includes an operating magnet NI and a transparent semi-circular number disc on which are printed the 10 digits or series of letters, as the case may be. Each time the indicator magnet is energized, it operates a pawl which advances the transparent disc one step. The disc is held in its advanced position by a retaining pawl associated with a common release rod. The semi-circular discs are placed side by side and a long filament lamp is run through or projects into the hollow space beneath the numbered surfaces. When all digit impulses have been sent in, the lamp lights up the number for which the indicator has been set. The indicator discs are restored to normal by the depression of the common release rod which disengages the retaining pawls, allowing the discs to return to normal under their own weight or by a retractile spring.

OPERATION OF FIRST AND SECOND IDENTIFICATION CIRCUITS

*First identification finder operates*

When the identification relay IR of the A-link (Fig. 7) is operated by the wire chief or the CLR operator, IR operates AR (Fig. 25) of the first identification finder serving the group of 100 lines in which the calling subscriber's line is located. AR closes a circuit from battery, winding of power magnet PI₁, front AR, back GVR of the common valve test circuit, back GSR to ground. The first identification finder hunts. AR connects the cathode C of V to the test brush T.

When the calling line terminals are reached, potential EC +4 (assigned for identification service, see Fig. 1a) will be found on the T terminal. The grids of V are connected to potentials EG1 +4 and EG2 +4, and when potential EC +4 is placed on a cathode, V fires GV. GV operates GVR which opens the circuit of PI₁ causing the first identification finder to come to rest on the terminals assigned to the calling line. GVR operates GSR which de-ionizes GV. GSR locks up over a front contact of AR and removes ground from GVR so that PI₁ may not be again energized when GVR releases.

*Second identification finder operates*

AR places a test battery on the T terminal of the first identification finder in the bank of the second identification finder and closes also a circuit for PI₂. When the calling first identification finder is found, TR2 operates, de-energizes PI₂, and in place thereof energizes SAR₁ or SAR₂ (Fig. 26), as the case may be.

WIRE CHIEF IDENTIFIES

Identification circuit busy at toll office

When the wire chief wishes to identify, for example, the number of the calling line originating a false call, he depresses IK of the false call trunk along with release button RLB (Fig. 26). The circuit requires the depression of the number indicator release button RLB so that the wire chief may not start identification with the number indicator off normal. When IK and RLB are depressed, IKR (Fig. 26) operates. In case the identification circuit is being used by a toll operator, BR or AR (Fig. 26) is operated and removes ground from winding of CR. Pilot lamp PL does not light and the wire chief knows that the common identification circuit is busy. The wire chief may hold IK and RLB depressed for 1 to 4 seconds until the toll operator has finished with the identification circuit, or he may depress the key and button a few seconds later.

Identification circuit free at toll office

The wire chief depresses RLB and IK and IKR operates and a circuit is established from ground, back BR, back AR, winding CR, back WRR, front IKR, pilot lamp PL, make contact of RLB to battery. The burning of the pilot lamp indicates to the wire chief that the identification circuit is free whereupon he releases RLB. IK is held depressed for two to three seconds until the number indicator is set. IKR remains locked up over its front contact and IK when RLB is released. CR operates and removes ground from BR, thus making the identification circuit busy to the toll office, and over a front contact and a contact on IK places positive battery on the t wire of the calling line, thus operating IR of the A-link (Fig. 7) and causing the operation of the first and second identification finders.

When SAR₁ or SAR₂ (Fig. 26) operates, a circuit is established from ground, winding operating magnet NI₁ of thousands indicator, back WRR, back FR, front SAR₁ or SAR₂, d wire, front TR2 (Fig. 25), front GSR, winding high resistance relay ISR (Fig. 28), cam B to battery. ISR operates but not NI₁. ISR closes circuit of power magnet PM of the impulse interrupter which starts rotation. At the commencement of rotation, cam A makes contact and cam B opens. Cam A does not open again until the revolution of the interrupter is complete and cam B does not close again until the A cam opens, thus during the sending of impulses the d wire is cleared for sending impulses.

The impulse interrupter makes one complete revolution and in so doing sends out simultaneously negative battery impulses over the a, b, c and d wires according to the strapping between the interrupter cams and the first and second identification finder bank terminals. The circuit in (Fig. 28) is shown strapped for the number 9372, so that cam 9 sends out nine impulses over the d wire, cam 3 three impulses over the c wire, cam 7 seven impulses over the b wire, and cam 2 two impulses over the a wire. After these impulses have been sent out, a positive battery impulse is sent out over the a wire. At the wire chief's desk (Fig. 26) the nine negative impulses over the d wire advance the thousands indicator to position 9, similarly the hundreds and tens indicators are advanced to positions 3 and 7, respectively. The two impulses sent out over the a wire pass through rectifier S(—) and operate relay NR4 which, in turn, advances NI4 to position 2. The following single positive impulse over the a wire passes through rectifier S(+) and operates relay WRR. WRR locks up over a second winding, a front contact, and the break contact of RLB to battery. The indicator lamp burns, circuit from ground, front WRR, filament to battery. The number 9372 is displayed before the wire chief.

WRR opens the circuit of CR and PL. CR releases and places ground on the winding of BR, thus freeing the identification circuit for use at the toll office. When CR opens its front contact, positive battery is removed from the t wire of the calling line, thus releasing IR of the A-link (Fig. 7) which in turn, releases AR (Fig. 25) of the first identification finder. AR opens the circuit of TR2 and GSR, thus releasing these circuits. When TR2 falls away, it releases SAR₁ or SAR₂, as the case may be. The finders have no home position and remain in the positions last selected. WRR also opens the circuit of NI₁ (Fig. 26) so that ISR (Fig. 28) is not again energized when the B cam is closed.

The wire chief holds IK depressed until the pilot lamp goes out or until the number indicator lamp burns. The key is then released, but the number remains displayed. When the wire chief has taken note of the number, release button RLB is depressed. This action removes the retaining pawls from the indicator discs which now return to their normal position. The depression of RLB also releases WRR, thereby extinguishing the number indicator lamp.

CLR OPERATOR IDENTIFIES

Identification circuit busy

The identification circuit may test busy to the toll operator because of its use by the distant wire chief or by some other operator in the CLR toll office. When the toll operator depresses the identification key IK of a position trunk (Fig. 23) and then momentarily the number indicator release button RLB, pilot lamp PL2 (Fig. 24) burns. Should the circuit be free at the toll office, the office identification will appear on the number indicator, though not lighted, within two seconds. Should the prefix not appear within this time, the toll operator will know that the circuit is being used by some other operator in the toll office. She may hold the key depressed for a few seconds and thus seize the identification trunk when it becomes free or she may release the key and try again later. If two or more operators are holding keys depressed simultaneously for the same identification circuit, that position will be served first whose CLR trunk is most favorably located in the bank of the third identification finder.

Should the identification trunk be free at the toll office but busy at the automatic office, the office prefix will appear on the number indicator within two seconds after IK and RLB are depressed, but the subscriber's office number will not appear within three seconds later. The wire chief can busy the circuit only for a maximum of three seconds, and if the operator continues to hold IK depressed, no other toll operator will be able to seize the trunk when it becomes free.

IDENTIFICATION CIRCUIT FREE

Third identification finder picks up CLR trunk

The CLR operator depresses identification key IK of the position trunk (Fig. 23) over which the call was received. The release button RLB of the number indicator (Fig. 24) is then momentarily depressed, establishing a circuit from battery, make contact RLB, back QR, winding low resistance pilot relay PLR, identification key IK (Fig. 23), brush C, second CLR finder (Fig. 22), brush C, first CLR finder, in multiple through the windings of HR and FR to ground. FR operates in this circuit and places ground on the common lead $y$ to the third identification finder (Fig. 27) connected to the identification link (Fig. 26) in the automatic office in which the call originated.

PI$_3$ (Fig. 27) is energized and the third identification finder hunts for the CLR trunk. When it is found, T3R operates over the test brush, front FR (Fig. 22), resistance R2 to battery. PI$_3$ is deenergized and in place thereof ground is placed on the winding of A3R.

Office prefix sent to number indicator

T3R (Fig. 27) closes a circuit from ground, back B3R, terminal S, winding starting relay SR (Fig. 29). SR energizes the impulse sender power magnet PM. As the impulse sender commences to rotate, it closes its A cam, which does not again open until the sender has made a complete revolution. The sender has 13 operating cams and 14 positions. At the beginning of each revolution, cam T makes contact in the second position, the first being the home position. Cams 1 to 10 operate simultaneously sending out 1 to 10 impulses, respectively, in positions 3 to 12 inclusive. Cam G sends out a positive battery impulse in the 13th position and cam B sends out an impulse from negative battery 14th position. The time for one revolution is about 1 second. The sender is common to the toll office.

Thus, when T3R operates and places ground on the winding of A3R, A3R does not operate until cam T makes contact to battery. When it does, a circuit is established from ground, cam T (Fig. 29), terminal $t$, back A3R (Fig. 27), winding A3R, front T3R, front FR (Fig. 22) to ground. A3R operates and locks up over a front contact and disconnects itself from the T cam of the interrupter. A3R places battery on the winding of relay B3R. As the impulse sender advances, it sends out a series of impulses and the office prefix sent out depends upon how the $d$, $e$ and $f$ terminals are cross-connected to the sender cams. The jumpering shown on Fig. 29 is for office prefix 527. As the sender rotates, it sends out five impulses from cam 5, circuit from battery, cam 5, terminal $d$, back B3R (Fig. 27), front A3R, brush D of third finder, brush D of first CLR finder (Fig. 22), brush D of second CLR finder, front LKR (Fig. 23), rectifier S(−) (Fig. 24), winding NR$_1$ to ground. NR$_1$ operates five times and advances the "millions" indicator NI$_1$ five steps. In a similar manner, the "hundred thousands" and "ten thousands" indicators are advanced to positions 2 and 7 respectively. In these cases, the impulses are transmitted direct from the cams to the operating magnets of the number indicators NI$_2$ and NI$_3$. FR (Fig. 22) disconnects brushes E and F from their normal connection with the CLR trunk to connection with the third identification finder bank (Fig. 27).

Following the office prefix impulses, cam G sends out a positive battery impulse over the $g$ wire and operates relay WR (Fig. 24) through rectifier S(+). WR locks up over its second winding and a front contact of key RLB. WR transfers the $d$, $e$ and $f$ wires from N$_1$, NI$_2$ and NI$_3$ to NI$_5$, NI$_6$ and NI$_7$, respectively. The office prefix remains displayed since the advanced number discs are held in position by the retaining pawls.

Cam B (Fig. 29) sends the final impulse and operates B3R (Fig. 27) which locks up over a front contact and a front contact of A3R. The third identification finder circuit is now disconnected from the impulse sender.

First and second identification finders operate

When the wire chief is not using the identification circuit, the circuit of BR (Fig. 26) is closed to ground over the back of CR. When T3R (Fig. 27) operates, it closed the circuit from battery, front T3R, winding D3R, back C3R, wire $d$ of 4-wire trunk to automatic office, winding BR (Fig. 26), back AR, back CR to ground. D3R and BR operate. BR makes circuit busy to wire chief.

D3R places positive battery on the $a$ wire of the CLR trunk, circuit from positive battery, front D3R, brush C, third finder, front FR (Fig. 22), front HR, one side of repeating coil, $a$ wire to automatic office (Fig. 21), one side of repeating coil, relay T1R, rectifier S(+) to ground. TMR and JR (Fig. 21) do not operate. T1R operates and places positive battery on the $t$ wire of the calling line. IR (Fig. 7) operates AR (Fig. 25) and the first and second identification finders operate as on a call from the wire chief.

When SAR$_1$ or SAR$_2$ (Fig. 26), as the case may be, operate, a circuit is established from ground, front SAR, front BR, winding AR to battery. AR operates, disconnects BR and locks up over a front contact in series with the contact on SAR. AR keeps the circuit busy to the wire chief by keeping open the circuit of CR. AR operates FR. The opening of the circuit of BR releases D3R (Fig. 27) whereupon C3R operates, circuit from ground, front B3R, winding C3R, back D3R to battery. C3R places positive battery on the C brush before it is removed by D3R.

Subscriber's office number sent in

FR (Fig. 26) and C3R (Fig. 27) extend the $a$, $b$, $c$ and $d$ wires from the impulse sender (Fig. 28), through the circuits (Figs. 25, 26, 27, 22 and 23), to the number indicator (Fig. 24). The closing of the $d$ wire (Fig. 26) or the $g$ wire (Fig. 22) places high resistance ISR (Fig. 28) in series with NR$_4$ and rectifier S(−) (Fig. 24). ISR operates, but not NR$_4$. ISR operates the sender (Fig. 28) and direct battery impulses are sent out which send NI$_4$, NI$_3$, NI$_2$ and NI$_1$ to positions corresponding to strapping at the sender, in this case 9372. The final positive impulse operates QR (Fig. 24) which locks up and lights the number indicator lamp, and the full number 527-9372 is displayed.

Identification circuit released

QR (Fig. 24) opens the circuit of IK (Fig. 23), thus releasing all circuits. FR (Fig. 22) falls away and releases T3R (Fig. 27). T3R releases A3R, A3R releases B3R, and B3R releases C3R. C3R removes positive battery from the $a$ wire of the CLR trunk and T1R (Fig. 21) removes positive battery from the *t* wire of the calling line. IR (Fig. 7) releases the first and second identification finders (Fig. 25).

Number indicator reset

When the toll operator has taken due note of the number, she depresses RLB (Fig. 24) which allows the individual indicators to return to normal. RLB also unlocks QR.

IN-TRUNKING

GENERAL

All local switching within a Universal office is always done on a multi-potential basis. To make this easily possible on inter-office calls, the incoming trunk link (Fig. 19) picks up a T-register link and a T-register in the terminating office. The incoming trunk links may be attached to first, second, or third group selectors as the case requires. In all cases the selector circuit is the same, i. e. Fig. 5(a), wiring b. The originating office side of the incoming trunk link is always especially adapted to meet the requirements of the distant office. All trunks are two-wire and impulsing and signalling for switching purposes is always on a full, two-wire, metallic basis, that is, there is a loop at one end and ground to battery connections at the other end. Earth potentials play no part in switching. When the trunk loop is closed at the originating office, the trunk link causes a free T-register link (Fig. 17) to pick it up, after which the T-register link picks up a free T-register (Fig. 18). These two circuits are the same and common for all incoming trunks whether from a Universal, a Strowger, a Rotary or a Toll office.

The other circuits and diagrams involved in the following descriptions are:

Universal to Universal:
 Fig. 14—Trunk fundamental circuit
 Fig. 10—A-register circuit in originating office
 Fig. 13—Out-trunk circuit
 Fig. 16—In-trunk link (I. T. U.)

Strowger to Universal:
 Fig. 30—Trunk fundamental circuit
 Fig. 31—Out-trunk repeater in Strowger office
 Fig. 32—In-trunk link (I. T. S.)
 No change is required in any Strowger circuit.

Rotary to Universal:
 Fig. 33—Trunk fundamental circuit
 Fig. 34—In-trunk link (I. T. R.)

When a Universal office is introduced into a Rotary network, the Rotary registers, if not already so arranged, must be modified to "unpair" impulses when trunking to a Universal office. By "unpairing" is meant the placing of the out-trunk impulses on a straight decimal basis just as they come from the subscriber's dial. "Unpairing" has been arranged for in some Rotary systems so as to permit that system to work directly with systems which operate on a decimal basis as do the Universal and Strowger systems. No other changes are required in existing Rotary offices.

S. I. R. (Stored impulse repeater)

An "S. I. R." is an essential piece of apparatus for incoming trunks from a Strowger office not provided with registers or other means of storing a call pending the picking up of the T-register link and T-register, thus the first impulse must be received and stored by the trunk and later on, before or in parallel with the second impulse, repeated to the T-register. The device is small and simple and mounts on the trunk link relay plate. The device consists of two ratchet driven parts, one part advances to a position determined by the number of trunk impulses received, the other follows repeating the impulses when the T-register is connected and stopping when it reaches the advanced position of the first part.

TRUNK FUNDAMENTAL CIRCUITS

Universal to Universal (Fig. 14)

The condition of the trunk just after it has been picked up in the originating office is shown at A. Relay JR (Fig. 16) is energized in series with relay P—R [Fig. 10 (a)] in the A-register. The A-register remains inactive while JR causes a T-register link (Fig. 17) to search for and pick up the trunk link. After this has been done, the T-register link picks up a T-register (Fig. 18).

The condition of the trunk when a T-register is connected is shown in Fig. 14 at B. The *a* and *b* wire connections are reversed and the dialing relay DIR of the T-register operates in series with P+R of the A-register. The T-register is now ready to receive impulses from the A-register in the outgoing office.

The condition of the trunk during impulsing is shown at C. The series relays in the A-register are short-circuited by a contact on RHR [Fig. 10 (a)] and impulses of uniform length and speed are sent out by interrupter I.

When the A-register has transmitted impulses for the four digits to the T-register, it releases and the trunk fundamental circuit becomes as shown at D. The outgoing end of the circuit is transferred to the R-link (Fig. 9). Relay DRR (Fig. 9) is placed in series with rectifier S(—) and does not operate. Retardation coil RET. is placed in series with rectifier S(+) and holds relay DIR energized.

When the T-register has completed selection, it releases and transfers the connection at the incoming end to the T-register link (Fig. 17) and the trunk fundamental circuit becomes as shown at E. DRR does not operate but BR does. This is the condition of the trunk during ringing or busy. In case of a busy connection, the calling subscriber hangs up, whereupon the trunk circuit is opened and release takes place.

When the called subscriber answers, the T-register link (Fig. 17) returns the trunk to the trunk link (Fig. 16). Current is reversed in the trunk loop and DRR of the R-link (Fig. 9) and JR operate in series with rectifier S(—), whereupon metering takes place and the trunk fundamental circuit becomes as shown at F.

After metering, the R-link (Fig. 9) at the outgoing end transfers the circuit to the B-link (Fig. 8) and the talking circuit becomes as shown at G.

At the end of the connection the calling subscriber hangs up, after which the trunk circuit is opened at the outgoing end as shown at H. The release of JR restores the in-trunk link (Fig. 16) to normal.

Should the call be a short number call, that is, a call having less than the full four digits, the T-register (Fig. 18) is caused by the local trunk to reverse current in the *a* and *b* wires. This reversal operates relay P—R in the A-register, which when operated after the sending of the first impulse, acts as a premature release relay and releases the A-register and R-link without metering.

Strowger to Universal (Fig. 30)

The outgoing end of a two-wire trunk between Strowger offices is always connected to an outtrunk repeater circuit, such as shown on drawing Fig. 31. This same out-trunk is used at the outgoing end of a trunk to a Universal office and the condition of the trunk fundamental circuit just after the trunk is picked up in the Strowger office is shown at A in Fig. 30. JR of the trunk link (Fig. 32) operates in series with relays E and F in the Strowger office (Fig. 31). Relay F, which controls metering, is a marginal and differentially disposed relay and does not operate until the direction of current flow in the trunk line is reversed.

A straight Strowger exchange is not equipped with registers, and the calling subscriber's dial impulses cannot be stored or delayed in the originating office. Provision is, therefore, made in the Universal office for storing the dial impulses of the first digit while the T-register is being connected. This is accomplished by equipping each incoming trunk link with a simple impulse storing and repeating device, called for short an "S. I. R." The trunk circuit at this stage is shown at B in Fig. 30. The impulses are sent by the A relay in the out-trunk repeater (Fig. 31) and are received by the JR relay in the trunk link (Fig. 32) which, in turn, passes them to the "S. I. R." which controls interrupter I. Should a T-register (Fig. 18) be connected to the trunk link before the dialing of the first trunked digit is complete, the circuit remains as shown at B and the impulses for the first digit are passed to the first digit switch ED4 (Fig. 18) in the register by interrupter I.

It may be assumed that a T-register will have been picked up before the dialing of the second digit starts because the maximum selection time of a register is no longer and probably less than the maximum selection time of a trunk in a level of a Strowger switch. The condition of the trunk fundamental circuit during the dialing of the remaining digits is shown at C, Fig. 30. The register circuit is so arranged that ED4 and ED5 may receive impulses simultaneously, the first from I and the second from A in the out-trunk repeater. This condition may arise whenever the T-register is seized at about or after the finish of the dialing of the first digit.

The condition of the trunk fundamental circuit during ringing or busy, which takes place after the T-register releases, is shown at D. Relay BR in the T-register link (Fig. 17) is held operated in series with relays E and F in the out-trunk repeater (Fig. 31). When the calling subscriber hangs up on a busy connection, the trunk circuit is opened at the outgoing end for a sufficiently long time to allow the slow release relay at the incoming end to fall off and release the connection. In the Strowger system the release is always slow.

When the called subscriber answers, the T-register link (Fig. 17) returns the connection to the trunk line (Fig. 32) in which the a and b wire connections are reversed by S2R which is energized over the called subscriber's line. This reversal operates relay F in the out-trunk repeater circuit (Fig. 31) which, in turn, operates the calling subscriber's meter. This metering and talking condition is shown at E.

At the end of the connection, the calling subscriber hangs up, whereupon the out-trunk register (Fig. 31) opens the trunk bridge and releases JR (Fig. 32).

Should the call be a short number call, the T-register is released when it picks up the local trunk. The register link (Fig. 17) is released by the register and the trunk loop is transferred back to the control of the trunk link (Fig. 32). If the short number call is to be metered, S2R is operated as on an answered full number call. If the call is not to be metered, S2R is not operated.

Rotary to Universal (Fig. 33)

Trunking between Rotary offices is on a reverting basis, that is, the impulsing takes place at the incoming end instead of at the outgoing end as on calls to Strowger or Universal offices. When a trunk is seized in a Rotary office and the Rotary register has not yet received the first digit to be trunked, the trunk circuit remains open as shown at A. As relay J1R of the trunk link (Fig. 34) is not energized, a T-register link (Fig. 17) and a T-register (Fig. 18) are not connected.

When the Rotary register has received the first digit to be trunked, the trunk fundamental circuit becomes as shown at B. High resistance relay J1R operates and causes a T-register link to pick up the trunk link and a T-register to pick up the T-register link. The out-stepping relay OSR in the Rotary register does not operate.

When a T-register is connected, the trunk fundamental circuit becomes as shown at C. OSR operates in series with D2R of the T-register.

Revertive impulses of the proper speed and character and consisting of momentary grounds placed on the b wire are applied to the trunk as shown at D. Each time the b wire is grounded, OSR in the Rotary register makes its back contact and counts one step.

When the proper number of impulses corresponding to the number dialed have been sent back to the Rotary register, the latter opens the trunk circuit as shown at E. The circuit remains open until the Rotary register is ready to receive the next series of impulses, at which time the trunk circuit is again restored to the reverting condition.

When the Rotary register has counted all digits, it releases and transfers the outgoing end of the trunk circuit to the Rotary connection circuit and the trunk fundamental circuit becomes as shown at F. Simultaneously, at the incoming end the T-register disconnects the dialing relay D2R and in place thereof bridges high resistance relay HRR across the trunk. Relay HRR holds the connection but supervisory relay S2R in the connection circuit does not operate.

When the T-register has completed selection, it releases and the connection is transferred to the T-register link circuit (Fig. 17) as shown at G. High resistance relay HRR operates and holds the connection but S2R is not operated. This is the busy and ringing position. In case of a busy call, the calling subscriber hangs up and the Rotary connection circuit opens the trunk circuit, whereupon the T-register link and trunk link are released.

When the called subscriber answers, the the T-register link (Fig. 17) returns the connection to the trunk link (Fig. 34) and the trunk fundamental circuit becomes as shown at H. The two windings of relay J2R are bridged across the trunk, the low resistance winding being closed over a front contact of the called line supervisory relay S3R. S2R in the Rotary connection circuit operates and the calling subscriber's meter is energized. This is the metering and talking position.

At the end of a connection, the calling subscriber hangs up and the Rotary connection cirouit opens the trunk circuit at the outgoing end, thereby releasing J2R as indicated at I.

Should the call be a short number call, the T-register is released when it picks up the local trunk. The register link (Fig. 17) is released by the register and the trunk loop is transferred back to the control of the trunk link (Fig. 34). If the short number call is to be metered, S3R is operated as on an answered full number call. If the call is not to be metered, S3R is not operated.

Premature releases, that is, releases by the calling subscriber before the completion of selection, may occur at any stage up to the completion of selection. A premature release with the circuit in the condition A, merely frees the trunk at the outgoing end. Since the trunk has not been disturbed at the incoming end, no action at this point follows. Should a premature release occur during condition B, the trunk link returns to normal when the trunk loop is opened at the outgoing end. Should a premature release occur during selection or between selections, special action is necessary since the normal waiting condition between selections is an open circuit as shown at E. At such times the Rotary register causes the premature release of the T-register by first opening the trunk at the outgoing end, if not already open, and then closing it for a very short interval of time. This short closure causes the T-register to release the partially completed connection at the receiving office.

IN-TRUNKING FROM ANOTHER UNIVERSAL OFFICE. T-REGISTER (FIG. 18) OPERATES

TRUNK FUNDAMENTAL CIRCUIT FIG. 14

General

The trunk starts with the out-trunk circuit (Fig. 13) in the originating office and terminates in the incoming trunk link circuit (Fig. 16). The operation of the local second group selector and the A-register (Fig. 10) in selecting the out-trunk has already been described. It is assumed that the incoming call is a terminating one of four digits.

TRUNK LINK CONNECTED TO T-REGISTER

When the A-register in the originating Universal office is connected to the two-wire trunk (Fig. 14, A), JR (Fig. 16) operates in series with rectifier S(−) and P−R [Fig. 10(a)]. Both relays operate. No current passes through P+R because of rectifier S(+). The operation of P−R at this stage of the connection has no effect upon the A-register. JR places a test potential on the T terminal of the register link (Fig. 17), circuit from battery, front JR, back CR, resistance R1 to T, and over another contact JR closes the circuit of the common register link starting relay CSR (Fig. 17). CSR has as many make contacts as there are trunk register links serving a group of sixty incoming trunk links. The figure 60 is set by the capacity of the trunk link finder bank. When CSR operates, it energizes the trunk link finder magnet PL of all idle register links, circuit from ground, back AR, front CSR, back T1R, back T4R, winding magnet PL to battery. All idle register links hunt for the calling trunk link and a circuit is established by the first to reach it from battery, front JR (Fig. 16), back CR, R1, brush T, high resistance winding of T1R to ground. T1R operates and de-energizes the power magnet PL and over its front contact makes the trunk link busy to the remaining hunting register links by shunting its high resistance winding by its low resistance winding in series with low resistance T2R. The trunk link finder comes to rest on the terminals of the trunk link.

T2R closes the circuit of the register finder magnet PR, circuit from ground, front T2R, back T3R, PR to battery. The register finder hunts for an idle register and when one is found, a circuit is established from battery, terminal 11, bank A of digit switch ED7 of the T-register (Fig. 18), in series through terminals 11 of all other escapement switches, back RRR, winding RLR, brush T of register link (Fig. 17), high resistance winding T3R, front T2R to ground. T3R operates and opens the circuit of PR and in place thereof shunts its high resistance winding with its low resistance winding in series with T4R, thus making the register busy to other register links. The winding of RLR (Fig. 18) has a non-inductive shunt so as to permit high speed operation of T3R. RLR locks up over a front contact in series with a back contact of the T-register release relay RRR. It will be seen that a register may not be picked up when any one of the escapement switches is off-normal.

T4R operates DR (Fig. 17) which closes the circuits of the register finder brushes A to G and a circuit from ground, winding DR (Fig. 16), brush E of the trunk link finder (Fig. 17), front DR, brush E of the register finder, winding AR (Fig. 18) to battery. DR operates but not AR owing to the high resistance of DR. The latter disconnects JR from the trunk loop but before doing so closes its circuit through resistance R3 to prevent its release during the transfer. DR disconnects the A and B brushes of the selector from the trunk link transmission bridge and grounds brush T over the back contact of selector relay AR. Finally, DR energizes CR, circuit from ground, off-normal contact ONC2, front DR, winding CR to battery. CR locks up over a front contact of JR. CR opens the circuit of the common starting lead to the T-register links (Fig. 16) and over another back contact removes test battery from the T terminal, thus releasing relays T1R and T2R (Fig. 16). Power magnet PL is not re-energized as its circuit is open at a back contact of T4R which remains locked up over its front contacts in series with T3 and RLR of the register (Fig. 18).

The trunk link (Fig. 16), the T-register link (Fig. 17), and the T-register (Fig. 18) are now ready to receive impulses from the A-register (Fig. 10).

The trunk link (Fig. 16) may be picked up for a second connection immediately after the release of the first and before the associated selector switch has had time to return to normal which may take as much as two seconds for a maximum run. The switch is driven to its home position over a circuit from ground, back CR, ONC3, winding of P to battery. When the switch reaches its home position, ONC3 opens and ONC2 closes, thus should DR be energized at that time, CR operates as described in a previous paragraph. It is necessary to be able to operate DR immediately a T-register is seized, to permit the A-register to send impulses to the T-register even though the selector is off-normal. The T-register, however, may not send out impulses to the group selector until the selector returns to its home position and closes contact ONC1. During the return home, brushes A and B are raised and therefore free of any connection and thus are in no position to disturb the register.

As the average hunt of a trunk link finder and T-register finder is short, the estimated average time for the selection of a T-register is about .5 seconds. The maximum hunt with only one T link free and with the trunk link finder and register finder in the most disadvantageous positions might reach two seconds but the probability of this maximum hunt occurring is extremely remote.

A-REGISTER TRANSMITS TO T-REGISTER

The trunk fundamental circuit after the T-register has been connected is shown at B in Fig. 14. The direction of current flow is reversed. Relay DlR of the T-register operates in series with P+R and rectifier S(+) of the A-register. DlR (Fig. 18) energizes HlR which is the usual slow release relay which does not fall off during impulsing. DlR also closes the circuit of EI from ground, front DlR, back H2R, back PCR₂, EI to battery. As EI advances from position 0 to position 1, PC makes contact momentarily and energizes PCR₃ which locks up and de-energizes EI. BR (Fig. 18) now operates, circuit from ground, winding BR, back CR, terminal 1+6, bank A of EI to battery. The T-register remains in this condition until the A-register commences to transmit.

When the first impulse from the subscriber's dial of the first digit to be trunked is received by the A-register, the series relays and rectifiers are short-circuited over a front contact of RHR as indicated at C in Fig. 14. Each dial impulse is repeated by the A-register to DlR (Fig. 18) immediately after it is received. Each time DlR falls away, it closes a circuit from ground, back DlR, front HlR, winding H2R, terminal 1 bank D of EI, back PCR₅, winding ED4 to battery. PCR₅ operates and prevents ED4 from making more than one step per impulse. ED4 advances to the position corresponding to the number dialed after which DlR remains on its front contact long enough to allow H2R to release, thereby again closing the circuit of EI over its back contact. EI goes from position 1 to position 2.

In the same way the second, third and fourth series of impulses advance digit switches ED5, ED6, ED7 to positions corresponding to the digits dialed by the subscriber.

FOURTH GROUP SELECTOR OPERATES

When ED4 goes to position 1, FR (Fig. 17) operates, circuit from ground, winding FR, front DR, brush F, resistance R–8 (Fig. 18), front BR, back ER to battery. Another circuit is established from battery, front BR, terminals 1 to 10 bank C of ED4, terminal O bank C of EO, winding RSR and in multiple winding PRR via back RGR, back GSR₁, back GVR₂, back GVR₁ to ground. RSR and PRR operate. RSR places a ground on the b wire, circuit from ground, back GVR₁, back GVR₂, front RSR, front BR, brush D of register finder (Fig. 17), front DR, front FR, back ER, brush G of trunk link finder, contact ONCl of group selector (Fig. 16), winding AR to battery. AR locks up and connects the group selector power magnet P to the grounded b wire and the group selector searches for the wanted trunk in the usual way. The cathodes of valves Vl and V2 (Fig. 18) are connected to the a wire over front RSR, front BR, brush C, register link (Fig. 17), front DR, front FR, back ER, brush F, front AR (Fig. 16) to the T brush. RSR operates TA.

When the wanted trunk is found, Vl fires GVl and GVl operates GVR₁ and the selector comes to rest and RSR is released. RTlR tests for a double connection and if successful, EO goes from position 0 to position 1.

PENULTIMATE SELECTOR OPERATES

When ED5 goes to position 1 with EO in position 1, the penultimate selector operates and selects a free final in the same manner as the last group selector selected the penultimate. EO goes to position 2.

"TENS" SELECTED

When ED6 goes to position 1 with EO in position 2, a parallel circuit is established from battery, bank B of ED6 to banks C and D of EO. RSR and RGR are operated simultaneously and the final counts the "tens." When the next to the last "tens" is counted, RFR is operated over bank C of ED6 and bank C of EC. When the proper number of "tens" has been counted, RSR is released, the final comes to rest, and EO goes to position 3.

"UNITS" SELECTED

After the "units" digits have been received, a circuit is established from terminal 5 bank C of EI, terminals 1 to 10, as the case may be, bank C of ED7, thence back over terminal 3 bank C of EO, winding RSR to ground. RSR operates and the "units" are selected.

The T-register (Fig. 18) is adapted to receive calls from Rotary as well as from Universal, Strowger and Toll. In a Strowger-Universal network where Rotary is not involved, the register may be simplified by omitting relays AR, D2R, CR, HRR, RVR and ER, interrupters I₂ and I₁ and escapement switch ER. This apparatus is required only for use in connection with a Rotary office.

T-REGISTER RELEASES

Line free

EI is in position 5. EO is in position 3. When GSR₁ operates, it drives EI to position 6, circuit from ground, back GSR₂, front GSR₁, front RFR, terminal 5 bank D, EI to battery. EI goes to position 6 and places positive battery or brush G of the register finder, circuit from positive battery, resistance R7, terminal 6 bank B of EI, terminal 3 bank D or EO, brush G of T-register link (Fig. 17) through relays AR and IRR and rectifier S(+) in multiple to ground. As will be pointed out, AR (Fig. 17) opens the circuit of DlR (Fig. 18). DlR releases HlR and a circuit is established from ground, back DlR, back HlR, back AR, one winding of RRR, terminal 6 bank A of EI to battery. RRR locks up in series with resistance R6. RRR opens the T brush circuit and releases RLR and RXR (Fig. 18) and T3R and T4R (Fig. 17) but keeps PR energized. RXR returns all escapement switches to their home positions which, when reached, closes a circuit through positions 11 from battery at bank A of ED7 through to R6 to ground. RRR thus short-circuited releases and opens the circuit. The register is now in a position to receive the next call.

Line busy

EI is in position 5. EO is in position 3. GSR₂ operates and establishes a circuit from ground, front GSR₂, front RFR, back PCR₃, EO to battery. EO goes to position 4, in which position negative battery is placed on the G brush, circuit from battery, terminal 4 bank D of EO to brush G. AR (Fig. 17) operates but not IRR. DIR is released and the register returns to normal.

*Slow or incomplete dialing or premature release by calling subscriber*

When a subscriber is slow in dialing or dials an incomplete number or hangs up before completing dialing, the A-register releases, the trunk line is opened at the outgoing end and DIR (Fig. 18) falls away and over its back contact energizes the register release relay RRR. The T-register returns to normal.

*Dead level call*

Unassigned levels or trunk group numbers are connected to local trunks having the corresponding EC potential.

*Short number call*

The calling subscriber may dial a special service number with 2 digits. The T-register will not release in the normal way. When the special service trunk is picked up, a temporary ground is found on the b wire. This operates relay RRR (Fig. 18) over a back contact of RSR. RRR restores the register to normal and releases the T-register link. The T-register link in turn, frees the trunk link and the trunk fundamental circuit again becomes as shown at A in Fig. 14. Relay P—R in the A-register operates and releases the A-register and R-link without metering the call.

*Continuous hunting*

Continuous hunting is permitted up to 40 seconds after the completion of the dialing of the full subscriber's number as on a local call. If a free penultimate or final is not found within that time, timed alarm TA makes its 40 second contact and operates TAR which places negative battery on brush G, thereby operating the busy relay AR in the T-link (Fig. 17). The register releases as on a busy call and the calling subscriber hears the busy tone.

T-REGISTER LINK (FIG. 17) OPERATES

*Line free*

Relays IRR and AR are operated by the T-register. IRR operates ER. AR disconnects DIR of the T-register from the a and b wires and in place thereof connects relay BR of the T-register link. BR operates over the closed trunk loop and locks up AR and ER (Fig. 17) and DR (Fig. 16), over the back contact of RR. The trunk fundamental circuit now becomes as shown at E in Fig. 14, ER connects RR to the a and b wires and applies ringing current to the called line. The circuit at this stage is closed over a front contact of IRR so as to give an immediate ring. When T4R falls away upon the opening of the T brush circuit by the register which takes place when DIR operates RRR (Fig. 18), DR releases and opens the circuit of the register finder brushes A to G. The opening of the F brush circuit releases FR and the opening of the G brush circuit releases IRR, whereupon the ringing circuit is transferred to the ringing generator through the ringing interrupter RI. The calling subscriber hears the ringing tone over the trunk from transformer TT, the primary of which is closed through the ringing tone interrupter RTI. When the called subscriber answers, relay RR operates and releases AR and ER (Fig. 17) and DR of Fig. 16. The T-register link is now restored to normal and ready for the next call. The trunk fundamental circuit becomes as shown at F and then G in Fig. 14.

*Line busy*

Only relay AR (Fig. 17) is operated by the register when the called line is busy. AR opens a circuit of DIR (Fig. 18) of the register and bridges BR (Fig. 17) across the trunk line. BR holds AR operated when the T-register releases. The calling subscriber receives the busy tone over the trunk from transformer TT which is now connected to busy tone interrupter BTI. When the calling subscriber hangs up, BR falls away and releases AR (Fig. 17) and DR of the trunk link (Fig. 16), and the circuit becomes as shown at H in Fig. 14.

*Other calls*

When the T-register releases on a slow call, a dead level call or a short number call, it opens the circuit of the T brush and releases T4R and T3R of the T-register link. T4R releases DR and thus restores the register link to normal.

The T-register link (Fig. 17) is a Universal link suitable for use with incoming trunk links from Rotary as well as from Universal, Strowger and Toll. In a Strowger area where connection with a Rotary office is not involved, the T-register link may be simplified by omitting relays CR and HRR and associated rectifier S(+). These pieces of apparatus are required only when in-trunking from Rotary offices is involved.

TRUNK LINK OPERATES

*Line free*

When the called subscriber answers, the T-register link (Fig. 17) opens the circuit of DR of the trunk link (Fig. 16). DR reconnects JR to the trunk line and RET. to the called line. JR reverses current in the trunk line and operates DRR in the R-link (Fig. 9). At this moment the trunk fundamental circuit becomes as shown at F in Fig. 14. The operation of DRR releases the R-link and transfers the connection to the B-link (Fig. 8) and the fundamental circuit becomes as shown at G in Fig. 14. JR is energized in series with the retardation coil RET. in the B-link. As there may be a very short opening of the trunk loop during the transfer from F to G, CR (Fig. 16) is made slightly slow releasing so that should JR break its front contact, CR will not break its front contact before JR is again energized.

*Release*

At the end of connection, the trunk loop is opened. JR falls away and releases CR. CR drives the group selector home over ONC3. When the home position is reached, ONC3 opens and ONC1 and ONC2 close. It should be noted that the trunk may be seized for another call at any time after CR releases.

IN-TRUNKING FROM A STROWGER OFFICE. T-REGISTER (FIG. 18) OPERATES

TRUNK FUNDAMENTAL CIRCUIT (FIG. 30)

*General*

The essential difference in trunking from Universal to Universal and from Strowger to Universal lies in the fact that in the straight Strowger system, no means is provided for storing the digit impulses for the short interval of time required to pick up the trunk register. The Strowger system is always worked to the limit and often beyond the limit when dialing in rapid succession a low digit such as 1. When this is done, a failure often occurs when all but the last few trunks in the selector level are busy. This point is mentioned to show that since there is no time whatsoever available for register selection, it is necessary that the first digit trunked into a Universal office from a Strowger office be stored in the trunk itself and this is what is done as will hereafter be seen. A full inter-digital time period is thus allowed for register selection. The speed of Universal switches assures positive selection within this time.

In the standard Strowger office, the outgoing trunk repeater (Fig. 31) is used.

Trunk Link Stores First Digit

When the trunk repeater (Fig. 31) at the Strowger office is picked up, the trunk fundamental circuit becomes as shown at A in Fig. 30. JR of the in-trunk link (Fig. 32) operates in series with relays E and F of the out-trunk repeater. Relay F, which controls the metering of the connection at the outgoing end, is differentially disposed at this stage of the connection and does not operate. The repeater repeats the impulses as they are received from the dial and the trunk fundamental circuit becomes as shown at B in Fig. 30. JR (Fig. 32) operates ER which places ground on the common starting lead $x$ to the T-register links (Fig. 17) and test battery over R1 to the T terminal.

The first digit may be received under one of three conditions depending upon the speed with which the subscriber dials and the speed with which the trunk is connected to a T-register. These three conditions are: (1) All dial impulses received before register connected; (2) Register connected during receipt of impulses; (3) Register connected before impulsing commences.

In all three cases the first digit is always received and stored in the trunk, but as the repeating of the impulses to the trunk register obviously cannot commence until the register is connected, there may be many times in which the register will receive the first and second digits almost simultaneously.

With each repeater impulse, JR makes its back contact. ER is slow-releasing and does not fall away during impulsing, thus a circuit is established from ground, back JR, front ER, winding FR through magnet P1 of I. S. A. R. D. (impulse storing and repeating device). P1 advances to a position corresponding to the digit dialed. At the end of the series of impulses, JR remains on its front contact long enough to allow FR to release. When P1 advances, it closes contact C and operates GR which places a ground on the winding DR over back FR.

Trunk Link Connected to T-Register

The T-register link (Fig. 17) hunts for and selects the calling trunk link (Fig. 32), after which the T-register link selects a free register (Fig. 18). Should the register still not be connected when impulsing is finished, case 1, DR (Fig. 32) does not operate. However, should the register be connected during the receipt of impulses, case 2, or before impulsing starts, case 3, DR operates when the series of impulses for the first digit have been sent in and not before. A circuit is then established from ground, front GR (Fig. 32), back FR, winding DR, brush E of trunk link finder (Fig. 17), front DR, brush E of register finder, winding AR (Fig. 18) to battery. As in the case of trunk link (Fig. 16) from a Universal office, DR operates but not AR owing to the high resistance of DR.

DR locks up to ground over a front contact. It disconnects JR from the $a$ and $b$ wires of the trunk line and in place thereof connects the trunk line through to the register over brushes A and B of the register link. JR is retained energized over resistance R3. DR also disconnects the A and B brushes of the selector from the transmission bridge and places a ground on the T brush via a back contact of AR. The trunk link is now ready to pass the impulses for the second digit to the dialing relay DIR in the register circuit (Fig. 18).

For an instant CR (Fig. 32) is placed in parallel via off-normal contact ONC2 with DR but CR promptly operates, locks up and disconnects itself from the E brush.

Trunk Link Repeats First Digit to T-Register

As soon as the register is connected, CR (Fig. 32) operates as previously stated. It closes a circuit from contact C to P1, front CR, interrupter I of P2, winding of P2 to battery. P2 advances step by step. At each step it opens its clutch magnet allowing the escapement pawl to release. At each step it also sends a ground impulse from contact C of P1, front CR, interrupter I, brush C of register link (Fig. 17), back BR (Fig. 18), back PCRs, ED4 to battery. When P2 reaches the position to which P1 has advanced, contact C opens and further impulsing ceases. Interrupter I remains in its normal condition shown on Fig. 32. ED4 advances under the control of P2 to a position corresponding to the number of impulses dialed.

During the repeating of the first series of impulses, CR (Fig. 18) operates and prevents the energization of BR, circuit from ground, interrupter C of P1 (Fig. 32), front CR, brushes D of register link (Fig. 17), back BR (Fig. 18), winding CR to battery.

CR sends EI to position 1, circuit from ground, front CR, terminal O, bank D of EI, winding EI to battery. The trunk fundamental circuit during the repeating of the first digit is shown at B in Fig. 30.

Strowger Repeater Repeats Second, Third and Fourth Digits to T-Register

When contact C (Fig. 32) opens, it releases relay CR (Fig. 18). BR (Fig. 18) is now energized from battery, position 1, bank A of EI.

The energization of DR (Fig. 32) connects the trunk line straight through to the register over the $a$ and $b$ wires and DIR (Fig. 18) operates in series with the loop in the distant Strowger repeater (Fig. 31). When DIR closes its front contact, it energizes TA and EI and EI goes from position 1 to position 2. Thus when DIR operates on the impulses received for the second digit, it transmits them to ED5 and not to ED4 since ED5 is connected to the dialing circuit with EI in position 2. The third and fourth digits are received in the usual way and ED6 and ED7 go to corresponding positions. The trunk fundamental circuit during the dialing of the second, third and fourth digits is shown at C in Fig. 30.

Selectors Operate

When BR (Fig. 18) operates which it does as previously stated upon the completion of the sending in of the first digit, a circuit is established from battery, front BR, terminal 1 to 10, as the case may be, bank C of ED4, position 0 bank c of ED, winding RSR and PRR to ground at the back of GVR1. RSR and PRR operate in the usual way and the fourth group selector operates. The following operation of the penultimate selector and the final selector is the same as previously described.

SUCCEEDING OPERATIONS

From now on the connection within the Universal office proceeds as though the call had originated in a distant Universal office. When the T-register releases upon the completion of selection, the call is transferred to the T-register link and BR (Fig. 17) remains energized in series with relays F and E in the Strowger repeater (see D in Fig. 30).

When the called subscriber answers and the T-register link (Fig. 17) releases, the call is returned to the trunk line and DR (Fig. 32) is released. The called line supervisory relay S2R operates and reverses the connection of JR to the trunk line as shown at E in Fig. 30. This reversal of current causes relay F in the Strowger repeater (Fig. 31) to operate and meter the call. At the end of a connection, the calling subscriber hangs up and relay A (Fig. 31) opens the trunk loop. Relay A energizes slow-releasing relay C over the front contact of B. C keeps the out-trunk repeater busy long enough to allow slow-releasing relay ER (Fig. 32) to fall off and release the connection in the Universal office. The fourth group selector is driven to its home position over the back contacts of CR. ER (Fig. 32), while slow-releasing, nevertheless releases some time before C of Fig. 31, thus the fourth selector is well on its way home before the trunk can be picked up for a second call. However, the trunk may be picked up for a second call before P reaches its home position and the first digit is stored in the trunk. This first digit cannot, of course, be repeated to a register until a T-register link and a T-register are picked up and this cannot be done until ONC2 closes.

IN-TRUNKING FROM A ROTARY OFFICE. T-REGISTER (FIG 18) OPERATES

TRUNK FUNDAMENTAL CIRCUIT (FIG. 33)

*Trunk link (Fig. 34) connected to T-register (Fig. 18)*

The trunk fundamental circuit after the trunk has been picked up at the Rotary office, but before the Rotary A-register has received the first digit to be trunked, is shown at A in Fig. 33. It will be seen that the trunk circuit is open. When the register has received the first digit to be trunked, the trunk loop is closed through the outstepping relay OSR in the A-register and the trunk fundamental circuit becomes as shown at B in Fig. 33. High resistance relay JIR (Fig. 34) operates but not OSR in the Rotary A-register. JIR causes a T-register link (Fig. 17) to seize the trunk and then a T-register (Fig. 18). When the T-register is connected, the trunk fundamental circuit becomes as shown at C in Fig. 33.

The resistance of the DR relay (Fig. 34) in-trunk links from Rotary is made low, and when it is connected in series with AR (Fig. 18) of the register, the latter operates and disconnects the a and b wires from the dialing relay DIR and in place thereof connects ground and relay D2R to the a and b wires, respectively, over back contacts of ER, AR sends EI to position 1.

T-REGISTER REVERTS TO A-REGISTER IN ROTARY OFFICE

When interrupter I₁ closes its circuit to battery, D2R (Fig. 18) operates in series with OSR in the Rotary A-register. D2R locks up to battery over one front contact and disconnects I₁ at a back contact. Immediately after I₁ opens its circuit to battery, I₂ closes its circuit to battery and operates RVR over a front contact of D2R. RVR does two things: (1) It grounds the b wire, thereby short-circuiting OSR while holding D2R. (2) Over another front contact it operates the corresponding ED escapement switch in the usual way through H2R. OSR releases and counts one step. I₂ operates at 14 to 16 steps a second and each time it closes a circuit of RVR, OSR counts one step and escapement switch ED advances one step. When the number of impulses sent out correspond to the digit dialed, OSR opens the trunk circuit and when I₂ opens its circuit to battery, D2R falls off.

When D2R was first energized, it closed a circuit of escapement switch ER. ER passed rapidly from position 1 to position 10 where its circuit was opened at bank B. The purpose of ER will be explained later on, and it will suffice to say here than when D2R fell off at the end of the first series of impulses, it sent EI to the next position over position 10 bank A of ER.

When the second digit has been received by the A-register, it again closed the fundamental circuit and D2R and OSR operated as just explained. All digits are transmitted to the T-register in the same way. The trunk fundamental circuit during reverting is shown at D in Fig. 33. Should the calling subscriber fail to dial promptly, causing the A-register to wait, the fundamental circuit opens again and becomes as shown at E in Fig. 33, but as soon as the subscriber commences to dial again, the reverting circuit D, is again restored.

ROTARY A-REGISTER RELEASES

When the A-register in the Rotary office has received the last of the reverting impulses, it releases and transfers the connection at the outgoing end to the Rotary connection circuit. At the same time D2R (Fig. 18) over its back contact sends EI to position 5, after which ER goes to position 0 and closes a circuit from ground, back D2R, position 0 bank A of ER, position 5 bank B of EI, front AR, winding ER to battery. ER disconnects D2R and ground from the a and b wires and in place thereof connects high resistance relay HRR. HRR operates in series with the supervisory relay S2R in the Rotary connection circuit and the fundamental circuit becomes as shown at F in Fig. 33. S2R does not operate, but HRR, as before stated, does and prevents the premature operation of the release relay RRR. The circuit remains in this condition until selection at the incoming office under the control of the T-register is complete.

SUCCEEDING OPERATIONS

Upon the completion of selection, the T-register releases as on a call from a Universal office. The T-register link (Fig. 17) operates as above described, but in this case CR operates and bridges the high resistance relay HRR across the a and b wires instead of relay BR. The fundamental circuit thus becomes as shown at G in Fig. 33. CR (Fig. 17) operates when ER (Fig. 18) changes the polarity of the current on the F brush of the register finder from negative to positive. FR is made slightly slow-releasing so that it does not open its front contact during the transfer.

When the T-register link (Fig. 17) releases on a free line call, DR (Fig. 34) releases and bridges J2R across the a and b wires. As the called subscriber has answered, S2R is energized and the low resistance winding of J2R shunts its high resistance winding. The trunk fundamental circuit becomes as shown at H in Fig. 33. S2R in the Rotary connection circuit operates and meters the call.

At the end of a connection, the calling subscriber hangs up and the connection circuit opens the trunk line, whereupon J2R of the trunk link (Fig. 34) falls away and releases CR. CR returns the selector to its home position. The trunk may be seized for a second call before the selector reaches its home position. DR may be operated but not CR since ONC2 closes only in the home position.

RELEASE

Should the subscriber hang up and release the connection while the fundamental circuit is in the position shown at A in Fig. 33, nothing happens at the incoming end of the trunk since no relays have been operated.

Should the calling subscriber hang up while the fundamental circuit is as shown at B, J1R (Fig. 34) releases CR which, in turn, releases CSR (Fig. 17) and T1R and T2R in case they have been operated. The trunk link (Fig. 34) and trunk register link (Fig. 17) are restored to normal when the relays release.

Should the subscriber hang up after the T-register has been picked up and before selection by the A-register is complete (C, D and E of Fig. 33), special provision is made for release. The Rotary system does this by first opening the trunk line if it is not already open so that D2R (Fig. 18) may release. It then closes the trunk line for a short interval and then reopens it. During the short closure, D2R operates and energizes ER but before ER has had time to pass position 2, D2R makes its back contact and energizes the register release relay RRR, after which the release takes its normal course.

Should the subscriber hang up after the completion of selection by the A-register (F, Fig. 33), but before the completion of selection by the T-register, HRR (Fig. 18) falls off and operates the release relay RRR.

OMISSION OF HOLD-OVER FEATURE

The T-register (Fig. 18) does not include the hold-over feature of the A-register (Fig. 10) for the following reasons: (1) There is no way of holding a Strowger trunk busy while releasing the calling subscriber. (2) The A-register hold-over covers failure on the part of the T-register properly to receive all impulses from the A-register in a Universal office; and (3) The local A-register sooner or later tests all of the group and final selectors except the in-trunk selector and these selectors and the associated links and inter-office cable pairs are generally given special attention.

What is claimed is:

1. In a telephone exchange system, a plurality of numerically designated lines, a plurality of numerically designated groups of trunks, a connection between a calling and a called line including a plurality of trunks and a plurality of identical successively operated numerical selector switches, common means for said numerical switches for operating each in accordance with one digit of the called number, means common to the numerical switches to cause each to hunt for an idle trunk in the group designated by the corresponding digit of the called number, said common means comprises an electrical discharge device having a plurality of electrodes, a circuit local to the common means for applying variable D. C. potentials to one electrode, and circuits including said switches for applying variable D. C. potentials to another electrode, said discharge device being adjusted to operate only when the potentials applied to the two terminals bear a predetermined relationship to one-another.

2. In a telephone exchange system, a plurality of numerically designated lines, a plurality of numerically designated groups of trunks, a connection between a calling and a called line including a plurality of trunks and a plurality of successively operated switches, said switches including a first and a second line finder, a first group selector, a plurality of other group selectors and a final selector, said first line finder and other group selectors being identical with one-another, said second line finder and first group selector being identical with one-another but different from the last-mentioned switches, means common to said selectors for operating each in accordance with one digit of the called number, and means common to the group selectors to cause each to hunt for an idle trunk in the group designated by the corresponding digit of the called number.

3. In a telephone exchange system, a plurality of numerically designated lines, a plurality of numerically designated groups of trunks, a connection between a calling and a called line including a plurality of trunks and a plurality of successively operated switches including a first and a second line finder, a first group selector, a plurality of other group selectors and a final selector, each of said finders and selectors having identical terminal banks, brushes and magnets for moving the brushes over the terminal banks, two relays associated with each first line finder and other group selector for controlling the circuits thereof, the construction and circuits of said two relays being the same in each finder and selector, a single relay associated with each second line finder and first group selector for controlling the circuits thereof, the construction and circuit of said single relay being identical with one-another, means common to said selectors for operating them in accordance with at least one digit of the called number; and means common to the group selectors to cause them to hunt for an idle trunk in the designated groups.

4. In a telephone exchange system, a plurality of numerically designated lines, a plurality of numerically designated groups of trunks, a connection between a calling and a called line including a plurality of trunks and a plurality of successively operated switches, said switches including a first and a second line finder, a first group selector, a plurality of other group selectors and a final selector, each of said finders and selectors having identical terminal banks, brushes and magnets for moving the brushes over the terminal banks, two relays associated with each first line finder and other group selector for controlling the circuits thereof, the construction and circuits of said two relays being the same in each finder and selector, a single relay associated with each second line finder and first group selector for controlling the circuits thereof, the construction and circuit of said single relays being identical with one-another, means common to said selectors for operating the group selectors in accordance with one digit and the final selector in accordance with two digits of the called number, means common to the selectors to cause the group selectors to hunt for an idle trunk in the designated groups, and the final selector to hunt for an idle one of a group of lines.

5. In a telephone exchange system, a plurality of numerically designated lines, a plurality of numerically designated groups of trunks, a connection between a calling and a called line including a plurality of trunks and a plurality of successively operated switches, said switches including a first and a second line finder, a first group selector, a plurality of other group selectors and a final selector, each of said finders and selectors having identical terminal banks, brushes and magnets for moving the brushes over the terminal banks, said trunks terminating in the banks of the second line finders and group selectors, and said lines in the banks of the first line finders and final selectors, groups of trunks terminating also in banks of final selectors, two relays associated with each first line finder and other group selector for controlling the circuits thereof, the construction and circuits of said two relays being the same in each finder and selector, a single relay associated with each second line finder and first group selector for controlling the circuits thereof, the construction and circuit of said single relays being identical with one-another, a plurality of register controllers, means for temporarily associating a register controller with the connection, and means in the controller for operating each group selector in accordance with one digit and the final selector in accordance with two digits of the called number, for causing each group selector to hunt for and seize an idle trunk in a designated group, and for operating said final selector to hunt for an idle trunk if a group of trunks is selected by it.

6. A telephone system according to claim 5, and in which each register controller comprises two electrical discharge tubes having a plurality of electrodes, circuits in the register controller for applying variable potentials to one electrode of the first tube depending on the designation of the called line, circuits controlled over brushes and terminals of the group and final selectors for applying variable potentials to a second electrode of the first tube depending on the terminals engaged by the selector brushes, circuits for applying a predetermined potential to one electrode of the second tube, circuits controlled in brushes and terminals of the second line finder and final selector for applying variable potentials to a second electrode of the second tube depending on the busy or idle condition of the terminals engaged by their brushes, a third electrical discharge tube having a plurality of electrodes, a circuit applying a predetermined potential to one electrode of the third tube, a circuit including a brush and a terminal of the first line finder for applying variable potentials to a second electrode of the third tube depending on the condition of the line represented by said terminal, said tubes being adjusted to operate only when the potentials applied to their two electrodes bear a predetermined relationship to one-another.

7. A telephone system according to claim 5, and in which the lines and trunks are connected to the brushes and terminals of said switches over two talking conductors, a test and a control conductor, the register controller being temporarily associated only with the talking conductors, energizing and locking circuits for the single relay and for the first one of the two relays in each switch over one of the talking conductors, and for the second relay over the control conductor, and paths from the test conductor of each switch to the test conductor and one of the talking conductors of the preceding switch over the associated relay contacts.

8. In an automatic telephone exchange system, groups of subscribers' lines, groups of first and second non-numerical switches, groups of numerical selector switches, each belonging to a different numerical selecting stage, a register at the central exchange for controlling the successive setting of said selector switches in accordance with the numerical designation of the called line to establish a connection between the calling and called subscribers over an idle selector switch belonging to each selecting stage, an A-link connecting each first non-numerical switch to a second non-numerical switch, a B-link connecting the second non-numerical switch to a selector belonging to the first selecting stage, a group of R-links, a B-link finder and a register finder for each R-link, an allotter, a circuit closed upon the initiation of the call for actuating said allotter to select an idle A-link for use, means operative thereupon for actuating the first non-numerical switch connected with the said A-link to connect the A-link with the calling line, means also controlled by said allotter for selecting one of the R-links for use, means operative thereupon for causing the B-link finder of the selected R-link to connect the R-link with a B-link, means operative thereupon for actuating the second non-numerical switch of the selected B-link to connect it with the selected A-link, an actuating circuit for the register finder of the selected R-link closed upon the connection of an R-link with a B-link to connect it with a register, and means for releasing the register and disconnecting the R-link from the B-link upon the completion of the connection.

9. In an automatic telephone exchange system, groups of subscribers' lines, groups of first and second non-numerical switches, groups of numerical selector switches, each belonging to a different numerical selecting stage, a register at the central exchange for controlling the successive setting of said selector switches in accordance with the numerical designation of the called line to establish a connection between the calling and called subscribers over an idle selector switch belonging to each selecting stage, an A-link connecting the brushes of each first non-numerical switch to a second non-numerical switch, a B-link connecting the second non-numerical switch to a selector belonging to the first selecting stage, a group of R-links, a B-link finder and a register finder for each R-link, an allotter, a circuit closed upon the initiation of the call for actuating said allotter to select an idle A-link for use, means operative thereupon for actuating the first non-numerical switch connected with the said A-link to connect the A-link with the calling line, means also controlled by said allotter for selecting one of the R-links for use, means operative thereupon for causing the B-link finder of the selected R-link to connect the R-link with a B-link, means operative thereupon for actuating the second non-numerical switch of the selected B-link to connect it with the selected A-link, an actuating circuit for the register finder of the selected R-link closed upon the connection of an R-link with a B-link to connect it with a register, a source of potential, a first relay in the allotter and a second relay in the register, means for operating said first relay and means for operating said second relay, said two means being responsive to the application of two potentials having a predetermined relationship to one-another, operating circuits for the allotter and the first non-numerical switch controlled by the first relay, operating circuits for the second non-numerical switch and the selector switches controlled by the second relay, means local to the relays for applying one of the two potentials to their operating circuits, circuits including said allotter and first non-numerical switch for applying the second potential to the circuit of the first relay, circuits including the second non-numerical switch and the selector switches for applying the second potential to the circuit of the second relay, and means for releasing the register and disconnecting the R-link from the B-link upon the completion of the connection.

10. In an automatic telephone exchange system, groups of subscribers' lines, groups of first and second line finder switches, groups of selector switches, each belonging to a different numerical selecting stage, each of said switches having a bank of terminals and a set of brushes cooperating therewith, a plurality of registers at the central exchange, each adapted to control the successive operations of said selector switches in accordance with the numerical designation of the called line to establish a connection between the calling and called subscribers over an idle selector switch belonging to each selecting stage, an A-link connecting the brushes of each first line finder to the terminals of the second line finders, a B-link connecting the brushes of each second line finder to the brushes of a selector belonging to the first selecting stage, groups of R-links, a B-link finder and a register finder for each R-link, a normally inactive allotter, a circuit closed upon the initiation of the call for actuating said allotter to select an idle A-link for use, means operative thereupon for actuating the first line finder connected with the selected A-link to hunt for and seize the calling line, means controlled by said allotter for selecting a group of R-links, means operative thereupon for causing the B-link finders of the selected group of R-links to hunt simultaneously to connect an R-link with a B-link, means operative upon the selection of a B-link for actuating the register finder of the connected R-link to connect it with a register, means operative upon the connection with a register for actuating the second line finder of the selected B-link to engage with its brushes the terminals of the selected A-link, means operative thereupon for releasing the allotter, and means for releasing the register and disconnecting the R-link from the B-link upon the completion of the connection.

11. In an automatic telephone exchange system, a plurality of subscribers' lines, a plurality of trunk lines, a plurality of non-numerical switches, a plurality of selector switches of various numerical selecting stages including a final stage, each of said switches having a terminal bank consisting of sets of terminals and sets of brushes cooperating with the terminals, off-normal contacts for each switch, the closure and opening of which is mechanically controlled by the associated switch during its movement from normal to an actuated position, a magnet for each of said switches for controlling the movement of its brushes from normal to an actuated position and from the actuated position back to the normal position, a maximum of two relays having contacts associated with each switch, a first group of common relays for a group of non-numerical switches, a second group of common relays for a group of selectors of the first stage, an impulse register variably operable under the control of a calling subscriber, means including a non-numerical switch and the two groups of common relays for associating said register with the calling subscriber's line upon the initiation of a call thereon, and circuits for controlling the operation of a switch in each selecting stage for establishing a talking connection between the calling and called subscribers over brushes and terminals of all said switches, said circuits being under the sole control of the register, the relays, contacts, brushes and terminals of said switches, and the two groups of common relays, and circuits for returning all said switches to normal under the sole control of the second group of common relays, and the relays, contacts, terminals and brushes in all said switches.

12. In an automatic telephone exchange system, a plurality of subscribers' lines, a plurality of trunk lines, a plurality of first and second line finder switches, a plurality of selector switches of various numerical selecting stages including a final stage, each of said switches having a terminal bank consisting of sets of four terminals, each set individual to a line in the first finders and in the final selector and to a trunk in all the other switches, a set of four brushes for each switch cooperating with the terminals, off-normal contacts for each switch, the closure and opening of which is mechanically controlled by the associated switch during its movement from normal to an actuated position, a magnet for each of said switches for controlling the movement of its brushes from normal to an actuated position and from the actuated position back to the normal position, a maximum of two relays having contacts associated with each switch, a first group of relays common to a group of line finders, a second group of relays common to a group of second line finders and selectors of the first stage, an impulse register variably operable under the control of a calling subscriber, means including a first and a second line finder, and said two groups of common relays for associating said register with the calling subscriber's line upon the initiation of a call thereon, and circuits for controlling the operation of a switch in each selecting stage for establishing a talking connection between the calling and called subscribers over brushes and terminals of all said switches, said circuits being under the sole control of the register, the relays, contacts, brushes and terminals of said switches, and the two groups of common relays, and circuits for returning all said switches to normal under the sole control of the second group of common relays, and the relays, contacts, terminals and brushes in all said switches.

13. In an automatic telephone exchange system, a plurality of subscribers' lines, a plurality of trunk lines, a plurality of first and second non-numerical switches, a plurality of selector switches of various numerical selecting stages including a final stage, each of said switches having a terminal bank consisting of sets of four terminals, a set of four brushes for each switch cooperating with the terminals, off-normal contacts for each switch, the closure and opening of which is mechanically controlled by the associated switch during its movement from normal to an actuated position, a magnet for each of said switches for controlling the movement of its brushes from normal to an actuated position and from the actuated position back to the normal position, a maximum of two relays having contacts associated with each switch, an A-link between the brushes of each first and second non-numerical switch, a B-link between each second non-numerical switch and each selector of the first stage, two relays in each A-link, seven relays in each B-link, an impulse register variably operable under the control of a calling subscriber, means including a first and a second non-numerical switch, an A and a B-link for associating said register with the calling subscriber's line upon the initiation of a call thereon, and circuits for controlling the operation of a switch in each selecting stage for establishing a talking connection between the calling and called subscribers over brushes and terminals of all said numerical and non-numerical switches, said circuits being under the sole control of the register, the relays, contacts, brushes and terminals of said switches, and the relays of the A-link and B-link, and circuits for returning all said switches to normal, under the sole control of the relays in the B-link and the relays, contacts, terminals and brushes in all said switches.

14. In an automatic telephone exchange system, a plurality of subscribers' lines, a plurality of trunk lines, a plurality of first and second line finder switches, a plurality of group selector switches of various numerical selecting stages including a final stage, each of said switches having a terminal bank consisting of sets of four terminals, each set individual to a line in the first finders and in the final selector and to a trunk in all the other switches, a set of four brushes for each switch cooperating with the terminals, off-normal contacts for each switch, the closure and opening of which is mechanically controlled by the associated switch during its movement from normal to an actuated position, a magnet for each of said switches for controlling the movement of its brushes from normal to an actuated position and from the actuated position back to the normal position, one relay having contacts associated with the second line finder and first group selector and two relays having contacts associated with each other switch, an A-link between the brushes of each first line finder and the terminals of the second line finders, a B-link between the bruhes of each second line finder and a group selector of the first stage, two relays in each A-link, seven relays in each B-link, an impulse register variably operable under the control of a calling subscriber, means including a first and a second line finder, an A and a B-link for associating said register with the calling subscriber's line upon the initiation of a call thereon, and circuits for controlling the operation of a switch in each selecting stage for establishing a talking connection between the calling and called subscribers over brushes and terminals of all said finder and selector switches, said circuits being under the sole control of the register, the relays, contacts, brushes and terminals of said switches, and the relays of the A-link and B-link, and circuits for returning all said switches to normal under the sole control of the relays in the B-link and the relays, contacts, terminals and brushes in all said switches.

15. In an automatic telephone exchange system, a plurality of numerically designated subscribers' and trunk lines, a calling device for each subscriber's line to produce impulses representing the various digits of the called number groups of first and second line finders, each of said finders having terminals and cooperating brushes and a magnet for moving said brushes, the subscribers' lines terminating in the terminals of the first line finders, characteristic potentials applied to certain terminals of the first line finders to indicate the condition of the lines to which they are individual, groups of selectors including first, intermediate and final selectors having terminals and cooperating movable brushes and a magnet for operating said brushes, trunks terminating in the terminals of said selectors except the final selectors in the terminals of which subscribers' lines terminate, an A-link terminating in the brushes of each first line finder and multipled to the terminal bank of the second line finder, a B-link connecting the brushes of each second line finder with the brushes of a first selector, groups of R-links, a plurality of impulse registers at the exchange variably operable in accordance with the impulses produced by the calling devices, an allotter having movable and cooperating stationary contacts, connections from the A-links and R-links to the stationary contacts of the allotter, a source of D. C. potential, characteristic D. C. potentials applied to some of the stationary contacts of the allotter to indicate the busy and idle condition of the A-links, a plurality of multi-electrode electronic tubes, two associated with each register and one with said allotter, an operating magnet for the movable contacts of said allotter, a circuit for the operating magnet of the allotter controlled by the discharge tube associated with the allotter, means in said allotter for applying various D. C. potentials to one electrode of the allotter discharge tube, means associated with the contacts of said allotter for applying various D. C. potentials to another electrode of the allotter discharge tube, a control circuit for the magnets of the first line finders controlled by the allotter discharge tube, a circuit for applying various potentials to an electrode of the discharge tube of said allotter including contacts of the allotter and the brushes and terminals of the first line finders, a circuit for selecting a group of R-links controlled by said allotter upon the selection of an A-link, a B-link finder switch at one end and a register finder switch at the other end of each R-link, means for operating the B-link finders of the group of R-links selected by the allotter to connect one of said group of R-links with a B-link, a circuit closed thereupon for operating the register finder of the last-mentioned R-link to connect it with a register, a circuit for operating the magnet of the second line finders controlled by one of the discharge tubes of the selected register, a circuit for applying various D. C. potentials to an electrode of the last-mentioned discharge tube including contacts of the allotter and the brushes and terminals of the second line finder, means in the selected register for applying various D. C. potentials to another electrode of the last-mentioned tube, circuits for the operating magnets of the selectors controlled by the two discharge tubes of the selected register circuits for applying various D. C. potentials to one electrode of one register tube from the terminals of all said selectors, a circuit for applying various D. C. potentials to the second register tube from the terminals of the final selector, successively operated means in the register for applying to another electrode of the first register tube various D. C. potentials depending on the successive digits of the called number, and means in the register for applying to another electrode of the second register tube D. C. potentials determined by the tens digit of the called number.

16. In an automatic telephone exchange system, a plurality of subscribers' lines, a plurality of non-numerical switches, a plurality of links, contacts in said switches for connecting a calling line with a link, an allotter switch for selecting one of said switches for operation, a source of potential, a relay in said allotter having an operating circuit which becomes effective when two potentials are applied thereto having a predetermined relationship to one-another, a circuit local to the allotter for applying one potential to the operating circuit, circuits including the allotter and the selected non-numerical switch for applying the second potenial to the operating circuit, a magnet for operating each switch, and a circuit for the magnet of the selected switch controlled by said relay.

17. In a telephone exchange system, a plurality of subscribers' lines, a plurality of trunk lines, a group of switches for connecting a calling line with a trunk, each switch having contacts and a magnet for operating them, an allotter for selecting an idle switch for operation, an electronic discharge device having cathode, grid and anode electrodes in said allotter, means for applying variable potentials to the grid electrode, a line and a cut-off relay for each subscriber's line having contacts for applying a characteristic potential to the cathode through the contacts of the selected switch, means in the allotter responsive to the flow of currrent from the cathode to the anode for controlling the magnet of the selected switch, a magnet for the allotter also controlled by the last-mentioned means, and a relay in said allotter for applying a predetermined potential to the grid electrode.

18. In an automatic telephone exchange system, a plurality of subscribers' lines, a plurality of finders, each finder having contacts in which said lines terminate, brushes cooperating with said contacts, and a magnet for controlling the movement of said brushes with respect to said contacts, an allotter for selecting an idle finder for operation, an electronic discharge device having cathode, grid and anode electrodes in said allotter, a relay in the allotter for applying variable potentials to the grid electrode, a line and a cut-off relay for each subscriber's line having contacts for applying a characteristic potential to the cathode through the contacts and brushes of the selected finder, a gaseous discharge device in the allotter responsive to the flow of current from the cathode to the anode for controlling the closing and opening of the magnet circuit of the selected finder, a magnet for the allotter also controlled by said gaseous discharge device, and a relay in said allotter operated upon the initiation of a call on a line for applying a predetermined potential to the grid electrode.

19. In an automatic telephone exchange system, a plurality of subscribers' lines, a plurality of line finders, each line finder having contacts in which said lines terminate, brushes cooperating with said contacts, and a magnet for moving the brushes over said contacts, an allotter for selecting an idle line finder for operation, an electronic discharge device having cathode, grid and anode electrodes in said allotter, a relay in the allotter for applying variable potentials to the grid electrode, a line and a cut-off relay for each subscriber's line having contacts for applying a characteristic potential to the cathode through the contacts and brushes of the selected line finder, and means in the allotter responsive to the flow of current from the cathode to the anode for controlling the closing and opening of the magnet circuit of the selected line finder.

20. In an automatic telephone exchange system, a plurality of subscribers' lines divided into groups, a group of line finders for each group of lines, each line finder having terminals in which said lines terminate, brushes cooperating with said terminals, and a magnet for moving the brushes over the terminals, an allotter for each group of line finders having sets of terminals connected with the line finders of its group brushes and a magnet for moving the allotter brushes over the allotter terminals, an electronic discharge device having cathode, grid and anode electrodes in each allotter, a first and a second relay in the allotter for applying variable potentials to the grid electrode, a line and a cut-off relay for each subscriber's line having contacts for applying a characteristic potential to the cathode through the terminals and brushes of a line finder, a gaseous discharge device in each allotter responsive to the flow of current from the cathode to the anode for controlling the magnet circuit of the allotter and the line finders, a circuit for the first relay controlled by the line relays of the associated group of lines, and a circuit for the second relay closed upon the selection of a set of terminals by the allotter brushes.

21. In an automatic telephone exchange system, a plurality of subscribers' lines, groups of normally inactive first and second nonnumerical switches, a group of selector switches, each of said switches having an operating magnet, a normally inactive allotter common to said lines, means for actuating said allotter upon the initiation of a call on any one of said lines, A-links connecting the first with the nonnumerical switches, a B-link connecting each second non-numerical switch with a group selector, means controlled by said allotter upon the initiation of a call on a line for selecting an A-link and a B-link, means controlled by said allotter upon the selection of an A-link for operating a first non-numerical switch to connect the selected A-link with the calling line, means controlled by the allotter upon the selection of a B-link for operating a second non-numerical switch to connect the selected B-link with the selected A-link, and means operative thereupon for releasing said allotter.

22. In an automatic telephone exchange system, a plurality of subscribers' lines, groups of normally inactive first and second line finder switches, a group of selector switches, each of said switches having stationary terminals and movable brushes cooperating therewith and a magnet for controlling the movement of the brushes, a normally inactive allotter common to said lines, means for actuating said allotter upon the initiation of a call on any one of said lines, A-links connecting the brushes of the first line finders with the terminals of the second line finders, a B-link connecting the brushes of each second line finder with the brushes of a group selector, means controlled by said allotter upon the initiation of a call on a line for selecting an A-link and a B-link, means controlled by said allotter upon the selection of an A-link for operating the first finder switch connected with the selected A-link for engaging with its brushes the terminals of the calling line, means controlled by the allotter upon the selection of a B-link for operating the second line finder of the selected B-link to engage with its brushes the selected A-link and means operative thereupon for releasing said allotter.

23. In an automatic telephone exchange system, a plurality of subscribers' lines, groups of normally inactive first and second line finder switches, a group of selector switches, each of said switches having stationary terminals and movable brushes cooperating therewith and a magnet for controlling the movement of the brushes, an allotter for selecting an idle first line finder for operation, an A-link connecting the brushes of the selected first line finder with the terminals of second line finders and said allotter, a device in said allotter for controlling the closing and opening of the selected first line finder magnet circuit, a control circuit for said device extending over the terminals and brushes of the first line finder to said device, a B-link connecting the brushes of each second line finder with the brushes of a group selector, means also controlled by said allotter for selecting a B-link, means controlled at a distant point and means in said allotter for controlling the magnet circuit of the second line finder of the selected B-link.

24. In an automatic telephone exchange system, a plurality of subscribers' lines, groups of normally inactive first and second line finder switches, a group of selector switches, each of said switches having stationary terminals and movable brushes cooperating therewith and a magnet for controlling the movement of the brushes, an allotter for selecting an idle first line finder for operation, an A-link connecting the brushes of the selected first line finder with the terminals of second line finders and said allotter, a device in said allotter for controlling the closing and opening of the selected first line finder magnet circuit, a control circuit for said device, a source of potential, said control circuit becoming effective only when two potentials are applied thereto having a predetermined relationship to one-another, a circuit local to the allotter for applying one potential, a circuit including brushes of the allotter and first line finder for applying the second potential, a B-link connecting the brushes of each second line finder with the brushes of a group selector, means also controlled by said allotter for selecting a B-link, and means in said allotter for controlling the magnet circuit of the second line finder of the selected B-link.

25. In an automatic telephone exchange system, a plurality of subscribers' lines, a plurality of first and second non-numerical switches, each having an operating magnet, a plurality of link circuits, an allotter, a magnet for operating the allotter to select a link circuit, a relay in the allotter for closing a circuit for the magnet of one of said first non-numerical switches to connect a calling line with the selected link circuit, and a relay in each link circuit having contacts for connecting the operated first non-numerical switch with a second non-numerical switch.

26. In an automatic telephone exchange system, a plurality of subscribers' lines, a plurality of first and second line finder switches, each of said switches having terminals and cooperating brushes, an operating magnet for the brushes of each line finder, a link circuit connected with the brushes of each first line finder, an allotter having cooperating contacts for selecting a first and a second line finder for operation, means in said allotter for controlling over its contacts and said link circuit the closing and opening of the magnet circuit of a first line finder to seize the calling line, a relay in said link circuit having contacts, and a circuit for said relay controlled over contacts of said allotter for connecting the brushes of the first line finder over the link circuit with the terminals of the second line finder.

27. In an automatic telephone exchange system, a plurality of subscribers' lines, a plurality of first and second line finder switches, each of said switches having terminals and cooperating brushes, an operating magnet for the brushes of each line finder, link circuits between the brushes of the first and the terminals of the second line finders, an allotter having cooperating contacts for selecting a first and a second line finder for operation, means in said allotter for controlling over its contacts and said link circuits the closing and opening of the magnet circuits of the first line finders, a relay in each link circuit having contacts normally connecting the brushes of the associated first line finder with the associated second line finder terminals, and an actuating circuit for said relay closed over contacts of said allotter upon the selection of a first line finder.

28. In an automatic telephone exchange system, a plurality of subscribers' lines, a plurality of first and second line finder switches, each of said switches having terminals and cooperating brushes, an operating magnet for the brushes of each line finder, link circuits connecting the brushes of the first line finders with terminals of the second line finders, an allotter for selecting a link circuit, means operative thereupon for actuating the first line finder of the selected link circuit to seize the calling line, means for operating a second line finder to engage with its brushes the terminals of the selected link, a relay in said link circuit having contacts in the link circuit, and an actuating circuit for said relay closed during the operation of the allotter and opened upon the selection of the link-circuit by the second line finder.

29. In an automatic telephone exchange system, a plurality of subscribers' lines, a plurality of first and second line finder switches, each of said switches having terminals and cooperating brushes, an operating magnet for the brushes of each line finder, link circuits between the brushes of each first and the terminals of the second line finders, each link circuit comprising two talking conductors and a control conductor, an allotter having cooperating contacts for selecting a first and a second line finder for operation, means in said allotter for controlling over its contacts and said link circuits the closing and opening of the magnet circuits of the associated first line finders to seize the calling line, means for operating the magnet of the selected second line finder to move the brushes to the terminals of the link circuit connected with the selected first line finder, a relay in each link circuit having armatures and back contacts normally connecting the talking and control conductors of the link circuit from the brushes of the first line finder to the associated second line finder terminals, and an energizing circuit for said relay closed over contacts of said allotter during the operation of the allotter and until the selection of the link circuit by the second line finder.

30. In an automatic telephone exchange system, a plurality of subscribers' lines, a plurality of groups of first and second line finder switches and a plurality of first group selector switches for establishing a connection between a calling and a called line, each switch having a terminal bank and brushes cooperating therewith, a group of A-links serving a group of subscribers' lines, one end of each link being connected with the brushes of a different first line finder, said links being divided into three groups, the other end of each link in each group being multipled to the terminal bank of a different group of second line finders, a B-link connecting the brushes of each second line finder with the brushes of each first group selector, said second line finders and B-links being divided into two sub-groups, each serving different sub-groups of A-links, as a first choice, and as a second choice, respectively, an allotter, an operating circuit for the allotter closed upon the initiation of a call for selecting an idle A-link, a relay for controlling the selecting of a B-link if the selected A-link is accessible as first choice to one sub-group of second line finders, and another relay for controlling the selecting of a B-link if the selected A-link is accessible as first choice to the second sub-group of second line finders.

31. In an automatic telephone exchange system, a plurality of subscribers' lines, a plurality of groups of first and second line finder switches and a plurality of first group selector switches for establishing a connection between a calling and a called line, each switch having a terminal bank and brushes cooperating therewith, a group of A-links serving a group of subscribers' lines, one end of each link being connected with the brushes of a different first line finder, said links being divided into three groups, the other end of each link in each group being multipled to the terminal bank of a different group of second line finders, a B-link connecting the brushes of each second line finder with the brushes of each first group selector, said second line finders and B-links being divided into two sub-groups, each serving different sub-groups of A-links, as first choice, and as second choice, respectively, an allotter, an operating circuit for the allotter closed upon the initiation of a call for selecting an idle A-link, a first and a second group of R-links, a plurality of registers, a relay for controlling the connection of a register with a B-link over the first group of R-links if the selected A-link is accessible as first choice to one sub-group, and another relay for controlling the connection of a register with a B-link over the second group of R-links if the selected A-link is accessible as first choice to the second sub-group of second line finders.

32. In an automatic telephone exchange system, a plurality of subscribers' lines, a plurality of groups of first and second line finder switches and a plurality of first group selector switches for establishing a connection between a calling and a called line, each switch having a terminal bank and brushes cooperating therewith, a group of A-links serving a group of subscribers' lines, one end of each link being connected with the brushes of a different first line finder, said links being divided into three groups, the other end of each link in each group being multipled to the terminal bank of a different group of second line finders, a B-link connecting the brushes of each second line finder with the brushes of each first group selector, said second line finders and B-links being divided into two sub-groups, each serving different sub-groups of A-links, as first choice, and as second choice, respectively, an allotter, an operating circuit for the allotter closed upon the initiation of a call for selecting an idle A-link, a first and a second group of R-links, a plurality of registers, a B-link finder at one end and a register finder at the other end of each R-link, a relay for starting all the B-link finders of the first group of R-links to hunt for a B-link if the selected A-link is accessible as first choice to one sub-group of second line finders, another relay for starting all the B-link finders of the second group of R-links if the selected A-link is accessible as first choice to the second sub-group of second line finders, and a starting circuit closed for the register finder of the R-link, the B-link finder of which has seized a B-link.

33. In an automatic telephone exchange system, a plurality of subscribers' lines divided into groups, each of which is sub-divided into two sub-groups, a plurality of groups of first and second line finder switches and a plurality of first group selector switches for establishing a connection between a calling and a called line, the first line finders having banks of terminals, brushes in some first line finders engaging as a first choice the terminals of one sub-group and as a second choice the terminals of the other sub-group, brushes for other first line finders engaging as a first choice the terminals of the other sub-group and as a second choice the terminals of said one sub-group of lines, a group of A-links, one end of each link being connected with the brushes of a different first line finder, a terminal bank for each second line finder to which the other ends of the A-links are multipled, brushes for some second line finders cooperating with the terminals connected to brushes of first line finders having said one sub-group as a first choice and brushes for other second line finders co-operating with terminals connected with first line finders having the other sub-group as a first choice and the first as a second choice, a B-link connecting the brushes of each second line finder with a first group selector, an allotter for each sub-group of lines, an operating circuit for the allotter of a sub-group closed upon the initiation of a call on one of the lines of the sub-group, means operative thereupon for selecting an idle A-link having as a first choice the calling sub-group and if all said A-links are busy then one having as a second choice the calling sub-group, a first and a second group of R-links, a plurality of registers, a B-link finder at one end and a register finder at the other end of each R-link, starting relays for each group of R-links, one responsive to one and the other to another allotter, a terminal bank for each B-link finder of the first group of R-links connected as a first choice with the B-links having access as a first choice to said one sub-group and as a second choice with the B-links having access as a first choice to the other sub-group, the bank of the B-link finder of the second group being connected in the reverse order of choices to said B-links, and a starting circuit closed for the register finder of the R-link, the B-link finder of which has seized a B-link.

34. The system according to claim 33, and in which multi-electrode electrical discharge tubes are provided at the allotter and each register, local circuits at the allotter and register for applying characteristic potentials to one electrode of the tube there provided, a circuit extending over the allotter, and another extending over the allotter, A-link and first line finder for applying characteristic potentials to a second electrode to the allotter tube depending, respectively, on the conditions of the A-link and the subscribers' lines engaged by the first line finder, a circuit extending over the second line finder, B-link finder, R-link and register finder for applying characteristic potentials to a second electrode of the register tube depending on the condition of the A-links engaged by the second line finder, said tubes being adjusted to operate only when the potentials applied to their electrodes bear a predetermined relationship to one-another, means controlled by the allotter tube for stopping the movement of the allotter and first line finder, and means controlled by the register tube for stopping the movement of the second line finder.

35. In an automatic telephone exchange system, a plurality of lines, means including a line finder and group selector switch for connecting a calling with a called line, said switches having four brushes linked to one-another, sets of four terminals for each switch in which the lines terminate, a magnet for each switch for moving said brushes over said terminals, a relay for each switch, a first and second talking conductor and third conductor forming part of the link between the brushes and connected to the first, second and third brush, respectively, of each switch, a fourth conductor connected to the fourth brush of each switch over a back contact and armature of the associated relay, a connection from the fourth to the first brush of each switch over said armature and a front contact of the associated relay, an energizing and a first locking circuit for each relay including the second talking conductor, a second locking circuit for each relay including a fifth conductor forming part of the link, and two energizing circuits for each magnet, one in parallel with the first and the second in parallel with the second locking circuit of the associated relay.

36. In an automatic telephone exchange system, a plurality of lines, means including a line finder and group selector switch for connecting a calling with a called line, each of said switches having four brushes, sets of four terminals in which the lines terminate, and a magnet for moving said brushes over said terminals, three off-normal contacts for each switch, the first and second closed only in the normal and the third only in off-normal positions of the brushes, a relay for each switch, a first and second talking conductor and a third conductor connected to the first, second and third brush, respectively, of each switch, a fourth conductor connected to the fourth brush of each switch over a back contact and armature of the associated relay, a connection from the fourth to the first brush of each switch over said armature and a front contact of the associated relay, an energizing circuit for each relay including the associated first off-normal contact and the second talking conductor, a locking circuit for each relay around the first off-normal contact, a second locking circuit for each relay over the third off-normal contact and a fifth conductor of the associated switch, two energizing circuits for each magnet, one in parallel with the first and the second in parallel with the second locking circuit of the associated relay, a loop closed over the second off-normal contacts of the switches, means for selecting said switches for use, and a test relay connected in said loop circuit controlling said means for selecting.

37. In an automatic telephone exchange system, a plurality of lines, means including a group of line finder and a group of group selector switches for connecting a calling with a called line, each of said switches having four brushes, sets of four terminals in which the lines terminate, and a magnet for moving said brushes over said terminals, three off-normal contacts for each switch, the first and second closed only in the normal and the third only in off-normal positions of the brushes, a relay for each switch, a B-link connecting the brushes of each finder towards the brushes of a selector, a first and second talking conductor and a third conductor in each B-link connected to the first, second and third brush, respectively, of the associated switches, a fourth conductor in each B-link connected to the fourth brush of the associated switches over a back contact and armature of the associated relay, a connection from the fourth to the first brush of each switch over said armature and a front contact of the associated relay, an energizing circuit for each relay including the associated first off-normal contact and the second talking conductor, a locking circuit for each relay around the first off-normal contact, a second locking circuit for each relay over the third off-normal contact and a fifth conductor of the associated switch, two energizing circuits for each magnet, one in parallel with the first and the second in parallel with the second locking circuit of the associated relay, a loop closed over the second off-normal contacts of the switches, means for selecting a B-link for use, and a test relay connected in the loop circuit of the selected B-link controlling said means for selecting, a source of D. C. potential, a switching relay in each B-link for connecting said source with the talking conductors, a supervisory relay in each B-link bridged across the talking conductor brushes of the associated group selector and having a contact applying potentials to the third, fourth and fifth conductors leading to the group selector and finder of a B-link.

38. In an automatic telephone exchange system, a plurality of first lines and a second line, means including a selector for connecting a first with the second line, said selector having four brushes and sets of four terminals cooperating therewith, each set of terminals being individual to a first line and the brushes to the second line, an operating magnet for said brushes, a connection between each first line and the first two of its terminals, a relay for each first line connected with its third terminal, means controlled over the first line and by said relay for applying characteristic D. C. potentials to the fourth terminal of the line, a first and a second relay for said selector, an energizing and a locking circuit for said first relay over the wire of the second line leading to the second brush, an energizing and locking circuit for the second relays over the wire of the second line leading to the third brush, a path from the first wire of the second line over front contacts of the first and second relays to the fourth brush, a path from the fourth brush over a front contact of the second and a back contact of the first relay to the fourth wire of the second line, an energizing circuit for the magnet controlled in a front contact of the first relay, a second energizing circuit for the magnet controlled in a back contact of the second relay, and a switching device associated with the second line.

39. In an automatic telephone exchange system, a plurality of subscribers' lines, a line and a cut-off relay for each line, means including a finder switch for interconnecting said lines, said finder having four brushes and sets of four terminals cooperating therewith, each set of terminals being individual to a line, an operating magnet for said brushes, a connection between the talking conductors of each line and the first two terminals, a connection from the winding of the cut-off relay to the third terminal, a connection from the fourth terminal of each line over armatures of the cut-off and line relays of the line, a source of potential characteristic for the calling condition of the line connected to a front contact and a source of potential characteristic of the designation of the calling line connected with a back contact of the line relay armature, a wire connected to each of three brushes, a first and second relay for said line finder, an energizing and a locking circuit for the first relay over the second and for the second relay over the third wire, a fourth wire connected with the fourth brush over a back contact and armature of the first and a front contact and armature of the second relay, a connection from the first wire to a front contact cooperating with the last-men and a second relay for said line finder, an energiz-circuit for the magnet parallel with that of the first relay and controlled in a front contact thereof, a second energizing circuit for the magnet controlled in a back contact of the second relay, and switching means connected with said wires controlled by all the line relays.

40. In an automatic telephone exchange system, a plurality of full metallic subscribers' lines, a line and a cut-off relay for each line, means including a first line finder for interconnecting said lines, said line finder having four brushes and sets of four terminals cooperating therewith, each set of terminals being individual to a line, wires connected to three brushes, an operating magnet for said brushes, off-normal contacts for said line finder, a connection between the two conductors of each subscriber's line and the first two terminals, a connection from the winding of the cut-off relay to the third terminal, a connection from the fourth terminal of each line over armatures of the cut-off and line relays of the line, a source of D. C. potential characteristic for the calling condition of the line connected to a front contact and a source of D. C. potential characteristic of the designation of the calling line connected with a back contact cooperating with said line relay armature, a first and a second relay for said line finder, an energizing circuit for said first relay including an off-normal contact and the wire leading to the second brush cooperating with one of the first two terminals, a circuit for the second relay including another off-normal contact and the wire leading to the third brush cooperating with the third terminal, a fourth wire connected over a back contact and armature of the first and an armature and back contact of the second relay connected to the fourth brush, locking circuits for said relays around said off-normal contacts, a circuit for said magnet over a front contact and armature of the first relay and parallel with the energizing circuit thereof, a second circuit for the magnet over an off-normal contact and a back contact of the second relay, ground potential applied to the first wire over an off-normal contact, characteristic D. C. potential applied over an off-normal contact and a back contact of the second relay to the armature thereof which is connected with the fourth wire over an armature of the first relay, a front contact cooperating with the last-mentioned armature and connected with the first wire, switching means connected with the four wires and a circuit for said switching means multipled to front contacts of the line relays.

41. In an automatic telephone exchange system, a plurality of first lines and a second line, means including a selector for connecting a first with the second line, said selector having four brushes and sets of four terminals cooperating therewith, each set of terminals being individual to a first line and the brushes to the second line, an operating magnet for said brushes, a connection between each first line and the first two of its terminals, a relay for each first line connected with its third terminal, means controlled by said relay for applying a characteristic D. C. potential to the fourth terminal of the line, a first and a second relay for said selector, an energizing and a locking circuit for said first relay over the wire of the second line leading to the second brush, an energizing and locking circuit for the second relays over the wire of the second line leading to the third brush, a path from the first wire of the second line over front contacts of the first and second relays to the fourth brush, a path from the fourth brush over a front contact of the second and a back contact of the first relay to the fourth wire of the second line, a connection from the second wire of the second line to the third brush, two energizing circuits for the magnet, one over a front contact of the first and the other over a back contact of the second relay, and switching devices associated with the first and second lines.

42. In an automatic telephone exchange system, a plurality of lines, a selector having four brushes in which a first line terminates and sets of four terminals in which other lines terminate, a magnet for moving said brushes over said terminals, off-normal contacts, a relay, a first, a second and a third conductor for the first line connected to the first, second and third brush, respectively, a fourth conductor for the first line connected to the fourth brush over a back contact of the relay, a connection from the fourth to the first brush over a front contact of the relay, an energizing circuit for the relay including an off-normal contact and the second conductor, a locking circuit for said relay around the off-normal contact, a second locking circuit for the relay over another off-normal contact and a fifth conductor of the first line, and two energizing circuits for the magnet, one in parallel with the first and the second in parallel with the second locking circuit.

43. In an automatic telephone exchange system, a plurality of lines, a selector having four brushes in which a first line terminates and sets of four terminals in which the other lines terminate, a magnet for moving said brushes over said terminals, two off-normal contacts, the first closed only in the normal and the second only in off-normal positions of the brushes, a relay, a first and second talking conductor and third conductor for the first line connected to the first, second and third brush, respectively, a fourth conductor for the first line connected to the fourth brush over a back contact and armature of the relay, a connection from the fourth brush to the first talking conductor over said armature and a front contact of the relay, an energizing circuit for the relay including the first off-normal contact and the second talking conductor, a locking circuit for said relay around the first off-normal contact, a second locking circuit for the relay over the second off-normal contact and a fifth conductor of the first line, and two energizing circuits for the magnet, one in parallel with the first and the second in parallel with the second locking circuit.

44. In an automatic telephone exchange system, a plurality of lines, a selector having four brushes in which a first line terminates and sets of four terminals in which the other lines terminate, a magnet for moving said brushes over said terminals, three off-normal contacts, the first and second closed only in the normal and the third only in off-normal positions of the brushes, a relay, a first and second talking conductor and third conductor for the first line connected to the first, second and third brush, respectively, a fourth conductor for the first line connected to the fourth brush over a back contact and armature of the relay, a connection from the fourth brush to the first talking conductor over said armature and a front contact of the relay, an energizing circuit for the relay including the first off-normal contact and the second talking conductor, a locking circuit for said relay around the first off-normal contact, a second locking circuit for the relay over the third off-normal contact and a fifth conductor of the first line, two energizing circuits for the magnet, one in parallel with the first and the second in parallel with the second locking circuit, a sixth and seventh conductor for the first line connected with one-another over the second off-normal contact, and means for selecting said selector for use controlled over said sixth and seventh conductors.

45. In an automatic telephone exchange system, a plurality of lines, a selector having four brushes in which a first line terminates and sets of four terminals in which the other lines terminate, a magnet for moving said brushes over said terminals, three off-normal contacts, the first and second closed only in the normal and the third only in off-normal positions of the brushes, a relay, a first and second talking conductor for the first line connected to the first and second brush, respectively, a third conductor for the first line connected to the fourth brush over a back contact and armature of the relay, a connection from the fourth to the first brush over said armature and a front contact of the relay, an energizing circuit for the relay including the first off-normal contact and the second talking conductor, a locking circuit for said relay around the first off-normal contact, a second locking circuit for the relay over the third off-normal contact and a fourth conductor of the first line, and two energizing circuits for the magnet, one in parallel with the first and the second in parallel with the second locking circuit.

46. In an automatic telephone system, a plurality of groups of trunks, each group having a different numerical designation, a selector switch having a terminal bank with a plurality of rows, each row accommodating a plurality of trunks, the terminals of some of the trunks belonging to the different groups having the same positions in several rows and those of the balance of the trunks belonging to the different groups having different positions in several rows, a set of brushes for the selector and a magnet for controlling the movement of the brushes consecutively over the trunk terminals in the successive rows.

47. In an automatic telephone system, a plurality of groups of trunks, each group having a different numerical designation and comprising a certain number of trunks, a selector switch having a terminal bank with adjacent rows, the odd and even terminals of each row forming two different sets, said rows being arranged in groups, each of which comprises one-half of said certain number, one-half the trunks belonging to the first group being connected to the first sets in the first group of rows, one-half the trunks in the second group to the first sets in the second group of rows, etc. and one-half the trunks in the last group to the first sets in the last group of rows, the other half of the trunks of the various groups being connected to the second sets of terminals in groups of rows different from the ones to the first sets of which trunks of the same group are connected, a set of brushes for the selector arranged to engage the terminals of either set, a magnet for controlling the movement of the brushes in one direction over the first sets of terminals in the successive rows, and in the opposite direction over the second sets of terminals in the successive rows.

48. In an automatic telephone system, a plurality of groups of trunks, each group having a different numerical designation and comprising a certain number of trunks, a selector switch having a terminal bank with adjacent rows, the odd and even terminals of each row forming two different sets, said rows being arranged in groups each of which comprises one-half of said certain number, one-half the trunks belonging to the first group being connected to the first sets in the first group of rows, one-half the trunks in the second group to the first sets in the second group of rows, etc. and one-half the trunks in the last group to the first sets in the last group of rows, the other half of the trunks of the various groups being connected to the second sets of terminals in groups of rows different from the one to the first sets of which trunks of the same group are connected, a set of brushes for the selector arranged to engage the terminals of either set, a magnet for controlling the movement of the brushes in one direction over the first sets of terminals in the successive rows, and in the opposite direction over the second sets of terminals in the successive rows.

49. In an automatic telephone system, ten groups of trunks, each group having a different numerical designation and comprising twelve trunks, a selector switch having a terminal bank with adjacent rows of eight terminals each, the four odd terminals in each row belonging to a first set and the four even terminals to a second set, six trunks belonging to the first group being connected to the first sets in the first six rows, six trunks in the second group to the first sets in the second group of six rows, etc. and the six trunks in the tenth group to the first sets in the tenth group of six rows, the other sixty trunks each of the ten groups being connected to the second sets of terminals in groups of rows different from the ones to the first sets of which trunks of the same group are connected, a set of four brushes for the selector arranged to engage the four terminals of either set, a magnet for controlling the movement of the brushes in one direction over the first sets of terminals in successive rows, and in the opposite direction over the second sets of terminals in successive rows.

50. In an automatic telephone exchange system, a plurality of lines, a bank of terminals consisting of sets of four terminals, four brushes cooperating with said terminals, a magnet for moving said brushes with respect to said terminals from a normal position into any one of a plurality of operative positions and from the operative position back to a normal position, talking conductors of lines terminating in the first and second brushes and first and second terminals of each set, control and test conductors leading to the third and fourth terminals and brushes, a first and a second relay, a plurality of off-normal contacts controlled by the movement of said brushes, an energizing circuit for the first relay including an off-normal contact and the talking conductor leading to the second brush, a locking circuit for the first relay around said off-normal contact, a path from the third brush to the control conductor including a front contact of the second relay, an energizing circuit for the second relay including an off-normal contact and the control conductor, a locking circuit for the second relay around the off-normal contact, a path from the fourth brush to the test conductor over a back contact of the first relay and a front contact of the second relay, a potential applied to the other talking conductor over an off-normal contact closed only in the off-normal position and a back contact of the second relay, a potential applied to the other talking conductor over a normally closed off-normal contact, a potential applied to said other talking conductor over a back contact and armature of the second relay and a front contact and armature of the first relay, a connection from the last-mentioned armature of the first relay and a back contact to the control conductor, a connection from the last-mentioned armature and a front contact of the second relay to the fourth brush, and energizing circuits for the magnet, one over back contacts of said relays and an off-normal contact, and the other over front contacts of said relays and one of the talking conductors.

51. An automatic telephone system according to claim 50, and a time alarm having a contact, a circuit for the time alarm including a front contact of the first and a back contact of the second relays and the control brush and terminal, and an energizing circuit for said magnet including the time alarm contact, a front contact of the first relay, back contact of the second relay and off-normal contact.

52. In an automatic telephone system, a plurality of numerically designated subscribers' lines, a final selector serving a group of lines and having a terminal bank consisting of adjacent rows of terminals, each row accommodating two lines, said rows being arranged in groups of ten separated by a row not connected to any line, a set of brushes for the selector adapted to engage the terminals of a line and a magnet for controlling the movement of the brushes successively to engage the line terminals in the different rows.

53. In an automatic telephone system, a plurality of numerically designated subscribers' lines, a final selector serving one hundred lines and having a terminal bank consisting of adjacent rows of eight terminals each, the odd terminals of each row forming one set and belonging to one line and the even terminals forming a second set and belonging to a different line, each group of ten rows being separated by a busy row not connected to any line, a set of four brushes for the selector adapted to engage the four terminals of either set, and a magnet for controlling the movement of the brushes in one direction over the first sets of terminals in the successive rows, and in the opposite direction over the second sets of terminals in the successive rows.

54. In an automatic telephone system, a plurality of numerically designated subscribers' lines, a final selector serving one hundred lines and having a terminal bank consisting of adjacent rows of eight terminals each, the odd terminals of each row forming one set and belonging to one line and the even terminals forming a second set and belonging to a different line, said rows being arranged in five adjacent groups of ten rows, the groups being separated by a busy row not connected to any line, an additional group of rows adjacent the fifth group, a set of four brushes for the selector adapted to engage the four terminals of either set, a magnet for controlling the movement of the brushes in one direction over the first sets of terminals in the successive rows, and in the opposite direction over the second sets of terminals in the successive rows.

55. In an automatic telephone system, a plurality of numerically designated lines, each having talking and test conductors, a plurality of selectors, each having a first set of contacts, one contact for each conductor, and one set for each line, a second set of contacts including a test contact cooperating with the first sets, means including said selector for connecting the calling with the called line, means including a relay in each selector for applying a characteristic D. C. potential to each test contact of each first set of contacts, a circuit for operating said relay when the selector is taken into use, a control relay having an operating circuit, a source of D. C. potential, said operating circuit becoming effective when two D. C. potentials are applied thereto having a predetermined relationship to one another, means variably operable in accordance with the designation of the called line for applying one D. C. potential to said operating circuit, a path including a test brush of a selector and one of the talking conductors for applying the second D. C. potential to said operating circuit, and a magnet for each selector to control the movement of one set of contacts relative to the other controlled by said control relay.

56. The automatic telephone system according to claim 55, and in which the relationship between the two potentials applied to the operating circuit depends on the difference in voltage.

57. In an automatic telephone system, a plurality of numerically designated lines comprising talking and test conductors, a plurality of selectors, each having a set of contacts including a test contact to which said lines are multipled and a second set of contacts including a test contact cooperating therewith, means including said selector for connecting a calling line with the called line, means including a relay in each selector for applying a characteristic D. C. potential to each test contact of the first set, a circuit for operating said relay when the selector is taken into use, a multi-electrode electric discharge tube, means variably operable in accordance with the designation of the called line for applying characteristic D. C. potentials to one electrode, means for connecting the test brush of a selector over a talking conductor with another electrode of the tube, said tube being adjusted to operate only when a predetermined relationship exists between the potentials applied to said two electrodes, a second relay responsive to the operation of said tube, and a magnet for each selector to control the movement of one set of contacts relatively to the other controlled by the second relay.

58. In an automatic telephone system, a plurality of numerically designated lines comprising talking and test conductors, a plurality of selectors, each having a bank of terminals, including a test terminal, to which said lines are multipled and a set of four brushes including a test brush cooperating therewith, means including the brushes and terminals of a selector for connecting the talking and test conductors of a calling line with the called line, a source of D. C. potential of characteristic value connected with each test terminal, a relay in each selector controlling the last-mentioned connection, a circuit for operating said relay when the selector is taken into use, a multi-electrode electric discharge tube, means variably operable in accordance with the designation of the called line for applying from said source characteristic potentials to one electrode, means for connecting the test brush of a selector over a talking conductor with another electrode of the tube, said tube being adjusted to operate only when a predetermined difference in voltage exists between the potentials applied to the two electrodes, a second relay responsive to the operation of said tube, and a magnet to move the selector brushes over the terminals controlled by the second relay.

59. In an automatic telephone system, a plurality of numerically designated subscribers' lines comprising talking and test conductors, a plurality of groups of trunk lines, each having talking and test conductors and each group having a different numerical designation, a plurality of selectors, each having a bank of terminals to which said trunks are multipled and a set of brushes including a test brush cooperating therewith, each trunk having a set of terminals including a test terminal in the bank, means including the brushes and terminals of a selector for connecting the talking and test conductors of a calling line over the talking and test conductors of a trunk with the called line, a source of D. C. potential connected with the test terminals so that the potential applied to the test terminals of each numerical group differs by a predetermined number of volts from the nearest numerical group, a relay in each selector controlling the last-mentioned connection, a circuit for operating said relay when the selector is taken into use, a multi-electrode electric discharge tube, means variably operable in accordance with the called line number for applying from said source varying potentials to one electrode, for each number said predetermined number of volts being less than for the next number and another predetermined number of volts being more than to the test terminal of the correspondingly numbered trunk, means for connecting the test brush of a selector over a talking conductor with another electrode of the tube, said tube being adjusted to operate only when the potential difference between said two electrodes is the last-mentioned number of volts, a second relay responsive to the operation of said tube, and a magnet for each selector to move its brushes over the terminals controlled by the second relay.

60. In an automatic telephone system, a plurality of numerically designated subscribers' lines comprising talking and test conductors, a plurality of groups of trunk lines, each having talking and test conductors and each group having a different numerical designation, a plurality of selectors, each having a bank of terminals to which said trunks are multipled and a set of four brushes including a test brush cooperating therewith, each trunk having a set of four adjacent terminals including a test terminal in the bank, means including the brushes and terminals of a selector for connecting the talking and test conductors of a calling line over the talking and test conductors of a trunk with the called line, a source of D. C. potential connected with the test terminals so that the potential applied to the test terminals of each numerical group differs by four volts from the nearest numerical group, a relay in each selector controlling the last-mentioned connection, a circuit for operating said relay when the selector is taken into use, a multi-electrode electric discharge tube, means variably operable in accordance with the called line number for applying from said source varying potentials to one electrode, for each numerical value of a digit four volts less than for the next value and two volts more than to the test terminal of the trunk designated by the corresponding digit, means for connecting the test brush of a selector over a talking conductor with another electrode of the tube, said tube being adjusted to operate only when the potential difference between said two electrodes is two volts, a second relay responsive to the operation of said tube, and a magnet for each selector to move its brushes over the terminals controlled by the second relay.

61. In an automatic telephone system, a plurality of numerically designated lines, means including a selector for connecting a calling with a called line, said selector having a first set of contacts with which the calling line is connected and groups of second sets of contacts, a magnet for moving the first and second sets of contacts relative one another, a source of D. C. potential, connections for applying from said source potentials characteristic for the designations of the individual lines in each group to the second set of contacts, a relay responsive to said potentials controlling the circuit of said magnet, and a second relay for counting the number of groups relative to which the first contact has been moved also controlling the circuit of said magnet.

62. In an automatic telephone system, a plurality of numerically designated lines, a selector for connecting a calling with a called line, said selector having a set of brushes and sets of terminals arranged in groups, a magnet for moving said brushes over said terminals, D. C. potentials characteristic for the designations of the individual lines in each group applied to a terminal of each set, a relay having a control circuit, a calling device, means responsive to said device for applying variable potentials to said control circuit, a path from the control circuit to the terminals, said relay being operated when the two potentials applied to its control circuit bear a predetermined relationship to one-another, a circuit for said magnet controlled by the relay, a device for counting the number of groups traversed by the brushes also controlling the circuit of said magnet, and means controlled by the calling device for controlling the operation of the counting device.

63. In an automatic telephone system, a plurality of numerically designated subscribers' lines, means including a selector for connecting a calling with a called line, said selector having a set of brushes with which the calling line is connected and sets of terminals arranged in groups, a magnet for moving said brushes over said terminals, a source of D. C. potential, connections for applying potentials characteristic for the designations of the individual lines in each group to a terminal of each set, an electrical discharge tube responsive to said potentials controlling the circuit of said magnet, a device for counting the number of groups traversed by the brushes also controlling the circuit of said magnet, and means operable in accordance with the called number for controlling the operation of said tube and device.

64. In an automatic telephone exchange system, a plurality of numerically designated lines, a selector, said selector having groups of contacts and contacts separating the groups, means including a magnet for establishing a connection with a line over one of said contacts, a source of D. C. potential, connections for applying a characteristic potential to each contact of each group to indicate its numerical position, a busy potential applied to the contacts separating said groups, a calling device, a register, a first and a second relay in said register having control circuits, digit switches in the register variably operable in accordance with the operation of the calling device, means controlled by the one digit switch for applying different potentials to the control circuit of the first relay depending on the operation of the digit switch, a connection for applying a predetermined potential to the control circuit of the second relay, a path leading from the selector contacts to the control circuits of the two relays, the first relay being operable only when the potentials applied to its control circuit bear a predetermined relationship to one-another, and the second relay being operable only when said busy potential is applied to its control circuit, a circuit for the selector magnet controlled by said relays, and a counting switch in said register jointly controlled by the second relay and a digit switch.

65. In an automatic telephone exchange system, a plurality of numerically designated lines, means including a final selector for connecting a calling and a called line, said selector having groups of terminals and terminals separating the groups, a brush, a magnet for moving said brushes over said terminals, a source of D. C. potential, a relay for applying a different D. C. potential to each terminal of each group to indicate its numerical position, a busy D. C. potential applied to the terminals separating said groups, a calling device for each line, a register, means for temporarily associating said register with the called line, two multi-electrode discharge tubes in said register, two switches in the register variably operable in accordance with the tens and units digits, respectively, of the called number, a path leading to one of the electrodes of the first tube, means controlled by the units switch for applying ten different potentials to said path depending on the operation of the units switch, a connection for applying a predetermined potential to one electrode of the second tube, a second path leading from the selector brush to the second electrodes of the two tubes, the first tube being adjusted to operate only when the potentials applied to its two electrodes bear a predetermined relationship to one-another, and the second tube so as to operate only when said busy potential is applied to its second electrode, a control relay for ecah tube responsive to the operation thereof, a circuit for the selector magnet controlled by the tube relays, and a counting switch in said register jointly controlled by the relay of the second tube and the tens digit switch.

66. In an automatic telephone exchange system, a plurality of numerically designated lines, means including a final selector for connecting a calling and a called line, said selector having groups of terminals and terminals separating the groups, a brush, a magnet for moving said brushes over said terminals, a source of D. C. potential, a relay for applying a different D. C. potential to each terminal of each group to indicate its numerical position, a busy D. C. potential applied to the terminals separating said groups, a calling device for each line, a register, means for temporarily associating said register with the calling line, two multi-electrode discharge tubes in said register, two switches in the register variably operable in accordance with the tens and units digits, respectively, of the called number, a path leading to one of the electrodes of the first tube, means controlled by the units switch for applying ten different potentials to said path depending on the operation of the units switch, a connection for applying a predetermined potential to one electrode of the second tube, a second path leading from the selector brush to the second electrodes of the two tubes, the first tube being adjusted to operate only when the potentials applied to its two electrodes bear a predetermined relationship to one-another, and the second tube so as to operate only when said busy potential is applied to its second electrode, a control relay for each tube responsive to the operation thereof, a circuit for the selector magnet controlled by the tube relays, a counting switch in said register jointly controlled by the relay of the second tube and the tens digit switch, a control switch for successively connecting in circuit the tens and units digit switches, and a busy signal actuated by the operation of the relay of the second tube only after the units switch had been connected in circuit by the control switch.

67. In an automatic telephone system, a plurality of numerically designated subscribers' lines comprising talking and test conductors, a plurality of final selectors, each having a bank of terminals, divided into groups of ten, to which said lines are multipled and a set of four brushes including a test brush cooperating therewith, each line having a set of four adjacent terminals including a test terminal in the bank, means including a final selector for connecting the talking and test conductors of a calling line with the called line, a source of D. C. potential connected with the test terminals so that ten different potentials are applied to the test terminals in each group, a predetermined D. C. potential applied to test terminals separating said groups, a relay in each selector controlling the connection of the source with the terminals, a circuit for operating said relay when the selector is taken into use, a first and a second multi-electrode electric discharge tube, means variably operable in accordance with the units digit of the called number for applying from said source varying potentials to one electrode of the first tube, means for applying a predetermined characteristic potential to one electrode of the second tube, means for connecting the test brush of a selector over a talking conductor with a second electrode of the first and second tubes, said tubes being adjusted to operate only when a predetermined relationship exists between the potentials applied to their two electrodes, a second relay responsive to the operation of the first tube, a third relay responsive to the operation of the second tube, a switch variably operated in accordance with the tens digit of the called number, and a magnet for each selector to move its brushes over the terminals jointly controlled by the third relay and said switch and controlled also solely by the second relay.

68. An automatic telephone system according to claim 67, and in which the second tube operates every time the test brush engages a test terminal separating the groups, and a second switch operated by the third relay and cooperating in the control of the magnet circuit.

69. An automatic telephone system according to claim 67, and in which a time alarm switch is operated after the sending of the units impulses, a hold-over relay energized by the time alarm switch after a predetermined lapse of time, a locking circuit for the hold-over relay controlled by the two tube relays, and a release circuit for the register controlled by the hold-over relay.

70. In an automatic telephone exchange system, a plurality of numerically designated subscribers' and groups of trunk lines, means including selectors arranged in a plurality of stages for connecting a calling with a called line, each of said selectors having electromagnetic means to perform a numerical operation to select a group of trunks and a hunting operation to seize an idle trunk in the selected group, a calling device for each subscriber's line, a register having a plurality of switches, one for each selecting stage, controlled by the calling device, each having a plurality of operating positions into one of which it is set by the digit of the called line number sent by the calling device at a predetermined rate of speed, control means in the register variably operable in accordance with the setting of the switches, circuits for associating the control means with the successive selector stages, and a control circuit established from the control means to the electromagnetic means of each selector stage for controlling the numerical operation of the selector at a different rate of speed.

71. In an automatic telephone exchange system, a plurality of numerically designated lines, an impulse sender for each line to send out impulses representing the digits of the called number, means including a plurality of group selectors for connecting a calling with a called line, each of said selectors belonging to a different numerical stage and having a terminal bank and brushes cooperating therewith, trunks leading from the terminal banks of one group of selectors to the brushes of the next group of selectors, a register common to all said group selectors, a plurality of switching means in said register corresponding to the numerical stages of said selectors, means including a subscriber's calling device for operating said switching means in accordance with the various digits of the called number, circuits for starting the brushes of a selector to move when the operating of a switching means in said register commences in accordance with the corresponding digit, and means controlled by each switching means for stopping the corresponding selector on a trunk designated by the digits dialled.

72. In an automatic telephone exchange system, a plurality of numerically designated lines, an impulse sender for each line adapted to send out impulses representing the digits of the called number, means including a first, a penultimate and a final group of selectors for connecting a calling with a called line, each of said selectors having a terminal bank and brushes cooperating therewith, trunks leading from the terminal banks of one group of selectors to the brushes of the next group of selectors, a register common to all said groups of selectors, a first, a penultimate and a final switching means in said register corresponding to said selectors, circuits for operating said switching means in accordance with the various digits of the called number, circuits for starting the brushes of a selector to move when the dialing of the corresponding digit to said register commences, and means controlled by each switching means for stopping the corresponding selector on a line designated by the digits dialled.

73. In an automatic telephone exchange system, a plurality of numerically designated lines, an impulse sender for each line adapted to send out impulses representing the digits of the called number, means including a first, an intermediate and a final group of selectors for connecting a calling with a called line, each of said selectors having a terminal bank and brushes cooperating therewith, trunks leading from the terminal banks of one group of selectors to the brushes of the next group of selectors, a register common to all said groups of selectors, a first, a penultimate and a final switching means in said register corresponding to said selectors, circuits for operating said switching means in accordance with the various digits of the called number, circuits for starting the brushes of a selector to move when the dialing of the corresponding digit to said register commences, and means controlled by each switching means for stopping the corresponding selector on a line designated by the digits dialled.

74. In an automatic telephone exchange system, a plurality of numerically designated lines, an impulse sender for each line adapted to send out impulses representing the digits of the called number, means including a first, penultimate and a final group of selectors for connecting a calling with a called line, each of said selectors having a terminal bank and brushes cooperating therewith, trunks leading from the terminal banks of one group of selectors to the brushes of the next group of selectors, a register common to all said groups of selectors, a first, a penultimate and a final switching means in said register corresponding to said selectors, circuits for operating said switching means in accordance with the various digits of the called number, circuits for starting the brushes of a selector to move when the dialing of the corresponding digit to said register commences, and means controlled by each switching means for stopping the corresponding selector on a line designated by the digits dialled.

75. In an automatic telephone exchange system, a plurality of numerically designated subscribers' and groups of trunk lines, means including selectors arranged in a plurality of stages for connecting a calling with a called line, each of said selectors having electromagnetic means to perform a numerical operation to select a group of trunks and a hunting operation to seize an idle trunk in the selected group, a calling device for each subscriber's line, a register having a plurality of switches, one for each selecting stage, controlled by the calling device, each having a plurality of operating positions into one of which it is set by impulses representing the digit of the called line number sent by the calling device at a rate of speed determined by that of the calling device, control means in the register variably operable in accordance with the setting of the switches, circuits for associating the control means with the successive selector stages, and a control circuit established from the control means to the electromagnetic means of each selector stage immediately upon its connection therewith and the actuation of the corresponding register switch, even before the latter reaches its operating position, for commencing the numerical operation of the selector.

76. In an automatic telephone exchange system, a plurality of numerically designated subscribers' and groups of trunk lines, means including selectors arranged in a plurality of stages for connecting a calling with a called line, each of said selectors having electro-magnetic means to perform a numerical operation to select a group of trunks and a hunting operation to seize an idle trunk in the selected group, a calling device for each subscriber's line, a register having a plurality of switches, one for each digit, controlled by the calling device, each having a normal and a plurality of successive operating positions into one of which it is moved by the digits of the called line number sent by the calling device at a rate of speed determined by that of the calling device, an in-control switch for successively associating the digit switches with the calling device, control means in the register variably operable in accordance with the setting of the digit switches, an out-control switch in the register for successively associating the digit switches with the control means, circuits for associating the control means with the successive selector stages, and a control circuit established under the control of the out-control switch from the control means to the electromagnetic means of each selector stage immediately upon its connection therewith and the moving of the corresponding digit switch out of its normal position into its first operating position for commencing the numerical operation of the selector.

77. In an automatic telephone exchange system, a plurality of numerically designated subscribers' and groups of trunk lines, means including group selectors arranged in a plurality of stages and a first selector for connecting a calling with a called line, each of said group selectors having electromagnetic means to perform a numerical operation to select a group of trunks and a hunting operation to seize an idle trunk in the selected group, and the final selector to perform the tens and units selections, a calling device for each subscriber's line, a register having a plurality of switches, one for each digit, controlled by the calling device, each having a normal and a plurality of successive operating positions into one of which it is moved by the digits of the called line number sent by the calling device at a rate of speed determined by that of the calling device, an in-control switch for successively associating the digit switches with the calling device, control means in the register variably operable in accordance with the setting of the digit switches, an out-control switch in the register for successively associating the digit switches with the control means, circuits for associating the control means with the successive selector stages, a control circuit established under the control of the out-control switch from the control means to the electromagnetic means of each selector stage and the tens selection of the final selector immediately upon its connection therewith and the moving of the corresponding digit switch out of its normal position into its first operating position for commencing the numerical operation of the selector and the tens selection by the final, and for completing the control circuit for the units selection by the final selector only upon the completion of the operation of the units digit switch under the control of the calling device.

78. In an automatic telephone exchange system, a plurality of numerically designated subscribers' lines, means including a plurality of stages of selectors having a plurality of positions for interconnecting calling and called lines, a register, a plurality of digit switches in the register, one for each digit of subscribers' line numbers, and each having a plurality of positions, a calling device for the calling line operable in accordance with the successive digits of the called number, a switch in the register for successively actuating the digit switches in accordance with the successive operations of the calling device, a relay in each register having a control circuit, potential responsive means controlled by the digit switches and the selectors for applying in their different positions different potentials to the control circuit, said relay being operable only if the potential applied to its control circuit by a digit switch bears a certain relationship to the potential applied by a selector, circuits for controlling the position into which each selector is moved controlled by said relay, a timing device to measure the time elapsing between two successive operations of the calling device, and a contact controlled by the timing device for controlling the last-mentioned circuits after the lapse of a predetermined length of time.

79. In an automatic telephone exchange system, a plurality of numerically designated subscribers' lines, means including a plurality of stages of selectors having a plurality of positions for interconnecting calling and called lines, a register, a plurality of digit switches in the register, one for each digit of subscribers' line numbers, and each having a normal and a plurality of actuated positions, a calling device for the calling line operable in accordance with the successive digits of the called number, a switch in the register for successively actuating the digit switches in accordance with the successive operations of the calling device, a relay in the register having a control circuit, potential responsive means controlled by the digit switches and the selectors for applying in their different actuated positions different potentials to the control circuit, and for applying a predetermined potential by each digit switch in its normal positions, said relay being operable only if the potential applied to its control circuit by a digit switch bears a certain relationship to the potential applied by the selectors, each of said selectors having a position in which a potential is applied to the control circuit bearing said certain relationship to the potential applied in the normal position of the corresponding digit switch, and positions in which potentials are applied bearing said certain relationship to the potentials applied in the actuated positions of the corresponding digit switch, a second relay actuated only in the operating positions of said digit switches, circuits for controlling the movement of each selector into a desired position jointly controlled by said relay and said second relay, a timing device to measure the time elapsing between two successive operations of the calling device, a contact controlled by the timing device for actuating the second relay after a predetermined length of time, and a relay for releasing the register controlled by the timing device.

80. In an automatic telephone exchange system, a plurality of numerically designated subscribers' and trunk lines, means including a line finder and a plurality of stages of selectors having a plurality of positions for connecting a calling with the different called lines, a plurality of registers, a plurality of links, a finder switch for each end of each link, means operative upon the initiation of a call for actuating the first finder switch of a link to connect it with the line finder and a selector of the first stage, and the second switch to connect the link with an idle register, a plurality of digit switches in each register, one for each digit of subscribers' line numbers, and each having a normal and a plurality of actuated positions, a calling device for the calling line operable in accordance with the successive digits of the called number, a switch in the register for successively connecting the calling device with successive digit switches to register the successive operations of the device, a relay in each register having a control circuit, potential responsive means controlled by the digit switches and the selectors for applying in their different actuated positions different potentials to the control circuit, and for applying a predetermined potential to the control circuit by each digit switch in its normal position, said relay being operable only if the potential applied to the control circuit by a digit switch bears a certain relationship to the potential applied by the selectors, each of said selectors having a position in which a potential is applied to the control circuit bearing said certain relationship to the potential applied in the normal position of the corresponding digit switch, and positions in which potentials are applied bearing said certain relationship to the potentials applied in the actuated positions of the corresponding digit switch, a second relay actuated only in the operating positions of said digit switches, circuits for controlling the movement of each selector into a desired position jointly controlled by said relay and said second relay, a timing device to measure the time elapsing between two successive operations of the calling device, a contact controlled by the timing device for actuating the second relay after a predetermined length of time, and a release relay for each register controlled by the timing device.

81. In an automatic telephone exchange system, a plurality of switches, each having a plurality of sets of four terminals, a set of four brushes cooperating therewith, and a magnet for moving the brushes, numerically designated telephone lines, one leading to each of said sets of terminals and brushes, each line having two talking conductors, two of the brushes and terminals of each set being connected to talking conductors, the third serving for control and the fourth for testing, a source of D. C. potential, a predetermined potential applied to the third terminal of every set indicating the busy or idle condition of the associated line, a characteristic potential applied to the fourth terminal of certain sets of terminals, indicating the position of the certain sets in the bank, a register common to all said switches, a control circuit for variably operating the register in accordance with the numerical designation of the called line, an operating circuit for said magnet controlled by said register, and a control circuit for the register to which the characteristic and predetermined potentials are applied over the brushes.

82. In an automatic telephone exchange system, a plurality of switches, each having a plurality of sets of four terminals, a set of four brushes cooperating therewith, and a magnet for moving the brushes, a line for each set of terminals and the brushes, each line having two talking conductors, two of the brushes and terminals of each set serving for the talking connection, the third for control and the fourth for testing, a source of D. C. potential, a characteristic D. C. potential applied to the third terminal of every set indicating the condition of the associated line, a characteristic potential applied to the fourth terminal of every tenth set of terminals, indicating the position of the set of terminals in the bank, a register common to all said switches, a multi-electrode electronic discharge device in said register, a control circuit for variably operating the register in accordance with numerical designation of the called line, an operating circuit for said magnet controlled by said device, and a control circuit for one of the electrodes to which the characteristic potentials at said terminals are applied over the cooperating brushes.

83. In an automatic telephone exchange system, a plurality of switches, each having a plurality of sets of four terminals, a set of four brushes cooperating therewith, and a magnet for moving the brushes, a line for each set of terminals and the brushes, each line having two talking conductors, two of the brushes and terminals of each set serving for the talking connection, the third for control and the fourth for testing, a source of D. C. potential, a characteristic D. C. potential applied to the third terminal of every set indicating the condition of the associated line, a characteristic D. C. potential applied to the fourth terminal of every tenth set of terminals, indicating the position of the set of terminals in the bank, a register common to all said switches, a control circuit for variably operating the register in accordance with numerical designation of the called line, a multi-electrode electronic discharge device in said register, means dependent on the numerical operation of the register for applying various D. C. potentials to one of the electrodes, an operating circuit for said magnet controlled by said device, and a circuit for another electrode to which the characteristic potentials at said terminals are applied over the cooperating brushes.

84. In an automatic telephone exchange system, a plurality of switches, each having a plurality of sets of four terminals, a set of four brushes cooperating therewith, and a magnet for moving the brushes, a line for each set of terminals and the brushes, each line having two talking conductors, two of the brushes and terminals of each set serving for the talking connection, the third for control and the fourth for testing, a source of D. C. potential, a characteristic D. C. potential applied to the third terminal of every set indicating the condition of the associated line, a characteristic D. C. potential applied to the fourth terminal of every tenth set of terminals, indicating the position of the set of terminals in the bank, a register common to all said switches, a control circuit for variably operating the register in accordance with numerical designation of the called line, an electronic discharge device in said register having cathode, anode and grid electrodes, means dependent on the numerical operation of the register for applying various D. C. potentials to the grid, an operating circuit for said magnet controlled by said device, and a circuit for the cathode to which the characteristic potentials at said terminals are applied over the cooperating brushes.

85. In an automatic telephone exchange system, a plurality of switches, each having a plurality of sets of four terminals, a set of four brushes cooperating therewith, and a magnet for moving the brushes, a line for each set of terminals and the brushes, each line having two talking conductors, two of the brushes and terminals of each set serving for the talking connection, the third for control and the fourth for testing, a predetermined D. C. potential applied to the third terminal of every set indicating the busy or idle condition of the associated line, a characteristic D. C. potential applied to the fourth terminal of certain sets of terminals, indicating the position of the certain sets in the bank, a register common to all said switches, a control circuit for variably operating the register in accordance with the numerical designation of the called line, an operating circuit for said magnet controlled by said register, and a control circuit for the register to which the characteristic and predetermined potentials are applied over the cooperating brushes.

86. In an automatic telephone exchange system, a plurality of switches, each having a plurality of sets of four terminals, a set of four brushes cooperating therewith, and a magnet for moving the brushes, a line for each set of terminals and the brushes, each line having two talking conductors, two of the brushes and terminals of each set serving for the talking connection, the third for control and the fourth for testing, a predetermined D. C. potential applied to the third terminal of every set indicating the condition of the associated line, a characteristic D. C. potential applied to the fourth terminal of every tenth set of terminals, indicating the position of the set of terminals in the bank, a register common to all said switches, a control circuit for variably operating the register in accordance with the designation of the called line, an operating circuit for said magnet controlled by said register, and a control circuit for the register to which the characteristic potentials are applied over the cooperating brushes.

87. In an automatic telephone exchange system, a plurality of switches, each having a plurality of sets of four terminals, a set of four brushes cooperating therewith, and a magnet for moving the brushes, a line for each set of terminals and the brushes, each line having two talking conductors, two of the brushes and terminals of each set serving for the talking connection, the third for control and the fourth for testing, a characteristic D. C. potential applied to the third terminal of every set indicating the condition of the associated line, a characteristic D. C. potential applied to the fourth terminal of every tenth set of terminals, indicating the position of the set of terminals in the bank, a register common to all said switches, a multi-electrode electronic discharge device in said register, a control circuit for variably operating the register in accordance with numerical designation of the called line, an operating circuit for said magnet controlled by said device, and a control circuit for one of the electrodes to which the characteristic potentials at said terminals are applied over the cooperating brushes.

88. In an automatic telephone exchange system, a plurality of switches, each having a plurality of sets of four terminals, a set of four brushes cooperating therewith, and a magnet for moving the brushes, a line for each set of terminals and the brushes, each line having two talking conductors, two of the brushes and terminals of each set serving for the talking connection, the third for control and the fourth for testing,
a source of D. C. potential, a characteristic D. C. potential applied to the third terminal of every set indicating the condition of the associated line, a characteristic D. C. potential applied to the fourth terminal of every tenth set of terminals, indicating the position of the set of terminals in the bank, a register common to all said switches, a control circuit for variably operating the register in accordance with numerical designation of the called line, a multi-electrode electronic discharge device in said register, means dependent on the numerical operation of the register for applying various D. C. potentials to one of the electrodes, an operating circuit for said magnet controlled by said device, and a circuit for another electrode to which the characteristic potentials at said terminals are applied over the cooperating brushes.

89. In an automatic telephone exchange system, a plurality of switches, each having a plurality of sets of four terminals, a set of four brushes cooperating therewith, and a magnet for moving the brushes, a line for each set of terminals and the brushes, each line having two talking conductors, two of the brushes and terminals of each set serving for the talking connection, the third for control and the fourth for testing, a source of D. C. potential, a characteristic D. C. potential applied to the third terminal of every set indicating the condition of the associated line, a characteristic D. C. potential applied to the fourth terminal of every tenth set of terminals, indicating the position of the set of terminals in the bank, a register common to all said switches, a control circuit for variably operating the register in accordance with numerical designation of the called line, an electronic discharge device in said register having cathode, anode and grid electrodes, means dependent on the numerical operation of the register for applying various D. C. potentials to the grid, an operating circuit for said magnet controlled by said device, and a circuit for the cathode to which the characteristic potentials at said terminals are applied over the cooperating brushes.

90. In an automatic telephone exchange system, a plurality of selector switches, each having a plurality of sets of terminals, a set of brushes cooperating therewith, a relay, and a magnet for moving the brushes, numerically designated lines connected to the terminals and to the brushes, each line having two talking conductors and a test conductor, two of the brushes and terminals of each set serving for interconnecting the talking conductors and the third for testing, a predetermined potential applied to the test terminal of every set characteristic for the numerical designation of the line, a register, a control circuit for variably operating the register in accordance with the called line number, means for temporarily associating the register with a switch, a first and a second relay at the register, an operating circuit for the selector magnet including a contact controlled by the selector relay, one of the talking conductors, and contacts controlled by the two register relays, a local register circuit for operating the first register relay, and a circuit extending from the test brush over a contact controlled by the selector relay, the other talking conductor, and a contact controlled by the first register relay for operating said second register relay.

91. In an automatic telephone exchange system, a plurality of selector switches, each having a plurality of sets of four terminals, a set of four brushes cooperating therewith, a relay and a magnet for moving the brushes, numerically designated lines connected to the terminals and to the brushes, each line having two talking conductors, two of the brushes and terminals of each set serving for interconnecting the talking conductors, the third for control and the fourth for testing, a source of direct current, a predetermined potential applied from said source to the fourth or test terminal of every set indicating the busy or idle condition of the associated line and a predetermined potential characteristic for the numerical designation of the line, a register, a control circuit for variably operating the register in accordance with the called line number, means for temporarily associating the register with a selector, a first relay and a multi-electrode electric discharge tube at the register, a second relay at the register responsive to the operation of said tube, an operating circuit for the selector magnet including a contact controlled by the selector relay, one of the talking conductors, and contacts controlled by the two register relays, a predetermined potential applied to one electrode of said tube characteristic for the variable operation of the register, a circuit local to the register for operating its first relay, a circuit extending from the test brush over a contact controlled by the selector relay, the other talking conductor, and a contact controlled by the first register relay to a second electrode of the tube, said tube being so adjusted that it operates only when the potentials applied to said two electrodes bear a predetermined relationship to one another, a test relay in the register also controlling the selector magnet, and a circuit for the test relay including the test brush, one of the talking conductors and contacts of the first register relay.

92. In an automatic telephone exchange system, a plurality of selector switches, each having a plurality of sets of four terminals, a set of four brushes cooperating therewith, a relay, and a magnet for moving the brushes, numerically designated lines connected to each set of terminals and to the brushes, each line having two talking conductors, two of the brushes and terminals of each set serving for interconnecting the talking conductors, the third for control and the fourth for testing, a source of direct current, a predetermined potential applied from said source to the fourth or test terminal of every set indicating the busy or idle condition of the associated line and a predetermined characteristic potential designating the numerical designation of the line, a register common to all said switches, a control circuit for variably operating the register in accordance with the designation of the desired called line, a means for temporarily associating the register with a switch, a first relay and a second relay in the register, an operating circuit for the selector magnet including a contact controlled by the selector relay, one of the talking conductors, and contacts controlled by the two register relays, an operating circuit for said second relay, a predetermined characteristic potential applied to said operating circuit depending on the variable operation of the register, and a circuit extending from the test brush over a contact controlled by the selector relay, the other talking conductor, and a contact controlled by the first register relay to said operating circuit, said second relay operating only when the potentials applied to its operating circuit bear a predetermined relationship to one-another.

93. In an automatic telephone exchange system, a plurality of selector switches, each having a plurality of sets of four terminals, a set of four brushes cooperating therewith, a relay, and a magnet for moving the brushes, numerically designated lines connected to each set of terminals and to the brushes, each line having two talking conductors, two of the brushes and terminals of each set serving for interconnecting the talking conductors, the third for control and the fourth for testing, a source of direct current, a predetermined potential applied from said source to the fourth or test terminal of every set indicating the busy or idle condition of the associated line and a predetermined characteristic potential designating the numerical designation of the line, a register common to all said switches, a control circuit for variably operating the register in accordance with the designation of the desired called line, a means for temporarily associating the register with a switch, a first relay and a multi-electrode electric discharge tube in the register, a second relay at the register responsive to the operation of said tube, an operating circuit for the selector magnet including a contact controlled by the selector relay, one of the talking conductors, and contacts controlled by the two register relays, a predetermined characteristic potential applied to one electrode of said tube depending on the variable operation of the register, and a circuit extending from the test brush over a contact controlled by the selector relay, the other talking conductor, and a contact controlled by the first register relay to a second electrode of the tube, said tube being so adjusted that it operates only when the potentials applied to said two electrodes bear a predetermined relationship to one-another.

94. In an automatic telephone exchange system, a plurality of subscribers' lines, a plurality of automatic switches divided into switching stages, means for successively operating a switch in each stage to connect a calling with a called line, said means comprising two current conducting means having different voltage-current characteristics such that for a predetermined voltage applied to them the difference between the magnitude of the currents flowing through them is a maximum and for voltages either greater or less than said predetermined voltage the said current difference rapidly decreases, means for deriving from said currents a potential difference dependent upon said current difference, a control means arranged to be actuated only by a potential exceeding a predetermined value, circuits for variably operating said switches in accordance with the number of the called line, the circuit of each switch being under the control of said control means and circuits successively controlled by said switches for applying said potential difference to said control means.

95. In an automatic telephone exchange system, a plurality of subscribers' lines, a plurality of automatic switches divided into switching stages, means for successively operating a switch in each stage to connect a calling with a called line, said means comprising two current conducting means having different non-linear voltage-current characteristics such that for a predetermined voltage appiled to them the difference between the magnitudes of the currents flowing through them is a maximum and for voltages either greater or less than said predetermined voltage the said current difference rapidly decreases, means for deriving from said currents a potential difference dependent upon said current difference, a control means arranged to be actuated only by a potential exceeding a predetermined value, means for applying said potential difference to said control means, circuits controlled by said control means for successively operating a switch in each stage in accordance with a different digit of the called number, and circuits successively controlled by the switches in successive stages for applying to said current conducting means different voltages dependent on the setting of the switches.

96. In an automatic telephone exchange system, a plurality of subscribers' lines, a plurality of automatic switches divided into switching stages, means for successively operating a switch in each stage to connect a calling with a called line, said means comprising two current conducting means having similar non-linear voltage-current characteristics such that for two predetermined voltages applied respectively to said current conducting means the difference between the currents flowing through them is a maximum, means for deriving from the current flowing through said conducting means potentials of a value dependent upon the difference in the magnitudes of said currents, a control means responsive over a range of potentials exceeding a potential approximately equal to the potential corresponding to said maximum current difference, means for applying said potentials to said control means, an impulse sender for each subscriber, an impulse register at the exchange variably operable by the sender of the calling subscriber, circuits controlled by said control means for variably operating a switch in each stage in accordance with a different digit of the called number, and circuits jointly controlled by said register and by the switches in successive stages for applying to said current conducting means different voltages dependent on the setting of said register and switches.

97. In an automatic telephone exchange system, a plurality of subscribers' lines, a plurality of automatic switches divided into switching stages, means for successively operating a switch in each stage to connect a calling with a called line, said means comprising an electron discharge means including two electron discharge paths each comprising an anode, a cathode and control grid and each having different grid voltage-anode current characteristics such that for a predetermined voltage applied to the control grids relative to the cathodes the difference between the magnitudes of the respective anode currents is a maximum and for voltages on either side of said predetermined voltage the said current difference rapidly decreases, means for deriving from said currents a potential difference dependent upon said current difference, a control means arranged to be actuated only by a potential exceeding a predetermined value, means for applying said last-mentioned potential difference to said control means, an impulse sender for each subscriber, an impulse register at the exchange variably operable by the sender of the calling subscriber, circuits controlled by said control means for variably operating a switch in each stage in accordance with a different digit of the called number, a circuit controlled by the register for applying predetermined voltages to the grids in accordance with the setting of the register for each digit, and a circuit for applying predetermined voltages to the cathode in accordance with the setting of each switch.

98. In an automatic telephone exchange system, a plurality of subscribers' lines, a plurality of automatic switches divided into switching stages, means for successively operating a switch in each stage to connect a calling with a called line, said means comprising electron discharge means including first and second electron discharge paths each consisting of at least an anode, a cathode and a control electrode, means for applying predetermined potentials to said control electrodes of such values that small variations thereof cause but little difference in the value relative to one-another of the plate currents flowing in said two paths, means for adding to said potentials a critical potential of such value that currents of substantially different magnitudes traverse the said paths, control means, means responsive to the difference in said currents for operating said control means, circuits controlled by said control means for successively operating a switch in each stage in accordance with a different digit of the called number, and circuits successively controlled by the switches in successive stages for applying to said current conducting means different voltages dependent on the setting of the switches.

99. In a telephone exchange system, a plurality of lines, a plurality of line finders each having a plurality of multipled terminals in which said lines terminate, a predetermined potential applied to the terminals of a line upon the initiation of a call thereon, a contacting means cooperating with terminals of each line finder, an operating mechanism for each contacting means, an allotter for selecting an idle line finder for operation, a first electron discharge means including first and second electron discharge paths, each consisting of at least an anode, a cathode and a control electrode, a second electron discharge means comprising a gas tube having an auxiliary control gap and a main discharge gap, a first circuit including said first discharge path, a second circuit including said second discharge path, a control relay, a third circuit including said main discharge gap and said control relay, means including said allotter for applying predetermined different potentials respectively to one of the electrodes constituting each said first and second discharge paths, a connection from the contacting means of the line finder selected for operation to another of the electrodes constituting said first and second discharge paths, means for deriving voltages from said first and second circuits and for applying said voltages to electrodes constituting said auxiliary control gap, a circuit for controlling said operating mechanism, and means under control of said control relay for opening and closing said last-mentioned circuit.

100. A control circuit according to claim 99, wherein said means for applying predetermined different potentials to said respective control electrodes includes a resistance of such value that when said control electrodes tend to acquire such positive potentials with respect to the cathodes that grid currents flow, the respective control electrodes are both maintained at substantially zero potential.

101. In an automatic telephone exchange system, a plurality of lines, means including a plurality of line finders and a selector switch for establishing a connection between a calling and a called line, an impulse sender for each line, a first and a second electron discharge means, each including first and second electron discharge paths each consisting of at least an anode, a cathode and a third electrode, a third and a fourth electron discharge means, each comprising a gas tube having an auxiliary control gap and a main discharge gap, a first and a second circuit including, respectively, the first discharge path of the first and second discharge means, a third and a fourth circuit including, respectively, the second discharge path of the first and second discharge means, a fifth and a sixth circuit including, respectively, the main discharge gap of the third and fouth discharge means, means responsive to the initiation of a call for applying predetermined different potentials respectively to one of the electrodes of each of the first and second discharge paths of the first discharge means, means controlled by the setting of the selector on the called line for applying predetermined different potentials respectively to one of the electrodes of each of the first and second discharge paths of the second discharge means, an allotter for selecting a line finder for operation, means controlled by the allotter for applying a critical potential to another of the electrodes of each of the discharge paths of the first discharge means, means controlled by the sender of the calling line for applying a critical potential to another of the electrodes of each of the discharge paths of the second discharge means, said critical potentials being of such values that currents of substantially different magnitudes traverse the first and second circuits, means for deriving from said last-mentioned currents a potential difference and for applying said potential difference across the auxiliary control gap of the third and fourth discharge means, respectively, whereby the latter are ionized and said gaps are fired and current flows in the third and the fourth circuits, control means responsive to the current flow in the third circuit for causing the line finder to seize the calling line, and control means responsive to the current flow in the fourth circuit for causing the selector to seize the called line.

102. In an automatic telephone exchange system, a plurality of subscribers' lines, a plurality of selector switches divided into selecting stages and each comprising a plurality of test terminals, a brush, and a magnet for controlling the movement of said brush over said terminals, impulse senders for said lines, a register at the exchange variably operable by the sender of the calling line, said register comprising a register switch comprising first and second sets of terminals, a plurality of sets of first and second brushes for said register switch and each cooperating with a different set of first and second terminals, means controlled by the calling subscriber's sender for moving different sets of first and second brushes in unison to make contact with a pair of cooperating terminals, means for applying predetermined potentials to the test terminals of the selector switches, means for applying predetermined potentials to the terminals of each first and second sets of terminals of said register switch such that the potentials applied to the respective terminals of each set of terminals are different but the potentials applied to each pair of terminals adapted to be simultaneously engaged by the cooperating first and second brushes differ by substantially the same amount, a first electron discharge means including first and second electron discharge paths each consisting of an anode, a cathode and a control electrode, a second electron discharge device comprising a gas tube having an auxiliary gap and a main discharge gap, a first circuit including said first discharge path, a second circuit including said second discharge path, a control relay, a third circuit including said main discharge gap and said control relay, means including said selector and register switches for establishing a connection from the test wiper of a selector switch in successive stages to the cathode of each said first and second discharge paths, means for establishing successive connections from different sets of first and second brushes of said register switch respectively to the control electrodes in said first and second discharge paths, means for deriving voltages from said first and second circuits and for applying said voltages to electrodes constituting said auxiliary control gap, and means acuated by the operation of said control relay for controlling the energization of the magnet of each selector.

103. In an automatic telephone exchange system, a plurality of subscribers' lines, a plurality of line finders, group selector and final selector switches, a register at the central exchange variably operable in accordance with impulses sent thereto by the calling subscriber, a first and a second multi-electrode electrical discharge tube associated with said register, means jointly controlled by the first and second tubes for operating said final selectors in accordance with the tens and units digits of the called number, means including the first tube for controlling the establishment of a connection from the calling subscriber towards the called subscriber's line over one of said group selectors in accordance with the other digits, and means controlled by the second tube for controlling the line finder to connect a group selector with the calling line.

104. In an automatic telephone exchange system, a plurality of subscribers' lines, a plurality of line finders, group selector and final selector switches, a register at the central exchange variably operable in accordance with impulses sent thereto by the calling subscriber, a first and a second multi-electrode electrical discharge tube associated with said register, means including the first tube for operating said group of final selectors, each in accordance with one digit of the called number, and means controlled by the second tube for operating the final selector in accordance with another digit of the called number and the line finder to connect a group selector with the calling line.

105. In an automatic telephone exchange system, a plurality of subscribers' lines, a plurality of line finders, group selector and final selector switches having terminals and cooperating brushes, a register at the central exchange variably operable in accordance with impulses sent thereto by the calling subscriber, a first and a second multi-electrode electrical discharge tube associated with said register, gas valve associated with each tube, circuits in the register for applying varying potentials to one electrode of the first tube depending on the operation of the register, a predetermined potential applied to one electrode of the second tube, circuits for applying varying potentials to a second electrode of the first tube over brushes and terminals of the selector switches and to a second electrode of the second tube over brushes and terminals of the line finder and the final selector, said tubes being so adjusted that only when the potentials applied to their electrode bear a predetermined relationship, the tube operates and actuates the associated valve, a relay jointly controlled by the register and the first valve for operating each selector in accordance with one digit of the called number, a relay jointly controlled by the said register and the second valve for operating the final selector in accordance with a second digit of the called number and for operating the line finder to connect the calling line with a group selector.

106. In an automatic telephone exchange system, a plurality of numerically designated subscribers' and trunk lines, means including a non-numerical and a plurality of numerical stages of selectors for establishing a connection between a calling and a called line over said trunk lines, the numerical selectors being arranged to hunt for an idle one in a selected group of trunks, a plurality of registers for controlling the numerical and hunting operations of the numerical selectors, a plurality of links, each provided with a multi-contact switch, means for operating the switch for temporarily connecting an idle register with the connection, a calling device for each subscriber's line, a circuit including said calling device, the non-numerical selector, the link, and a first contact of the switch for variably setting said register in accordance with the called number, a second circuit including the link, and a second contact of the switch for controlling the numerical operations of the successive stages of selectors in accordance with the setting of the register, ringing means for signaling the called line, means controlled by the register over a third contact of the switch for actuating the ringing means.

107. In an automatic telephone exchange system, a plurality of numerically designated subscribers' and trunk lines, means including a non-numerical and a plurality of numerical stages of selectors for establishing a connection between a calling and a called line over said trunk lines, the numerical selectors being arranged to hunt for an idle one in a selected group of trunks, a plurality of registers for controlling the numerical and hunting operations of the numerical selectors, a plurality of links each provided at each end with a multi-contact switch, means for operating the switch for temporarily connecting an idle register with the connection, a calling device for each subscriber's line, a circuit including said calling device, the non-numerical selector, the link, and a first and a second contact of the switch for variably setting said register in accordance with the called number, a second circuit including the link, and a third and a fourth contact of the switch for controlling the numerical operations of the successive stages of selectors in accordance with the setting of the register, ringing and busy signaling means in each link, means controlled by the register for grounding a fifth and a sixth contact of the switch for ringing the called line, and means controlled by the register for grounding the fifth contact of the switch for sending the busy signal to the calling line.

108. In an automatic telephone exchange system, a plurality of numerically designated subscribers' lines a calling device for each line, a plurality of trunks arranged in numerical groups, numerical groups and final selectors arranged in successive switching stages for interconnecting calling and called lines over trunks, each group selector having means to perform a numerical operation to select a group of trunks designated by a digit of the called number and a hunting operation to seize an idle trunk in the selected group, means in the final selector to select a group of lines in accordance with the tens digit and a line in the selected group in accordance with the units digit, a register for controlling the numerical and hunting operations of said selectors and comprising a plurality of digit switches, one of each digit, a first and a second relay, each having a control circuit, an impulse relay, means including a non-numerical selector for connecting the impulse relay with the calling line, an out-control switch for successively connecting the control circuit of the first relay with the digit switches, a source of potential, contacts in each digit switch for applying characteristic potentials to the connected control circuit for each setting of the digit switch, a predetermined potential applied to the control circuit of the second relay, contacts in the numerical and non-numerical selectors for applying potentials to the control circuits of the relays characteristic for the numerical operations of the numerical selectors and for the condition of the line engaged by the non-numerical selector, the test contacts of each group of trunks in the group selectors and of each individual line in the final selector having a potential characteristic for their numerical designation, and test contacts in the final selectors separating groups of individual line contacts to which predetermined busy potentials are applied, said tubes operating only if a predetermined relationship exists between the potentials applied to their control circuits, an out-control switch in the register for successively connecting the control circuits with the different digit switches, a circuit controlled by the relays for operating the out-control switch, once for each digit, a circuit for controlling the non-numerical selector controlled by the second relay, a circuit succesively extended to the selectors for controlling the operations thereof and controlled by the first and second relays, a counting switch in said register, and a circuit controlled by the tens digit switch for operating the counting switch once for each actuation of the second relay.

109. In an automatic telephone exchange system, a plurality of numerically designated subscribers' lines, a calling device for each line, a plurality of trunks arranged in numerical groups, group and final selectors arranged in successive switching stages for interconnecting calling and called lines over trunks, each group selector having electromagnetic means to perform a numerical operation to select a group of trunks designated by a digit of the called number and a hunting operation to seize an idle trunk in the selected group, electromagnetic means in the final selector to select a group of lines in accordance with the tens digit and a line in the selected group in accordance with the units digit, a register for controlling the numerical and hunting operations of said selectors and comprising a plurality of digit switches, one for each digit, two multi-electrode electrical discharge tubes, a relay for each tube responsive to the operation thereof, an impulse relay, means including a line finder for connecting the impulse relay with the calling line, electromagnetic means for operating said line finder, a source of potential, a first path leading to one electrode of the first tube, an out-control switch for successively connecting said path with the digit switches, contacts in each digit switch for applying characteristic potentials to said path for each setting of the digit switch, a predetermined potential applied to one electrode of the second tube, a second path leading to a second electrode of each tube, a first and a selector relay in the register for connecting the second path, respectively, with the line finder and to the successive selectors in the connection, test contacts in said line finder and selectors for applying potentials to the second path characteristic for the numerical operations of the selectors and for the condition of the line engaged by the line finder, the test contacts of each group of trunks in the group selectors and of each individual line in the final selector having a potential characteristic for their numerical designation, and test contacts in the final selectors separating groups of individual line contacts to which predetermined busy potentials are applied, said tubes being adjusted to operate only if a predetermined relationship exists between the potential applied to their two electrodes, an out-control switch in the register for successively connecting the selector relay with the different digit switches, a circuit controlled by the relays of the tubes for operating the out-control switch once for each digit received, a circuit for the electromagnetic means of the line finder controlled by the first relay and the relays associated with the tubes, a circuit successively extended to the selectors for actuating the electromagnetic means thereof and controlled by the selector relay and the tube relays, a counting switch in said register, and a circuit for operating the counting switch once for each actuation of the relay of the second tube, controlled by the tens digit switch.

110. In an automatic telephone exchange system, a plurality of numerically designated subscribers' lines, a calling device for each line, a plurality of trunks arranged in numerical groups, group and final selectors arranged in successive switching stages for interconnecting calling and called lines over trunks, each group selector having electromagnetic means to perform a numerical operation to select a group of trunks designated by a digit of the called number and a hunting operation to seize an idle trunk in the selected group, electromagnetic means in the final selector to select a group of lines in accordance with the tens digit and a line in the selected group in accordance with the units digit, and to hunt for an idle P. B. X line, a register for controlling the numerical and hunting operations of said selectors and comprising a plurality of digit switches, one for each digit, two multi-electrode electrical discharge tubes, a relay for each tube responsive to the operation thereof, an impulse relay, means including a line finder for connecting the impulse relay with the calling device of the calling line, electromagnetic means for operating said line finder, a source of D. C. potential, a first path leading to one electrode of the first tube, an out-control switch for successively connecting said path with the digit switches, contacts in each digit switch for applying characteristic D. C. potentials to said path for each setting of the digit switch, a predetermined D. C. potential applied to one electrode of the second tube, a second path leading to a second electrode of each tube, a first relay in the register for connecting the second path with the line finder and selector relay for connecting the second path to the successive selectors in the connection, test contacts in said line finder and selectors for applying D. C. potentials to the second path characteristic for the numerical operations of the selectors and for the condition of the line engaged by the line finder, the test contacts of each group of trunks in the group selectors and of each individual line in the final selector having a potential characteristic for their numerical designation, all the contacts of a group of P. B. X lines having the same characteristics potential, and test contacts in the final selectors separating groups of individual line contacts to which predetermined busy potentials are applied, said tubes being adjusted to operate only if a predetermined relationship exists between the potentials applied to their two electrodes, an out-control switch in the register for successively connecting the selector relay with the different digit switches, a circuit controlled by the relays of the tubes for operating the out-control switch once for each digit received, a circuit for the electromagnetic means of the line finder controlled by the first relay and the relays associated with the tubes, a circuit successively extended to the selectors for actuating the electromagnetic means thereof and controlled by the selector relay and the tube relays, a test relay in said register connected with the second path under the control of the selector relay, said test relay cooperating in the control of the out-control switch circuit, a counting switch in said register, a circuit for operating the counting switch once for each actuation of the relay of the second tube, controlled by the tens digit switch, and a busy signal under the joint control of the out-control switch and the relay of the second tube.

111. In a telephone exchange system, a plurality of subscribers' lines, each identified by a number comprising a thousands, a hundreds, a tens and a units digit, means including a first and a second non-numerical and a plurality of numerical selector switches for connecting a calling with a called line, a first identification switch having terminals connected with the lines and a set of brushes cooperating therewith, a second identification switch having sets of terminals and cooperating brushes, some of the terminals of the second identification switch being connected with the brushes of the first identification switch, a number indicator having a thousands, a hundreds, a tens and a units indicating magnet, an impulse sender arranged to send impulses representing all the digits of line numbers, connections from the terminals of the first identification switch to the units and tens senders, connections from the terminals of each set in the second identification switch to the hundreds and the thousands digits senders, a first relay associated with one of said non-numerical switches, a circuit for said first relay including contacts of an operator's key, a second relay associated with the first identification switch controlled by the first relay and controlling the operations of the two identification switches, a third relay having a control circuit and controlling the operation of the first identification switch, said third relay being adjusted to operate only if two potentials having a predetermined relationship to one another are applied to its control circuit, a source of potentials, a first path for applying a predetermined potential to said control circuit from said course, means for applying different potentials from said source to the test terminals of each line depending on the condition of the line, a second path including a brush of the first identification switch for applying the last-mentioned potential to said control circuit, and means associated with the number indicator for connecting the indicator magnets one at a time with the brushes of the second identification switch.

112. The telephone system according to claim 111, and in which the control circuit of the third relay includes a multi-electrode electronic tube, having one electrode to which said first path is permanently connected and another electrode to which said second path is connected, said tube being adjusted to operate said relay only when the potentials applied to the two paths bear a predetermined relationship to one-another.

113. In a telephone exchange system, a plurality of subscribers' lines, each identified by a number comprising a thousands, a hundreds, a tens and a units digit, means including a first and a second line finder and a plurality of selector switches for connecting a calling with a called line, each of said lines having multiple terminals in certain first line finder and final selector switches, a first identification finder having terminals to which each line is multipled and a set of brushes cooperating therewith, a second identification finder having sets of terminals and cooperating brushes, two terminals of each set being connected with two brushes of the first identification finder, a number indicator having a thousands, a hundreds, a tens and a units indicating magnet, an impulse sender comprising two groups of ten cams, connections from the first group of cams to the first terminal of each set of contacts in the first identification finder in accordance with the units digit of the number designating the line to which the set of terminals is individual, connections from the second group of cams to the second terminal of each set in the first identification finder in accordance with the tens digit of the line numbers, connections to the third terminal of each set in the second identification finder in accordance with the hundreds digits of the line numbers, connections from the cams of the second group to the fourth terminals of each set in the second identification finder in accordance with the thousands digits of the line numbers, magnets for operating the cams, the first identification finder and the second identification finder, a first relay associated with each A-link, a circuit for said first relay including contacts of the second line finder and an operator's key, a second relay associated with the first identification finder controlled by the first relay, a circuit for the magnet of the second identification finder controlled by contacts of said second relay, a third relay, a circuit for the magnet of the first identification finder jointly controlled by contacts of the second and third relays, a control circuit for the third relay, said third relay being adjusted to operate only if two D. C. potentials having a predetermined relationship to one-another are applied to its control circuit, a source of D. C. potentials, a first path for continuously applying a predetermined potential to said control circuit from said source, means for applying different potentials from said source to the test terminals of each line depending on the condition of the line, a second path including a brush of the first identification finder and the contact of the second relay for applying the last-mentioned potential to said control circuit, a circuit for the magnet for operating the cams also controlled by said control circuit, and means associated with the number indicator for connecting the indicator magnets one at a time with the brushes of the second identification finder.

114. The telephone system according to claim 113, and in which the control circuit of the third relay includes a multi-electrode electronic tube, having one electrode to which said first path is permanently connected and another electrode to which said second path is connected, said tube being adjusted to operate said relay only when the potentials applied to the two paths bear a predetermined relationship to one-another.

115. In a telephone exchange system, a plurality of subscribers' lines, each identified by a number comprising a thousands, a hundreds, a tens and a units digit, means including a first and a second line finder and a plurality of selector switches for connecting a calling with a called line, each of said lines having multiple terminals in certain first line finder and final selector switches, a plurality of A-links between the first and second line finders, a first identification finder having terminals to which each line is multipled and a set of brushes cooperating therewith, a second identification finder having sets of terminals and cooperating brushes, two terminals of each set being connected with two brushes of the first identification finder, a number indicator having a thousands, a hundreds, a tens and a units indicating magnet, units, tens, hundreds and thousands wires, one leading from each brush of the second identification finder towards the indicating magnets, an impulse sender comprising two groups of ten cams, connections from the first group of cams to the first terminal of each set of contacts in the first identification finder in accordance with the units digit of the number designating the line to which the set of terminals is individual, connections from the second group of cams to the second terminal of each set in the first identification finder in accordance with the tens digit of the line numbers, connections to the third terminal of each set in the second identification finder in accordance with the hundreds digits of the line numbers, connections from the cams of the second group to the fourth terminals of each set in the second identification finder in accordance with the thousands digits of the line numbers, magnets for operating the cams, the first identification finder and the second identification finder, a first relay associated with each A-link, a circuit for said first relay including contacts of the second line finder and an operator's key, a second relay associated with the first identification finder controlled by the first relay, a circuit for the magnet of the second identification finder controlled by contacts of said second relay, a third relay, a circuit for the magnet of the first identification finder jointly controlled by contacts of the second and third relays, a source of D. C. potential, a control circuit for the third relay, said third relay being adjusted to operate only if two D. C. potentials having a predetermined relationship to one-another are applied to its control circuit, a connection for continuously applying a predetermined potential to said control circuit from said source, means for applying different potentials from said source to the test terminals of each line depending on the condition of the line, a path including a brush of the first identification finder and the contact of the second relay for applying the last-mentioned potential to said control circuit, a circuit for the magnet operating the cams also controlled by said control circuit, a fourth, a fifth and a sixth relay associated with the number indicator, a circuit for connecting the thousands magnet with the thousands wire including contacts of the fourth and fifth relays, a circuit for connecting the hundreds magnet with the hundreds wire including a contact of the fifth relay, a circuit for connecting the tens magnet with the tens wire including contacts of the fifth relay, a circuit for energizing the units magnet including a contact of the sixth relay, and an energizing circuit for the fourth and sixth relays including a contact of the fifth relay and the units wire.

116. In an automatic telephone system, an automatic and a toll exchange, a plurality of numerically designated subscribers' lines terminating at the automatic exchange, means including non-numerical and a plurality of stages of numerical selector switches for interconnecting calling and called lines at the automatic exchange, a group of toll trunks leading from one of the selector stages to the toll exchange, a source of current at the automatic exchange, a first relay at the automatic exchange connected with a trunk upon its seizure by a selector, a line relay connected with the seized trunk at the toll exchange, operators' positions having a plurality of trunks, automatic switching means for connecting the seized toll trunk with an operator's position trunk, a toll supervisory relay at the selected operator's trunk, means controlled by the operator for connecting the supervisory relay with the selected trunk in the place of the line relay and for controlling the energization of the first relay, means controlled over the calling line for connecting said source to the selected trunk, an identifying relay at the automatic exchange for each trunk, means for identifying the number of the calling line controlled by the identifying relay, a ringing relay for signaling the calling line, and a circuit for the signaling relay controlled by the identifying relay.

117. In an automatic telephone system, an automatic and a toll exchange, a plurality of numerically designated subscribers' lines terminating at the automatic exchange, means including a plurality of stages of selectors for interconnecting calling and called lines at the automatic exchange, a group of toll trunks leading from one of the selector stages to the toll exchange, each of said trunks consisting of two conductors, a source of current at the automatic exchange, a first relay at the automatic exchange, a first bridge including said source and the first relay placed across the two conductors at the automatic exchange upon the seizure of the trunk by a selector, terminal equipment for each trunk at the toll exchange including a line relay bridged across the two conductors, operators' positions having a plurality of trunks, means for connecting the seized toll trunk with an operator's position trunk, a high resistance bridged by the operator across the two conductors in the place of the line relay, said first relay at the automatic exchange becoming de-energized in series with said high resistance, means controlled over the calling line for connecting said source to the two conductors, a low resistance connectable by the operator across the two conductors, a second bridge across the two conductors at the automatic exchange and including an identifying relay having contacts controlling the first bridge, a source of current at the toll exchange, means controlled by the operator for connecting said source to operate the identifying relay, and means for identifying the number of the calling line controlled by the identifying relay.

118. In an automatic telephone system, an automatic and a toll exchange, a plurality of numerically designated subscribers' lines terminating at the automatic exchange, means including a plurality of stages of selectors for interconnecting calling and called lines at the automatic exchange, a group of toll trunks leading from one of the selector stages to the toll exchange, each of said trunks consisting of two conductors, a source of current at the automatic exchange, a first relay at the automatic exchange, a first bridge including said source and the first relay placed across the two conductors at the automatic exchange upon the seizure of the trunk by a selector, terminal equipment for each trunk at the toll exchange including a line relay bridged across the two conductors, operators' positions having a plurality of trunks, means for connecting the seized toll trunk with an operator's position trunk, a high resistance bridged by the operator across the two conductors in the place of the line relay, said first relay at the automatic exchange becoming de-energized in series with said high resistance, means controlled over the calling line for connecting said source to the two conductors, a low resistance connectable by the operator across the two conductors, a second bridge across the two conductors at the automatic exchange and including a meter relay and an identifying relay having contacts controlling the first bridge, a source of current at the toll exchange, means controlled by the operator for connecting said source selectively to operate the meter and the identifying relays, a meter for the calling line controlled by the meter relay, and means for identifying the number of the calling line controlled by the identifying relay.

119. In an automatic telephone system, a first and a second exchange, a plurality of numerically designated subscribers' lines terminating at the first exchange, means including line finder and a plurality of stages of selectors for interconnecting calling and called lines at the first exchange, a group of trunks leading from one of the selector stages to the second exchange, a source of current at the first exchange, a first relay at the first exchange connected with a trunk upon its seizure by a selector, a line relay connected with the seized trunk at the second exchange, an operator's position, a first and a second switch at the second exchange for connecting the seized trunk with said position, means controlled by the operator for controlling the operations of the line relay and of the first relay, a first and a second identification finder at the first exchange, a third identification finder at the second exchange, a first identifying relay at the first exchange for each trunk, means controlled by the operator for actuating said identifying relay and for operating the third identification finder to connect the first switch at the second exchange with the second identification finder, a second identifying relay associated with the line finder at the first exchange, a circuit for the second identifying relay extending over selector switches and contacts of the first identifying relay, a relay in the first identification finder controlled by the second identifying relay to operate the second identification finder to connect the third with the first identification finder, a magnet for operating the first identification finder to connect with a terminal of the calling line, a control relay for said magnet, a first impulse sender at the first exchange comprising means to send impulses representing the various digits of line numbers, connections from the means for sending certain digits to the first identification finder, and from the means for sending other digits to the second identification finder, a magnet for operating said means having a circuit including contacts controlled by the second and third identification finders, a second impulse sender at the second office and having means to send impulses representing the designation of an exchange, connections from the last-mentioned sender to the third identification finder, a magnet for operating the means of the second impulse sender having a circuit including contacts controlled by the third identification finder, and a number indicator at the operator's position connected with the second switch at the second exchange.

120. In an automatic telephone system, an automatic and a toll exchange, a plurality of numerically designated subscribers' lines terminating at the automatic exchange, means including a first and a second line finder and a plurality of stages of selectors for interconnecting calling and called lines at the automatic exchange, a group of toll trunks leading from one of the selector stages to the toll exchange, each of said trunks consisting of two conductors, a source of current at the automatic exchange, a first relay at the automatic exchange, a first bridge including said source and the first relay placed across the two conductors at the automatic exchange upon the seizure of the trunk by a selector, terminal equipment for each trunk at the toll exchange including a line relay bridged across the two conductors, operators' positions having a plurality of trunks, a first and a second toll finder for connecting the seized toll trunk with an operator's position trunk, means controlled by the operator for controlling the operations of the line relay and of the first relay at the automatic exchange, a first and a second identification finder at the automatic exchange, a third identification finder at the toll exchange, a first identifying relay at the automatic exchange for each toll trunk and connected with one of its conductors, means controlled by the operator for actuating said identifying relay and for operating the third identification finder to connect the first toll finder with the second identification finder, a second identifying relay associated with the first line finder at the automatic exchange, a circuit for the second identifying relay extending over the second line finder and selector switches and contacts of the first identifying relay, a relay in the first identification finder controlled by the second identifying relay to operate the second identification finder to connect the third with the first identification finder, a magnet for operating the first identification finder to connect with a terminal of the calling line, a control relay for said magnet, a circuit for the control relay controlled over the calling line, a first impulse sender at the automatic exchange adapted to send impulses representing the units, tens, hundreds and thousands digits of line numbers, connections for sending the units and tens impulses to the first identification finder, connections for sending the hundreds and thousands impulses direct to the second identification finder, a magnet for operating said sender having a circuit including said control relay and contacts controlled by the second and third identification finders, a second impulse sender at the toll office arranged to send impulses representing the designation of an exchange, connections from the last-mentioned sender to the third identification finder, a magnet for operating the second impulse sender having a circuit including contacts controlled by the third identification finder, and a number indicator at the toll office connected with the second toll finder.

121. In an automatic telephone system, an automatic and a toll exchange, a plurality of numerically designated subscribers' lines terminating at the automatic exchange, means including a first and a second line finder and a plurality of stages of selectors for interconnecting calling and called lines at the automatic exchange, a group of toll trunks leading from one of the selector stages to the toll exchange, each of said trunks consisting of two conductors, a source of current at the automatic exchange, a first relay at the automatic exchange, a first bridge including said source and the first relay placed across the two conductors at the automatic exchange upon the seizure of the trunk by a selector, terminal equipment for each trunk at the toll exchange including a line relay bridged across the two conductors, operators' positions having a plurality of trunks, a first and a second toll finder, each having two brushes for connecting the two conductors of the seized toll trunk with an operator's position trunk and also additional brushes, means controlled by the operator over said additional brushes for controlling the operations of the line relay and of the first relay at the automatic exchange, a first and a second identification finder at the automatic exchange, a third identification finder at the toll exchange, a first identifying relay at the automatic exchange for each toll trunk and connected with one of its conductors, means controlled by the operator over said additional brushes for actuating said identifying relay and for operating the third identification finder to connect the additional brushes of the first toll finder with the second identification finder, a second identifying relay associated with the first line finder at the automatic exchange, a circuit for the second identifying relay extending over the second line finder and selector switches and contacts of the first identifying relay, a relay in the first identification finder controlled by the second identifying relay to operate the second identification finder to connect the third with the first idenification finder, a magnet for operating the first identification finder to connect with a terminal of the calling line, a control relay for said magnet, a control circuit for the control relay to which a predetermined potential is permanently applied, means including said terminal for applying a second potential to the control circuit characteristic for the condition of the line, said control relay being operable only if the two potentials applied to its control circuit bear a predetermined relationship to one-another, a first impulse sender at the automatic exchange comprising a first group of cams to send impulses representing the units and a second group of cams to send impulses representing the tens, hundreds and thousands digits of line numbers, connections from the units and tens identifying cams to the first identification finder, connections from the hundreds and thousands identifying cams direct to the second identification finder, a magnet for operating said cams having a circuit including said control relay and contacts controlled by the second and third identification finders, a second impulse sender at the toll office and having a group of cams arranged to send impulses representing the designation of an exchange, connections from the last-mentioned sender to the third identification finder, a magnet for operating the cams of the second impulse sender having a circuit including contacts controlled by the third identification finder, and a number indicator at the toll office connected with the additional brushes of the second toll finder.

122. In an automatic telephone system, an automatic and a toll exchange, a plurality of numerically designated subscribers' lines terminating at the automatic exchange, means including non-numerical and a plurality of stages of numerical selector switches for interconnecting calling and called lines at the automatic exchange, a group of toll trunks leading from one of the selector stages to the toll exchange, a source of current at the automatic exchange, a first relay at the automatic exchange connected with a trunk upon its seizure by a selector, a line relay connected with the seized trunk at the toll exchange, operators' positions having a plurality of trunks, automatic switches means for connecting the seized toll trunk with an operator's position trunk, a toll supervisory relay at the selected operator's trunk, means controlled by the operator for connecting the supervisory relay with the selected trunk in the place of the line relay and for controlling the energization of the first relay, means controlled over the calling line for connecting said source to the selected trunk, a meter relay at the automatic exchange for each trunk, means controlled by the operator for actuating said meter relay, a meter for the calling line controlled by said meter relay, a ringing relay for signaling the calling line, and a circuit for the ringing relay controlled by the meter relay.

123. In an automatic telephone system, an automatic and a toll exchange, a plurality of numerically designated subscribers' lines terminating at the automatic exchange, means including non-numerical and a plurality of stages of numerical selector switches for interconnecting calling and called lines at the automatic exchange, a group of toll trunks leading from one of the selector stages to the toll exchange, a source of current at the automatic exchange, a first relay at the automatic exchange connected with a trunk upon its seizure by a selector, a line relay connected with the seized trunk at the toll exchange, operators' positions having a plurality of trunks, automatic switching means for connecting the seized toll trunk with an operator's position trunk, a toll supervisory relay at the selected operator's trunk, means controlled by the operator for connecting the supervisory relay with the selected trunk in the place of the line relay and for controlling the energization of the first relay, means controlled over the calling line for connecting said source to the selected trunk, a meter relay and an identifying relay at the automatic exchange for each trunk, means controlled by the operator for actuating either said meter or said identifying relay, a meter for the calling line controlled in a contact of the meter relay, means for identifying the number of the calling line controlled in contacts of the identifying and meter relays, a ringing relay for signaling the calling line, and a circuit for the ringing relay including contacts of the meter and identifying relays.

124. In an automatic telephone system, an automatic and a toll exchange, a plurality of numerically designated subscribers' lines terminating at the automatic exchange, means including a plurality of stages of selectors for interconnecting calling and called lines at the automatic exchange, a group of toll trunks leading from one of the selector stages to the toll exchange, each of said trunks consisting of two conductors, a source of current at the automatic exchange, a first relay at the automatic exchange, a first bridge including said source and the first relay placed across the two conductors at the automatic exchange upon the seizure of the trunk by a selector, terminal equipment for each trunk at the toll exchange including a line relay bridged across the two conductors, operators' positions having a plurality of trunks, means for connecting the seized toll trunk with an operator's position trunk, a high resistance bridged by the operator across the two conductors in the place of the line relay, said first relay at the automatic exchange become de-energized in series with said high resistance, means controlled over the calling line for connecting said source to the two conductors, a low resistance connectable by the operator across the two conductors, a second bridge across the two conductors at the automatic exchange and including a meter relay and an identifying relay having contacts controlling the first bridge, a source of current at the toll exchange, means controlled by the operator for connecting said source selectively to operate the meter and the identifying relays, a meter for the calling line controlled by the meter relay, means for identifying the number of the calling line controlled by the identifying relay, a ringing relay for signaling the calling line, and a circuit for the ringing relay controlled by the meter and identifying relays.

125. In an automatic telephone system, an automatic and a toll exchange, a plurality of numerically designated subscribers' lines terminating at the automatic exchange, means including first and a second line finder and a plurality of stages of selectors for interconnecting calling and called lines at the automatic exchange, a group of toll trunks leading from one of the selector stages to the toll exchange, each of said trunks consisting of two conductors, a source of current at the automatic exchange, a double wound relay at the automatic exchange, a first bridge including said source and the two relay windings placed across the two conductors at the automatic exchange upon the seizure of the trunk by a selector, terminal equipment for each trunk at the toll exchange including a double wound relay bridged across the two conductors, operators' positions having a plurality of trunks, means including a first and a second finder in series for connecting the seized toll trunk with an operator's position trunk, a toll supervisory relay at the selected operator's trunk having a high and a low resistance winding, means controlled by the operator for bridging the high resistance winding of the supervisory relay across the two conductors in the place of the line relay, said double wound relay at the automatic exchange becoming de-energized in series with said high resistance winding, means controlled over the calling line for connecting said source to the two conductors, means controlled by the operator to connect the low resistance winding of the supervisory relay across the two conductors, a second bridge across the two conductors at the automatic exchange and including a path from ground over a first rectifier and a meter relay to one conductor and a second path from said ground over a second rectifier and an identifying relay to the other conductor, the first bridge including back contacts of the meter and identifying relays, a source of current at the toll exchange, means controlled by the operator for connecting said source with either conductor or to both conductors, a meter for the calling line controlled in a front contact of the meter relay, means for identifying the number of the calling line controlled in a front contact of the identifying relay and back contact of the meter relay, a ringing relay for signaling the calling line, and a circuit for the ringing relay including front contacts of the meter and identifying relays.

126. In an automatic telephone system, an automatic and a toll exchange, a plurality of numerically designated subscribers' lines terminating at the automatic exchange, means including a plurality of stages of selectors for inter-connecting calling and called lines at the automatic exchange, a group of toll trunks leading from one of the selector stages to the toll exchange, each of said trunks consisting of two conductors, a source of current at the automatic exchange, a first relay at the automatic exchange, a first bridge including said source and the first relay placed across the two conductors at the automatic exchange upon the seizure of the trunk by a selector, terminal equipment for each trunk at the toll office including a line relay bridged across the two conductors, operators' positions having a plurality of trunks, means for connecting the seized toll trunk with an operator's position trunk, a high resistance bridged by the operator across the two conductors in the place of the line relay, said first relay at the automatic exchange becoming de-energized in series with said high resistance, means controlled over the calling line for connecting said source of the two conductors, a low res'stance connectable by the operator across the two conductors, a second bridge across the two conductors at the automatic exchange and including a meter relay and an identifying relay having contacts controlling the first bridge, a source of current at the toll exchange, means controlled by the operator for connecting said source selectively to operate the meter and the identifying relays, a meter for the calling line controlled by the meter relay, means for identifying the number of the calling line controlled by the identifying relay, a ringing relay for signaling the calling line, and a circuit for the ringing relay controlled by the meter and identifying relays.

127. In an automatic telephone system, an automatic and a toll exchange, a plurality of numerically designated subscribers' lines terminating at the automatic exchange, means including non-numerical and a plurality of stages of numerical selector switches for interconnecting calling and called lines at the automatic exchange, a group of toll trunks leading from one of the selector stages to the toll exchange, a source of current at the automatic exchange, a first relay at the automatic exchange connected with a trunk upon its seizure by a selector, a line relay connected with the seized trunk at the toll exchange, operators' positions having a plurality of trunks, automatic switching means for connecting the seized toll trunk with an operator's position trunk, a toll supervisory relay at the selected operator's trunk, means controlled by the operator for connecting the supervisory relay with the selected trunk in the place of the line relay and for controlling the energization of the first relay, means controlled over the calling line for connecting said source to the selected trunk, a meter and an identifying relay at the automatic exchange, a meter for the calling line controlled by the meter relay, means for identifying the calling line number jointly controlled by the meter and identifying relays, and means controlled by the operator for selectively operating the meter and identifying relays.

128. In an automatic telephone exchange system, a plurality of numerically designated subscribers' and trunk lines, means including a line finder and a plurality of numerical stages of selectors for establishing a connection between a calling and a called line over said trunk lines in a first exchange, said selectors being arranged to hunt for an idle one in a selected group of trunks, a plurality of registers for controlling the numerical and hunting operations of said selectors, a plurality of links each provided at each end with a switch having a terminal bank and a set of brushes cooperating therewith, means operative upon the initiation of a call for operating the brushes of said switches for temporarily connecting an idle register with the connection, a calling device for each subscriber's line, a circuit including said calling device, the line finder, the link, and a first and a second brush of each switch for variably setting said register in accordance with the called number, a second circuit including the link, and a third and a fourth brush of each switch for controlling the numerical operations of the successive stages of selectors in accordance with the setting of the register, ringing and busy signaling means in each link, means controlled by the register for grounding a fifth and a sixth brush of one switch and a fifth brush of the other switch for ringing the called line, means controlled by the register for grounding the fifth brushes of said switches and a sixth brush of the other switch for sending the busy signal to the calling line, inter-office trunks leading from the first to a second exchange, a special selector to which said inter-office trunks are accessible, controlled by the register, and means controlled by the register when an inter-office trunk is selected to ground the fifth and sixth brushes of both switches and to ground a seventh brush of one switch for both ringing and busy signaling.

129. In a telephone system, a plurality of automatic exchanges, a toll exchange, a plurality of lines terminating in each exchange, means in the first automatic exchange for establishing a connection between a calling and a called line, said means including a plurality of group selectors having banks of terminal sets and cooperating brushes, trunks leading from said first automatic exchange to the toll exchange and to the other automatic exchanges, an out-trunk link and an in-trunk link in the first automatic exchange for each trunk, the out-trunk links in which trunks to other automatic exchanges terminate being identical with one another, connections from said out-trunk links to one of the group selectors at the first automatic exchange, connections from the in-trunk links to another group selector at the first automatic exchange, a first register at the first automatic exchange, means operative upon the initiation of a call for connecting the first register with the first group selector at the first exchange, a second register at the first automatic exchange, and means operable upon the selection of an incoming link for connecting the second register therewith.

130. The telephone system according to claim 129, and in which each of said trunks consists of two wires and the out-trunk link connected therewith comprises two relays and four wires terminating in the terminal sets of a group selector, the first one of said relays having a first winding connected over a back contact of the second relay to one of the terminals of a set, a second relay having a winding connected in series with a second winding of the first relay and a contact thereof to a second terminal of said set, a source of D. C. potential connected over a back contact of the second relay to a third terminal of the set, and a connection between the two wires of the trunk and the first and a fourth terminal of the set, including front contacts of the second relay.

131. The telephone system according to claim 129, and in which the trunk leading to the toll office consists of two wires and the out-trunk link connected therewith comprises a set of relays, four wires leading to a set of terminals of one of the group selectors, a repeating coil in the out-trunk link, said set of relays comprising a first and a second relay having contacts for connecting a first and a second terminal of a set with one side of the repeating coil, a third relay having a winding energized over a circuit including the back contact of the first relay and one of said terminals, said third relay having a front contact for controlling the energization of the first relay, a fourth relay connected to one of the conductors of the inter-office trunk and having a contact controlling the circuit of the second relay, a fifth relay bridged across said connection to the repeating coil controlled by the first and the second relay and having contacts controlling the second and third relays.

132. The telephone system according to claim 129, and in which the inter-office trunks consist of two wires and the in-trunk link connected with the trunk leading to a second automatic exchange comprises three relays and associated contacts, the first relay having two windings connected across the two wires of the trunk over back contacts of the second relay, a circuit for the second relay controlled in said second register, a circuit for the third relay controlled by said second relay, a resistance bridged across the two trunk conductors during the energization of the second relay, and a circuit for controlling the connection of the second register with the in-trunk link controlled by the first relay.

133. In a telephone system, a plurality of automatic exchanges, a toll exchange, a plurality of lines terminating in each exchange, means in the first automatic exchange for establishing a connection between a calling and a called line, said means including a first and a second line finder, first, second, third and other group selectors, terminal banks and cooperating brushes, an A-link inter-connecting the first and second line finders, a B-link inter-connecting the second line finder and the first group selector, the second line finder and first group selector being identical with one another, and the first line finder and the other group selectors being identical with one another, inter-office trunks leading from said first automatic exchange to the toll exchange and to the other automatic exchanges, an out-trunk link and an in-trunk link in the first automatic exchange for each inter-office trunk, the out-trunk links in which trunks to other automatic exchanges terminate being identical with one another, connections from said out-trunk links to the terminal banks of first and second group selectors at the first automatic exchange, connections from the in-trunk links to the brushes of third group selectors at the first automatic exchange, a first register at the first automatic exchange, means operative upon the initiation of a call for connecting the first register with the B-link to control the operation of said group selector switches at the first exchange in the establishment of the desired connection, a second register at the first automatic exchange, means operable upon the selection of an incoming link for connecting the second register therewith, and means in the second register for controlling all the group selector switches beyond the third group selector in said automatic exchange.

134. In a telephone system, a plurality of automatic telephone exchanges, a plurality of numerically designated lines terminating in said exchanges, means including automatic selector switches for establishing connections between calling and called lines in said exchanges, means for setting each of said selectors in accordance with a different digit of the called line number, a plurality of trunks extending from one exchange to a second exchange, impulse means controlled by the calling line for controlling the setting of successive selectors to establish the desired connection, a relay for each trunk at the second exchange responsive to said impulse means, a switch for said trunk at the second exchange having a plurality of operated positions, a circuit for operating the switch controlled by said relay, and a control circuit for successive selectors at the second exchange jointly controlled by said relay and switch.

135. In a telephone system, a plurality of automatic telephone exchanges, a plurality of numerically designated lines terminating in said exchanges, means including automatic selector switches for establishing connections between calling and called lines in said exchanges, means for setting each of said selectors in accordance with a different digit of the called number, a plurality of trunks extending from one exchange to a second exchange, impulse means controlled by the calling line for controlling the setting of successive selectors to establish the desired connection, a relay for each trunk at the second exchange responsive to said impulse means, a switch in said trunk at the second exchange having a normal and a plurality of operated positions, an interrupter in each trunk, a circuit for operating the switch controlled by said relay, means for variably operating the interrupter in accordance with the operations of the switch, and a control circuit for successive selectors at the second exchange jointly controlled by said relay, the interrupter and the switch.

136. In a telephone system, a plurality of automatic telephone exchanges, a plurality of numerically designated lines terminating in said exchanges, means including automatic selector switches for establishing connections between calling and called lines, a plurality of trunks extending from one exchange to a second exchange and selectable by a selector at the former, a register in the second exchange, a plurality of digit switches in said register, means controlled by the calling line for variably operating each digit switch in accordance with a different digit of the called line number, means for successively associating said digit switches with successive selectors successively to control their operation, a relay for each trunk at the second exchange, circuits controlled by the relay of the selected trunk for associating said register therewith, a switch for said trunk at the second exchange having a normal and a plurality of operated positions, an interrupter for each trunk at the second exchange, means for variably operating said interrupter in accordance with the operations of the switch, a circuit for operating the switch controlled by said relay, means jointly controlled by said relay and the switch for operating the interrupter, and a control circuit for the digit switches of the register jointly controlled by said relay, the interrupter and the first switch.

137. The telephone system according to claim 136, and in which said relay is quick acting and controls a slow acting relay, the latter controlling the association of said register with the trunk, a contact closed by said switch while it is out of its normal position and opened in its normal position, a second switch in each trunk for operating said interrupter, the circuit for operating the first switch being controlled in contacts of the quick and slow relays, a circuit for operating the second switch jointly controlled by the interrupter, the slow relay and the contact of the first switch, and the control circuit for the digit switches of the register being jointly controlled by the slow relay, the interrupter, and the contact of the first switch.

138. In an automatic telephone system, a plurality of exchanges, subscribers' lines terminating at the exchanges, groups of local and inter-office trunks, successive stages of numerical selectors at each exchange having brushes and terminals in which said trunks terminate, said brushes and terminals including two over which two conductors of a talking circuit are extended, a magnet for each selector to move its brushes over its terminals, a calling device for each line to send series of impulses representing the digits of the called number, a register at each exchange, in each register an impulse relay responsive to said impulses variably to operate the register, a circuit for the impulse relay including the two talking conductors, a first relay in each register having a control circuit, a second and a third relay in each register, a first path leading to said control circuit, contacts for applying different potentials to the first path depending on the setting of the register, a second path leading to said control circuit over one of the talking conductors and contacts of the second and the third relay for applying different potentials thereto depending on the terminals engaged by the successive selector stages, said first relay operating only when the potentials applied over the two paths bear a predetermined relationship to one-another, circuits for the magnets of successive selectors including the other talking conductor and contacts of the second, third and first relays, a circuit for the second relay including contacts controlled by the register when it is set for controlling the selection of an inter-office trunk, a bridge across the two talking conductors at the register including contacts of the second relay and a bridging relay, and an interrupter in said bridge at the register variably operable in accordance with the setting of the register.

139. In an automatic telephone system, a plurality of exchanges, a plurality of numerically designated subscribers' lines at each exchange, means including a plurality of stages of selectors having cooperating brushes and terminals for inter-connecting calling and called lines at each exchange, inter-office trunks leading from the terminals of one stage of selectors at a first exchange to the brushes of one stage of selectors at a second exchange, a register at each exchange, a first link operative upon the initiation of a call at the first exchange to connect the register at the first exchange with the calling line and a first stage selector, a second link operable upon the selection of an inter-office trunk for connecting the register at the second exchange with the selected inter-office trunk, means for releasing the registers upon the completion of the connection by the selectors at the first and second exchanges, a plurality of digit switches in each register, one for each digit of subscribers' line numbers, and each having a plurality of actuated positions, a calling device for the calling line operable to send impulses in accordance with the successive digits of the called number, an impulse relay in each register responsive to impulses, a switch in the register for associating said relay with the successive digit switches to register the number of impulses sent by the calling device for each digit, a control relay in each register having a control circuit, potential responsive means controlled by the digit switches and the selector brushes for applying in their different actuated positions different potentials to the control circuit, said control relay being operable only if the potential applied to its control circuit by a digit switch bears a certain relationship to the potential applied by a selector brush, each of said selectors having positions in which potentials are applied to the control circuit bearing said certain relationship to the potentials applied in the positions of the corresponding digit switch, circuits for controlling the position into which each selector is moved, controlled by said control relay, a circuit closed at the register of the first exchange for the impulse relay of the second exchange, an interrupter in the last-mentioned circuit, and means controlled by digit switches of the first exchange register for operating said interrupter only after the connection of the register at the second exchange.

140. An automatic telephone system according to claim 139, and in which means are provided in the second exchange for causing current to flow over the talking conductors of the inter-office trunk in one direction while the register at the second exchange is connected, and in the opposite direction before the connection and after the release of said register.

141. An automatic telephone system according to claim 139, and a circuit established upon the selection of an inter-office trunk including at the first exchange said interrupter and two relays in the register connected in parallel and responsive to current flow in opposite directions, and at the second exchange a trunk relay, means responsive to the connection of the register at the second exchange for reversing the flow of current in said circuit and replacing the trunk relay by the impulse relay of the register at the second exchange, means operable upon the release of the register at the first exchange for replacing in said circuit the two register relays in parallel by two relays in parallel in the first link and responsive to current flow in opposite directions, means responsive to the release of the register at the second exchange for replacing the impulse relay of the latter with a relay in the second link in said circuit, means responsive to the answer by the called subscriber for replacing in said circuit the relay in the second link by said trunk relay and reversing the flow in said circuit, and means operative thereupon for replacing in said circuit the two relays of the first link by a relay associated with the last operated selector in the first exchange.

142. In an automatic exchange system, a plurality of exchanges, subscribers' lines terminating at the exchanges, groups of local and inter-office trunks, successive stages of numerical selectors having brushes and terminals in which said trunks terminate, said brushes and terminals including two over which two conductors of a talking circuit are extended, a magnet for each selector to move its brushes over its terminals, a register at the first exchange, an impulse relay in the register connected with the calling line over the two talking conductors, a calling device at the calling line for sending impulses over the two talking conductors in accordance with the digits of the called number, a plurality of digit switches in the register, means for successively associating the digit switches with the impulse relay, a first relay in the register having a control circuit, a second and a third relay in said register, a first path leading to said control circuit, contacts for said digit switches for applying different potentials to the first path depending on the setting thereof, a second path leading to said control circuit over one of the talking conductors, a back contact of the second relay and a front contact of the third relay for applying different potentials thereto depending on the terminals engaged by the successive selector stages, said first relay operating only when the potentials applied over the two paths bear a predetermined relationship to one another, circuits for the magnets of successive selectors including the other talking conductor and contacts of the second, third and first relays, a circuit for the second relay including contacts operated by one of the digit switches when it is set for controlling the selection of an inter-office trunk, a bridge across the two talking conductors at the register including contacts of the second relay and a first bridging relay, and in parallel a second bridging relay, an interrupter in said bridge at the register and controlled by the digit switches, and a second impulse relay at the connected exchange bridged across the talking conductors.

143. An automatic telephone system, according to claim 142, a negatively poled rectifier in series with the first bridging relay, and a positively poled rectifier in series with the second bridging relay.

144. The automatic telephone system according to claim 142, and a trunk link including two talking conductors for connecting inter-office trunks with a selector at the called exchange, a relay in the trunk link normally bridged across the talking conductors thereof, a second register at the called exchange comprising the second impulse relay, a register link for connecting the second register with the trunk link controlled by its relay, and a relay at the first register controlling said interrupter having a contact bridging the talking conductors.

145. The automatic telephone system according to claim 142, and a trunk link including two talking conductors for connecting inter-office trunks with a selector at the called exchange, a relay in the trunk link normally bridged across the talking conductors thereof to operate in series with the first bridging relay of the register, a second register at the called exchange comprising the second impulse relay, a register link for connecting the second register with the trunk link controlled by its relay, means operative thereupon for disconnecting the relay in the trunk link and bridging across the talking conductors of the latter the second impulse relay in the called exchange register to operate in series with the second bridging relay at the first register, and a relay at the first register controlling said interrupter having a contact bridging the talking conductors and a circuit controlled by the second bridging relay and the digit switches of the first register which respond to the impulses destined for controlling selection at the called exchange.

146. The automatic telephone system according to claim 142, and a trunk link including two talking conductors for connecting inter-office trunks with a selector at the called exchange, a relay in the trunk link normally bridged across the talking conductors thereof to operate in series with the first bridging relay of the register, a second register at the called exchange comprising the second impulse relay, a register link for connecting the second register with the trunk link controlled by its relay, means operative thereupon for disconnecting the relay in the trunk link and bridging across the talking conductors of the latter the second impulse relay in the second register to operate in series with the second bridging relay at the first register, a relay at the first register controlling said interrupter having a contact bridging the talking conductors and a circuit controlled by the second bridging relay and the digit switches of the first register which respond to the impulses destined for controlling selection at the called exchange, means for releasing the first register upon the completion of its operation, two parallel bridges established across the talking conductors in the last selector stage of the calling exchange to replace those in the first register and containing, respectively, a relay and a positively and a negatively poled rectifier, means for releasing the second register upon the completion of its operation, means operative thereupon for disconnecting the second impulse relay and bridging across the talking conductors a relay in the register link, means operative when the called subscriber answers for substituting for the last-mentioned bridge the one including the relay in the trunk link, a meter for the calling subscriber operated thereupon, and a coil bridged across the talking conductors in the place of the parallel bridges in the last selector stage of the calling exchange.

147. In an automatic telephone system, a plurality of exchanges, subscribers' lines terminating at the exchanges, groups of local and inter-office trunks, successive stages of numerical selectors at each exchange having brushes and terminals in which said trunks terminate, said brushes and terminals including two over which two conductors of a talking circuit are extended, a magnet for each selector to move its brushes over its terminals, said inter-office trunks extending from terminals of a selector at a first exchange to an impulse repeating relay at a second exchange, a calling device for each line to send series of impulses representing the digits of the called number, a plurality of registers at the first exchange, in each register an impulse relay responsive to said impulses variably to operate the register, a circuit for the impulse relay including the two talking conductors, a first relay in each register having a control circuit, a second and a third relay in each register, a first path leading to said control circuit, contacts for applying different potentials to the first path depending on the setting of the register, a second path leading to said control circuit over one of the talking conductors, selector brushes at the first exchange, and contacts of the second and the third relay for applying different potentials thereto depending on the terminals engaged by the successive selector stages, said first relay operating only when the potentials applied over the two paths bear a predetermined relationship to one another, circuits for the magnets of successive selectors at the first exchange including the other talking conductor and contacts of the second, the third and the first relay, a circuit for the second relay including contacts closed when the register is set for controlling the selection of an inter-office trunk, a bridge across the two talking conductors at the register including contacts of the second relay and a bridging relay, an interrupter in said bridge controlled by the setting of the register.

148. In an automatic telephone system, a plurality of exchanges, subscribers' lines terminating at the exchange, groups of local and inter-office trunks, successive stages of numerical selectors at each exchange having brushes and terminals in which said trunks terminate, said brush and terminals including two over which two conductors of a talking circuit are extended, said inter-office trunks being connected between the brushes of one of the selector stages at a first exchange and a trunk repeater at a second exchange, a magnet for each selector to move its brushes over its terminals, a calling device for each line to send series of impulses representing the digits of the called number, a register at the first exchange, in each register an impulse relay responsive to said impulses variably to operate the register, a circuit for the impulse relay including the two talking conductors, a first relay in each register having a control circuit, a second and a third relay in each register, a first path leading to said control circuit, contacts for applying different potentials to the first path depending on the setting of the register, a second path leading to said control circuit over one of the talking conductors, selector brushes at the first exchange, and contacts of the second and the third relay for applying different potentials thereto depending on the terminals engaged by the successive selector stages at the first exchange, said first relay operating only when the potentials applied over the two paths bear a predetermined relationship to one another, circuits for the magnets of successive selectors of the first exchange including the other talking conductor, and contacts of the second, the third and the first relay, a bridge across the two talking conductors at the register including the impulse relay, a bridge across the talking conductors in said trunk repeater and a repeater relay having contacts in the last-mentioned bridge.

149. In an automatic telephone exchange system, a plurality of subscribers' lines designated by multi-digit numbers, means including a selector switch for establishing a connection between a calling and a called line, said selector having a first set of contacts and groups of contacts designated by one of the digits and constituting a second set, a magnet for operating the two sets of contacts relative one another, means for making busy the contacts of the second set, means for controlling said magnet in accordance with said one digit of the called number to cause cooperation between the first set of contacts and the desired group of contacts of the second set, means for controlling said magnet in accordance with the next digit of the called number to cause cooperation between the first set of contacts and the desired contact in said desired group, and means responsive to the busy condition of the desired contact for controlling said magnet to cause cooperation between the first set of contacts and any predetermined contact in the desired group.

150. In an automatic telephone exchange system, a plurality of subscribers' lines designated by multi-digit numbers, means including a selector switch for establishing a connection between a calling and a called line, said selector having a bank of terminals arranged in consecutive groups and a set of brushes cooperating therewith, each group of terminals being designated by one digit of the called number and each terminal in a group by the next digit, means for temporarily making busy a terminal while it is engaged by a brush, means for controlling the brushes in accordance with said one digit to select a group of terminals, means for controlling the brushes in accordance with the next digit for selecting a terminal in the selected group, and means responsive to the busy condition of the last mentioned terminal for controlling the brushes to select any predetermined idle terminal in the selected group of terminals.

151. The telephone system according to claim 149, and in which the groups of terminals are formed by permanently making busy any terminals, the terminals on either side of permanently busy terminals constituting separate groups.

152. In an automatic telephone exchange system, a plurality of numerically designated lines, means including a selector for connecting a calling with a called line, said selector having sets of terminals, cooperating brushes, a magnet and a first and a second relay, means controlled over the calling line and including the first relay for operating the magnet to control said brushes in accordance with a digit of said number to engage a set of terminals, means controlled by the second relay for holding the brushes in engagement with the selected terminals, a circuit for the second relay controlled over the calling line, a circuit for the first relay controlled over the called line, and means controlled by the first relay for holding the brushes in engagement with the selected terminals.

153. The telephone system according to claim 152, and in which said magnet has a first circuit controlled in front contacts and a second circuit controlled in back contacts of the two relays, a first circuit for the first relay controlled over the calling line, a second circuit for the first relay controlled over the called line and a back contact of the second relay, and a circuit for the second relay controlled over the calling line.

154. In a automatic telephone exchange system, a plurality of numerically designated lines, means including a selector for establishing a talking circuit between a calling and a called line, said selector having four brushes and sets of terminals, each set consisting of four terminals, a magnet for controlling said brushes to engage a set of terminals determined by the numerical designation of the called line, said talking circuit including two of said brushes and terminals, a circuit including the third brush and terminal for controlling the holding of the brushes in engagement with the selected set for terminals, means for establishing two different test conditions on the fourth terminal of said sets, and test circuits responsive to said conditions including the fourth brush.

155. The telephone system according to claim 154, and circuits for controlling the operation of said magnet in accordance with two digits of the called number including the fourth brush.

156. In a telephone exchange system, a plurality of numerically designated subscribers' lines, a plurality of successively operated switches for connecting a calling with a called line, said switches having terminals and cooperating brushes including a test terminal and brush, and a continuous conductive test circuit including the test terminals and brushes of all said switches.

157. The telephone system according to claim 156, and separate circuits in each switch for holding the brushes of the switch in engagement with the terminals.

158. The telephone system according to claim 156, and a relay connected with said circuit and responsive to the flow therethrough of a predetermined current.

159. In an automatic telephone exchange system, a plurality of numerically designated subscribers' lines, a line relay for each line having an armature and cooperating front and back contacts, a circuit closed for the line relay of the line upon which a call is initiated, sources of potential connected to the line relay contacts, means including a plurality of selectors and operable in accordance with called numbers for establishing connections with called lines, switching means responsive to the potential connected to the front contact of a relay for extending the associated calling line to one of said selectors, means controlled by the calling line and responsive to the potential connected to the back contact of the called line relay for operating said one of said selectors to seize the called line, and means for identifying the number of the calling line responsive to the potential connected to the back contact of the calling line relay.

160. In an automatic telephone exchange system, a plurality of numerically designated lines, means including a plurality of numerically operable selectors for establishing a two wire talking circuit between a calling and a called line, means for connecting the calling line with one of said selectors, a register variably operable over a line in accordance with the called number for variably controlling said selectors, switching means for connecting the register with the calling line and said one of said selectors, each of said selectors having a pair of cooperating contacts for each wire of the talking circuit, a source of potential and means for connecting it with one wire of the talking circuit, means responsive to the presence of the potential on said one wire in a selector for cooperating with the register in the control of the last mentioned selector, and means for giving a busy signal to the calling line responsive to the absence of said potential from the wire with which a selector connects under the control of the register.

161. The system according to claim 160, and in which the last mentioned means is associated with said switching means.

162. The system according to claim 160, and means also responsive to the absence of said potential for releasing said register.

163. The system according to claim 160, and a second source of potentials and means for connecting it to the second wire in any selector, means responsive to the presence of said second potential on the second wire in the selectors for cooperating with the register in the successive control of the selectors to establish the talking circuit, means responsive to the presence of a different potential on the second wire in any selector for releasing the register, said switching means and the selectors operated in the establishment of the talking circuit.

164. The system according to claim 160, and a second source of potentials and means for connecting it to the second wire in any selector, means responsive to the presence of said second potential on the second wire in the selectors for cooperating with the register in the successive control of the selectors to establish the talking circuit, means responsive to the presence of a different potential on the second wire in any selector for releasing the register, said switching means and the selectors operated in the establishment of the talking circuit, a special position, and means operative upon the release for connecting the calling line with said position.

165. In a multi-exchange telephone system, a first type of exchange having revertive impulse controlled selectors for establishing connections, a second type of exchange having directively controlled switches for establishing connections, a first register in each exchange of the first type for controlling the establishment of local connections, incoming and outgoing inter-office trunks between all said exchanges, and a second register in each exchange of the first type for controlling the establishment of all incoming inter-office connections.

166. The system according to claim 165, and means controlled by the first register in an exchange of the first type for selecting an outgoing trunk.

167. The system according to claim 165, and switching means in the exchanges of the first type for connecting the second register with any incoming trunk, and control relays for each incoming trunk associated with said switching means.

GERALD DEAKIN.